(12) United States Patent
Palazoglu et al.

(10) Patent No.: US 7,112,954 B2
(45) Date of Patent: Sep. 26, 2006

(54) METHODS, SYSTEMS, AND DEVICES FOR EVALUATION OF THERMAL TREATMENT

(75) Inventors: Tunc Koray Palazoglu, Mersin (TR); Josip Simunovic, Raleigh, NC (US); Kenneth R. Swartzel, Raleigh, NC (US); Kandiyan Puthalath Sandeep, Cary, NC (US)

(73) Assignee: North Carolina State University, Raleigh, NC (US)

( * ) Notice: Subject to any disclaimer, the term of this patent is extended or adjusted under 35 U.S.C. 154(b) by 181 days.

(21) Appl. No.: 10/767,427

(22) Filed: Jan. 28, 2004

(65) Prior Publication Data

US 2004/0228387 A1 Nov. 18, 2004

Related U.S. Application Data

(60) Provisional application No. 60/443,298, filed on Jan. 28, 2003.

(51) Int. Cl.
  *G01N 27/44* (2006.01)
  *G01R 33/12* (2006.01)
  *G01K 7/02* (2006.01)
(52) U.S. Cl. ................. 324/204; 374/176
(58) Field of Classification Search ............... 324/204; 374/176

See application file for complete search history.

(56) References Cited

U.S. PATENT DOCUMENTS 5,039,426 A  8/1991  Giddings
5,438,526 A  8/1995  Itoh et al.
5,722,317 A  3/1998  Ghiron et al.
6,015,231 A  1/2000  Swartzel et al.
6,776,523 B1 *  8/2004  Simunovic et al. ......... 374/176
2005/0031751 A1  2/2005  Weng et al.

FOREIGN PATENT DOCUMENTS

WO  WO 2005/011409  2/2005

OTHER PUBLICATIONS

International Search Report and Written Opinion corresponding to PCT. International patent application No. PCT/US04/02355 dated Jan. 6, 2006.
European Search Report corresponding to European application No. 04706039.8-2204 dated Apr. 18, 2006.

* cited by examiner

*Primary Examiner*—Reena Aurora
(74) *Attorney, Agent, or Firm*—Jenkins, Wilson, Taylor & Hunt, P.A.

(57) ABSTRACT

Methods, Systems, and Devices for Evaluation of Thermal Treatment. A magnetically detectable particle and related methods, systems, and devices are provided for generating a temperature measurement for a batch or a continuous stream of material. The particle can include a first and second magnet each comprising a positive and negative pole. The particle can also include an adhesive having a release temperature and operable to attach one or both of the positive and negative poles of the first magnet proximate to the same polarity pole of the second magnet or to attach one of the positive and negative poles of the first magnet between the poles of the second magnet below the release temperature such that a first magnetic field is generated by the first and second magnet. The adhesive can also be operable to release the first and second magnets from one another above the release temperature.

88 Claims, 90 Drawing Sheets

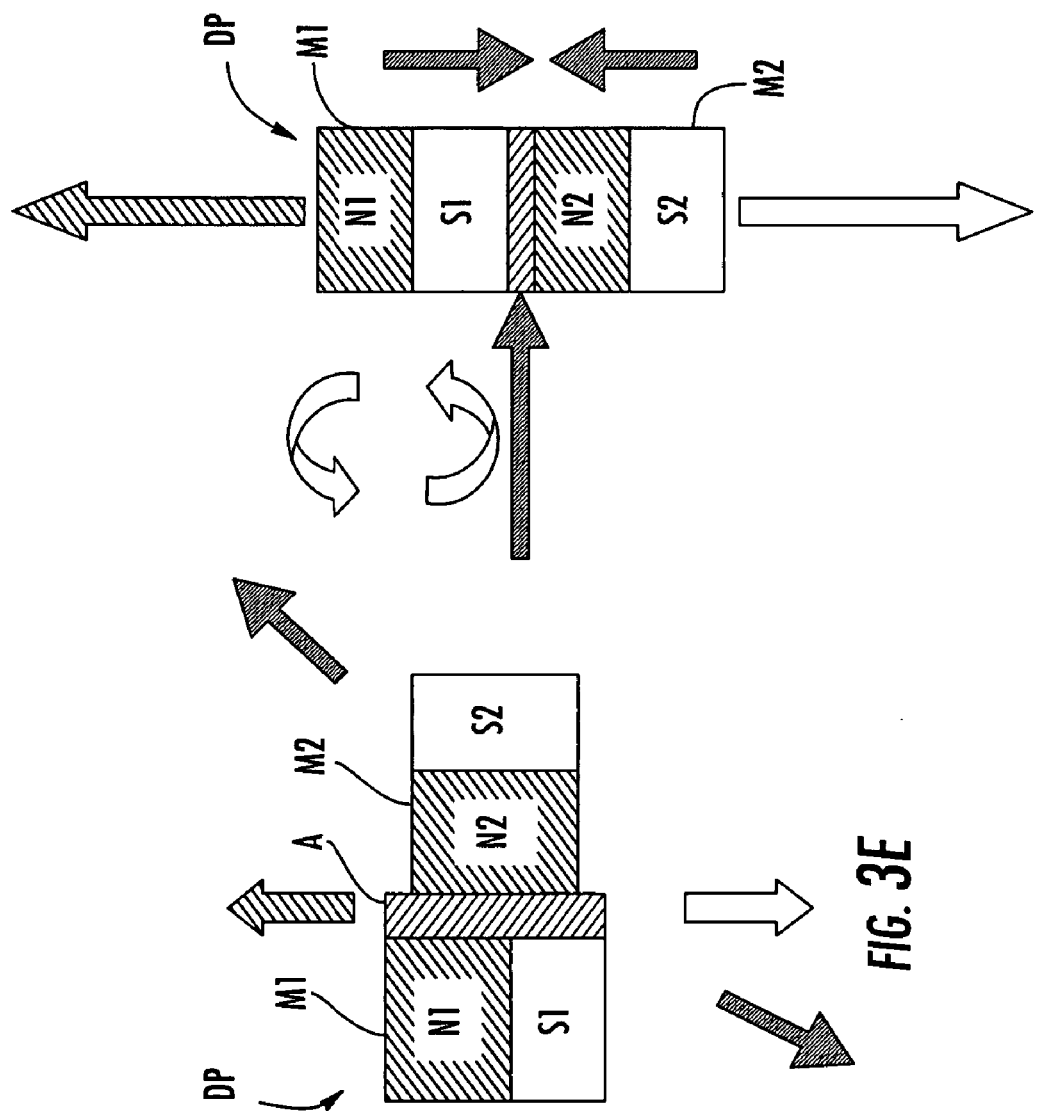

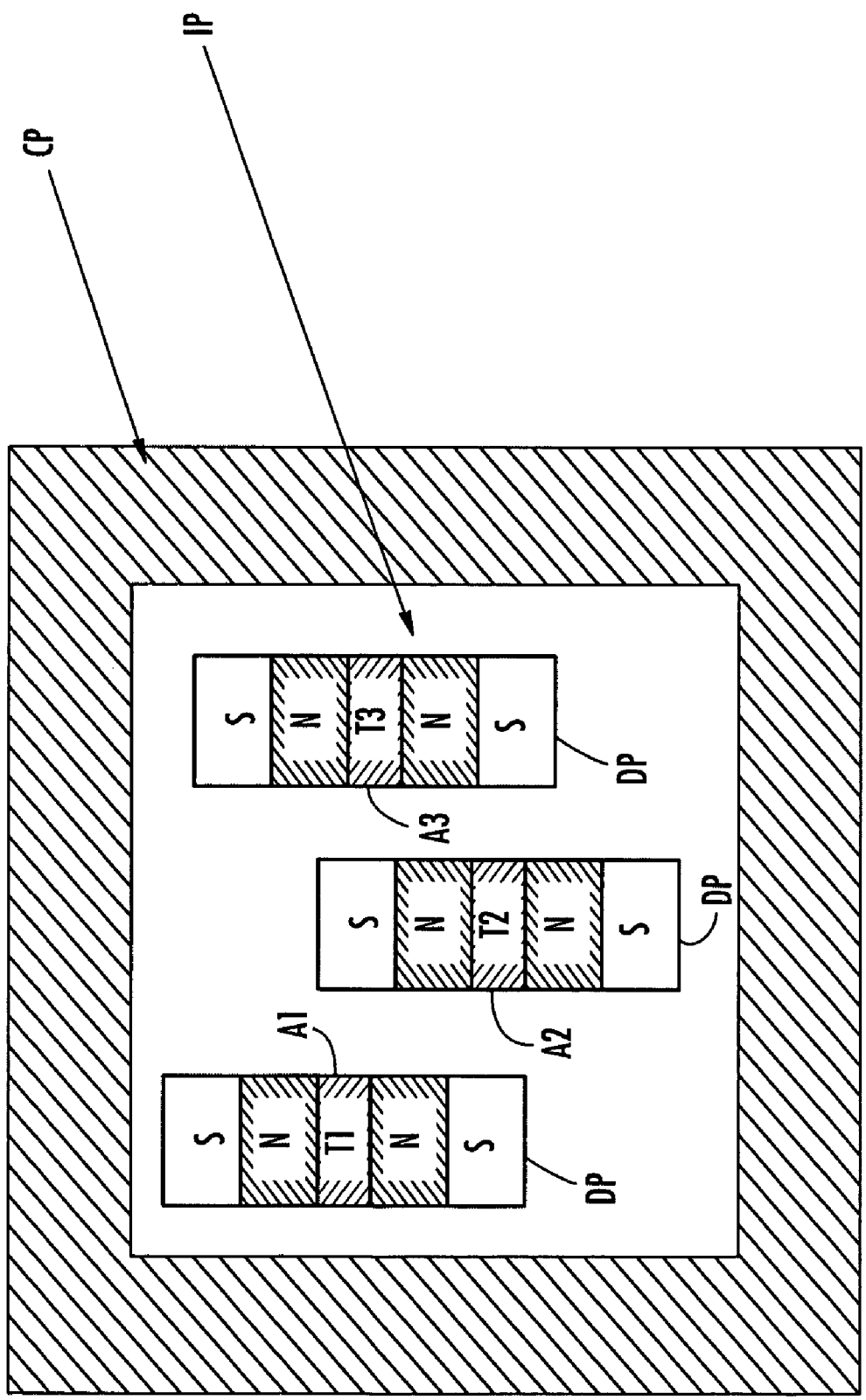

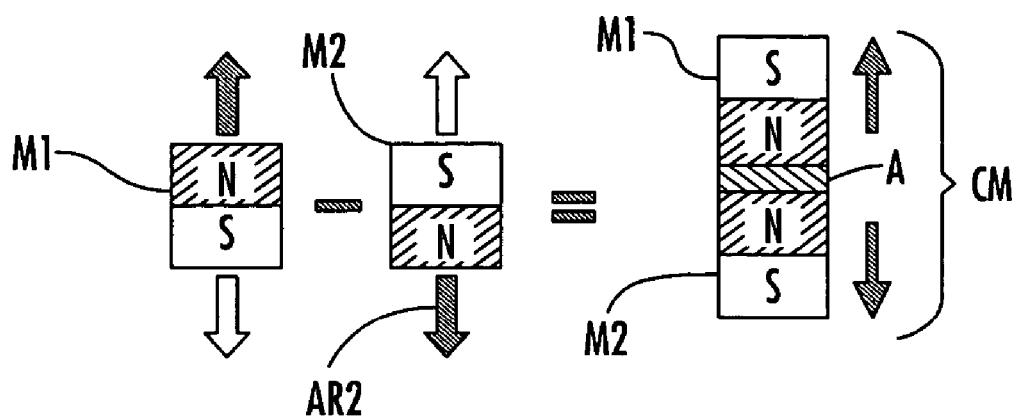
FIG. 4
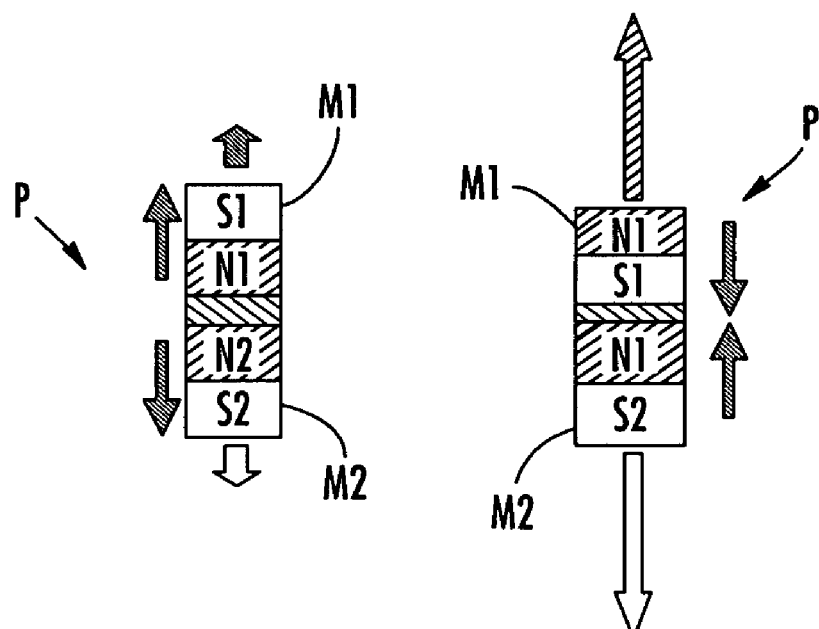
FIG. 5A
FIG. 5B

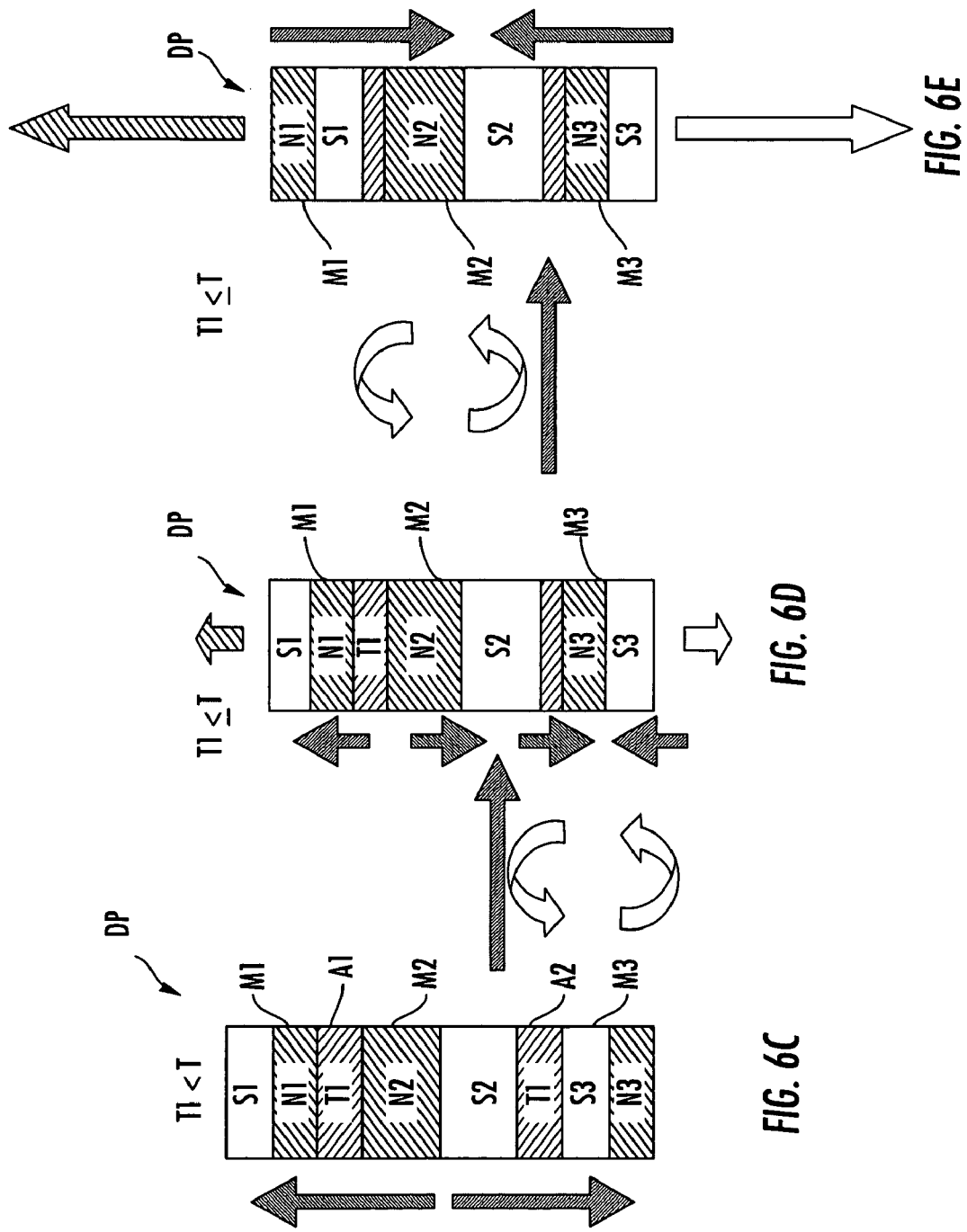

```
          3600
              ╲         ┌─3602
                     ( START )
                         │
   3604 ──┐              ▼
         ┌──────────────────────────┐
         │ STORE INFORMATION FOR    │
         │ SIMULATING A TARGET      │
         │ PARTICLE                 │
         └──────────────────────────┘
                         │
   3606 ──┐              ▼
         ┌──────────────────────────┐
         │ STORE INFORMATION FOR    │
         │ SIMULATING A CARRIER     │
         │ PARTICLE DESIGN          │
         └──────────────────────────┘
                         │
   3608 ──┐              ▼
         ┌──────────────────────────┐
         │ DETERMINE THE CONSERVATIVE│
         │ BEHAVIOR CHARACTERISTICS │
         │ OF A TARGET PARTICLE     │
         └──────────────────────────┘
                         │
   3610 ──┐              ▼
         ┌──────────────────────────┐
         │ DETERMINE MATERIALS AND  │
         │ DIMENSIONS FOR A CARRIER │
         │ PARTICLE DESIGN ABOUT    │
         │ MATCHING THE CONSERVATIVE│
         │ BEHAVIOR CHARACTERISTICS │
         │ OF THE TARGET PARTICLE   │
         └──────────────────────────┘
                         │
   3612 ──┐              ▼
         ┌──────────────────────────┐
         │ FABRICATE AN ACTUAL      │
         │ CARRIER PARTICLE ABOUT   │
         │ EQUIVALENT TO THE        │
         │ CARRIER PARTICLE DESIGN  │
         └──────────────────────────┘
                         │
                         ▼
                      ( STOP )
                   3614 ─┘
```

*FIG. 36*

CUBIC PARTICLE
1/2 in.

POLYPROPYLENE
$F_0$=3 min

POTATO
$F_0$ = 146 min

CUBIC PARTICLE
3/8 in.

POLYPROPYLENE
$F_0$=3 min

POTATO
$F_0$ = 93 min

CYLINDRICAL PARTICLE
1/2 in. x 1/2 in.

POLYPROPYLENE
$F_0$=3 min

POTATO
$F_0$ = 133 min

CYLINDRICAL PARTICLE
3/8 in. x 3/8 in.

POLYPROPYLENE
$F_0$=3 min

POTATO
$F_0$ = 84 min

POTATO
1/2 IN.
$F_0(CENTER) = 3$ MIN.
TIME = 131.4 s
(HOLDING ONLY)
$\alpha = 1.63 \times 10^{-7} m^2/s$

FIG. 42

POTATO
1/2 IN.

POTATO
3/8 IN.
$F_0$(CENTER) = 3 MIN.
TIME = 82.1 s
(HOLDING ONLY)
$\alpha = 1.63 \times 10^{-7}$ m$^2$/s

FIG. 53

POTATO
3/8 IN.

TPX
3/8 IN.
TIME = 82.1 s
(HOLDING ONLY)
α = 1.04 × 10⁻⁷ m²/s

TEFLON
3/8 IN.
TIME = 82.1 s
(HOLDING ONLY)
$\alpha = 1.15 \times 10^{-7} m^2/s$

POTATO
1/2 IN. X 1/2 IN.
F₀(CENTER) = 3 MIN.
TIME = 120.5 s
(HOLDING ONLY)
α = 1.63 X 10⁻⁷ m²/s

FIG. 64

TPX
1/2 IN. X 1/2 IN.
TIME = 120.5 s
(HOLDING ONLY)
$\alpha = 1.04 \times 10^{-7} m^2/s$

TEFLON
1/2 IN. × 1/2 IN.
TIME = 120.5 s
(HOLDING ONLY)
α = 1.15 × 10⁻⁷ m²/s

CPDESIGN

FOOD PARTICLE
POTATO

PLASTIC MATERIAL
TPX

PARTICLE SHAPE
CYLINDRICAL
VIEW PARTICLE

REFERENCE
UNIT CONVERTER
ABOUT
EXIT

8700

POTATO
DENSITY= 1,090 b kg/m³
THERMAL CONDUCTIVITY= 0.554 c W/mK
SPECIFIC HEAT= 3,517 c J/kgK

TPX
DENSITY= 833 kg/m³
THERMAL CONDUCTIVITY= 0.17 W/mK
SPECIFIC HEAT= 1,968 J/kgK

CYLINDRICAL PARTICLE RADIUS
FOOD PARTICLE  0.00635 m
PLASTIC PARTICLE  0.00635 m
HALF THICKNESS
FOOD PARTICLE  0.00635 m
PLASTIC PARTICLE  0.00635 m

PROCESS VARIABLES AND DESIRED $F_0$
INITIAL PARTICLE TEMPERATURE  20 °C
AMBIENT TEMPERATURE  140 °C
HEAT TRANSFER COEFFICIENT  1000 W/m²K
DESIRED $F_0$  3 MIN

CALCULATION OF MAXIMUM IMPLANT WEIGHT
TARGET PARTICLE DENSITY  1000 kg/m³

START

BASED ON THE COMPUTED WALL THICKNESS OF THE PLASTIC PARTICLE AND THE TARGET PARTICLE DENSITY, THE MAXIMUM IMPLANT WEIGHT CAN BE 411 G.

PRINT RESULTS

*FIG. 87*

METHODS, SYSTEMS, AND DEVICES FOR EVALUATION OF THERMAL TREATMENT

RELATED APPLICATIONS

This application claims the benefit of U.S. Provisional Patent Application Ser. No. 60/443,298, filed Jan. 28, 2003, entitled "Methods, Systems, and Devices for Evaluation of Thermal Treatment"; the disclosure of which is incorporated herein by reference in its entirety.

Additionally, co-pending U.S. patent application Ser. No. 09/804,366, filed Mar. 12, 2001, entitled "Method and System for Conservative Evaluation, Validation and Monitoring of Thermal Processing", is incorporated herein by reference in its entirety.

GOVERNMENT INTEREST

This work was supported by the National Science Foundation (NSF) pursuant to contract number MCB 9631375. The Government has certain rights in the invention.

TECHNICAL FIELD

The subject matter disclosed herein relates generally to thermal treatment of materials. More particularly, the subject matter disclosed herein relates to methods, systems, and devices for evaluating such processing.

BACKGROUND ART

It will be appreciated by those of skill in the art that thermal processing of particulate-containing food products is difficult to accomplish in an efficient but effective manner. Particulate-containing food products are also described in the art as multi-phase food products, or as multi-phase foods, in that these products include liquids and solids.

Traditionally, thermal processing of particulate-containing food products involved the placing of the product in individual cans, followed by thermal treatment of the product within the can. The process is generally effective in removing microbial contamination and in providing a food product that is safe for consumption. However, this process is labor and machinery-intensive and time-consuming. Thus, this process lacks efficiency.

Continuous thermal processing generally involves the thermal processing of the food product as a stream or flow in one line while processing the containers or cans in which the food will be stored in another line. The food product is then placed in the container under appropriate conditions wherein microbes and their spores are excluded. Continuous thermal processing thus enables unlimited package size, yielding increased efficiencies and reduced costs to the industry and ultimately to the consumer. Continuous thermal processing is sometimes also called aseptic processing the art.

In the United States, each continuous thermal process for use in the treatment of food must be described in a document to be filed with the United States Food and Drug Administration (FDA) for approval before it can be implemented in industry. Because of the problems associated with uniform treatment in the continuous thermal process, the FDA subjects these documents, hereinafter referred to as "FDA process filings", "process filings" or "FDA filings", to rigorous scrutiny.

To gain FDA approval, a process filing must demonstrate biovalidation of the process, among other information. As is known in the art, biovalidation refers to data showing that the process was effective in removing contamination of the food product by microbes and their spores. To determine biovalidation, conservative residence time distribution measurements are required. Lengthy test runs must be performed to generate the conservative residence time distribution measurements. Such test runs require a great deal of time and involve the loss of a great deal of the food product, as the food product that is part of the test runs have prevented the wide scale adoption in the industry of continuous thermal processing of particulate-containing food products.

The current state of the art for process evaluation and validation of continuous thermal processes for particulate-containing food particles, including low acid multi-phase foods, has evolved over a number of years through the joint efforts of the Center for Advanced Processing and Packaging Studies and the National Center for Food Safety and Technology. Currently, it includes a three (3)-stage sequence. The first stage of the sequence primarily includes process modeling and simulation that provides predicted scenarios for the efficacy of process with respect to microbial lethality. The second stage of the sequence includes experimental measurements of real or simulated particle residence times while flowing through the system for a sufficient number of replications for each particulate product component to provide statistically acceptable (i.e. representative) data for particle velocities to ensure that a portion of the fastest moving particles has been captured and their residence times recorded for modeling purposes. The third and final stage of process evaluation and validation is a biological validation including the use of thermoresistant bacterial spore loads within simulated food particles to demonstrate the achievement of appropriate cumulative thermal time and temperature by the implemented process—sufficient to lethally injure all bacterial spores present within the test particles.

Procedures disclosed in the art attempt to implement these stages by using various methods of particle residence time measurement. For example, U.S. Pat. No. 5,261,282 to Grabowski et al. discloses the use of implanted radio frequency transponders to identify simulated particles passing through a continuous process system. U.S. Pat. No. 5,741,979 to Arndt et al. discloses the use of dipole antenna marker implants in the particles and microwave transducer detectors to measure particle residence times.

Segner et al., "Biological Evaluation of a Heat Transfer Simulation for Sterilizing Low-Acid Large Particulate Foods for Thermal Packaging", Journal of Food Processing and Preservation, 13:257–274, (1989); Tucker, G. S. and Withers, P. M., "Determination of Residence Time Distribution of Food Particles in Viscous Food Carrier Fluids using Hall effect sensors", Technical Memorandum 667, Campden Food and Drink Research Association (CFDRA), Campden, Glos., U.K. (1992); "Case Study for Condensed Cream of Potato Soup", Aseptic Processing of Multi-phase Foods Workshop, Nov. 14–15, 1995 and Mar. 12–13, 1996 (published 1997); U.S. Pat. No. 5,750,907 to Botos et al.; U.S. Pat. No. 5,739,437 to Sizer et al.; and U.S. Pat. No. 5,876,771 to Sizer et al. all disclose the use of permanent magnets for implants (single tag type) and a variety of magnetic field sensors to detect and record their passage through several system segments and locations.

The necessity for measurements of particle residence time and subsequent biological process validation using bacterial spores is a result of the current inability to measure temperature in the "cold spot" (the slowest heating point within a particle) of the fastest moving, slowest heating particle present in the continuously thermally processed multiphase product. Several techniques have been proposed in the art for this purpose and can be grouped into two groups: techniques implementing cross sectional imaging/tomography of the entire flow profile and techniques implementing thermosensitive implants in specific particle locations.

Magnetic resonance imaging thermometry, such as that disclosed by Litchfield et al., "Mapping Food Temperature with Magnetic Resonance Imaging", National Research Initiative Competitive Grant Program, Cooperative State Research, Education, and Extension Service, United States Department of Agriculture (March 1998), is a non-obstructing and non-contact method, but is not rapid enough to provide in-line real time measurements. It took eight seconds to image a single 64×64 cross-sectional temperature map. During this time a considerable quantity of product would pass the detector unmonitored. It is also extremely complex and cumbersome for these types of measurements, requiring complicated technology, highly trained personnel, and specialized power and power conditioning. Due to all these factors, the number of windows/cross sections that can be observed and monitored within the process equipment is very limited, i.e. the detection of the initial location where the lethal thermal treatment temperature is achieved cannot be determined for all possible cases. The applicability of detection through stainless steel equipment walls without special ports or windows is unclear.

Similar shortcomings are evident with the other tomographic/cross sectional imaging techniques implementing ultrasonic tomography and tomographic reconstruction, such as that disclosed in U.S. Pat. No. 5,181,778 to Belller. Particularly, due to system complexity, the number of observed cross sections is limited. Another problem with the Beller system is the potential for misidentifying the thermal profiles occurring within or outside of the particle. For example, Beller discloses that the curve of the speed of sound versus temperature for potatoes approximately paralleled that of water above about 110° C. This indicates a potential material and location misidentification of fluid vs. solid temperatures. Additionally, standardization and calibration curves must be generated for each and every potential product component, necessitating a very laborious and lengthy measurement and calibration procedure prior to implementation. The applicability of detection through stainless-steel equipment walls without special ports or windows is also unclear.

Methodologies that implement thermosensitive implants include the local magnetic temperature measurement approach disclosed in U.S. Pat. No. 5,722,317 to Ghiron et al. Ghiron et al. disclose the use of spherical paramagnetic particles for implants and detector coils around the pipes for sensors. The approach then implements the correlation between the falling magnetic field strength and temperature increase to calculate the implant temperature from the signals of three sensor coils. However, the negative correlation between the measured magnetic field and the increasing temperature employed by the Ghiron et al. approach can cause a non-conservative temperature estimation, i.e. the resulting calculation can indicate a higher temperature than is actually present in the implant. This is due to the fact that magnetic field reduction can be caused by a variety of factors other than temperature increase in the implant, such as the particle or the detection system being out of calibration, reduction of sensitivity of the detection system, and obstruction of detection by other materials such as other present food particles. The complexity of the system disclosed by Ghiron et al. also limits the number of observation points as well as the applicability at high-temperature, short time processing levels.

The Campden and Chorleywood Food Research Association in Great Britain reports on the use of a Temperature Responsive Inductance Particle (TRIP) sensor, which can be placed in the food product. The time temperature history of the sensor is purportedly monitored/logged in real time outside the processing equipment/environments. See Research Summary Sheets, 1997-68, "TRIP—A New Approach to the Measurement of Time and Temperature in Food Processing Systems". Most of the details of this methodology are not publicly available. However, one of the accessible, limited reports indicates that the sensor size is about 5 mm in diameter. This size precludes its use to measure the "cold spot" temperatures in aseptically processed particles. Additionally, no disclosure is made with respect to capability for the monitoring through stainless steel equipment and current applicability to continuous processes.

One common shortcoming of all available systems is the inability to provide a detectable particle that closely mimics the behavior of an actual food particle. This is a serious disadvantage due to the fact that the detectable particle will not provide an accurate temperature measurement of a food particle's "cold spot" temperature. This can result in a non-conservative measurement and therefore non-conservative process evaluation. Thus, what is needed is a method, system, and device that can provide conservative temperature measurements in a continuous thermal processing of particulate-containing food products, batch, or other applications.

SUMMARY

According to one embodiment, a magnetically detectable particle is disclosed for generating a temperature measurement for a batch or a continuous stream of material. The particle can include a first and second magnet each comprising a positive and negative pole. The particle can also include an adhesive having a release temperature and operable to attach one or both of the positive and negative poles of the first magnet proximate to the same polarity pole of the second magnet or to attach one of the positive and negative poles of the first magnet between the poles of the second magnet below the release temperature such that a first magnetic field is generated by the first and second magnet. The adhesive can also be operable to release the first and second magnets from one another above the release temperature. The first and second magnets can move with respect to one another when the adhesive releases the first and second magnets such that one of the positive and negative poles of the first magnet moves toward the opposing polarity pole of the second magnet for generating a second magnetic field different than the first magnetic field to indicate a temperature measurement for the batch or continuous stream.

According to a second embodiment, a method is disclosed for generating a temperature measurement for a batch or a continuous stream of material. The method can include a step for providing a magnetically detectable particle. The particle can include a first and second magnet each comprising a positive and negative pole. The particle can also include an adhesive having a release temperature and operable to attach one or both of the positive and negative poles of the first magnet proximate to the same polarity pole of the second magnet or to attach one of the positive and negative poles of the first magnet between the poles of the second magnet below the release temperature such that a first magnetic field is generated by the first and second magnet. The adhesive can also be operable to release the first and second magnets from one another above the release temperature. The first and second magnets can move with respect to one another when the adhesive releases the first and second magnets such that one of the positive and negative poles of the first magnet moves toward the opposing polarity pole of the second magnet for generating a second magnetic field different than the first magnetic field to indicate a temperature measurement for the batch or continuous stream. The method can also include a step for inserting the detectable particle into the batch or continuous stream. Further, the method can include a step for detecting a change in magnetic field strength of the detectable particle to thereby generate a temperature measurement for the batch or continuous stream.

According to a third embodiment, a system is disclosed for generating a temperature measurement for a batch or a continuous stream of material. The system can include a magnetically detectable particle. The particle can include a first and second magnet each comprising a positive and negative pole. The particle can also include an adhesive having a release temperature and operable to attach one or both of the positive and negative poles of the first magnet proximate to the same polarity pole of the second magnet or to attach one of the positive and negative poles of the first magnet between the poles of the second magnet below the release temperature such that a first magnetic field is generated by the first and second magnet. The adhesive can also be operable to release the first and second magnets from one another above the release temperature. The first and second magnets can move with respect to one another when the adhesive releases the first and second magnets such that one of the positive and negative poles of the first magnet moves toward the opposing polarity pole of the second magnet for generating a second magnetic field different than the first magnetic field to indicate a temperature measurement for the batch or continuous stream. The system can also include a detector for detecting a change from the first magnetic field to the second magnetic field to thereby generate a temperature measurement for the batch or continuous stream.

According to a fourth embodiment, a method is disclosed for generating a temperature measurement for a batch or a continuous stream of material. The method can include a step for providing a plurality of magnetically detectable particles. Each particle can include a first and second magnet each comprising a positive and negative pole. Each particle can also include an adhesive having a release temperature and operable to attach one of the positive and negative poles of the first magnet to the same polarity pole of the second magnet or between the poles of the second magnet below the release temperature such that a first magnetic field is generated by the first and second magnet, and operable to release the first and second magnets from one another above the release temperature. The first and second magnets can move with respect to one another when the adhesive releases the first and second magnets such that one of the positive and negative poles of the first magnet moves toward the opposing polarity pole of the second magnet for generating a second magnetic field different than the first magnetic field to indicate a temperature measurement for the batch or continuous stream. The method can also include a step for inserting the detectable particles into the batch or continuous stream. Further, the method can include a step for detecting a change in magnetic field strength from each of the detectable particles to thereby generate a temperature measurement for the batch or continuous stream.

According to a fifth embodiment, a magnetically detectable particle is disclosed for generating a temperature measurement for a batch or a continuous stream of material. The particle can include a first, second, and third magnet each comprising a positive and negative pole. The first adhesive can have a first release temperature and operable to attach the negative pole of the first magnet to the negative polarity pole of the second magnet below the first release temperature, and operable to release the first and second magnets from one another above the first release temperature. The second adhesive can have a second release temperature and operable to attach the positive pole of the third magnet to the positive pole of the second magnet below the first release temperature, and operable to release the second and third magnets from one another above the first release temperature. A first magnetic field can be generated by the first, second, and third magnets when the first magnet and third magnets are attached to the second magnet. The first and second magnets can move with respect to one another when the first adhesive releases the first and second magnets such that the positive pole of the first magnet moves toward the negative pole of the second magnet for generating a second magnetic field different than the first magnetic field to indicate a first temperature measurement for the batch or continuous stream. The second and third magnets can move with respect to one another when the second adhesive releases the second and third magnets such that the negative pole of the third magnet moves toward the positive pole of the second magnet for generating a third magnetic field different than the first magnetic field to indicate a second temperature measurement for the batch or continuous stream.

According to a sixth embodiment, a magnetically detectable particle is disclosed for generating an environmental condition measurement. The particle can include a first and second magnet each comprising a positive and negative pole. The particle can also include an adhesive operable to attach one of the positive and negative poles of the first magnet to the same polarity pole of the second magnet or between the poles of the second magnet when a predetermined environmental condition is not detected such that a first magnetic field is generated by the first and second magnet. The adhesive can also be operable to release the first and second magnets from one another when the predetermined environmental condition is detected. The first and second magnets can move with respect to one another when the adhesive releases the first and second magnets such that one of the positive and negative poles of the first magnet moves toward the opposing polarity pole of the second magnet for generating a second magnetic field different than the first magnetic field to indicate a temperature measurement for the batch or continuous stream.

According to a seventh embodiment, a method is disclosed for generating an environmental condition measurement in an environment. The method can include a step for providing a magnetically detectable particle. The particle can include a first and second magnet each comprising a positive and negative pole. The particle can also include an adhesive operable to attach one of the positive and negative poles of the first magnet to the same polarity pole of the second magnet when a predetermined environmental condition is not detected such that a first magnetic field is generated by the first and second magnet. The adhesive can also be operable to release the first and second magnets from one another when the predetermined environmental condition is detected. The first and second magnets can move with respect to one another when the adhesive releases the first and second magnets such that one of the positive and negative poles of the first magnet moves toward the opposing polarity pole of the second magnet for generating a second magnetic field different than the first magnetic field to indicate a temperature measurement for the batch or continuous stream. The method can also include a step for inserting the detectable particle into the environment. Further, the method can include a step for detecting a change in magnetic field strength of the detectable particle to thereby generate a temperature measurement for the environment.

According to an eighth embodiment, a system is disclosed for generating an environmental condition measurement for an environment. The system can include a magnetically detectable particle. The particle can include a first and second magnet each comprising a positive and negative pole. The particle can also include an adhesive operable to attach one of the positive and negative poles of the first magnet to the same polarity pole of the second magnet when a predetermined environmental condition is not detected such that a first magnetic field is generated by the first and second magnet. The adhesive can also be operable to release the first and second magnets from one another when the predetermined environmental condition is detected. The first and second magnets can move with respect to one another when the adhesive releases the first and second magnets such that one of the positive and negative poles of the first magnet moves toward the opposing polarity pole of the second magnet for generating a second magnetic field different than the first magnetic field to indicate a temperature measurement for the batch or continuous stream. The system can also include a detector for detecting a change from the first magnetic field to the second magnetic field to thereby generate an environmental condition measurement for the environment.

According to a ninth embodiment, a magnetically detectable particle is disclosed for generating a temperature measurement for a batch or a continuous stream of material. The particle can include a plurality of sets of first and second magnets, each of the first and second magnets comprising a positive and negative pole. The particle can also include a plurality of adhesives each corresponding to one of the sets of first and second magnets, the adhesives each having a release temperature and each adhesive operable to attach one of the positive and negative poles of the corresponding first magnet between the positive and negative poles of the corresponding second magnet below the release temperature such that a first magnetic field is generated by the corresponding first and second magnet. Each adhesive can also be operable to release the first and second magnets from one another above the release temperature. The corresponding first and second magnets can move with respect to one another when the adhesive releases the corresponding first and second magnets such that one of the positive and negative poles of the corresponding first magnet moves toward the opposing polarity pole of the corresponding second magnet for generating a second magnetic field different than the first magnetic field to indicate a temperature measurement for the batch or continuous stream.

According to a tenth embodiment, a device is disclosed for generating a temperature measurement for a batch or continuous stream of material. The device can include a detectable particle comprising a signal that changes at a predetermined temperature. The device can also include a carrier particle comprising an interior cavity holding the detectable particle. The carrier particle can have a conservative behavior characteristic matching a target particle, wherein the thermal protection provided by the carrier particle to the interior cavity is greater than or equivalent to conservative thermal behavior of a target particle at its cold spot under similar heating conditions.

According to an eleventh embodiment, a method is disclosed for generating a temperature measurement for a batch or a continuous stream of material. The method can include a step for providing a device including a detectable particle comprising a signal that changes at a predetermined temperature. The device can also include a carrier particle comprising an interior cavity holding the detectable particle. The carrier particle comprises a conservative behavior characteristic matching a target particle, wherein the thermal protection provided by the carrier particle to the interior cavity is greater than or equivalent to conservative behavior characteristics of a target particle to the cold spot under similar heating conditions. The method can also include a step for inserting the device into the batch or continuous stream. Further, the method can include a step for detecting a signal change of the device to thereby generate a temperature measurement for the batch or continuous stream.

According to a twelfth embodiment, a method is disclosed for providing a carrier particle with conservative behavior characteristics in a batch or continuous stream of material. The method can include a step for determining conservative behavior characteristics of a target particle found in a batch or continuous stream of material. The method can also include a step for determining material and dimensions for a carrier particle design that substantially correspond to one or more conservative behavior characteristics of the target particle.

According to a thirteenth embodiment, a method is disclosed for providing a carrier particle with conservative behavior characteristics in a batch or continuous stream of material. The method can include a step for simulating thermal treatment of a target particle until a predetermined lethality is accumulated. The method can also include a step for simulating a carrier particle under the same thermal treatment simulated in the first step. The carrier particle can have an interior cavity and a wall. Further, the method can include a step for determining a conservative thickness for the wall of the carrier particle such that the interior cavity of the carrier particle can receive the same predetermined lethality as the target particle under the thermal treatment simulated in the first step.

According to a fourteenth embodiment, a system is disclosed for aiding the design of a carrier particle with conservative behavior characteristics in a batch or continuous stream of material. The system can include a memory comprising conservative behavior characteristics of a target particle used in a batch or continuous stream of material. The system can also include a spatial simulation engine operable to simulate material and dimensions of a carrier particle design for matching the conservative behavior characteristics of the target particle.

According to a fifteenth embodiment, computer-readable medium is disclosed having stored thereon instructions for aiding the design of a carrier particle with conservative behavior characteristics in a batch or continuous stream of material. The computer-readable medium can include instructions for determining conservative behavior characteristics of a target particle used in a batch or continuous stream of material. The computer-readable medium can also include instructions for determining material and dimensions for a carrier particle design about matching the conservative behavior characteristics of the target particle.

According to a sixteenth embodiment, a computer-readable medium is disclosed having stored thereon instructions for aiding the design of a carrier particle with conservative behavior characteristics in a batch or continuous stream of material. The computer-readable medium can include instructions for simulating thermal treatment of a target particle until a predetermined lethality is accumulated. The computer-readable medium can also include instructions for simulating a carrier particle under the same thermal treatment simulated in the first step. The carrier particle can have an interior cavity and a wall. Further, the computer-readable medium can include instructions for determining a conservative thickness for the wall of the carrier particle such that the interior cavity of the carrier particle can receive the same predetermined lethality as the target particle under the thermal treatment simulated in the first step.

Some of the objects of the invention having been stated hereinabove, and which are addressed in whole or in part by the present invention, other objects will become evident as the description proceeds when taken in connection with the accompanying drawings as best described hereinbelow.

BRIEF DESCRIPTION OF THE DRAWINGS

Exemplary embodiments of the subject matter will now be explained with reference to the accompanying drawings, of which:

FIG. 1 is a schematic diagram of combining a first and second magnet at opposing magnetic poles to achieve a combined magnet;

FIG. 2 is a schematic diagram of the result of combining a first and second magnet at similar magnetic poles to achieve a combined magnet;

FIGS. 3A, 3C, and 3E are schematic diagrams of a magnetically detectable particle in a state below a predetermined conservative temperature;

FIGS. 3B, 3D, and 3F are schematic diagrams of the magnetically detectable particle of FIGS. 3A, 3C, and 3F, respectively, in a state above a predetermined conservative temperature;

FIGS. 3G–3I are schematic diagrams of the assembly and operation of one embodiment of a magnetically detectable particle comprising multiple magnets;

FIGS. 3J–3L are schematic diagrams of carrier particles comprising multiple detectable particles;

FIG. 4 is a schematic diagram of the principle of forced coupling and fixing similar magnets;

FIG. 5A is a schematic diagram of another embodiment of a magnetically detectable particle in a state below a predetermined conservative temperature;

FIG. 5B is a schematic diagram of the magnetically detectable particle of FIG. 5A in a state above the predetermined conservative temperature;

FIG. 6A is a schematic diagram of another embodiment of a magnetically detectable particle in a state below a predetermined conservative temperature;

FIG. 6B is a schematic diagram of the magnetically detectable particle of FIG. 6A in a state above the predetermined conservative temperature;

FIG. 6C is a schematic diagram of another embodiment of a magnetically detectable particle in a state below a predetermined conservative temperature;

FIGS. 6D and 6E are schematic diagrams of the magnetically detectable particle of FIG. 6C in a state above the predetermined conservative temperature;

FIG. 6F is a schematic diagram of a carrier particle comprising a detectable particle comprising more than two magnets (e.g. three magnets), all assembled using the same adhesive;

FIG. 7A is a schematic diagram of another embodiment of a magnetically detectable particle in a state below a first predetermined conservative temperature;

FIG. 7B is a schematic diagram of the magnetically detectable particle of FIG. 7A in a state above the first predetermined conservative temperature and below a second predetermined temperature;

FIG. 7C is a schematic diagram of the magnetically detectable particle of FIGS. 7A and 7B in a state above the first and second predetermined temperatures;

FIGS. 7D–7G are schematic diagrams of carrier particles comprising multiple detectable particles;

FIG. 8 illustrates a schematic diagram of attaching a first and second magnet via a metal alloy and thermo-resistant adhesives;

FIG. 9 is an experimental system for use in demonstrating magnetically detectable particles, carrier particles, and related devices;

FIG. 10 is a perspective view of a simulated particle containing a coupled magnet sensor/detector;

FIG. 11 is a perspective view of another simulated particle including a thermocouple lead having contact with a magnet assembly;

FIG. 12 is a perspective view of a simulated particle with the experimental system of FIG. 9;

FIG. 13 is a perspective view of a data acquisition system including a display for presenting acquired temperature information and magnetic field strength data;

FIGS. 14A–14D are different perspective view of a triple magnet assembly being assembled in a simulated particle;

FIG. 15 is still image of a magnet pair with a U.S. penny for providing a size scale perspective;

FIG. 16 is a graph of magnetic field strength from two naturally aligned identical magnets with no heating;

FIG. 17 is a graph of magnetic field strength from two aligned and attached magnets with no heating;

FIG. 18 is a graph of magnetic field strength from two aligned and attached with heating;

FIG. 19 is a graph showing applied temperature versus magnetic field strength;

FIG. 20 is a graph showing applied temperature versus magnetic field strength;

FIG. 21 is a graph showing applied temperature versus magnetic field strength;

FIG. 22 is a graph showing applied temperature versus magnetic field strength;

FIGS. 23–27 are different graphs of experimental results obtained by testing the device shown in FIGS. 3A and 3B with an adhesive comprising a metal alloy with a melting point of 138.3° C.;

FIGS. 28–30 are different graphs of experimental results obtained by testing the device shown in FIGS. 3A and 3B with an adhesive comprising a metal alloy with a melting point of 123.9° C.;

FIG. 31 is a graph of magnetic field strength versus temperature obtained using the assembly shown in FIGS. 5A and 5B was tested using the experimental system shown in FIG. 9;

FIG. 32 is a graph of magnetic field strength versus temperature obtained using the assembly shown in FIGS. 6A and 6B was tested using the experimental system shown in FIG. 9;

FIG. 33 is a graph of magnetic field strength versus temperature obtained using the assembly shown in FIG. 7 was tested using the experimental system shown in FIG. 9;

FIG. 36 is a flow chart that illustrates a process for providing a carrier particle having materials and dimensions to provide characteristics for the carrier particle that about match the conservative behavior characteristics of a selected target particle;

Figure 73:
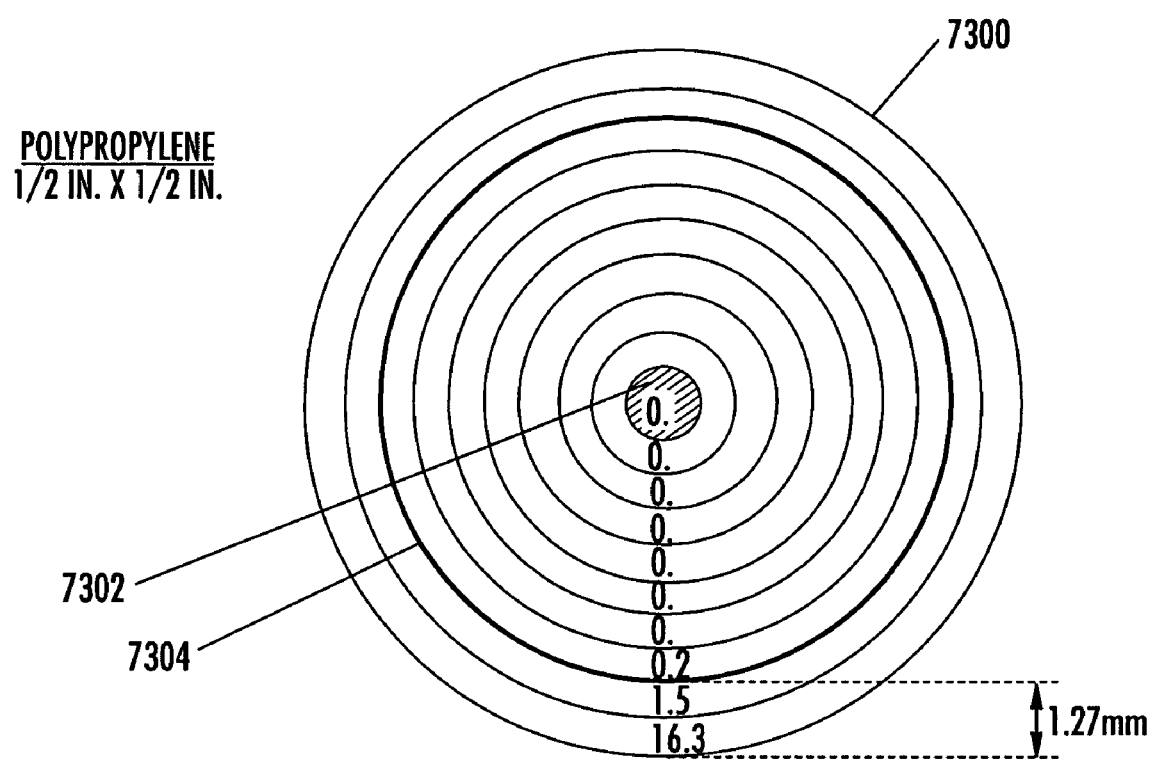
Figure 74:
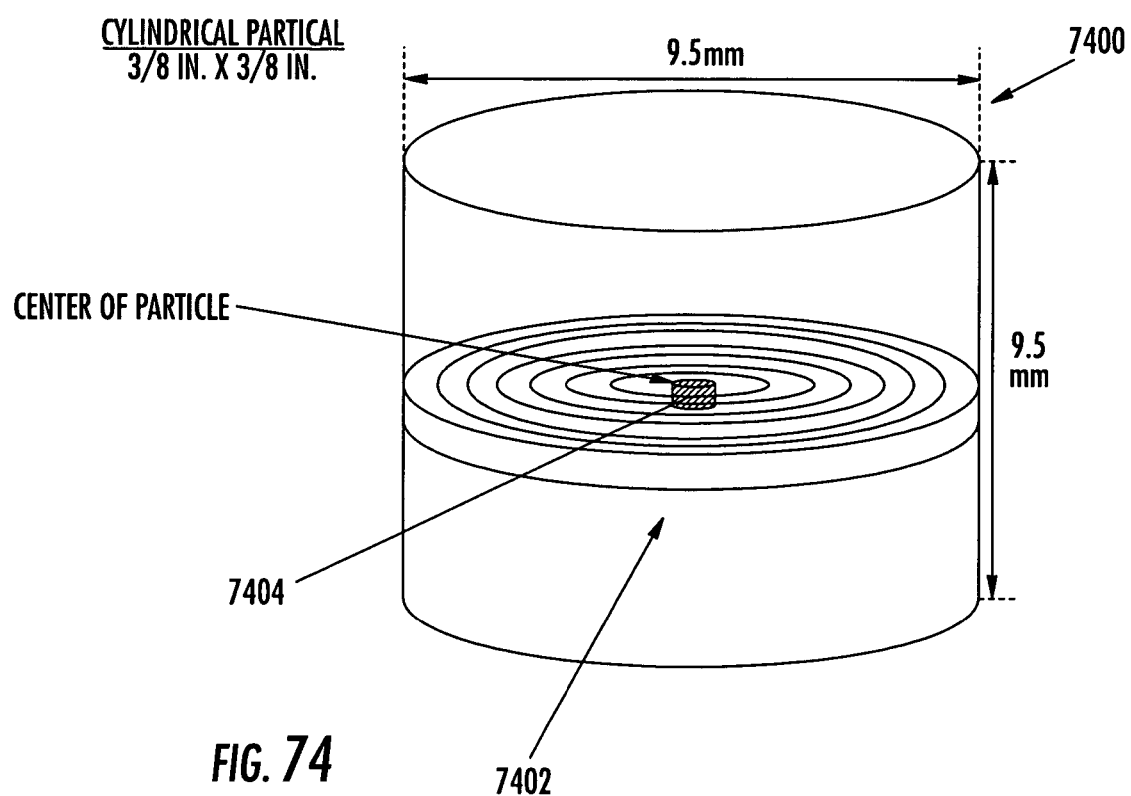
Figure 76:
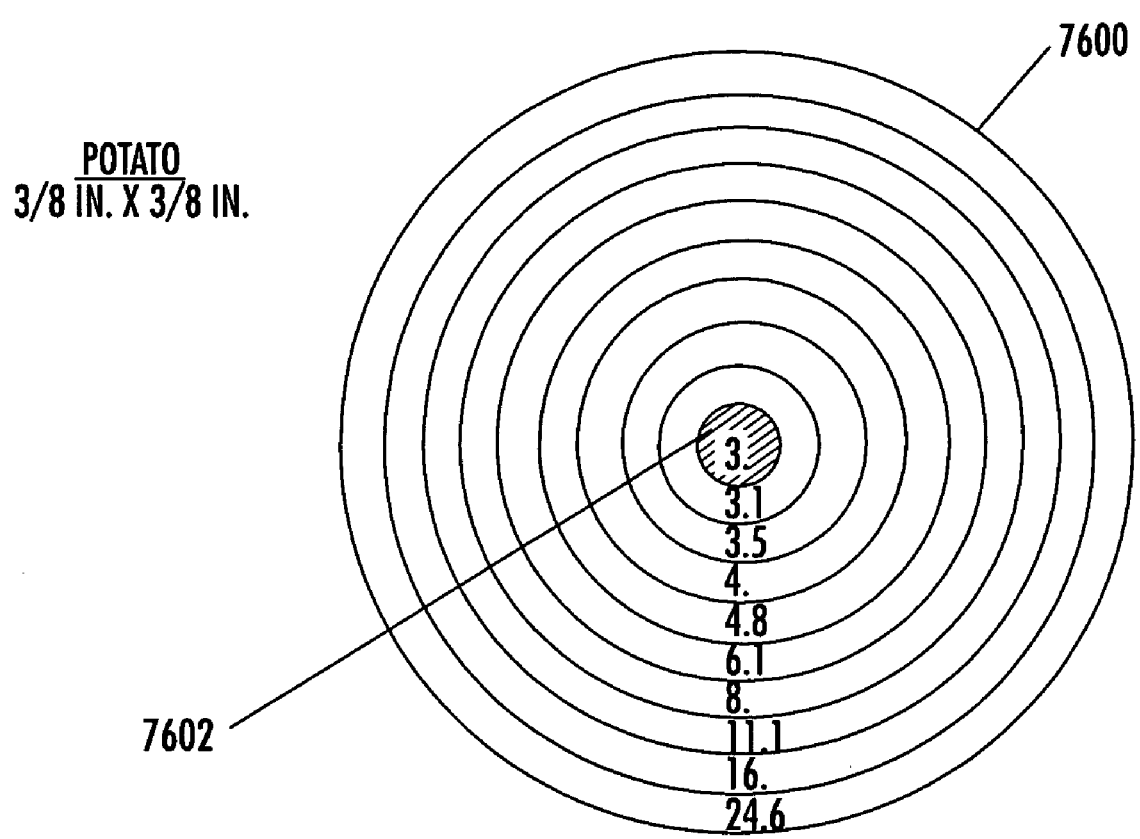
Figure 78:
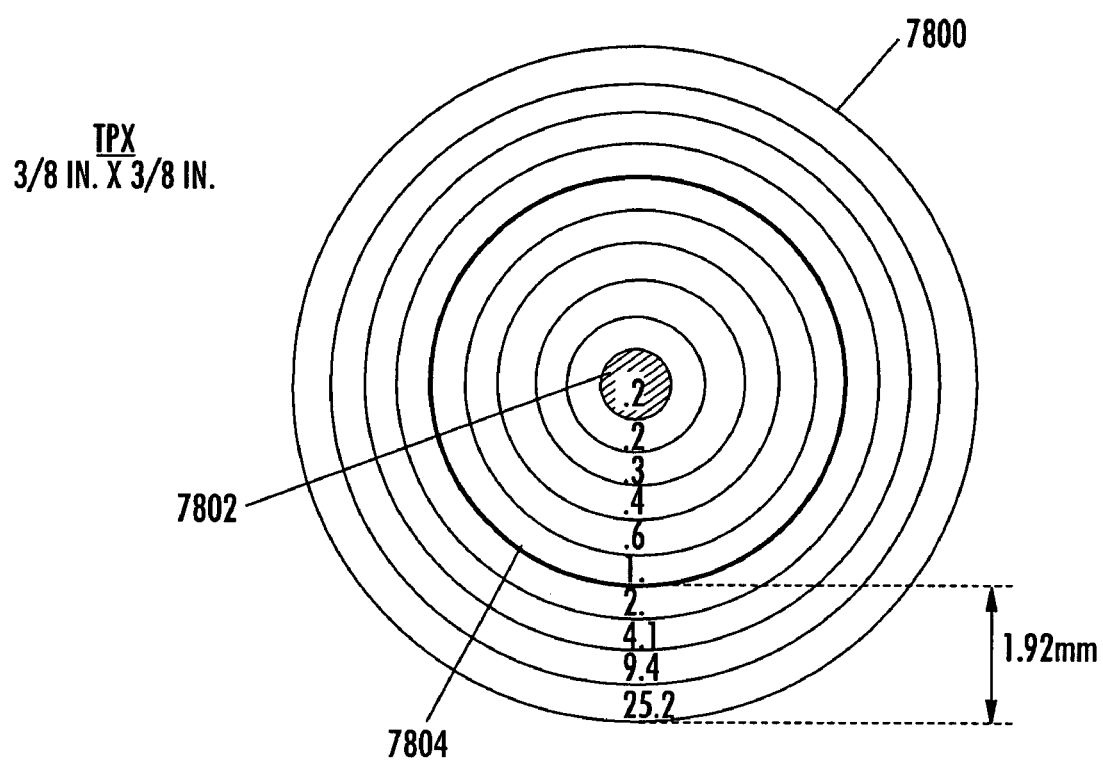
Figure 80:
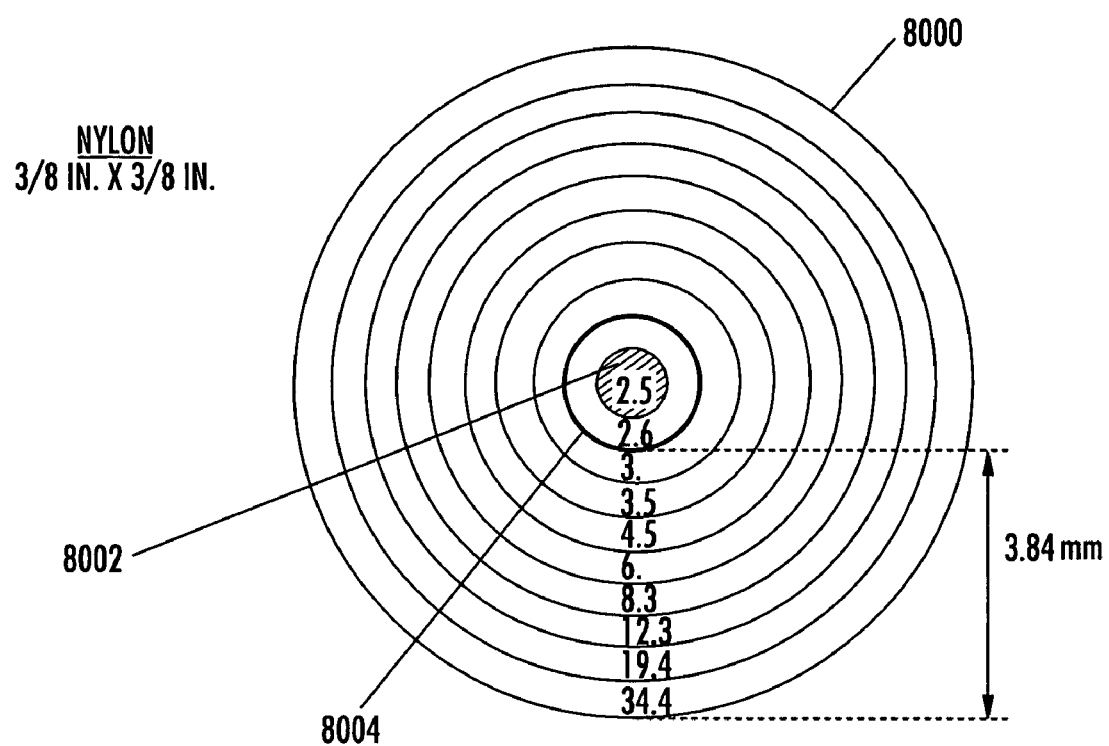
Figure 82:
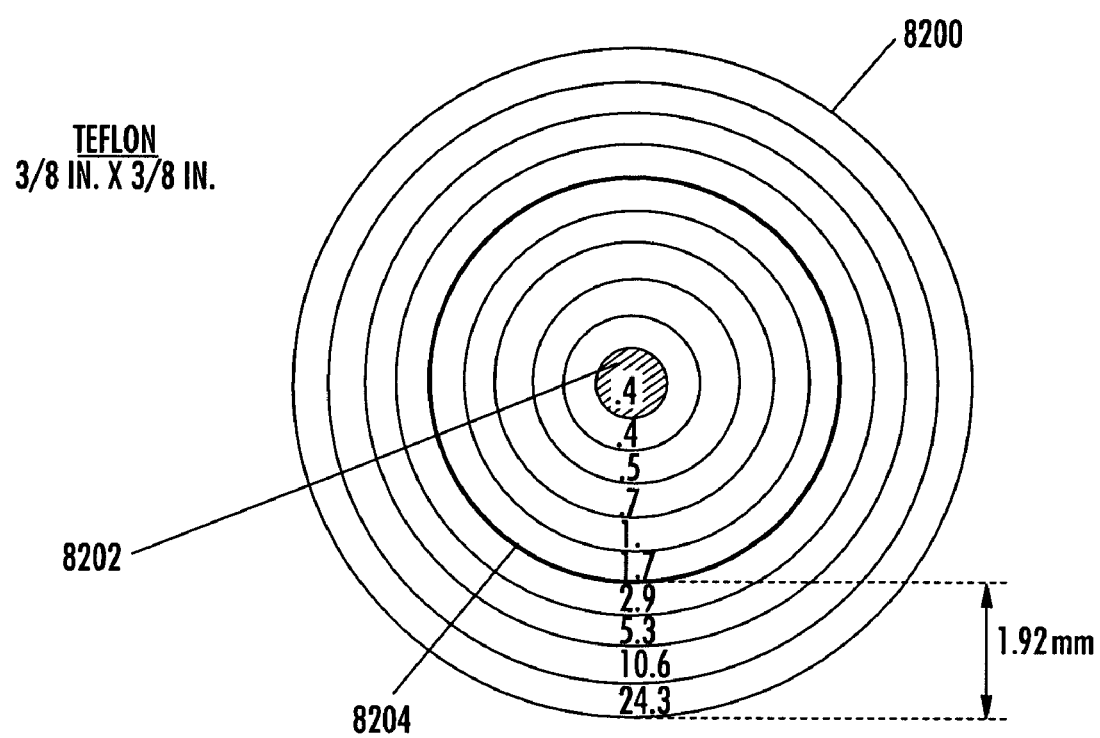
Figure 84:
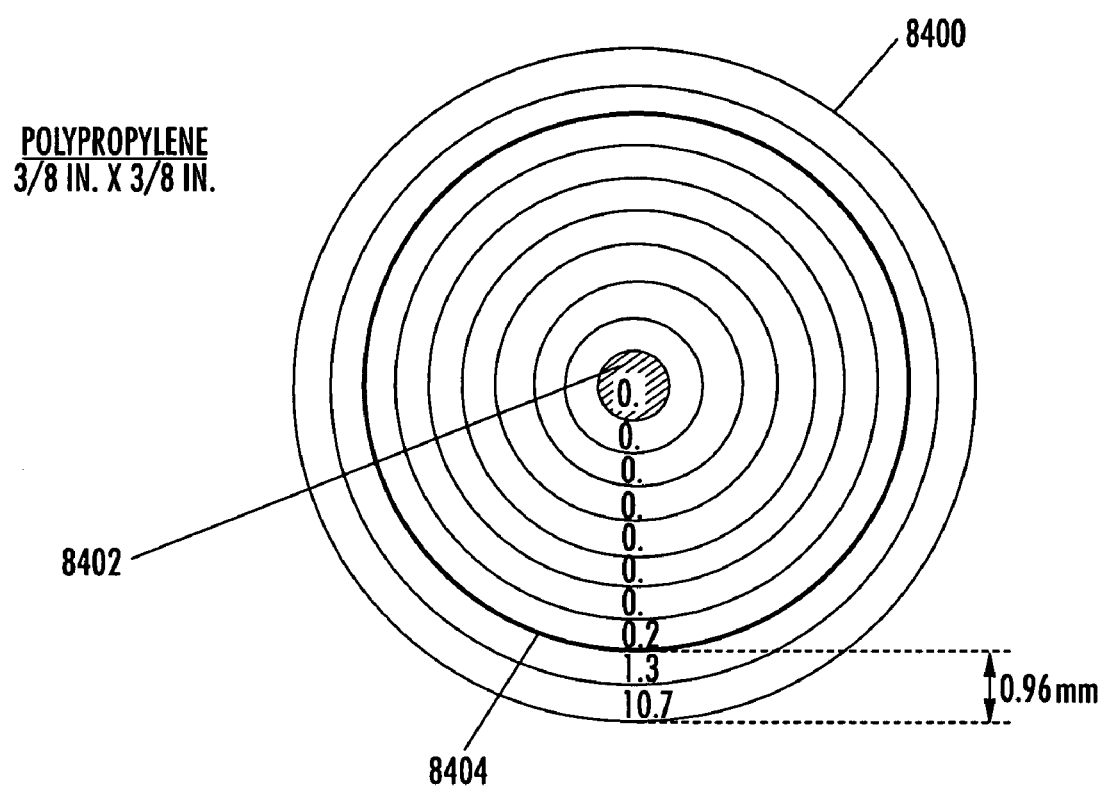
Figure 85:
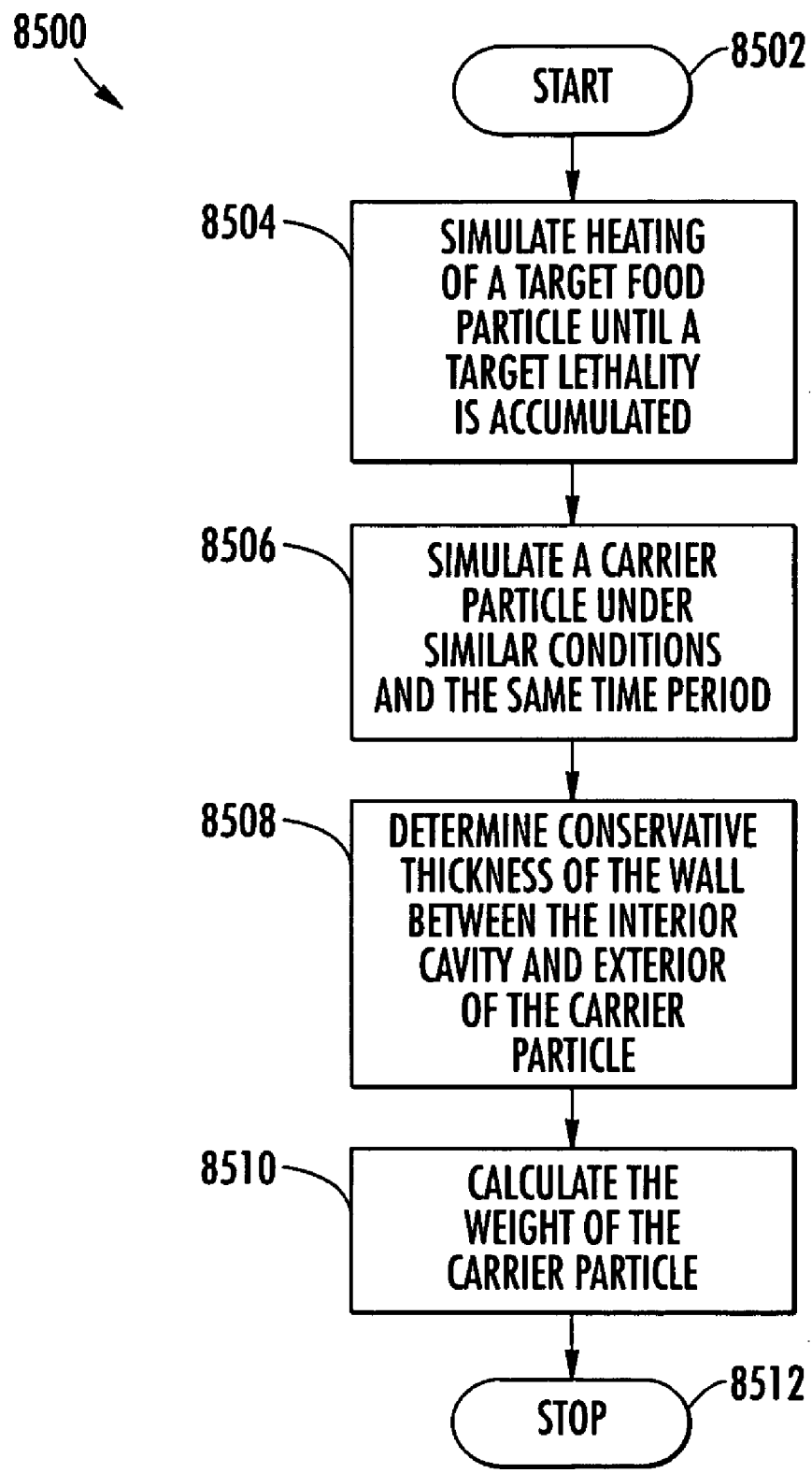
Figure 86:
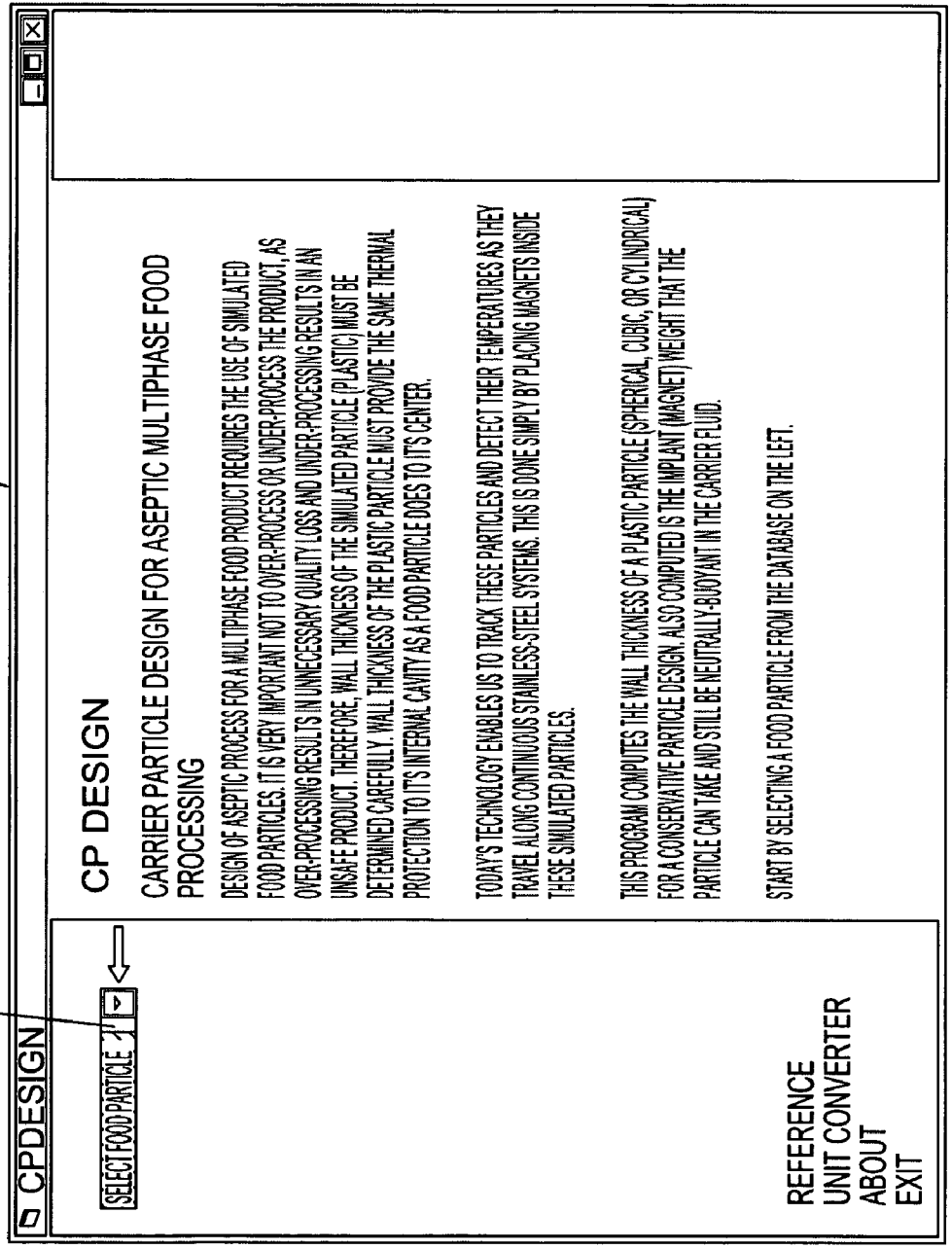
Figure 88A:
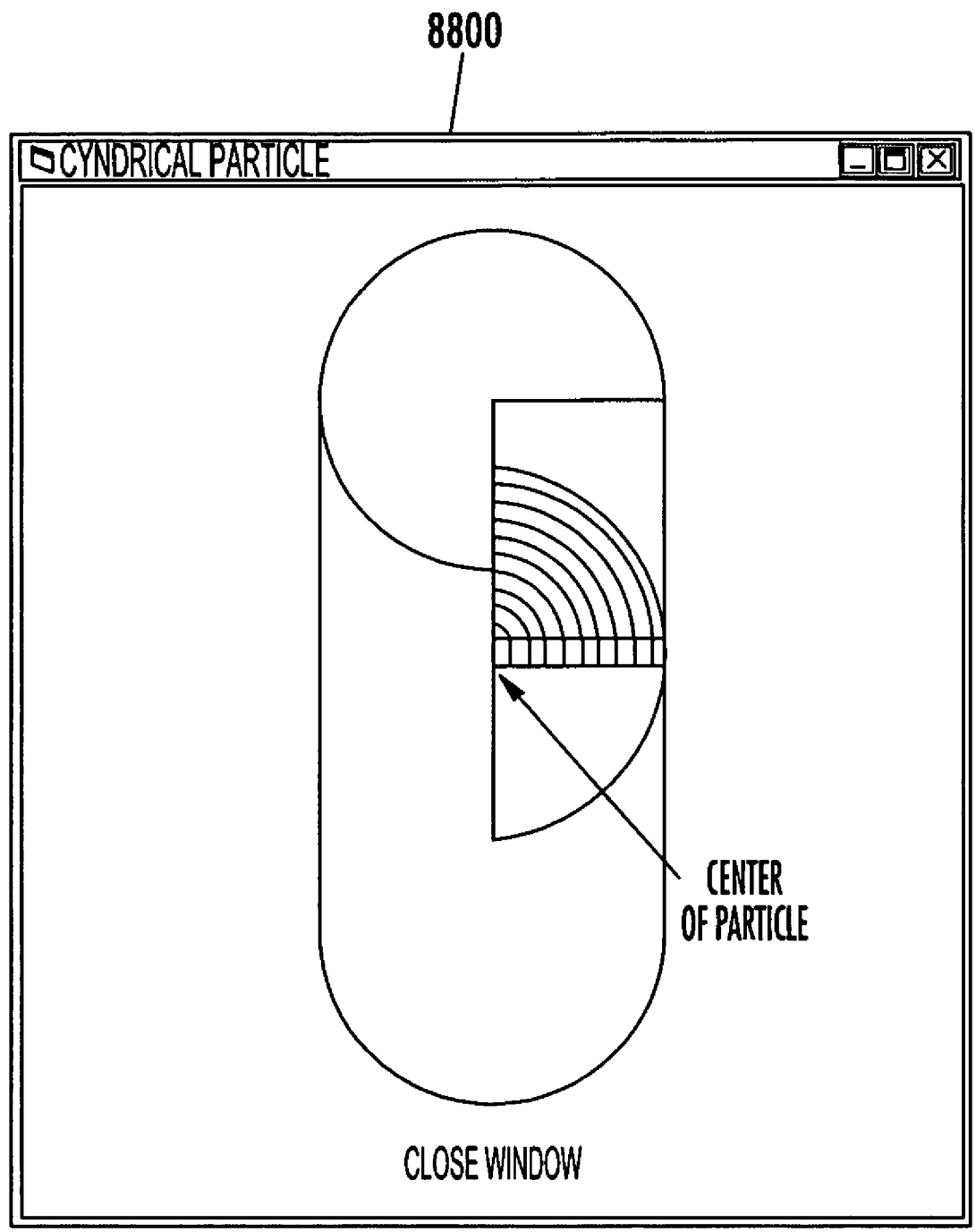
Figure 88B:
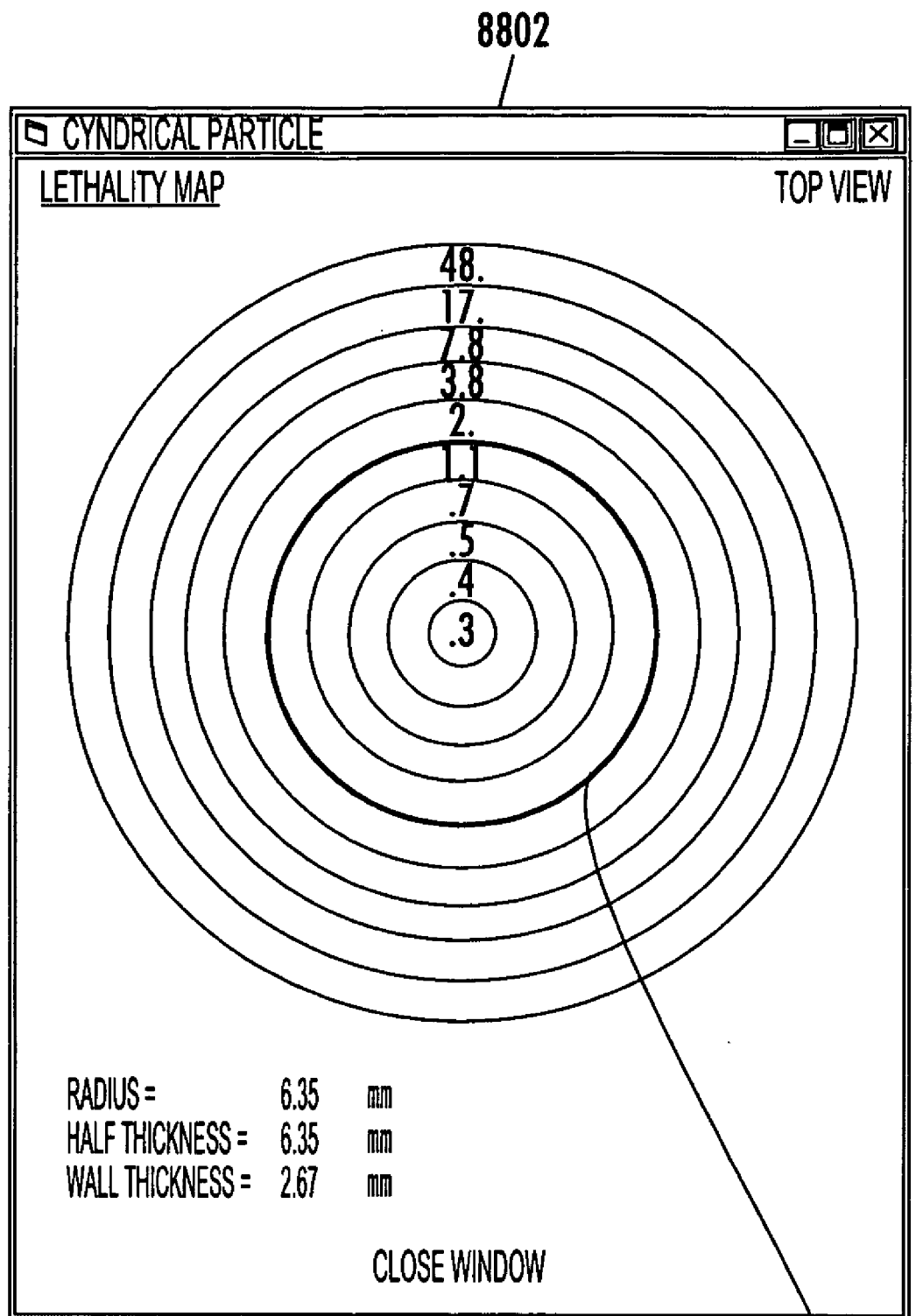
Figure 89A:
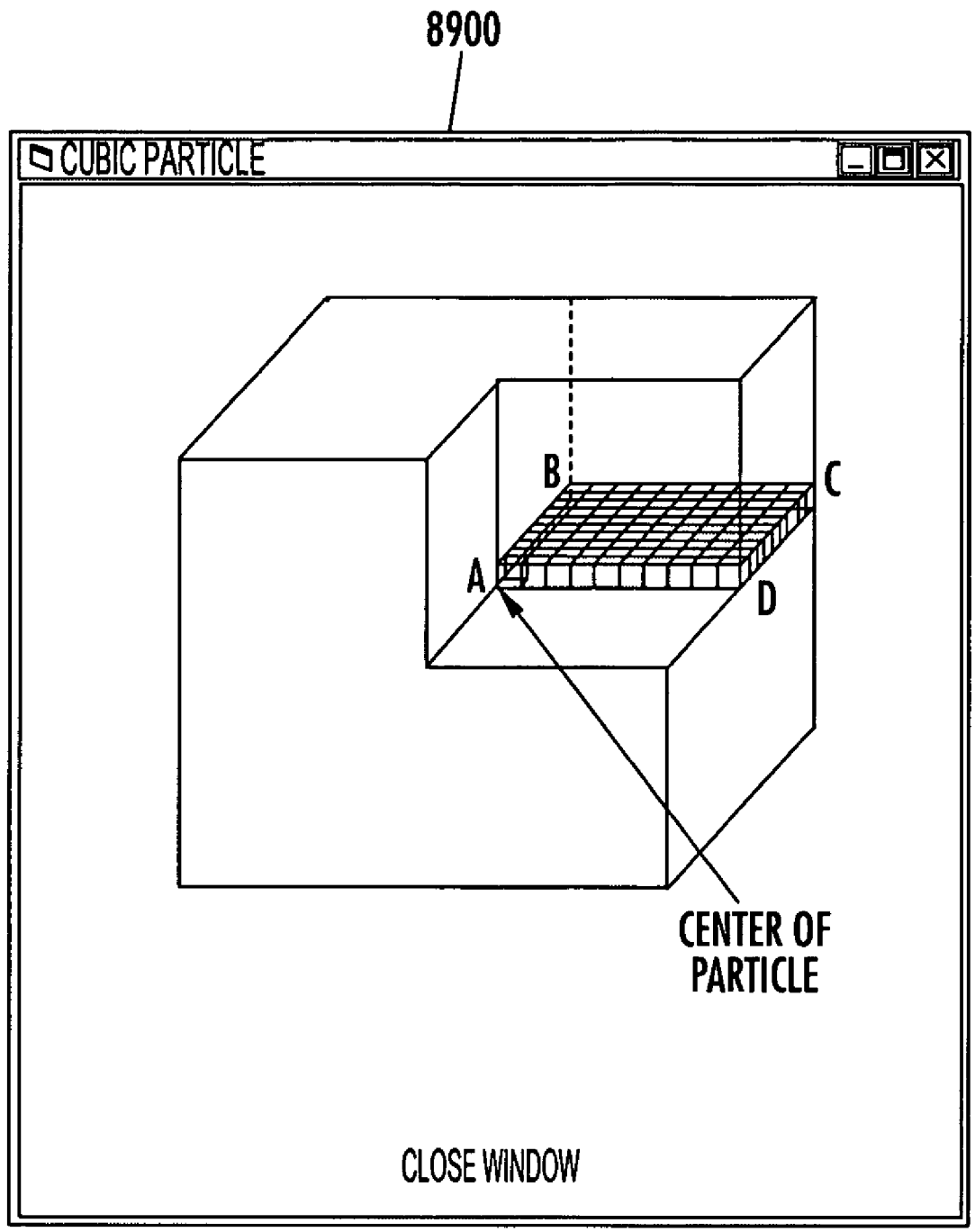
Figure 89B:
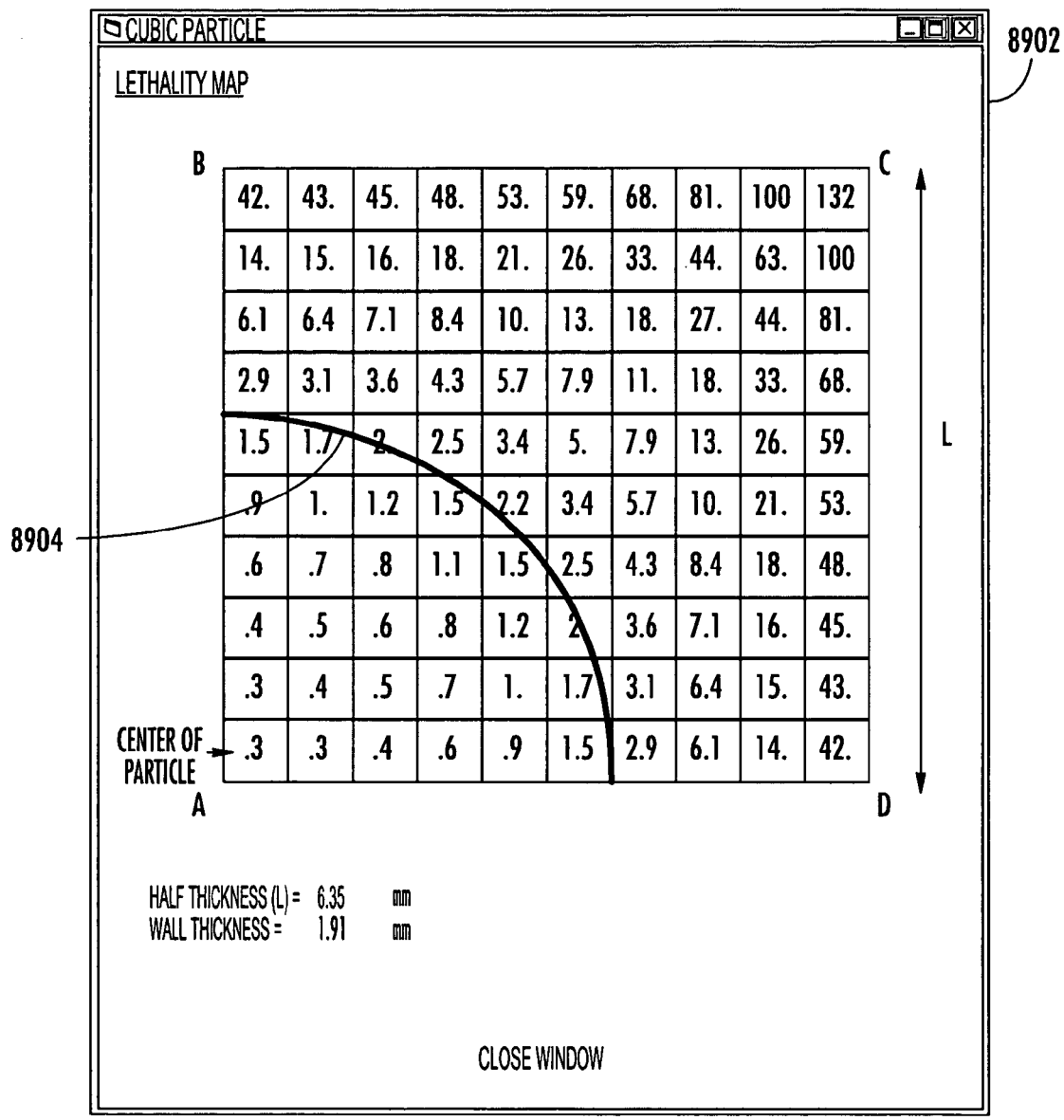
Figure 90A:
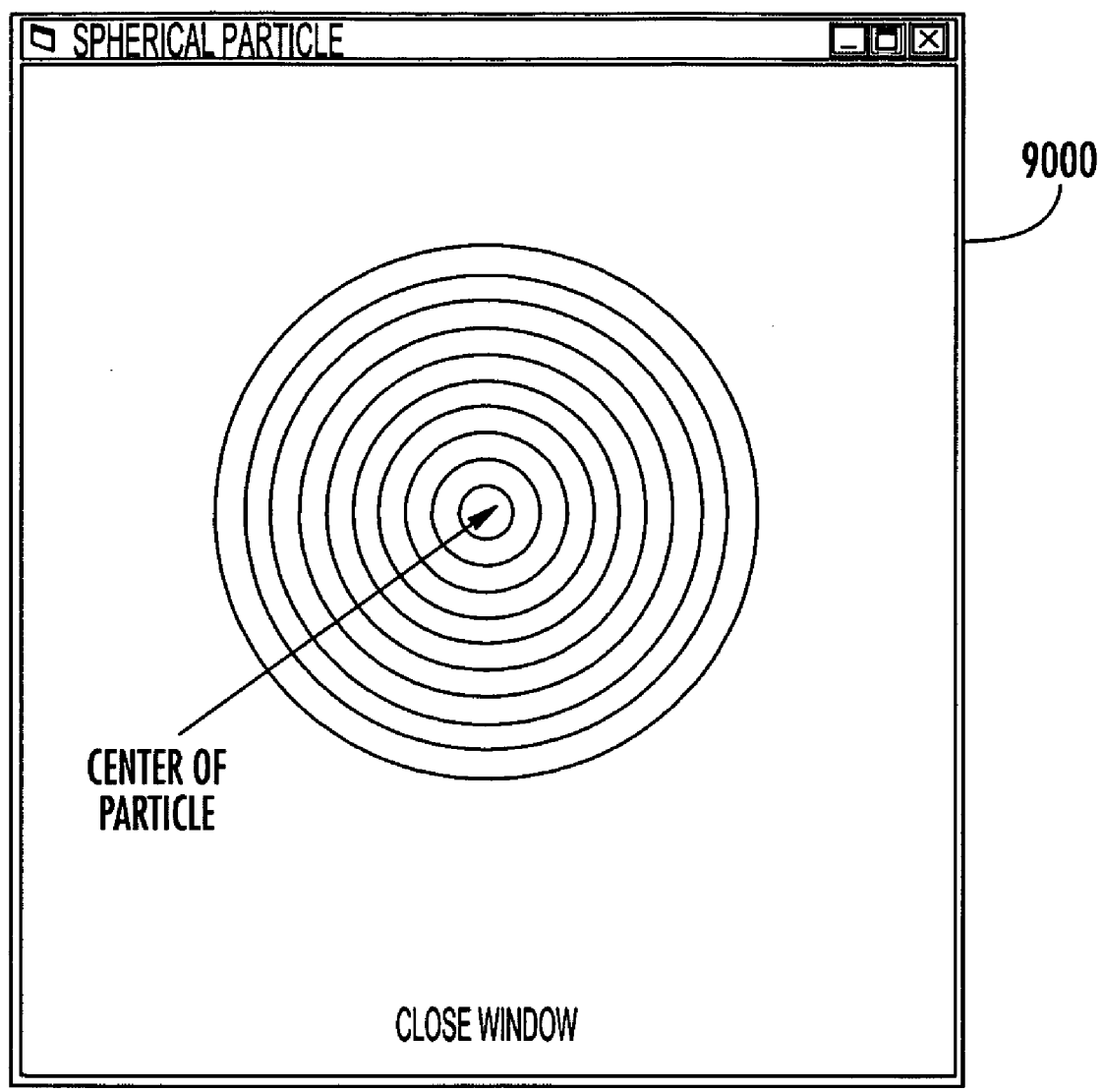
Figure 90B:
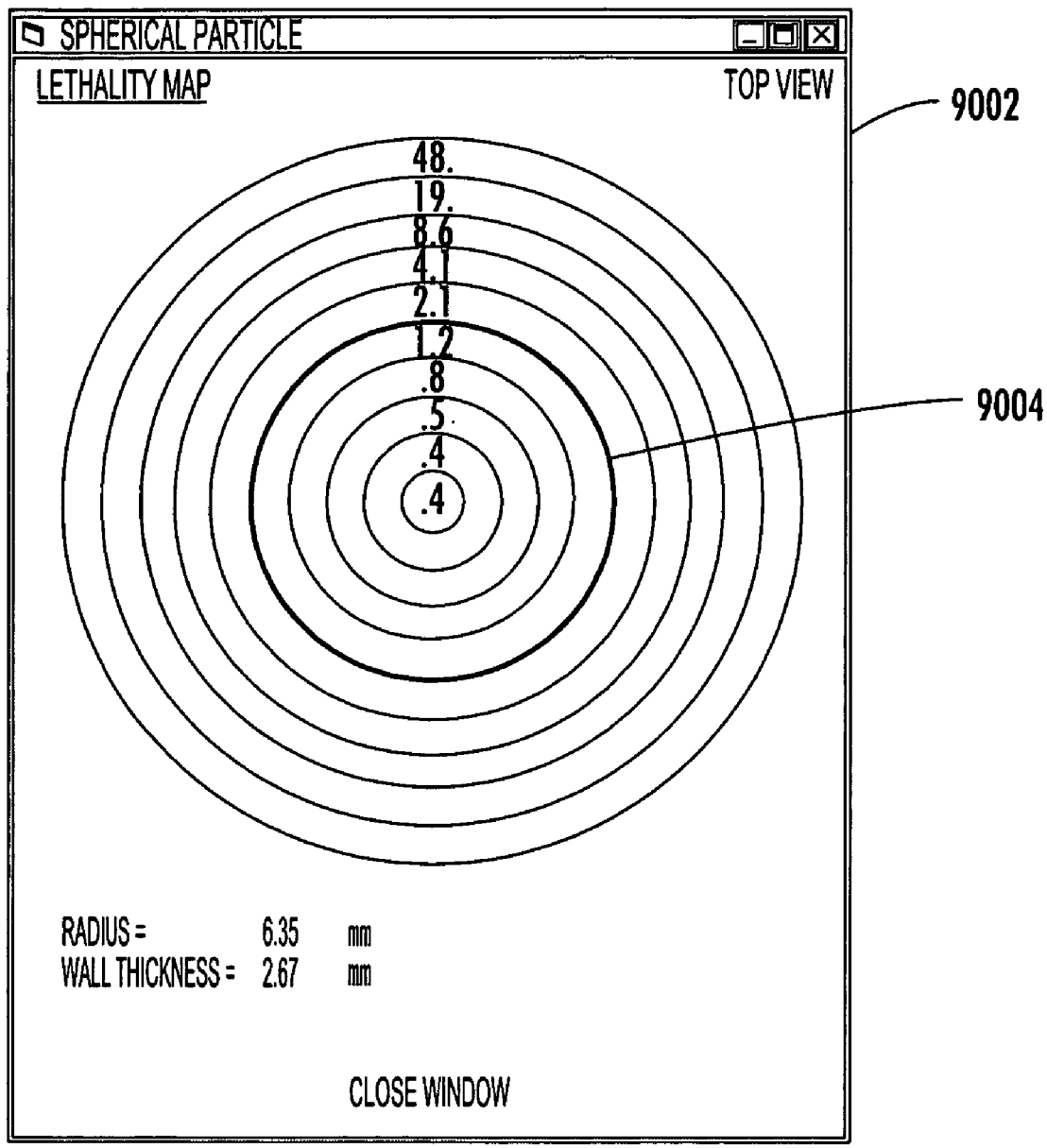

FIG. 37 is an illustration of two screen displays show results indicating that using an overly conservative carrier particle design can result in a potato food particle receiving cumulative lethality in its cold spot up to two orders of magnitude greater than required for commercial sterility;

FIG. 38 is an illustration of two screen displays that show other simulations applied to a carrier particle design and ⅜ inch potato food particle, respectively, under similar conditions;

FIG. 39 is an illustration of two screen displays that show other simulations applied to a carrier particle design and a 0.5 inch×0.5 inch, cylindrical, potato food particle, respectively, under similar conditions;

FIG. 40 is an illustration of two screen displays that show other simulations applied to a carrier particle design and a ⅜ inch×⅜ inch, cylindrical, potato food particle, respectively, under similar conditions;

FIG. 41 is a schematic diagram of a 0.5 inch, cubic particle design for simulation by a spatial simulation engine;

FIG. 42 is an illustration of a screen display showing exemplary simulation results for cubic particle design of FIG. 41;

FIG. 43 is schematic diagram showing a grid relating to FIG. 42 of the result of heating each of its cubes in the thermal processing simulation;

FIG. 44 is an illustration of a screen display showing exemplary simulation results for a 0.5 inch TPX carrier particle design;

FIG. 45 is a schematic diagram showing a grid of the result of heating the TPX carrier particle design of FIG. 44 in the same thermal processing simulation of the target particle;

FIG. 46 is an illustration of a screen display showing exemplary simulation results for a 0.5 inch nylon carrier particle design;

FIG. 47 is a schematic diagram showing a grid of the result of heating the nylon carrier particle design of FIG. 46 in the same thermal processing simulation of the target particle;

FIG. 48 is an illustration of a screen display showing exemplary simulation results for a 0.5 inch TEFLON™ carrier particle design;

FIG. 49 is a schematic diagram showing a grid of the result of heating the TEFLON™ carrier particle design of FIG. 44 in the same thermal processing simulation of the target particle;

FIG. 50 is an illustration of a screen display showing exemplary simulation results for a 0.5 inch polypropylene carrier particle design;

FIG. 51 is a schematic diagram showing a grid of the result of heating the polypropylene carrier particle design of FIG. 50 in the same thermal processing simulation of the target particle;

FIG. 52 is a schematic diagram of a ⅜ inch cubic particle design for simulation by spatial simulation engine;

FIG. 53 is an illustration of a screen display showing exemplary simulation results for the cubic particle design shown in FIG. 52;

FIG. 54 is a schematic diagram showing a grid of the result of heating each of cubes in the thermal processing simulation;

FIG. 55 is an illustration of a screen display showing exemplary simulation results for a ⅜ inch TPX carrier particle design;

FIG. 56 is a schematic diagram showing a grid of the result of heating each of cubes in the thermal processing simulation;

FIG. 57 is an illustration of a screen display showing exemplary simulation results for a ⅜ inch nylon carrier particle design;

FIG. 58 is a schematic diagram showing a grid of the result of heating the nylon carrier particle design of FIG. 57 in the same thermal processing simulation of the target particle;

FIG. 59 is an illustration of a screen display showing exemplary simulation results for a ⅜ inch TEFLON™ carrier particle design;

FIG. 60 is a schematic diagram showing a grid of the result of heating the TEFLON™ carrier particle design of FIG. 59 in the same thermal processing simulation of the target particle;

FIG. 61 is an illustration of a screen display showing exemplary simulation results for a ⅜ inch polypropylene carrier particle design;

FIG. 62 is a schematic diagram showing a grid of the result of heating the polypropylene carrier particle design of FIG. 61 in the same thermal processing simulation of the target particle;

FIG. 63 is a schematic diagram of a cylindrical particle design for simulation by spatial simulation engine;

FIG. 64 is an illustration of a screen display showing exemplary simulation results for the cylindrical particle design shown in FIG. 63;

FIG. 65 is a schematic diagram showing a plurality of circular portions and the result of heating each of circular portions in the thermal processing simulation;

Figure 66:
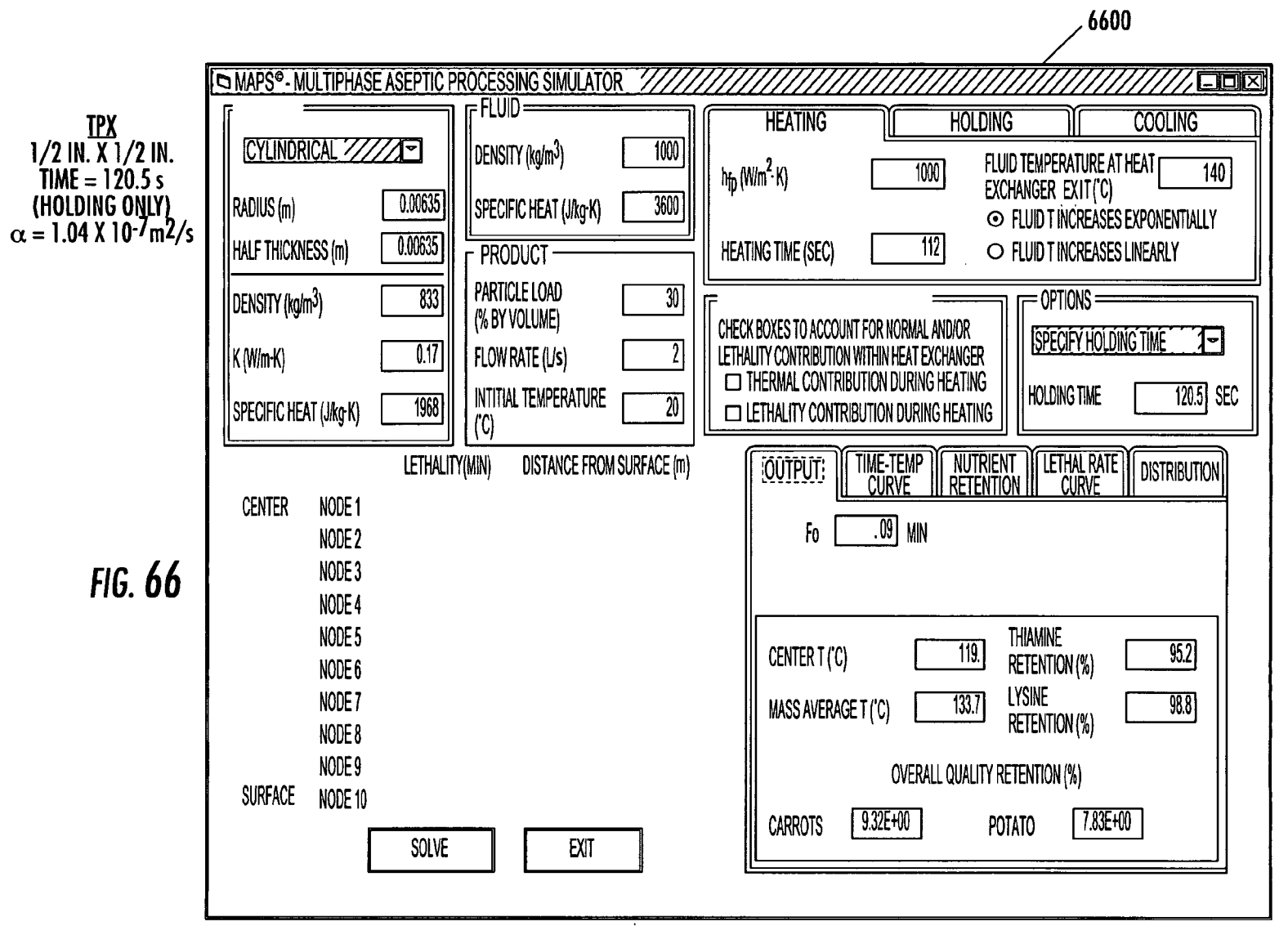

FIG. 66 is an illustration of a screen display showing exemplary simulation results for a 0.5 inch, TPX carrier particle design;

FIG. 67 is a schematic diagram showing a plurality of circular portions of the result of heating the TPX carrier particle design of FIG. 66 in the same thermal processing simulation of the target particle;

FIG. 68 is an illustration of a screen display showing exemplary simulation results for a 0.5 inch nylon carrier particle design;

FIG. 69 is a schematic diagram showing a plurality of circular portions of the result of heating the nylon carrier particle design of FIG. 46 in the same thermal processing simulation of the target particle;

FIG. 70 is an illustration of a screen display showing exemplary simulation results for a 0.5 inch TEFLON™ carrier particle design;

FIG. 71 is a schematic diagram showing a plurality of circular portions of the result of heating the TEFLON™ carrier particle design of FIG. 66 in the same thermal processing simulation of the target particle;

Figure 72:
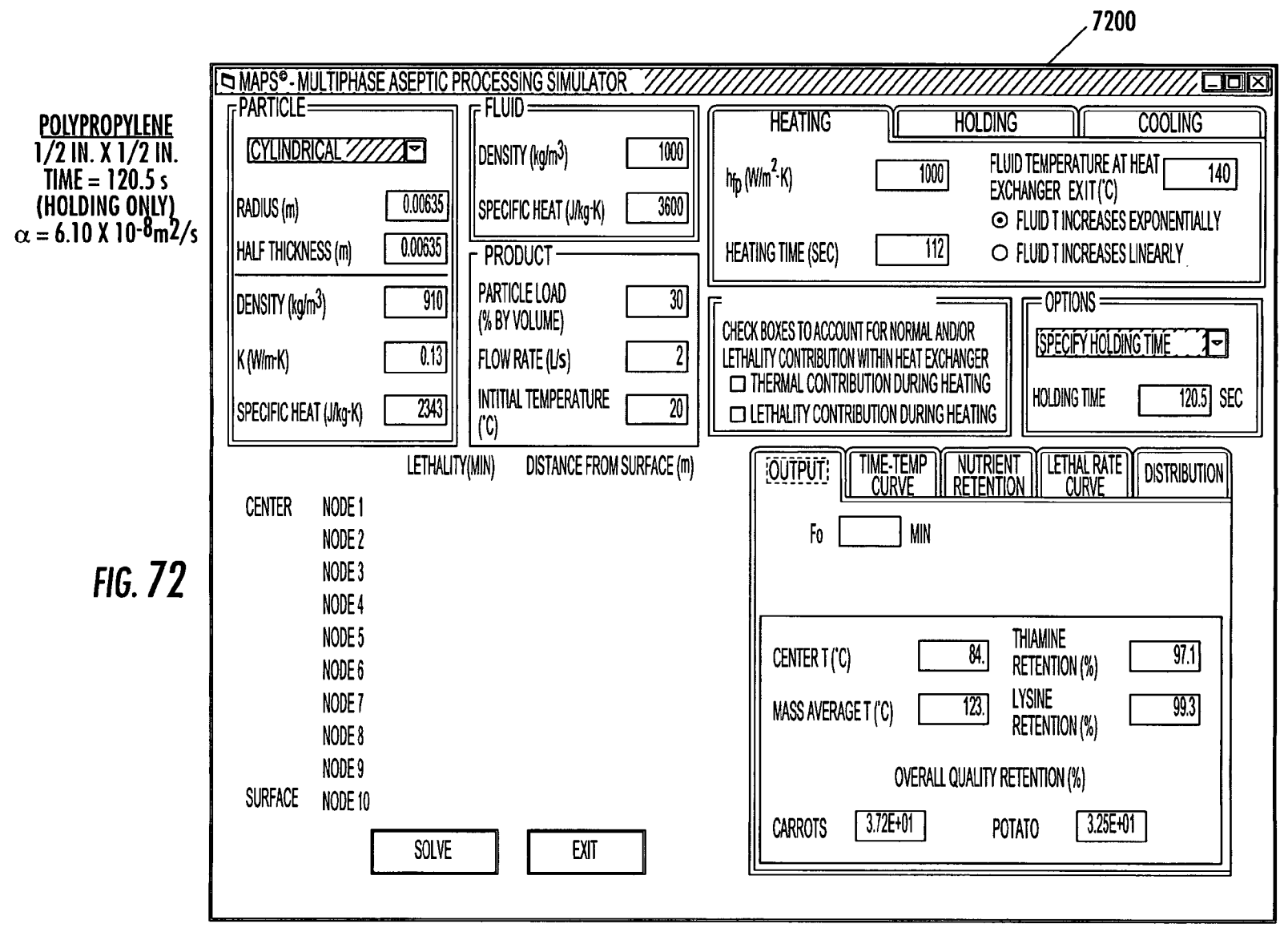

FIG. 72 is an illustration of a screen display showing exemplary simulation results for a 0.5 inch polypropylene carrier particle design;

FIG. 73 is a schematic diagram showing a plurality of circular portions of the result of heating the polypropylene carrier particle design of FIG. 72 in the same thermal processing simulation of the target particle;

FIG. 74 is a schematic diagram of a cylindrical particle design for simulation by a spatial simulation engine;

Figure 75:
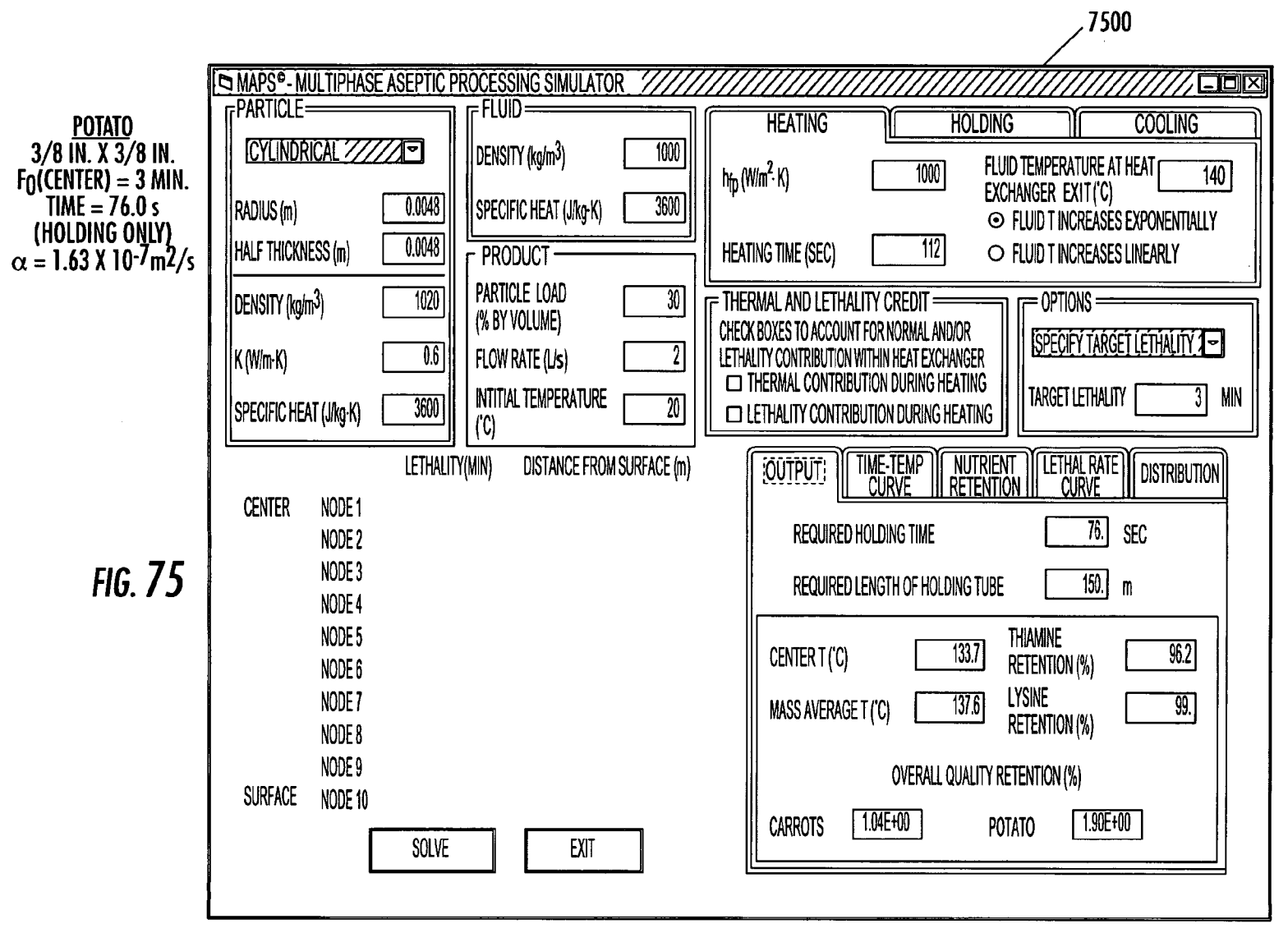

FIG. 75 is an illustration of a screen display showing exemplary simulation results for the cylindrical particle design shown in FIG. 74;

FIG. 76 is a schematic diagram showing a plurality of circular portions of the result of heating each of circular portions in the thermal processing simulation;

Figure 77:
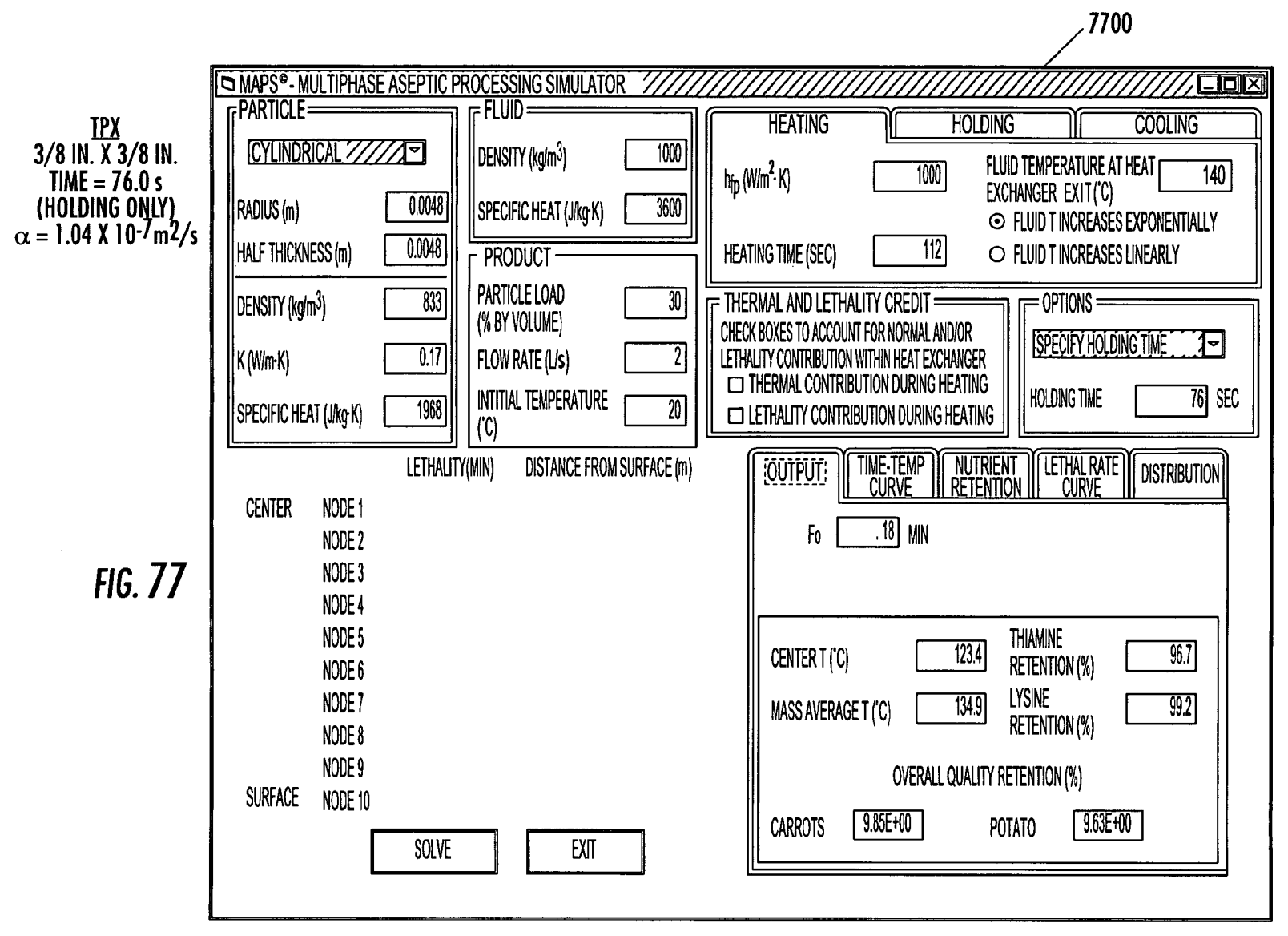

FIG. 77 is an illustration of a screen display showing exemplary simulation results for a ⅜ inch TPX carrier particle design;

FIG. 78 is a schematic diagram showing a plurality of circular portions of the result of heating the TPX carrier particle design of FIG. 77 in the same thermal processing simulation of the target particle;

Figure 79:
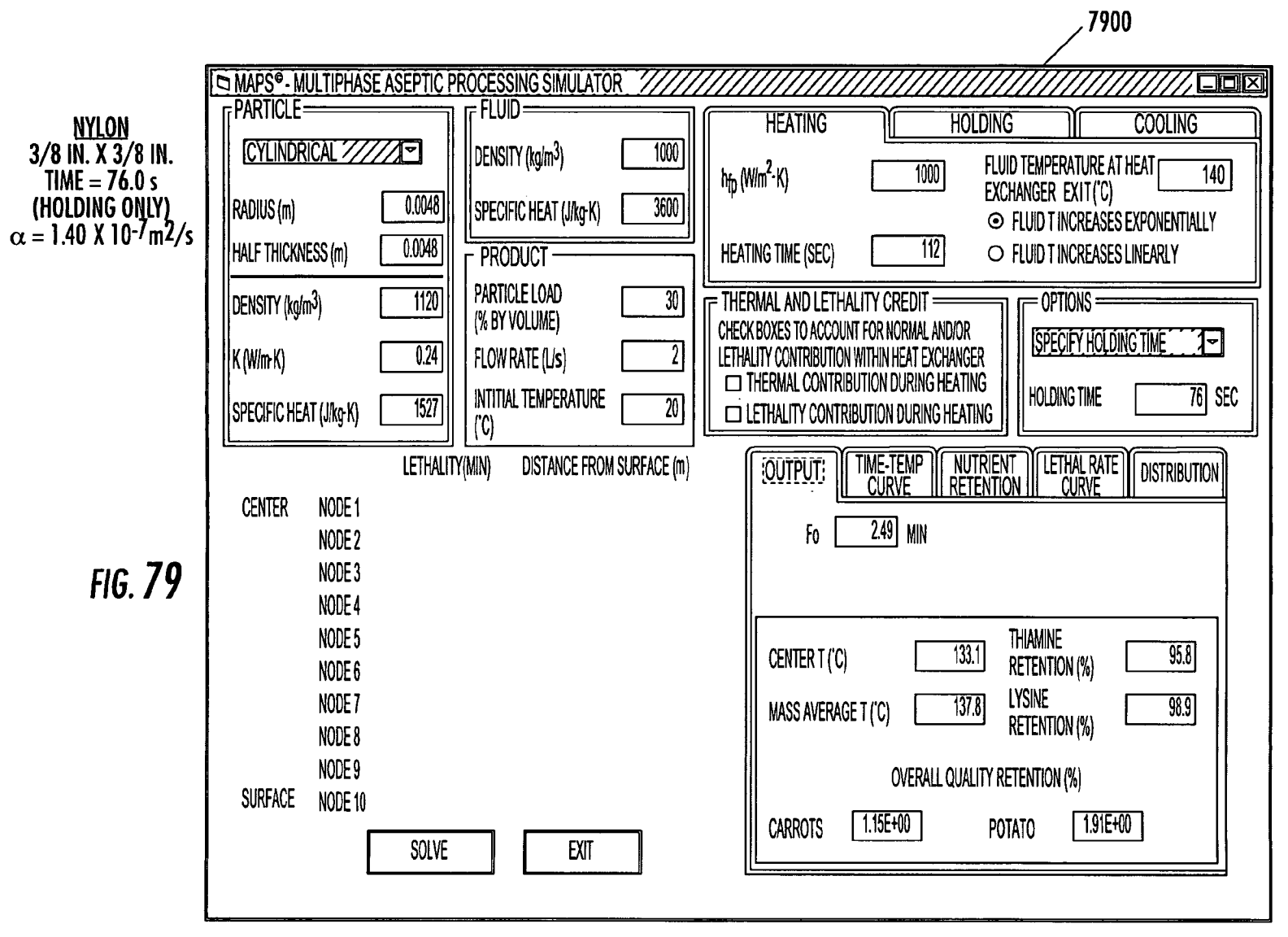

FIG. 79 is an illustration of a screen display showing exemplary simulation results for a ⅜ inch nylon carrier particle design;

FIG. 80 is a schematic diagram showing a plurality of circular portions of the result of heating the nylon carrier particle design of FIG. 57 in the same thermal processing simulation of the target particle;

Figure 81:
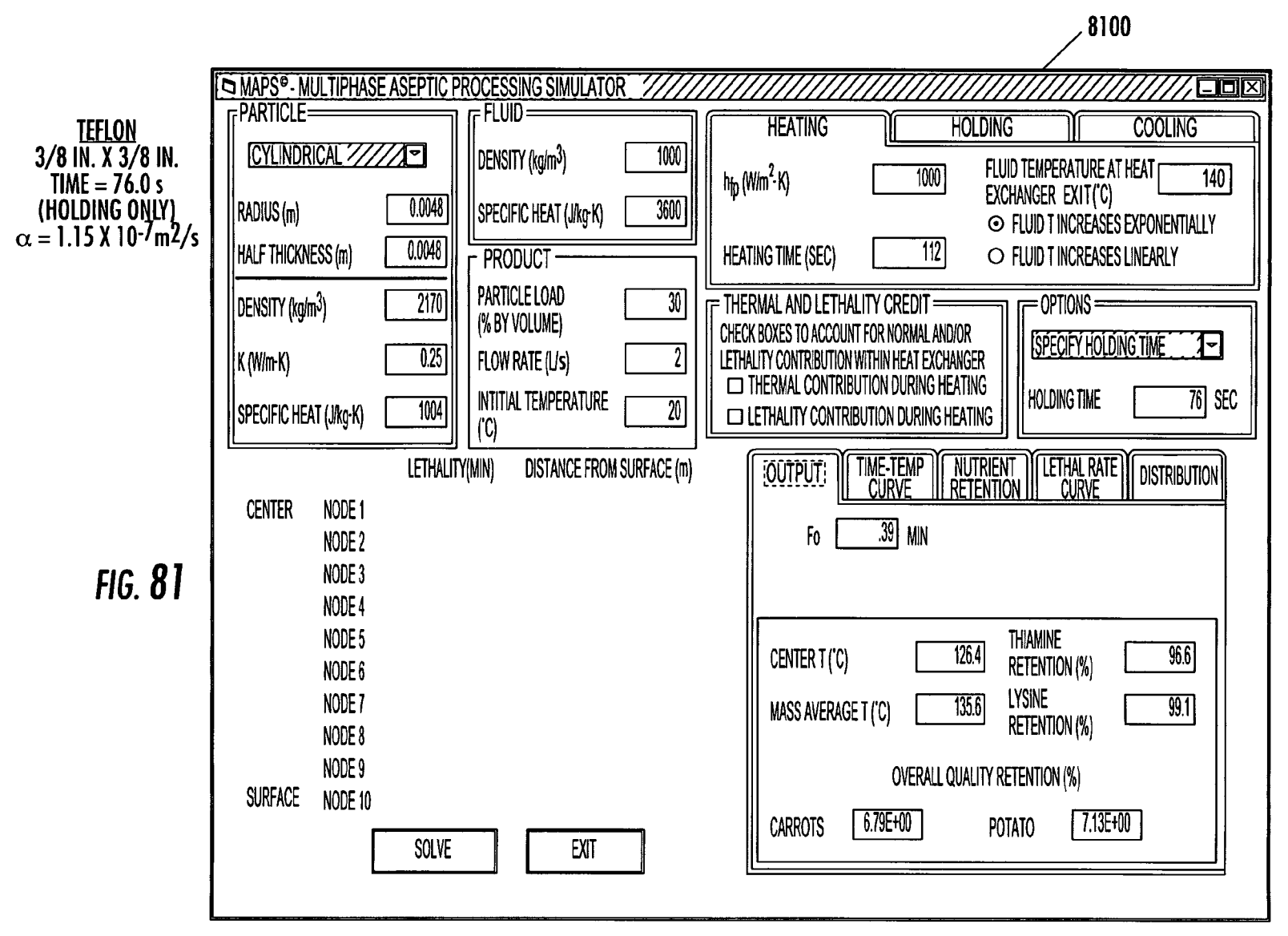

FIG. 81 is an illustration of a screen display showing exemplary simulation results for a ⅜ inch TEFLON™ carrier particle design;

FIG. 82 is a schematic diagram showing a grid of the result of heating the TEFLON™ carrier particle design of FIG. 81 in the same thermal processing simulation of the target particle;

Figure 83:
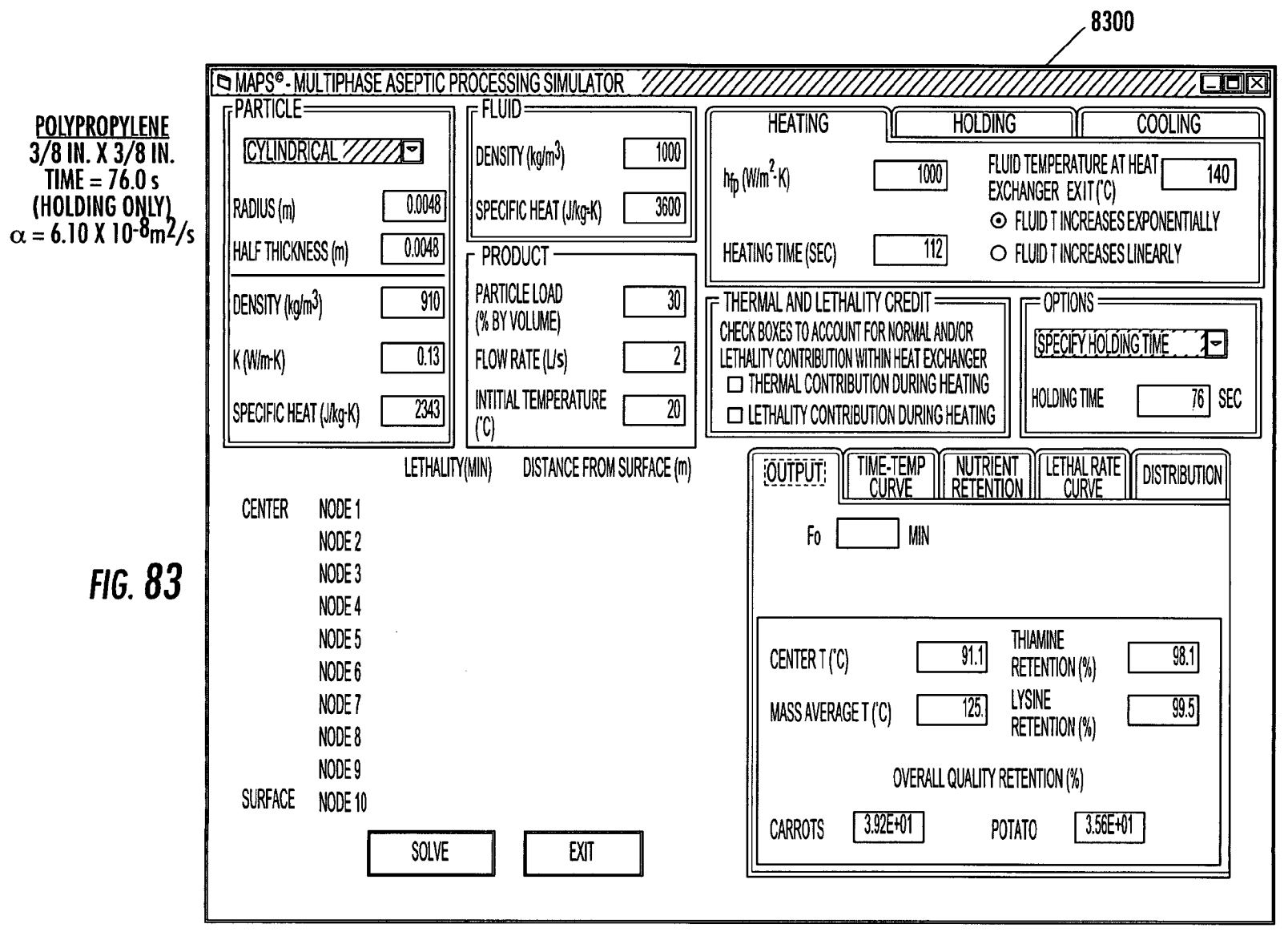

FIG. 83 is an illustration of a screen display showing exemplary simulation results for a ⅜ inch polypropylene carrier particle design;

FIG. 84 is a schematic diagram showing a grid of the result of heating the polypropylene carrier particle design of FIG. 83 in the same thermal processing simulation of the target particle;

FIG. 85 is a flow chart that illustrates a process for designing a carrier particle having characteristics about matching the conservative behavior characteristics of a selected target particle;

FIG. 86 is an illustration of a screen display of an application providing a dropdown menu for selecting a target food particle for simulation;

FIG. 87 is an illustration of a screen display of an application providing a menu for receiving operator input for designing a carrier particle;

FIGS. 88A and 88B are illustrations of screen displays of an application providing the results of the information entered in the screen display of FIG. 87;

FIGS. 89A and 89B are illustrations of screen displays of an application providing exemplary results of simulation information entered by an operator; and FIGS. 90A and 90B are illustrations of screen displays of an application providing exemplary results of other simulation information entered by an operator.

DETAILED DESCRIPTION

Temperature measurements for the continuously flowing particles in a thermal multi-phase processing system need to be performed in such a way that will not obstruct or impede the stream of continuously moving product within the system. If the stream of the observed targets needs to be impeded, slowed down or stopped to implement the measurement, this will generally result in non-conservative measurement and therefore non-conservative process evaluation.

Temperature measurements therefore need to be performed using non-obstructing, non-contact measurement techniques and using a sufficiently rapid response and detection to enable recording of the temperature in full stream and in real time. The detection system should also preferably be functional through the existing stainless steel equipment without major modifications to the geometry or material structures. Finally, embodiment of a temperature measurement method and system should measure temperature in the "cold spot" of the fastest moving, slowest heating particle present in the continuously thermally processed multi-phase product.

Particularly, methods and systems are provided that can conservatively generate temperature measurements in batch and in continuous thermal processing of particulate-containing food products, among other applications. In some embodiments, the methods and systems described herein can implement a large number of inexpensive, robust, thermally stable sensors adjusted to cover and monitor the entire length of a process hold tube and reliably ensure the detection of the time and place of target temperature achievement, regardless of its location along the tube length. Thus, a conservative temperature measurement is assured for all processed products and particle types without complicated system modifications. Optionally, the number (and thus system sensitivity) and density of sensors can be increased at specific path areas of interest to enable more precise location and measurement.

While treatment of the methods and systems described herein can be applied to food products, other representative applications include other types of thermal treatment, such as enzymatic inactivation, thermal inactivation or destruction of other harmful components (viruses, toxins, carcinogens, mutagens, and contaminants); thermal or catalytic process enhancement; and thermal treatments of various materials required to achieve either a minimum temperature or a minimum time-temperature process combination. The subject matter disclosed herein thus pertains to temperature measurement methods and systems that provide conservative measurement with respect to a variety of particles, such as real food particles with no characteristic compensation or adjustment; non-food biomaterial particles; and organic and inorganic thermally treated particles, whether natural or fabricated.

Conservative temperature measurement is defined herein as a measurement that provides temperature detection only when a selected minimum temperature is reached by the observed target. Conservative temperature measurement is of particular importance in thermal microbicidal treatments such as pasteurization and sterilization since it provides a tool to assure that the minimal required cumulative microbicidal thermal process has been received by the observed target. Correspondingly, then, a conservative temperature evaluation method as referred to herein is a method that assures detection and recording of all temperatures exceeding a preselected or predetermined temperature level.

Following long-standing patent law convention, the terms "a" and "an" mean "one or more" when used in this application, including the claims.

I. Methods and Systems Temperature Level Detection and Recording

Methods and systems are provided for generating a temperature measurement for a batch or a continuous stream of material, particularly food materials. Additionally, a magnetically detectable particle is disclosed that can be applied to these methods and systems. According to one embodiment, the detectable particle comprises a first and second magnet having a positive and negative pole. One of the positive and negative poles of the first magnet can be attached to the same polarity positive or negative pole of the second magnet. This arrangement of the magnets can generate a first magnetic field and can have the effect of reducing or canceling the magnetic field strength of the first and second magnet.

The magnetically detectable particle can also comprise an adhesive having a release temperature and operable to attach the first and second magnets together above the release temperature and release the first and second magnets from one another above the release temperature. When the adhesive releases the first and second magnets, the first and second magnets can move with respect to one another such that one of the positive and negative poles of the first magnet moves toward the opposite polarity positive or negative pole of the second magnet. This arrangement of the magnets can generate a detectable change in magnetic field strength to indicate a temperature measurement for the batch or continuous stream.

Generally, by the term "detectable particle" or "magnetically detectable particle", it is meant a particle that includes an implant that is detectable by magnetic field sensors that can be used in the methods and systems described herein. According to one embodiment, a system can include a magnetically detectable particle as described herein and a detector for detecting a change from a first magnetic field to a second magnetic field to thereby generate a temperature measurement for the batch or continuous stream. According to another embodiment, the method can include providing the magnetically detectable particle described herein; inserting the detectable particle into a batch or continuous stream; and detecting a change in magnetic field strength of the detectable particle to thereby generate a temperature measurement for the batch or continuous stream. The magnetic field signal can be detected by external non-contacting magnetic sensors, and can be indicated in a number of ways, including by a closing of relays, by light indicators, by alarms, and other suitable indicators known to those of skill in the art. Further, the methods and systems described herein can be used for the monitoring and recording of achieved temperature levels and the additional data (e.g., time required for achievement of temperature associated with the temperature event). The methods and systems described herein can be used for remote, non-contact detection (such as, for example, during a flow of multi-phase materials containing solids within sealed vessels). Specifically, the generated signals can be detected through stainless steel walls or enclosures of standard sanitary processing equipment for, e.g., foodstuffs and biomaterials. Alternatively, the methods and systems can be applied to the detection of overheating reactors, industrial heaters and other equipment (i.e., critical temperature detection in automotive applications).

The methods and systems described herein can be used to detect that predetermined temperature levels have been reached in a wide variety of objects and materials. According to one embodiment, the objects and materials can be simulated and real food particles. The detectable particle can be inserted within, attached to, or otherwise integrated into a simulated or real food particle. The simulated food particles can be adjusted or designed to provide conservative flow and heating behavior when compared to other food particles present in, e.g., a continuously, thermally-processed multiphase food product. In some embodiments, the implant's magnetic field strength can be monitored via a series of non-contacting giant magneto resistive (GMR) magnetic field sensors. Detection of a change in magnetic signal can indicate a point in the system (e.g., location and time-of-flight) needed for a custom-designed conservative particle to achieve a pre-set temperature in the center of the particle or at the implant location. This detection can assure that each and every other real food particle has achieved at least the preset temperature at or prior to the detection location. Thus, the methods and systems described herein can facilitate a conservative time-temperature detection system for continuous flow thermal processing of multiphase food products.

In addition to monitoring flows and thermal histories of continuously thermally processed multiphase foods, the methods and systems described herein can be used for the detection of any increase in temperature above a pre-set limit. In food processing, for example, cans can be individually tagged with coupled-magnet devices to confirm via automatic detection that individual cans have achieved pre-set sterilization/thermal treatment levels. Alternatively, for specific products (e.g., refrigerated foods), attainment of higher temperatures is undesirable; thus, methods and systems described herein can be used to detect temperature abuse during the product distribution and storage cycles.

The first and second magnets of the magnetically detectable particle can be pre-magnetized, and can be selected based on any number of desirable physical characteristics (e.g., maximum operating temperature, size, shape, weight, material composition, and magnetic field strength). According to one embodiment, the first and second magnets can comprise a material selected from the group consisting of neodymium iron boron, cobalt rare earth (e.g., samarium-cobalt), aluminum-based (e.g., aluminum-nickel), ceramic, organic, plastic-embedded metal or ceramic and combinations thereof. According to another embodiment, the magnets can be made of special sintered neodymium-iron-boron (NdFeB) grades, such as NdFeB M series (having a maximum operating temperature of about 100° C.); NdFeB H series (having a maximum operating temperature of about 120° C.); NdFeB SH series (having a maximum operating temperature of about 180° C.); NdFeB UH series (having a maximum operating temperature of about 180° C.); and NdFeB EH series (having a maximum operating temperature of about 180° C.).

The adhesive for attaching the magnets can be selected from an adhesive such as glue materials, metallic alloys, or their combinations based on their melting point and service temperature range characteristics. The following table, Table I, shows exemplary adhesive compositions for eutectic metallic alloys and metals:

TABLE I

Adhesive Compositions for Eutectic Metallic Alloys and Metals

| Composition (%) | Eutectic Melting Point (Degrees C.) |
|---|---|
| Indium (In) 51/Bismuth (Bi) 32.5/Tin (Sn) 16.5 | 60 |
| Sn13.1/Bi 49.5/Lead (Pb) 27.3/Cadmium (Cd) 10.1 | 70 |
| In 66.3/Bi 33.7 | 72 |
| In 41.5/Bi 48.5/Cd10.0 | 77.5 |
| Bi 57/In 26/Sn 17 | 79 |
| In 29.6/Sn 16.3/Bi 54.1 | 81 |
| Bi 51.6/Pb 40.2/Cd 8.2 | 92 |
| In 44.0/Sn 42.0/Cd 14.0 | 93 |
| Sn 18.0/Bi 52.0/Pb 30.0 | 95 |
| Sn 35.7/Bi 35.7/Pb 28.6 | 100 |
| Sn 25.9/Bi 53.9/Cd 20.2 | 104 |
| In 33.0/Bi 67.0 | 109 |
| In 52/Sn 48 | 118 |
| In 74/Cd 26 | 123 |
| Bi 55.5/Pb 44.5 | 124 |
| In 70.0/Sn 15.0/Pb 9.6/Cd 5.4 | 125 |
| Sn 41.6/Bi 57.4/Pb 1.0 | 135 |
| Sn 42/Bi 58 | 138 |
| In 97/Silver (Ag) 3 | 143 |
| Bi 60.0/Cd 40.0 | 144 |
| Sn 51.2/Pb 30.6/Cd 18.2 | 145 |
| In 97.0/Ag 3.0 | 146 |
| In 99.5/Ga 0.5 | 153 |
| In 100.0 | 156.7 |

Additionally, the listed and similar alloys shown in Table I can be used as the thermal release layer in a laminated composition with magnetic implants, i.e., a layer of meltable metal or alloy can be affixed between the paired magnets using adhesives with higher operating temperatures than the eutectic melting point of the release-layer alloy, such as high temperature acrylic, cyano-acrylate, silicone, and epoxy adhesives.

Preferably, the adhesive is eutectic at its melting point, thus providing a sharp, instantaneous change from solid to liquid when the melting/release temperature is reached. Upon achieving the melting/release temperature, the adhesive force of the adhesive can be overcome by the repulsing force of the same polarity magnetic poles of the first and second magnets such that the magnets can be released from one another. The magnets generate the repulsing force opposing the adhesive force because the same magnetic poles of the magnets are attached adjacent to one another.

The melting/switching temperatures of selected alloys can vary slightly due to the variability of metallic batches and variations among supplier sources. In order to ascertain the conservative nature of the measurements, an appropriately conservative temperature value may be assigned to the switch. According to one embodiment, the conservative temperature can be 1 degree lower than any experimentally determined melting or switching point for the selected batch of alloy material. That way, both measurement errors (due thermocouple, thermometer, converter and data acquisition system variability) and material property errors (due to alloy variability) can be conservative.

The adhesives can have a release temperature selected between a range of about −40° C. and 1000° C. Mercury can represent the lower end of this temperature range, and Al—Ni—Co can represent the higher end of this temperature range. According to one embodiment, the release temperature of the adhesive can be set between about 45° C. and 160° C. About the 45° low end range can represent an application to low temperature pasteurization, and the 160° C. high end range can represent a UHT sterilization range.

Upon release, the magnets can move with respect to one another so that opposing magnetic poles are joined. The opposing poles of the magnets are attracted to one another and can cause the magnets to realign with respect to one such that opposing poles are adjacent one another. This joining of opposing poles results in an addition of magnetic field strengths such that the magnetic field signal is increased and can be detected via magnetic sensors.

When two magnetized permanent magnets are in sufficiently close vicinity for magnetic field lines to cross over and overlap, there can be a detectable physical attraction between the opposing magnetic poles. If the magnets are sufficiently close and strong, this attraction causes the coupling of opposing poles resulting in a combined magnet. The resulting magnetic field strength is an additive combination of individual magnet field strengths. The combination of the magnets can have a magnetic field strength higher than either of the individual magnets.

Figure 1:
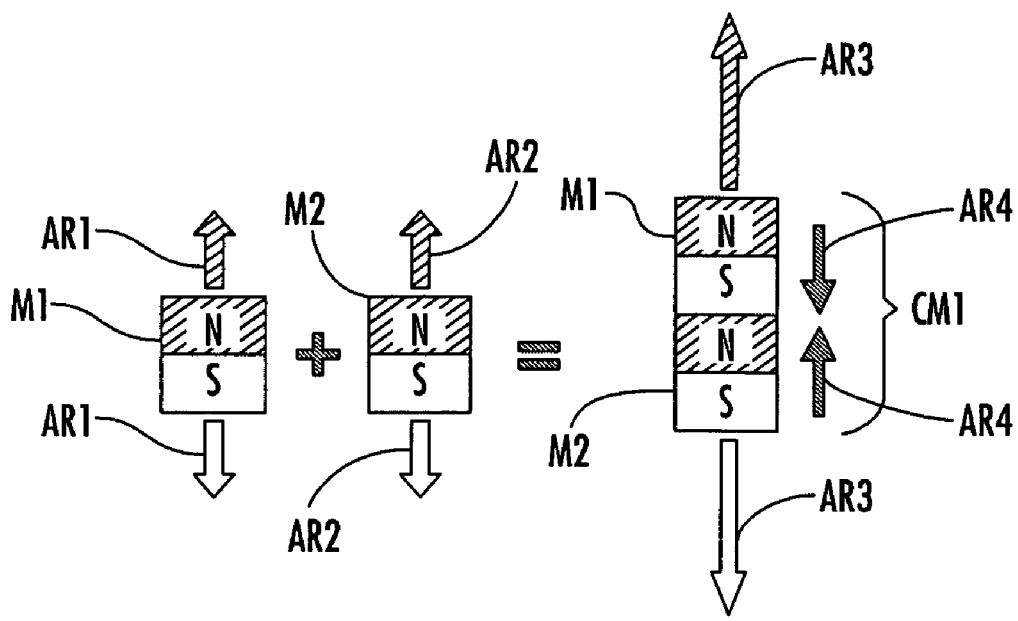

FIG. 1 illustrates a schematic diagram of combining a first and second magnet M1 and M2 at opposing magnetic poles to achieve a combined magnet, generally designated CM1. Arrows AR1, AR2, AR3 represent the comparative magnetic field strengths of first magnet M1, second magnet M2, and combined magnet CM1, respectively. The sizes of arrows AR1, AR2, and AR3 represent the corresponding field strengths of first magnet M1, second magnet M2, and combined magnet CM1, respectively. As indicated, the magnetic field strength of combined magnet CM1 is greater than the magnetic field strength of magnets M1 and M2 individually. For example, if magnets M1 and M2 are about identical and equally magnetized, the field strength of combined magnet CM1 is about double the individual field strength of magnets M1 and M2. Arrows AR4 represents the attractive force between generated between magnets M1 and M2 due to the orientation of the opposing poles of magnets M1 and M2 adjacent one another.

Alternatively, if similar magnetic poles (north and north or south and south) of two permanent magnets are joined, there is a physical repulsion force that must be overcome in order to join the similar poles. This joining can also result in the mutual cancellation of magnetic fields, resulting in a combined magnet of about zero magnetic field strength while the physical repulsion force remains in effect. If the magnets are released and allowed to realign freely, there is first repulsion, and then realignment of the attracting opposite poles, resulting in increased magnetic field strength. The difference between the magnetic field strengths in these configurations can be detectable by magnetic sensors.

Figure 2:
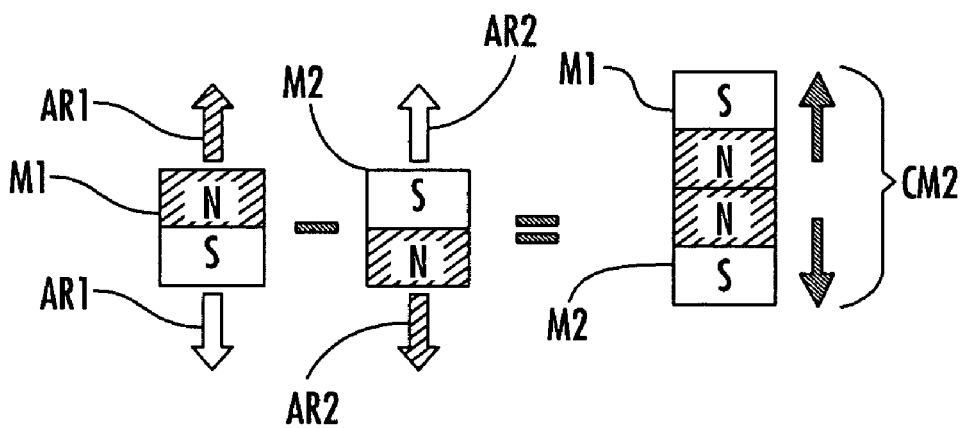

FIG. 2 illustrates a schematic diagram of the result of combining first and second magnets M1 and M2 at similar magnetic poles to achieve a combined magnet, generally designated CM2. In this example, the magnetic field strengths of magnets M1 and M2 (indicated by arrows AR1 and AR2, respectively) are about equal. When magnets M1 and M2 are combined to achieve combined magnet CM2, the combined magnetic field strengths of magnets M1 and M2 are effectively canceled or substantially reduced due to the orientation of the poles of magnet M1 with respect to the poles of magnet M2. According to this embodiment, the opposing magnetic poles of magnets M1 and M2 are about equal and attached adjacent to one another to result in a zero or substantially small magnetic field for combined magnet CM2.

The magnetic behavior shown in FIG. 2 can be utilized in a non-contact thermomagnetic switch system based on forcing magnets M1 and M2 to attach at similar magnetic poles. Magnets M1 and M2 can be attached at the similar poles by an adhesive such as a thermo-labile adhesive or soldering alloy. The adhesive can include a melting/release point temperature at which point the repulsion force of magnets M1 and M2 overcomes the adhesive force of the adhesive to release of magnets M1 and M2 from attachment at the similar magnetic poles. After magnets M1 and M2 are released, magnets M1 and M2 can naturally realign due to the magnetic attraction between opposing magnetic poles such that the opposing magnetic poles of magnets M1 and M2 are adjacent. Thus, the natural realignment of magnets M1 and M2 is determined by heating to the melting/release temperature of the adhesive. This dictates a basis for the selection of adhesives, such as thermo-labile adhesive or soldering alloy, wherein their selection is based on their thermal breakdown point or melting point. The change in magnetic field strength caused by this realignment to the natural coupling of opposite poles can cause a detectable change in magnetic field strength level, and thus a way to remotely detect the time and location of a desired temperature level event.

Figure 3A:
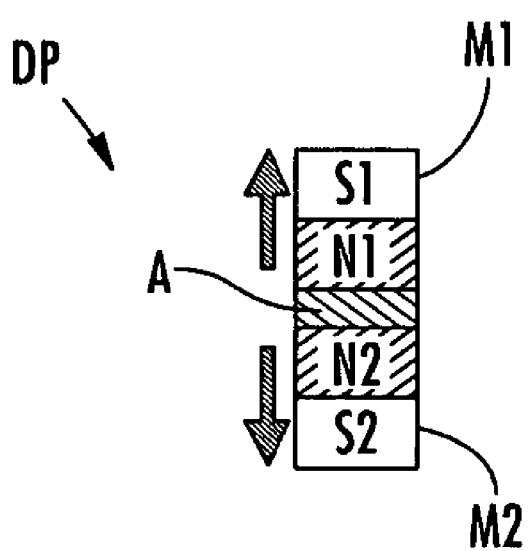
Figure 3B:
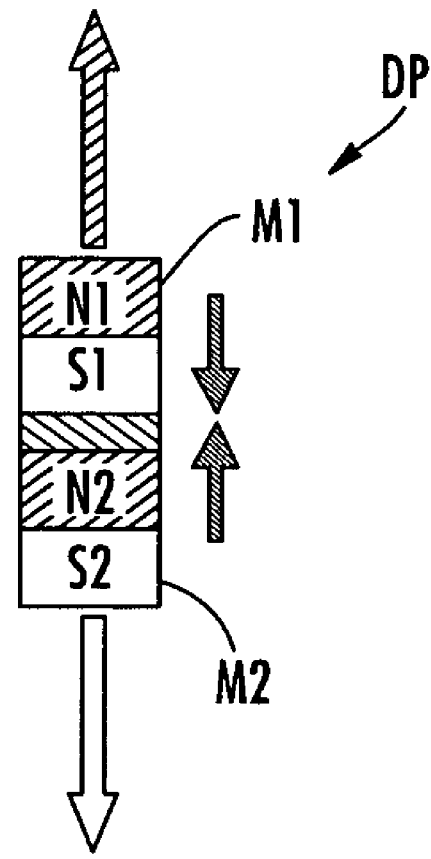
Figure 3D:
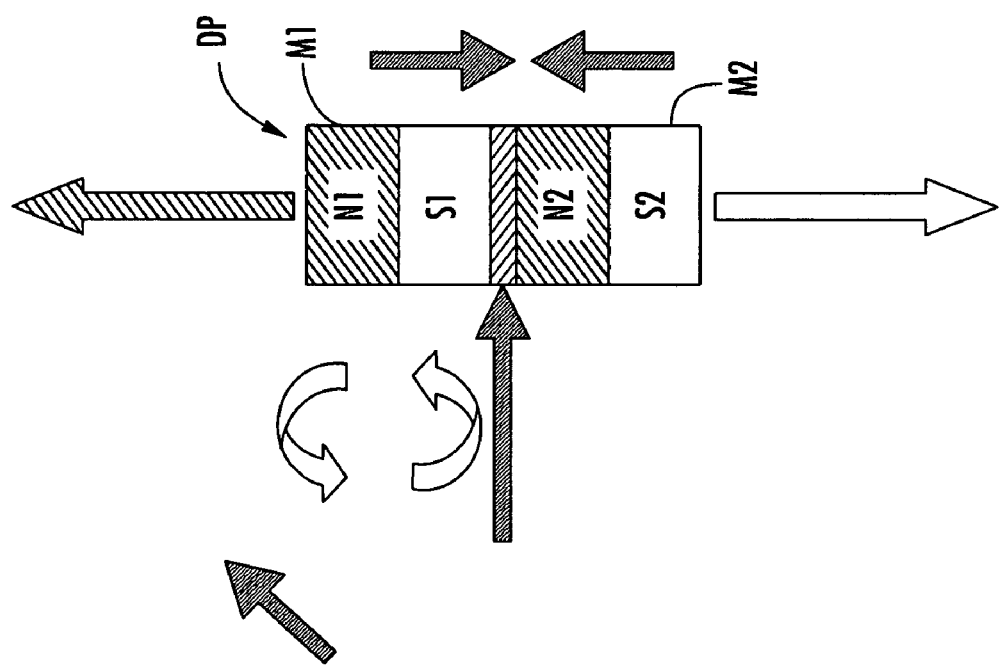
Figure 3C:
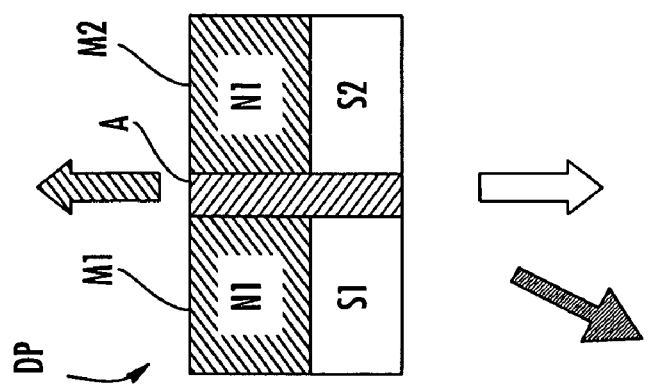

FIGS. 3A, 3C, and 3E, and FIGS. 3B, 3D, and 3F illustrate different states of a magnetically detectable particle, generally designated DP, during heating from a temperature below a predetermined conservative temperature to a temperature above the predetermined temperature. Referring specifically to FIGS. 3A, 3C, and 3E, schematic diagrams of particle DP in a state below a predetermined conservative temperature is illustrated. Particle DP can comprise a first and second magnet M1 and M2 having north magnetic poles N1 and N2, respective, and south magnetic poles S1 and S2, respectively. In this arrangement of magnets M1 and M2 with respect to one another, the magnetic fields of magnets M1 and M2 are effectively reduced and can be effectively canceled if magnets M1 and M2 have about the same magnetic field strength. In this arrangement, there is also a repulsion force between magnets M1 and M2.

Referring to FIGS. 3A, 3C, and 3E, particle DP can also comprise an adhesive A for attaching magnets M1 and M2 at or proximate to north magnetic poles N1 and N2, including an embodiment as shown in FIG. 3E wherein pole N2 is attached between poles N1 and S1. Thus a detectable particle of the presently disclosed subject matter can comprise both perfect and non-perfect pole alignments. In some embodiments, a proximate alignment provides a detectable magnetic field strength that can be used for residence time detection upstream from the point of the thermal switch occurrence. Adhesive A can include a melting/release temperature equivalent to the predetermined conservative temperature. Above the melting/release temperature, the repulsion of magnets M1 and M2 overcomes the adhesive force of adhesive A for releasing magnets M1 and M2. The process of releasing magnets M1 and M2 can be irreversible. In this embodiment, adhesive A is selected to have a release temperature equal to a predetermined conservative temperature.

Referring specifically to FIGS. 3B, 3D, and 3F, schematic diagrams of particle DP in a state above the predetermined temperature is illustrated. After magnets M1 and M2 are released, magnets M1 and M2 can naturally realign due to the magnetic attraction between opposing magnetic poles S1 and N2 such that the opposing magnetic poles S1 and N2 are adjacent. Alternatively, magnets M1 and M2 can naturally realign due to the magnetic attraction between opposing magnetic poles S2 and N1 such that the opposing magnetic poles S2 and N1 are adjacent. The change in magnetic field strength caused by this realignment due to the natural coupling of opposite poles S1 and N2 can cause a detectable change in magnetic field strength level, and thus a way to remotely detect the time and location of a desired temperature level event. In this embodiment, the magnetic field strength of particle DP is increased from about zero to about the equivalent of adding the magnetic field strengths of magnet M1 and M2.

Figure 3G:
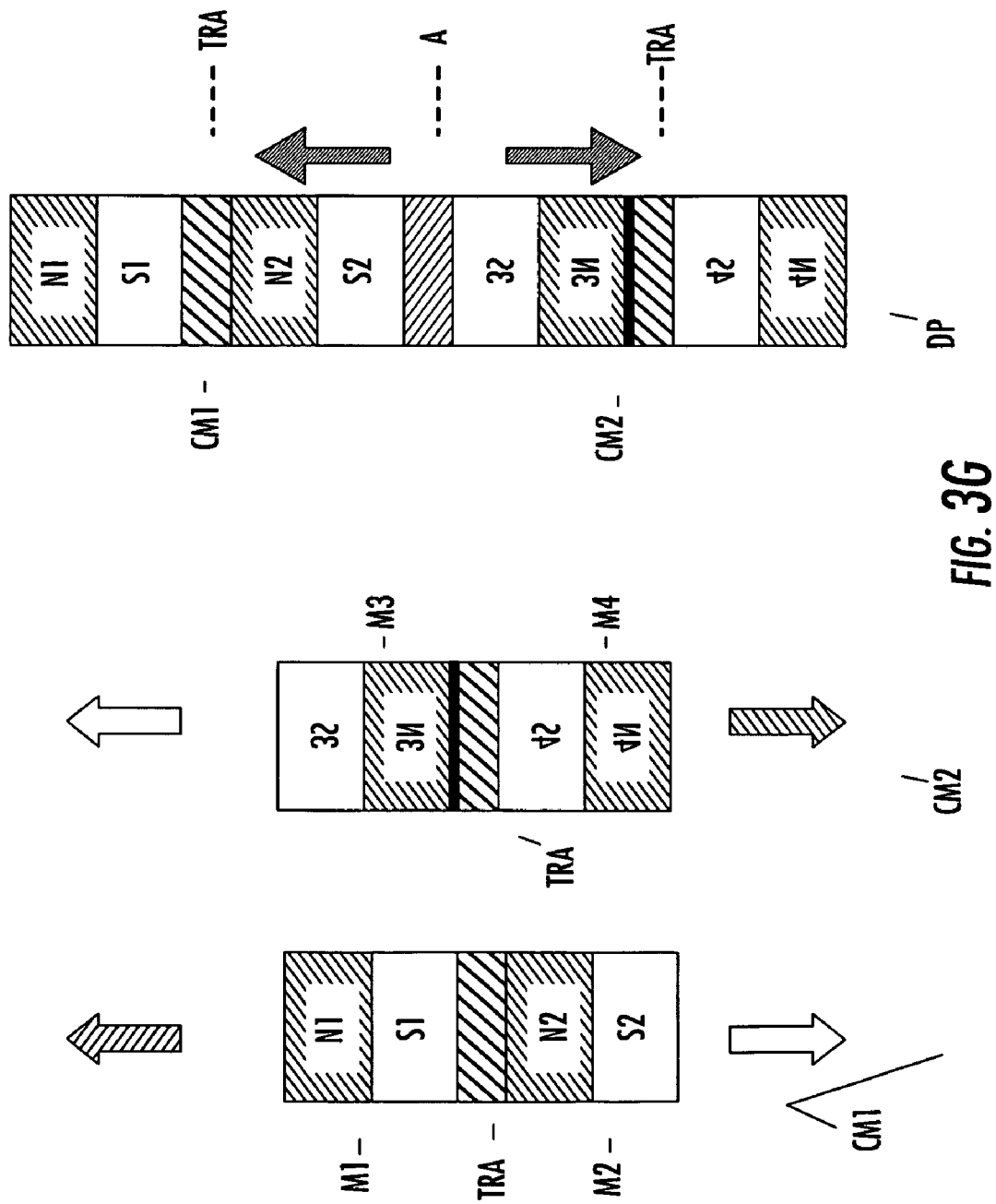
Figure 3I:
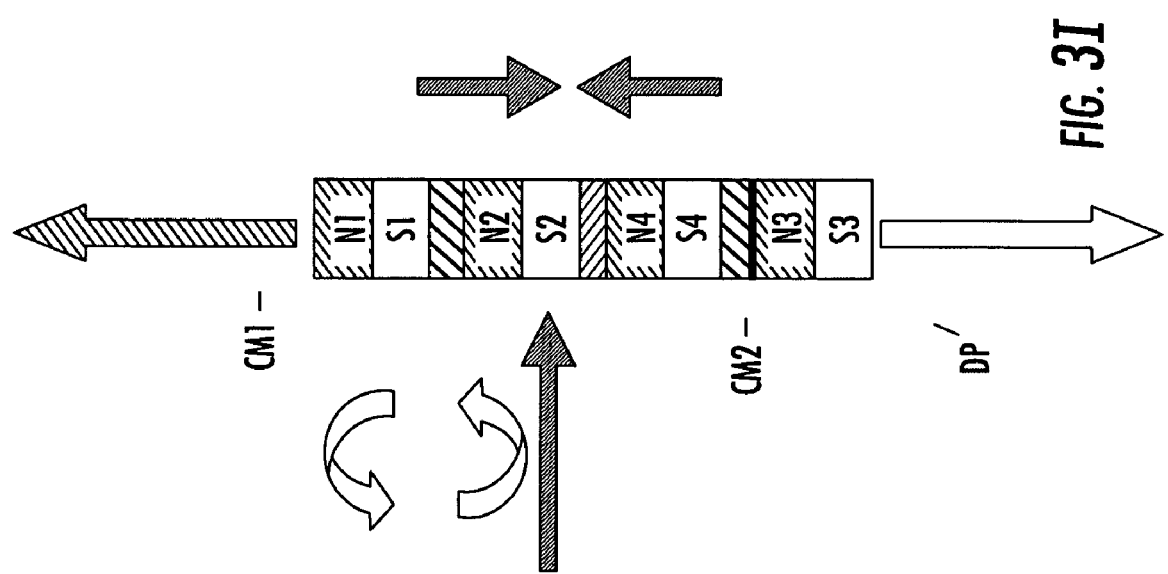
Figure 3H:
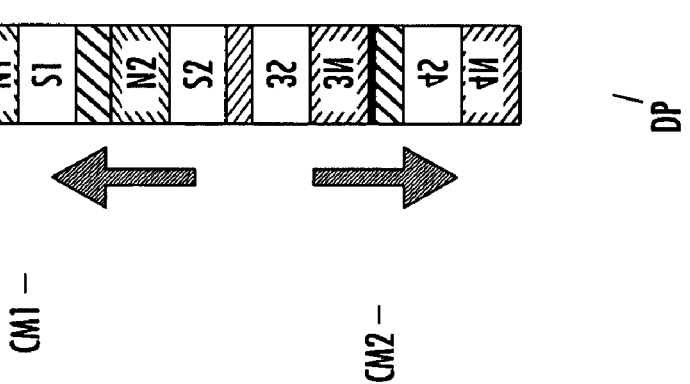

Referring now to FIGS. 3G–3I, schematic diagrams of the assembly and operation of one embodiment of a magnetically detectable particle DP is presented. In this embodiment a pair of combined magnets CM1 and CM2, wherein each combined magnet CM1 and CM2 comprises multiple magnets M1 and M2, and M3 and M4, respectively, is assembled by attaching opposing poles S1 and N2, and N3 and S4, respectively, using a thermo-resistant adhesive TRA. Combined magnets CM1 and CM2 are then attached at or proximate to same poles S2 and S3 by adhesive A, and combined magnets CM1 and CM2 respectively function as a single magnet within the functional pair that define detectable particle DP.

Referring specifically to FIGS. 3H and 3I, a schematic diagram of particle DP in a state below and above a predetermined temperature is illustrated. After combined magnets CM1 and CM2 are released, combined magnets CM1 and CM2 can naturally realign due to the magnetic attraction between opposing magnetic poles S2 and N4 such that the opposing magnetic poles S2 and N4 are adjacent. Alternatively, combined magnets CM1 and CM2 can naturally realign due to the magnetic attraction between opposing magnetic poles S3 and N1 such that the opposing magnetic poles S3 and N1 are adjacent. The change in magnetic field strength caused by this realignment due to the natural coupling of opposite poles can cause a detectable change in magnetic field strength level, and thus a way to remotely detect the time and location of a desired temperature level event. In this embodiment, the magnetic field strength of particle DP is increased from about zero to about the equivalent of adding the magnetic field strengths of combined magnets CM1 and CM2.

Figure 3J:
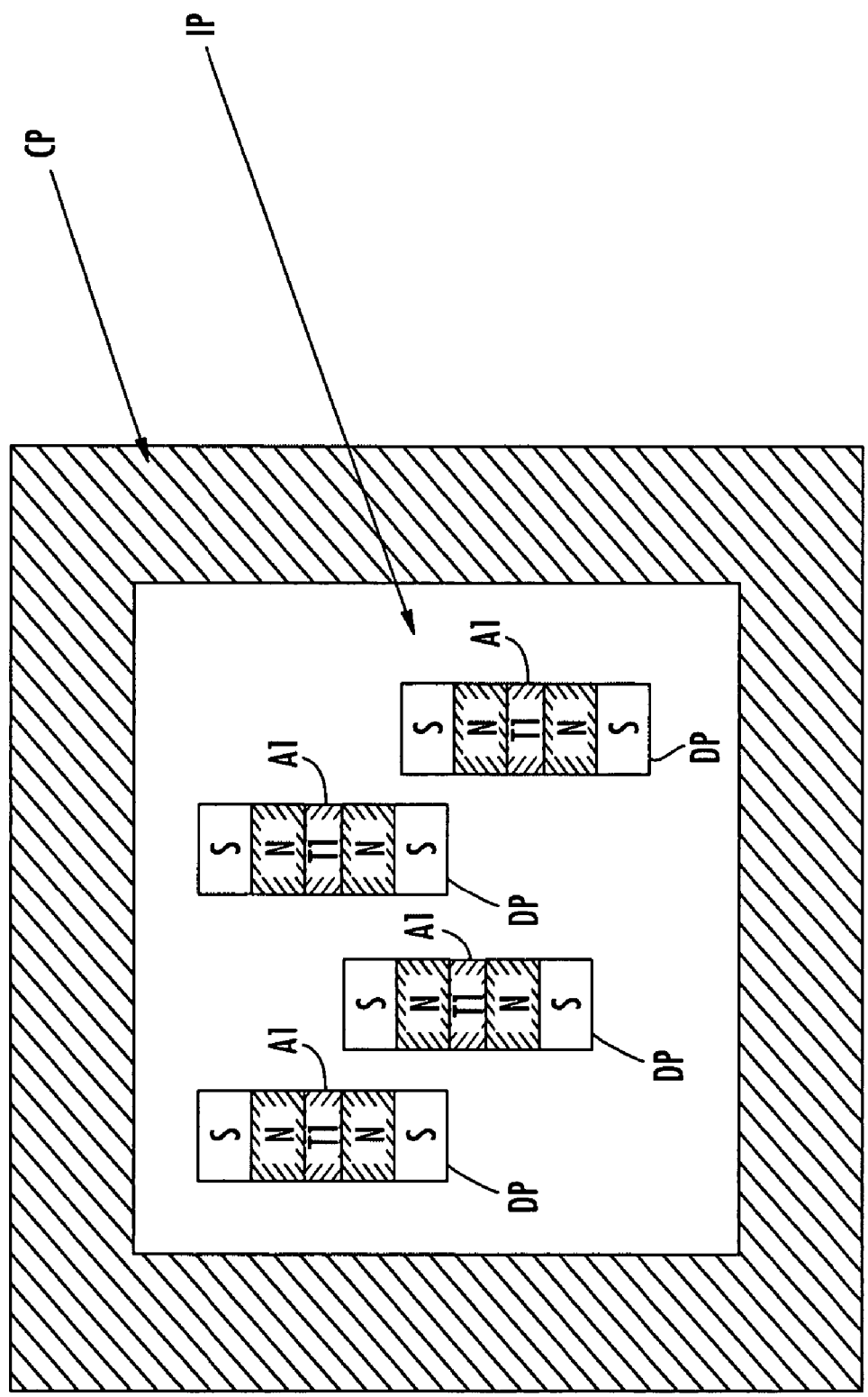
Figure 3L:
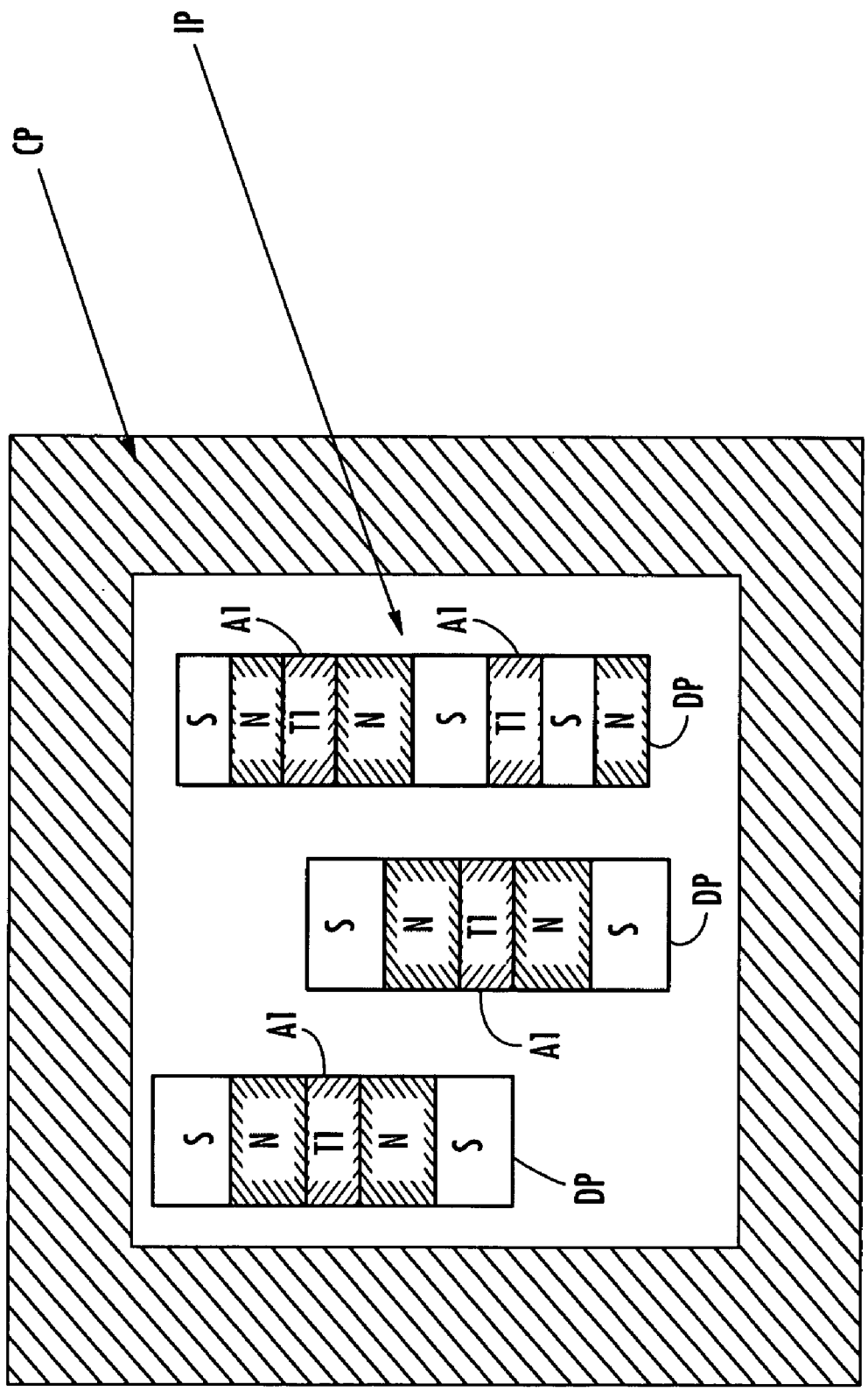

Referring now to FIGS. 3J–3L, carrier particles CP comprising multiple detectable particles DP are disclosed. In FIG. 3J, detectable particles DP comprising two magnets each, all assembled using the same adhesive A1 with release temperature T1, are disposed in interior portion IP of carrier particle CP. In FIG. 3K, detectable particles DP comprising two magnets each, assembled using different adhesives A1, A2 and A3, each having a different release temperature T1, T2, and T3, respectively, are disposed in interior portion IP of carrier particle CP. In FIG. 3L, detectable particles DP comprising two or magnets each, all assembled using the same adhesive A1 with release temperature T1, are disposed in interior portion IP of carrier particle CP.

Referring to FIG. 4, a schematic diagram of the principle of forced coupling and fixing similar magnets M1 and M2 is illustrated. Magnets M1 and M2 can individually generate a magnetic field. Magnets M1 and M2 can then be attached at similar magnetic poles (e.g., north magnetic poles or south magnetic poles) via adhesive A. Again, a repulsion force is generated between magnets M1 and M2 because they are positioned together at similar magnetic poles.

For the specific application of flow monitoring of multiphase foods undergoing continuous thermal treatment, it can be useful to have an associated level of magnetic field strength with the particle prior to the point at which the predetermined conservative temperature is achieved. In this way, the particle can be followed through the system and its residence time monitored and recorded in the system components preceding the actual location of the temperature switch occurrence. According to one embodiment, this can be achieved by providing a magnetically detectable particle having two dissimilar magnets.

FIGS. 5A and 5B illustrate different states of a magnetically detectable particle, generally designated P, having dissimilar magnets M1 and M2. The two states are above and below a predetermined conservative temperature. Referring specifically to FIG. 5A, a schematic diagram of particle DP in a state above the predetermined conservative temperature is illustrated. Particle DP can comprise a first and second magnet M1 and M2 having north magnetic poles N1 and N2, respectively, and south magnetic poles S1 and S2, respectively. In this arrangement of magnets M1 and M2 with respect to one another, magnets M1 and M2 can generate a detectable magnetic strength level because magnet M1 and M2 have different strength levels. In particular, magnet M2 has a higher magnetic strength than magnet M1. In this arrangement, there is also a repulsion force between magnets M1 and M2. Below the predetermined temperature, there is a low but detectable magnetic field strength, which can substantially increase once the predetermined temperature has been reached. Particle DP is useful in this state for tracking particle DP before heating above the predetermined conservative temperature.

Referring now to FIG. 5B, a schematic diagram of particle DP in a state above the predetermined conservative temperature for releasing magnets M1 and M2 from one another is illustrated. Magnets M1 and M2 naturally move with respect to one another such that opposite magnetic poles S1 and S2 are adjacent. In this configuration, magnets M1 and M2 generate a detectably higher magnetic field than in the state of particle DP shown in FIG. 5A.

Figure 6A:
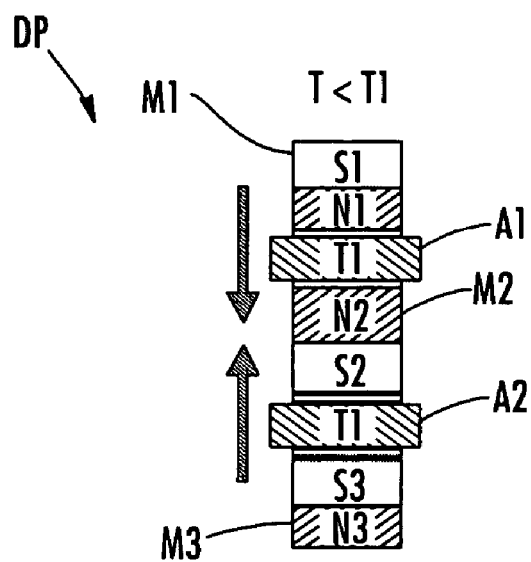

Two different levels of magnetic field strength according to temperature levels can be achieved with a particle including a three-magnet configuration. FIGS. 6A and 6C, and FIGS. 6B, 6D, and 6E illustrate different states of a magnetically detectable particle, generally designated DP, having a first, second, and third magnet M1, M2, and M3 during heating from a temperature below a predetermined conservative temperature to a temperature above the predetermined temperature. Referring specifically to FIGS. 6A and 6C, schematic diagrams of particle DP in a state below a predetermined conservative temperature is illustrated. Magnets M1, M2, and M3 can include north magnetic poles N1, N2, and N3, respectively, and south magnetic poles S1, S2, and S3, respectively. North magnetic pole N1 of magnet M1 can be attached to similar north magnetic pole N2 of magnet M2 via a first adhesive A1. South magnetic pole S2 of magnet M2 can be attached to south magnetic pole S3 of magnet M3 via a second adhesive A2. Adhesives A1 and A2 can be selected to have the same release temperature T1, equal to the predetermined conservative temperature. Thus, when adhesives A1 and A2 are reach a temperature greater than the release temperature, magnets M1 and M3 can be released from magnet M2 due to the repulsive force between magnet M2 and magnets M1 and M3. In this embodiment, adhesives A1 and A2 are selected to have a release temperature equal to a predetermined conservative temperature.

Figure 6B:
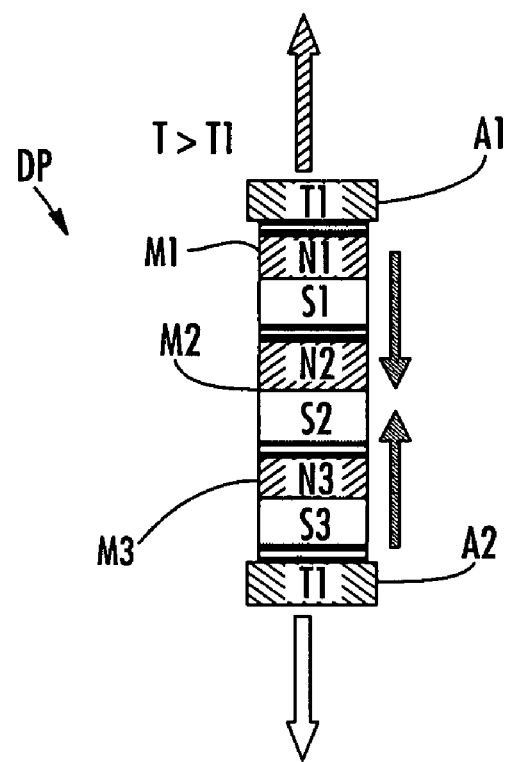

Referring now to FIGS. 6B, 6D, and 6E, schematic diagrams of particle DP in a state above the predetermined conservative temperature is illustrated. Upon release via adhesive A1, magnet M1 can move with respect to magnet M2 such that south magnetic pole S1 is adjacent to north magnetic pole N2 of magnet M2. Additionally, upon release via adhesive A2, magnet M3 can move with respect to magnet M2 such that north magnetic pole N3 is adjacent to south magnetic pole S2 of magnet M2. The resulting magnetic filed of particle DP is about the total of the magnetic fields of magnets M1, M2, and M3. According to one embodiment, magnets M1, M2, and M3 can have different magnetic fields strengths. Alternatively, magnets M1 and M3 can have the same magnetic field strength, and magnet M2 can have a magnetic field strength greater than magnets M1 and M3.

Figure 6F:
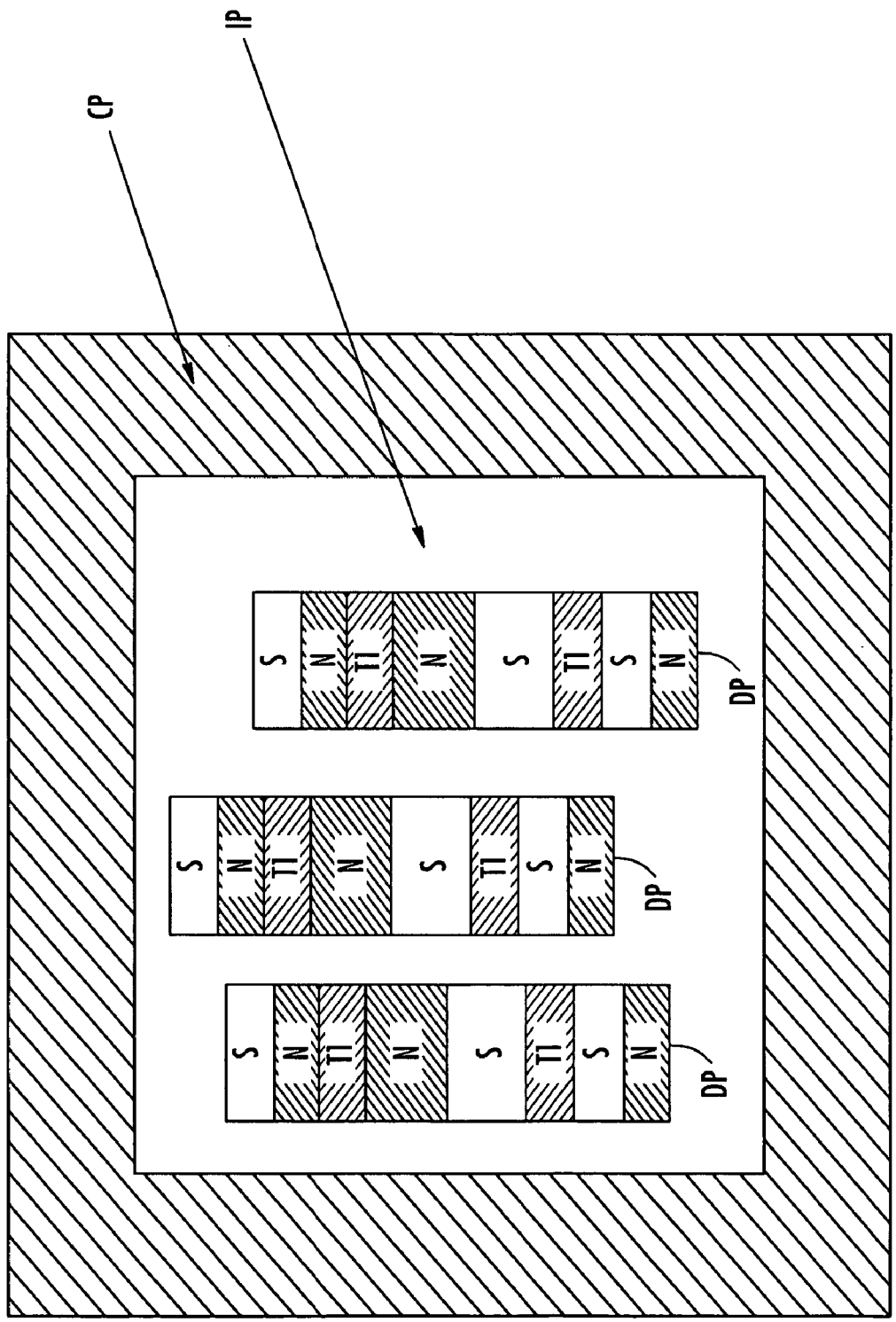

Referring to FIG. 6F, detectable particles DP comprising more than two magnets each (e.g. three magnets), all assembled using the same adhesive A1 with release temperature T1, are disposed in interior portion IP of carrier particle CP.

Figure 7C:
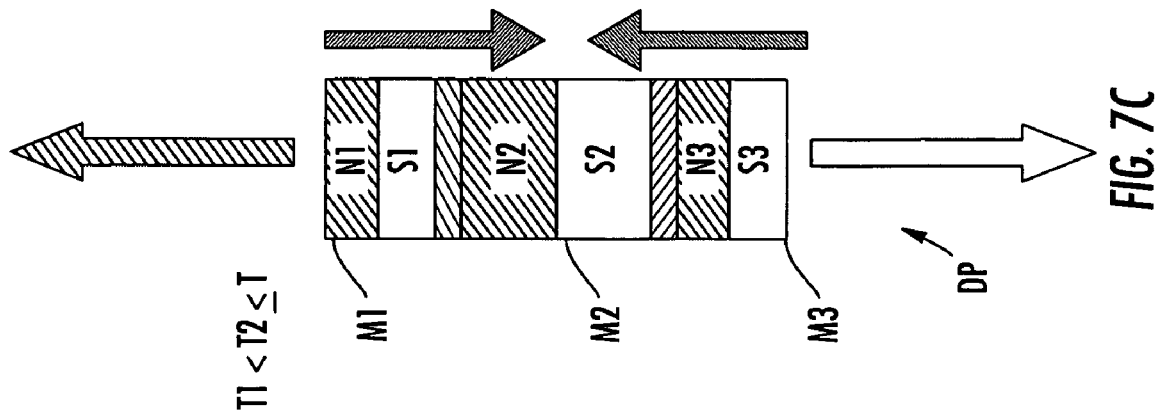
Figure 7B:
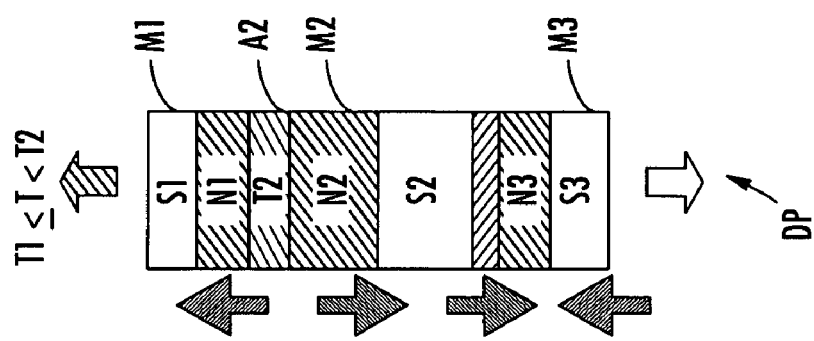
Figure 7A:
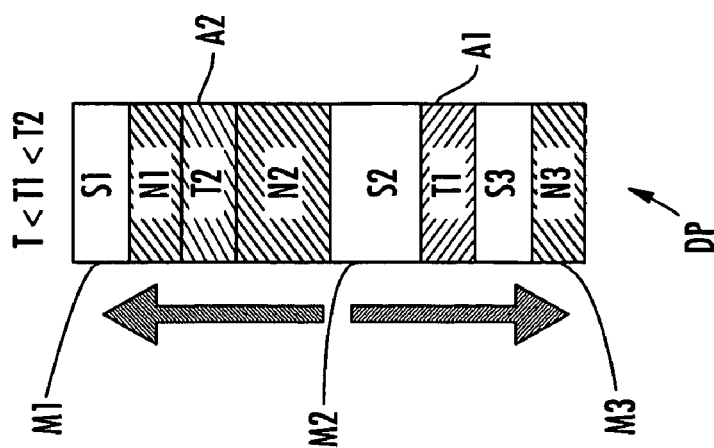

It can also be useful to have two or more temperature set-point switch levels, e.g., a lower and progressively higher ones to enable detection of times and locations of achievement of multiple predetermined temperature levels. FIGS. 7A–7C illustrate different states of a magnetically detectable particle, generally designed DP, operable at three different magnetic field strength levels for indicating three different predetermined temperature levels are illustrated. Particle DP can include magnets M1, M2, and M3. Referring specifically, to FIG. 7A, a schematic diagram of particle DP in a state with its temperature below a first predetermined conservative temperature T1 is illustrated. Magnets M1, M2, and M3 can include north magnetic poles N1, N2, and N3, respectively, and south magnetic poles S1, S2, and S3, respectively. South magnetic pole S2 of magnet M2 can be attached to south magnetic pole S3 of magnet M3 via a first adhesive A1. North magnetic pole N1 of magnet M1 can be attached to similar north magnetic pole N2 of magnet M2 via a second adhesive A2. In this state, the magnetic field strength of particle DP is at a low/zero level.

Adhesives A1 and A2 can be selected to have different release temperatures such that magnet M1 releases from magnet M2 at a different temperature than magnet M3 releases from magnet M2. Adhesive A1 is selected such that magnet M3 releases from magnet M2 when the temperature of adhesive A1 rises above a predetermined temperature T1. Adhesive A2 is selected such that magnet M1 releases from magnet M2 when the temperature of adhesive A2 rises above a predetermined temperature T2. According to this embodiment, predetermined temperature T2 is greater than temperature T1. Thus, as the temperature of particle DP rises, magnet M1 releases from magnet M2 before magnet M3 releases from magnet M2.

FIG. 7B illustrates a schematic diagram of particle DP in a state when the temperature of particle DP is between temperature T1 and temperature T2. When the temperature rises above temperature T1, magnet M3 can be released from magnet M2 and move with respect to magnet M2 such that north magnetic pole N3 is adjacent south magnetic pole S2 of magnet M2. The magnetic field strength of particle DP is at an intermediate level in this state.

FIG. 7C illustrates a schematic diagram of particle DP in a state when the temperature of particle DP is greater than temperature T1 and T2. When the temperature rises above temperature T2, magnet M1 can be released from magnet M2 and move with respect to magnet M2 such that south magnetic pole S1 is adjacent north magnetic pole N2 of magnet M2. The magnetic field strength of particle DP is at a high level in this state. In some embodiments, the process of releasing magnets M1 and M3 via attachment by adhesives A2 and A1, respectively, is irreversible.

Figure 7D:
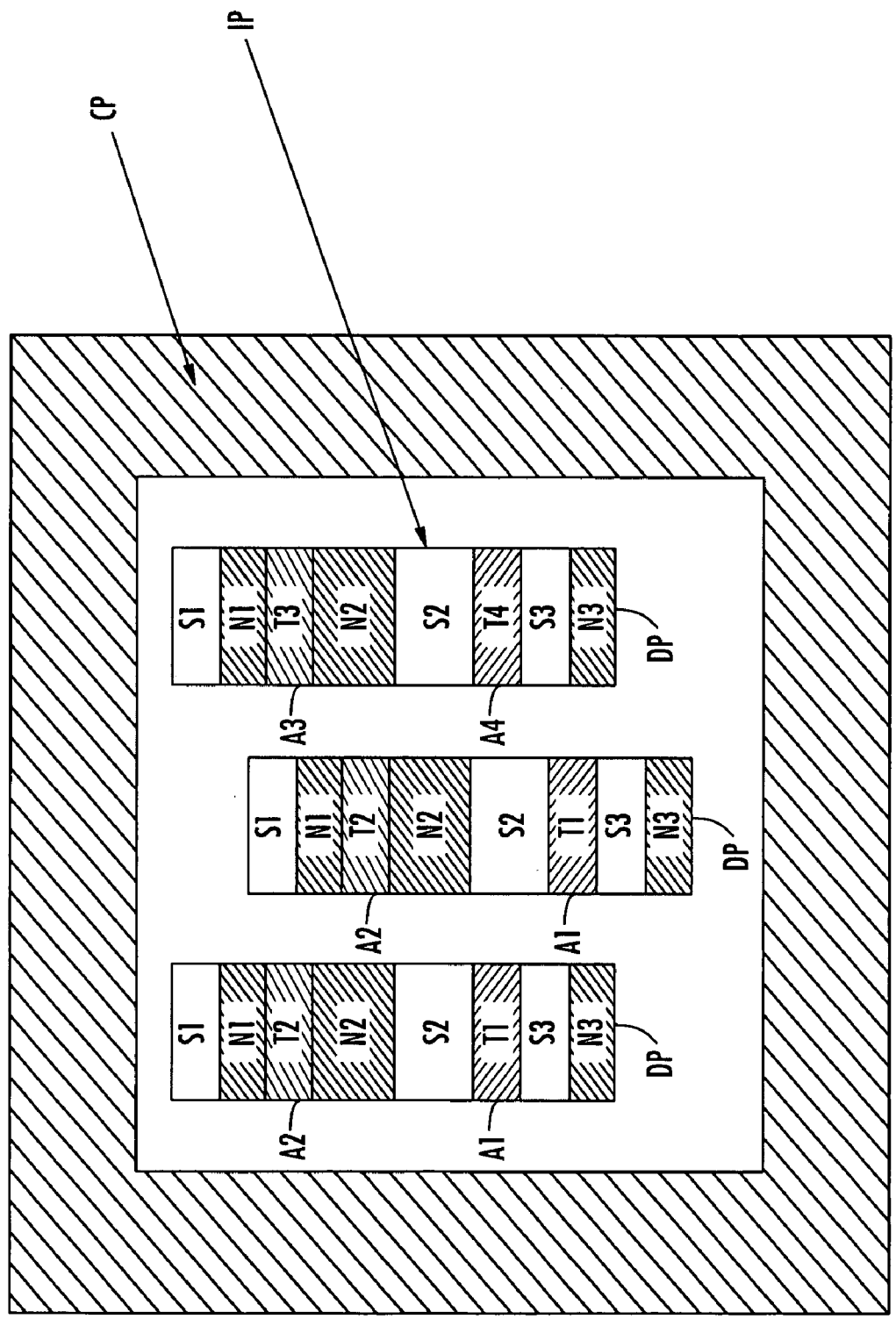
Figure 7E:
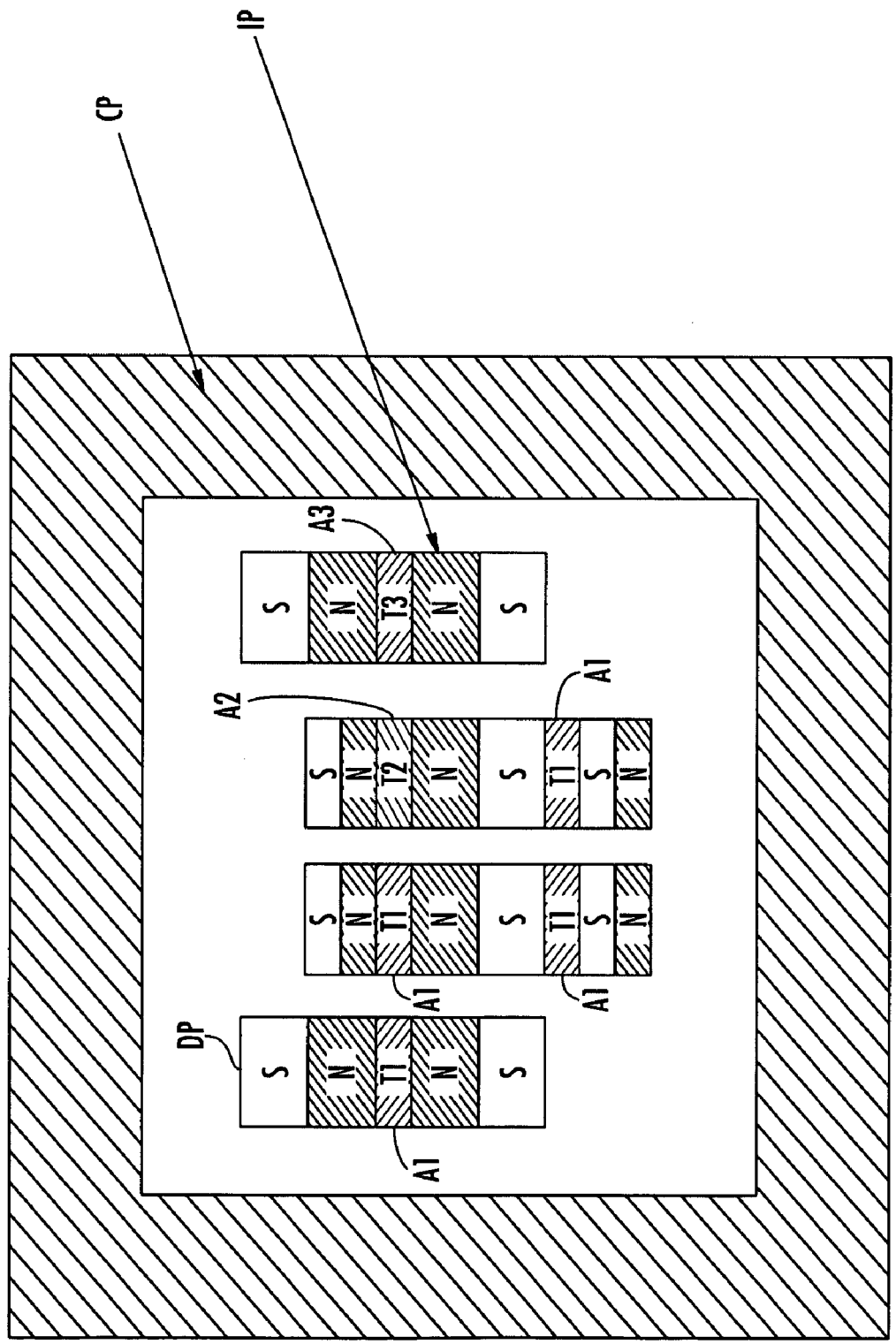
Figure 7F:
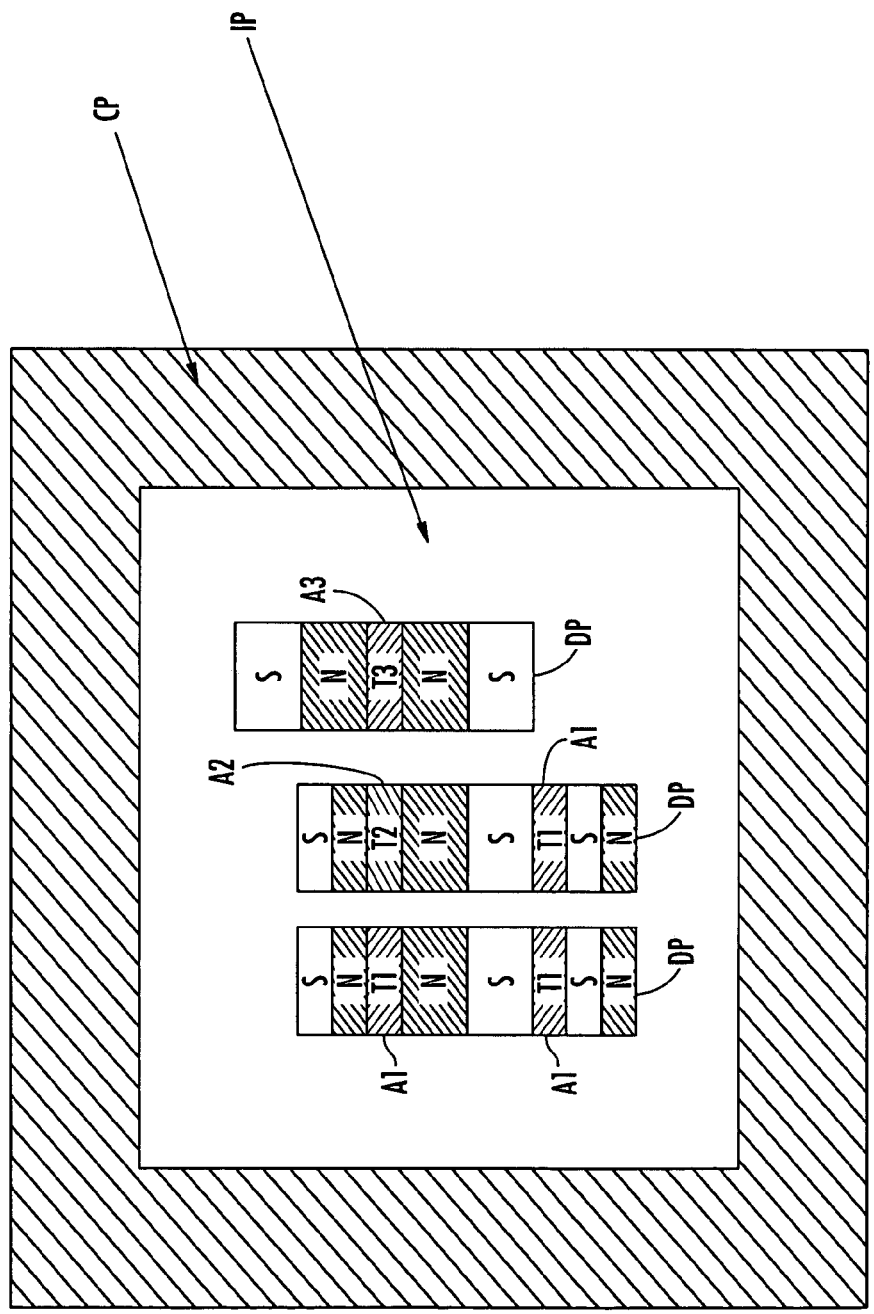
Figure 7G:
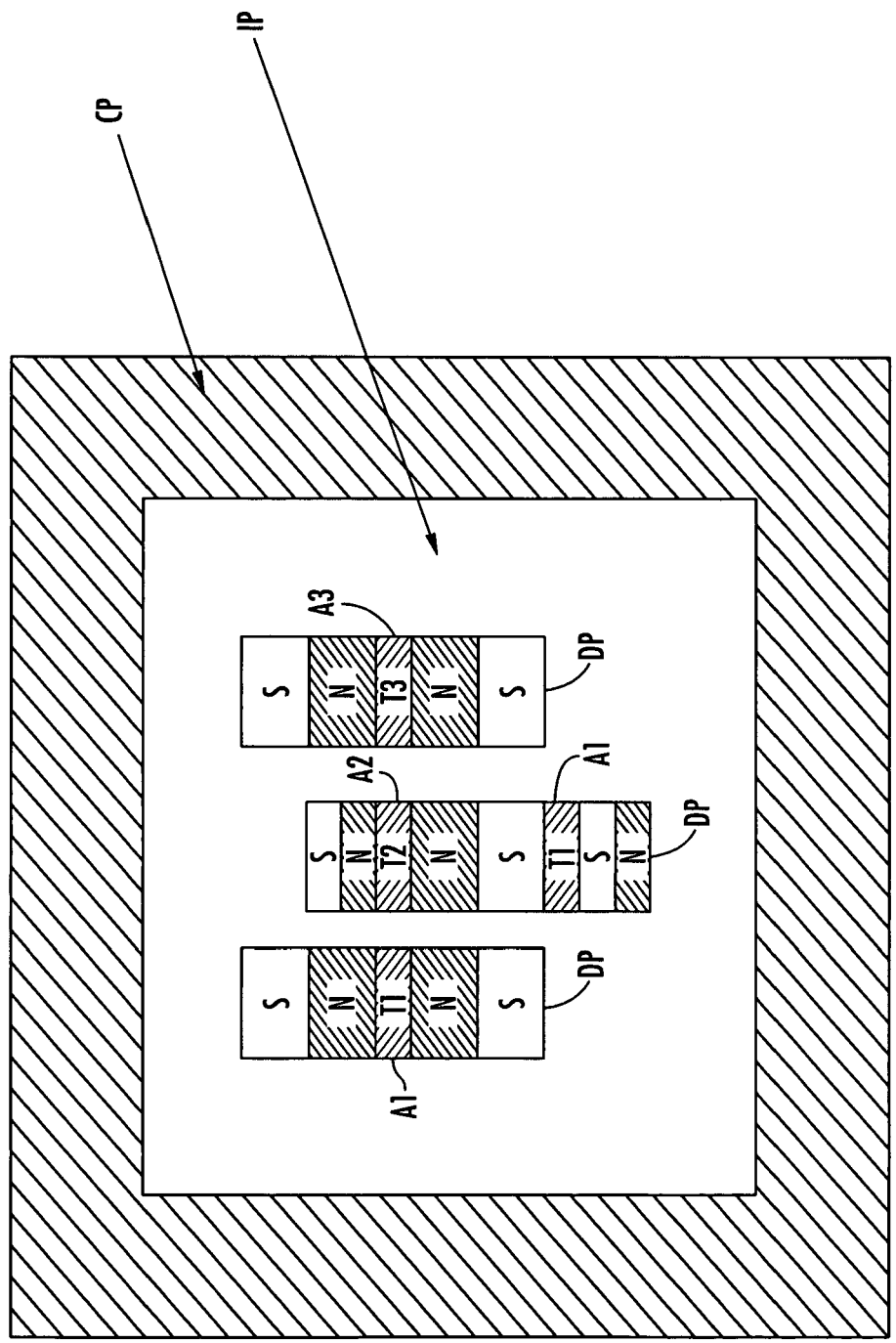

Referring now to FIGS. 7D–7G, carrier particles CP comprising multiple detectable particles DP are disclosed. In FIG. 7D, detectable particles DP comprising three magnets each (as an example of an embodiment with more than two magnets each), assembled using adhesives A1, A2, A3, and A4, each with different respective release temperatures T1, T2, T3, and T4, are disposed in interior portion IP of carrier particle CP. In FIGS. 7E–7G, detectable particles DP comprising two or more magnets each, assembled using different adhesives A1, A2 and A3, having different respective release temperatures T1, T2, and T3, respectively, are disposed in interior portion IP of carrier particle CP.

A still further alternative way to have more than a single temperature switch is to add coupled magnet pairs to the same space with an initial coupled identical magnet pair as depicted in FIGS. 3A, 3B, and 4 (and optionally a single non-coupled magnet for residence time measurement purpose).

If all magnets of a particle (such as particle DP shown in FIGS. 7A–7C) are identical, the change in the magnetic field strength upon achieving each successive predetermined switch temperature should be approximately double the single magnet strength. Therefore, using identical magnet pairs for successive temperature switches and a single initial magnet for residence time determination (RTD), for five successive switch temperatures, the sequence of magnetic field strength increase should be as follows:

Below Temp1: 1×
At and above Temp1 but below Temp2: 3×
At and above Temp2 but below Temp3: 5×
At and above Temp3 but below Temp4: 6×
At and above Temp4 but below Temp5: 9×
At and above Temp5: 11×

The following table, Table II, shows a conservative flow approach to implanting multiple magnetic pair switches into the carrier cavities of simulated 0.5 inch cube food particles (alternative target particle weights are given and theoretical number of implantable fixed magnet pairs with a mass of 0.06 grams each). Depending on the material used and carrier particle design, in theory ten or more magnet pair temperature switches could be implanted in every particle. The final functional pairs can be larger than 0.06 grams to facilitate detection. Furthermore, the reduced number of increments can simplify the detection of stepwise temperature switch signal changes.

allowing for larger, heavier magnets to be used for yielding higher initial (unswitched) magnetic signal levels as well as higher signal levels after the switch/melting has occurred.

In yet another embodiment, magnets (such as magnets M1 and M2 shown in FIGS. 3A and 3B) can be assembled by using an adhesive comprising a flat piece of suitable metal alloy (foil or thin sheet grade). Appropriate adhesives (such as adhesive A shown in FIG. 3A) include any adhesive capable of affixing dissimilar metal pieces to each other and that can, once set, withstand temperatures in excess of any process temperature encountered during processing. Appropriate adhesives can be single or multi-component epoxies, epoxy films, or special thermo-resistant cyanoacrylate adhesives. The curing temperature of the adhesive (if curing is necessary) should be below the lowest melting temperature of any meltable element (e.g., metallic alloy) used in the assembly of the particle.

Figure 8:
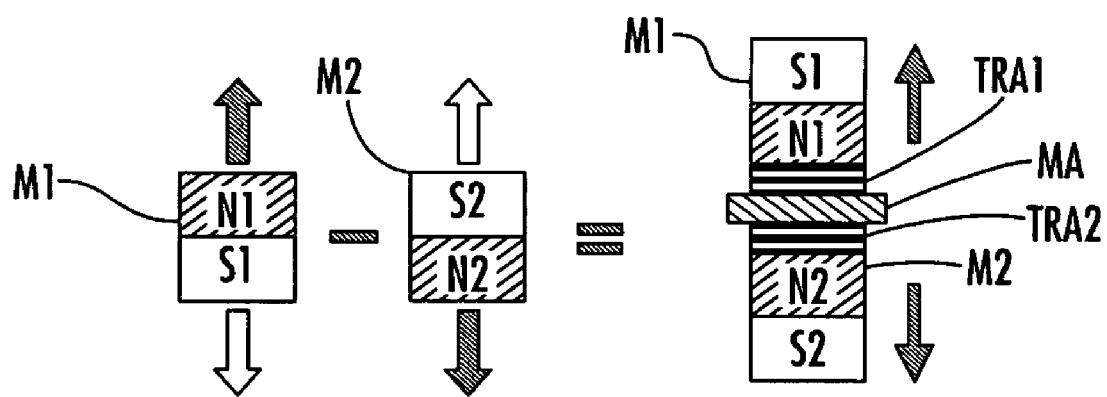

FIG. 8 illustrates a schematic diagram of attaching a first and second magnet M1 and M2 via a metal alloy MA and thermo-resistant adhesives TRA1 and TRA2. Magnets M1 and M2 can comprise a north magnetic pole N1 and N2, respectively, and a south magnetic pole S1 and S2, respectively. Metal alloy MA can be attached to north magnetic pole N1 and north magnetic pole N2 via adhesives TRA1 and TRA2, respectively. Metal alloy MA can comprise a thin layer foil having a release temperature for releasing magnets M1 and M2 from one another above the predetermined temperature. Metal alloy MA can be selected having a release temperature equal to a predetermined conservative temperature. Adhesives TRA1 and TRA2 can have a curing temperature below the melting point of metal alloy MA. Adhesives TRA1 and TRA2 can also have a maximum service temperature above any temperature encountered during processing and operation.

Exemplary epoxy adhesives for the embodiment shown in FIG. 8 include but are not limited to Master Bond Polymer System Supreme 3HT-80 (single component, curing temperature 80° C./175° F.; maximum service temperature of 350° F.) and Master Bond EP62-1 (two component, curing temperature 60–100° C.; maximum service temperature of 400° F.), both produced by Master Bond Inc. of Hackensack, N.J., United States of America. Examples of appropriate cyanoacrylic adhesives are TX-1500 (room temperature cure, maximum service temperature 150° C.) produced by Intek Adhesives Ltd., of Northumberland, England; POW-

TABLE II

Conservative Flow Approach to Implanting Multiple Magnetic Pair Switches

|  | WEIGHT grams 1/2 inch cube 1.00 density | WEIGHT grams 1/2 inch cube 1.01 density | WEIGHT grams 1/2 inch cube 1.02 density | WEIGHT grams 1/2 inch cube 1.03 density | WEIGHT grams 1/2 inch cube 1.04 density | WEIGHT grams 1/2 inch cube 1.05 density |
| --- | --- | --- | --- | --- | --- | --- |
|  |  | 1.01 | 1.02 | 1.03 | 1.04 | 1.05 |
| 1.27 | 2.048383 | 2.06886683 | 2.08935066 | 2.10983449 | 2.13031832 | 2.15080215 |
| 0.82 | 1.67967406 | 1.67967406 | 1.67967406 | 1.67967406 | 1.67967406 | 1.67967406 |
| Free space (grams) | 0.36870894 | 0.38919277 | 0.4096766 | 0.43016043 | 0.45064426 | 0.47112809 |
| # Magnet pairs (0.06 grams each) | 6.145149 | 6.486546167 | 6.827943333 | 7.1693405 | 7.510737667 | 7.852134833 |
| Bubble space (1/4 inch cube) | 0.256047875 | 0.256047875 | 0.256047875 | 0.256047875 | 0.256047875 | 0.256047875 |
| # Magnet pairs (0.06 grams) | 4.267464583 | 4.267464583 | 4.267464583 | 4.267464583 | 4.267464583 | 4.267464583 |
| Temperature switch pairs | 10.41261358 | 10.75401075 | 11.09540792 | 11.43680508 | 11.77820225 | 12.11959942 |

Table II demonstrates the application of a number of paired magnets for implantation. The number of implanted magnetic pairs can be smaller, typically about two or less, ERBOND™ (room temperature cure, maximum service temperature 180° C.) available from Permabond International Corporation of New York, N.Y., United States of America; and PERMABOND™ C910 produced by Permabond, a division of National Starch and Chemical, Bridgewater, N.J., United States of America.

One advantage of the adhesive metal alloy embodiment (an example of which is shown in FIG. 8) is the capability to assemble the magnets at temperatures significantly lower than the melting points of metallic alloys (such as metallic alloy MA shown in FIG. 8). This capacity increases the speed and reliability of assembly, and makes possible device combinations that could be very difficult to assemble if the assembly had to rely on melting of the metallic alloy interfaces.

Figure 9:
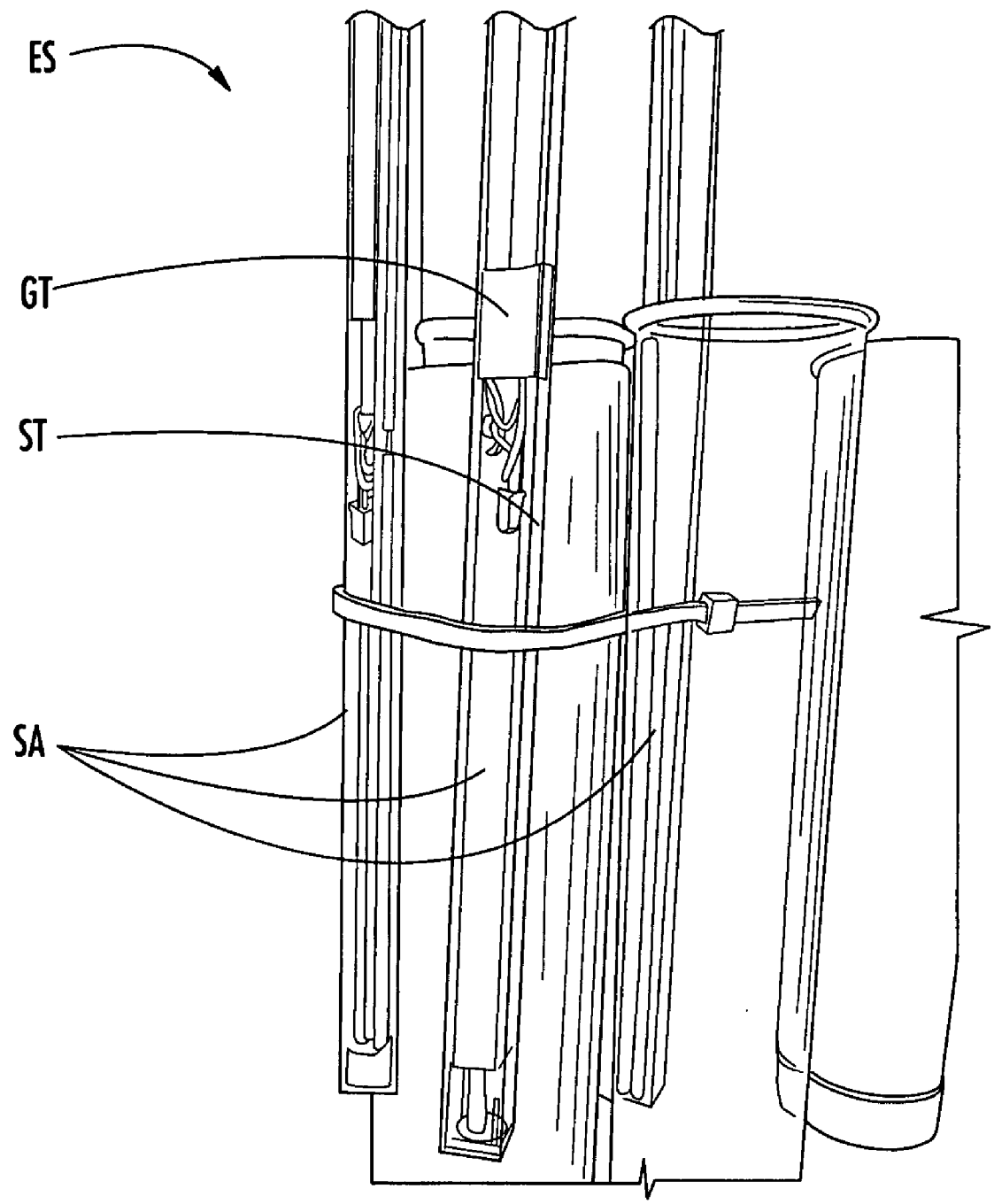

FIG. 9 illustrates an experimental system, generally designated ES, for use in demonstrating the magnetically detectable particles, carrier particles, and related devices described herein. Experimental system ES can include glass tubes GT positioned in a laboratory heating well and filled with propylene glycol in order to achieve food sterilization temperatures (above 140° C.) without substrate boiling. Glass tubes GT can be covered externally with larger stainless steel tubes ST to demonstrate the ability of system ES to detect magnetic field strength changes through stainless steel, a standard food process equipment material. Four GMR magnetic field sensor assemblies SA can be attached to an external surface of stainless steel tube ST and signal from sensors S can be wired to a computer data acquisition system (not shown) and recorded using a conventional computer (such as an INTERNATIONAL BUSINESS MACHINES™ (IBM) compatible computer available from IBM Corporation of White Plains, N.Y., United States of America) and an operating system (such as the WINDOWS™ operating system available from Microsoft Corporation of Redmond, Wash., United States of America). Sensors S can be a GMR magnetic sensor having wired connections to the computer data acquisition system. Sensor assemblies SA can be housed in protective polycarbonate tubes affixed to the surface of stainless steel tubes ST.

Figure 10:
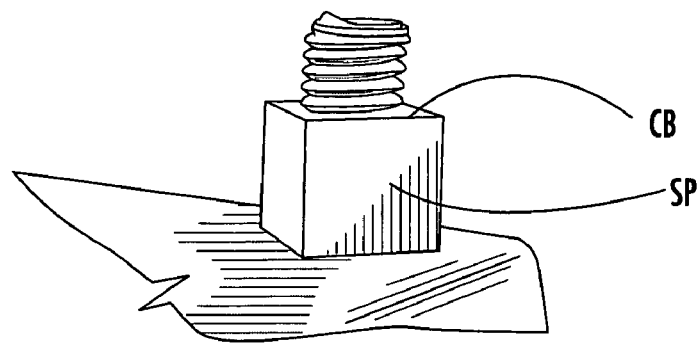

FIGS. 10–15 illustrate further aspects of experimental system ES shown in FIG. 9. Referring to FIG. 10, a still image of a simulated particle SP containing a coupled magnet sensor/detector is illustrated. Simulated particle SP can include a cargo bay CB for containing a coupled magnet (not shown). Simulated particle SP can be fabricated from polypropylene and nylon material in order to withstand the sterilization temperatures. The magnet couples can be constructed using adhesives and placed in the center of simulated particle SP, sealed with a machined screw consisting of the same material as simulated particle SP.

Figure 11:
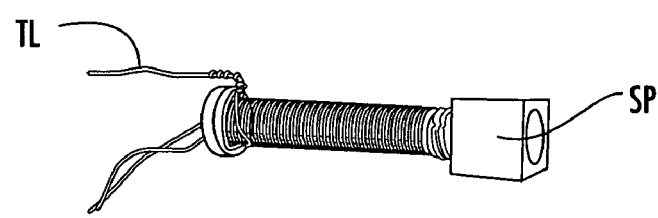

Referring to FIG. 11, a still image of another simulated particle SP including a thermocouple lead TL having contact with a magnet assembly (not shown) in the center is illustrated. Combined magnet-implant loaded particles SP can be fitted with thermocouple leads with hot junction in contact with the combined magnet for providing a temperature monitoring feed to the experimental system (such as experimental system ES shown in FIG. 9).

Figure 12:
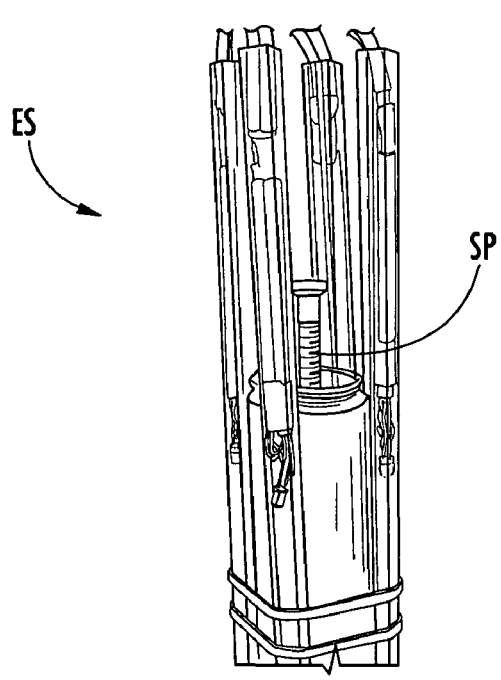

Referring to FIG. 12, a still image of simulated particle SP (shown in FIG. 11) with experimental system ES. Simulated particle SP is lowered into a heated test tube TT via an ex-centric rotating shaft providing a controlled up-down motion. During experimentation, simulated particle SP was repeatedly raised and lowered while being monitored by sensor assemblies SA. Data was recorded from the thermocouple (temperature in the center of particle SP). Sensor assemblies SA can provide temperature switch point calibration and recording.

Figure 13:
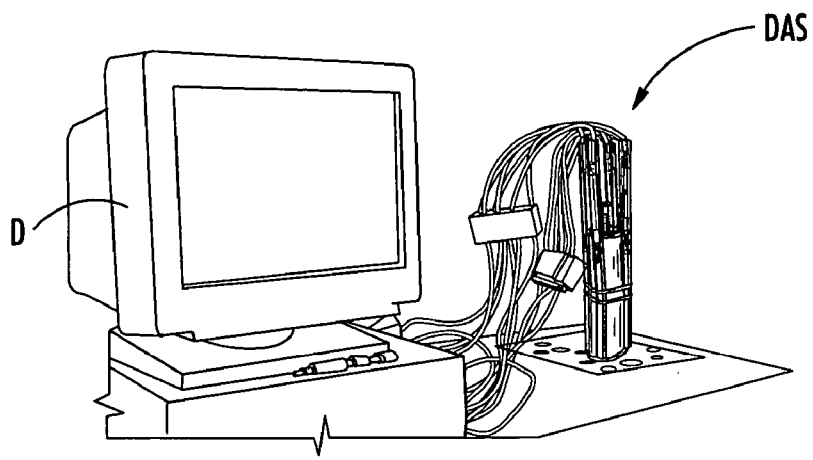

Referring to FIG. 13, a still image of a data acquisition system, generally designated DAS, including a display D for presenting acquired temperature information and magnetic field strength data. The temperature can be acquired from a single type T thermocouple. The magnetic field strength data can be acquired from sensor assemblies SA (shown in FIG. 9).

Figure 14A:
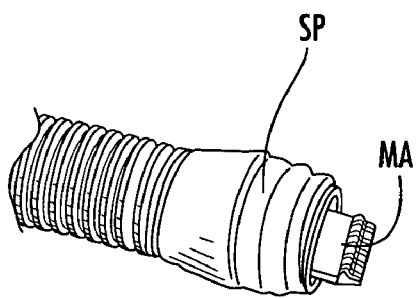
Figure 14B:
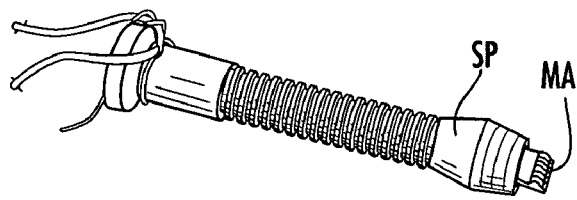
Figure 14C:
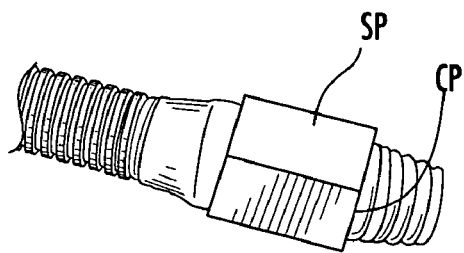
Figure 14D:
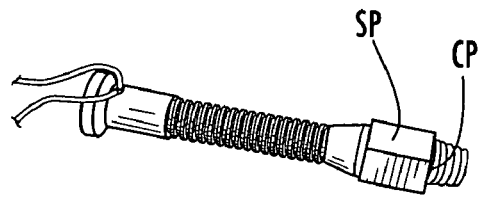

FIGS. 14A–14D illustrate different still images of a triple magnet assembly MA being assembled in a simulated particle SP. FIGS. 14A–14B show two magnets joined together by solder plus a single magnet (thermocouple-attached) for temperature and residence time measurement. FIGS. 14C–14D show simulated particle SP enclosing the magnet assembly with a cap CP.

Figure 15:
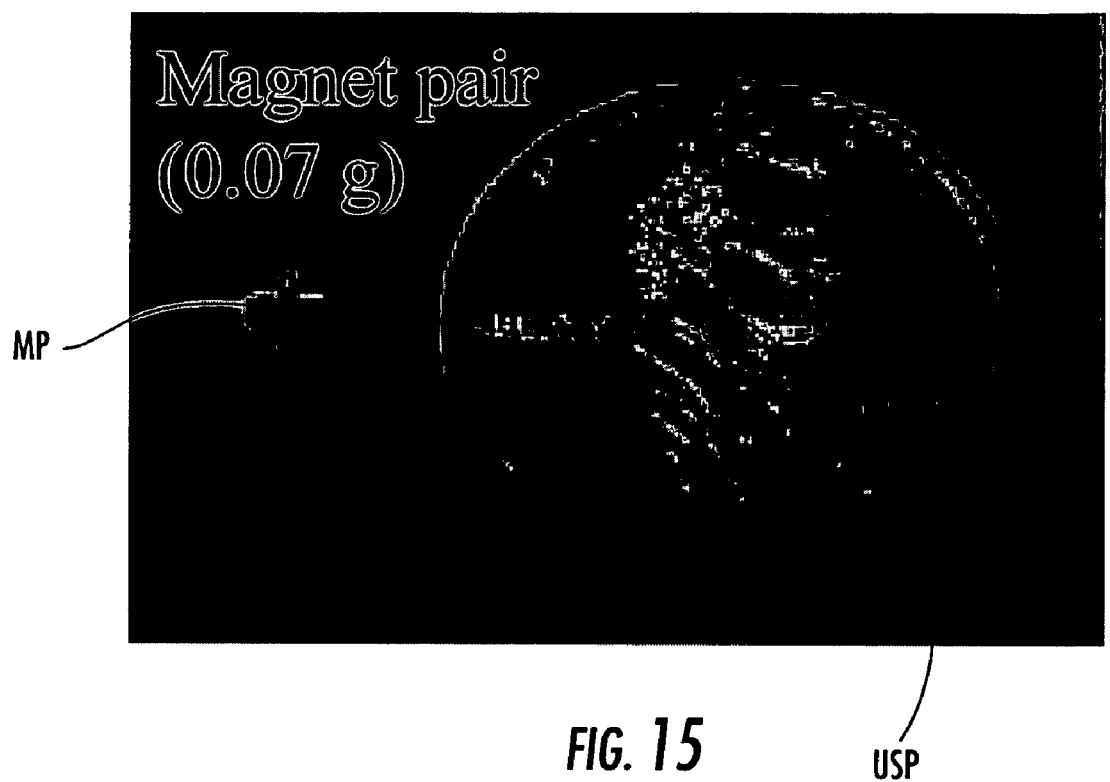

FIG. 15 illustrates a still image of a magnet pair MP with a U.S. penny USP for providing a size scale perspective. Magnet pair MP can be about 0.07 grams.

FIGS. 16–30 illustrate different graphs and other illustrations of experimental results obtained by testing various particles as described in this section under experimental conditions. Unless otherwise indicated, the particles were tested using experimental system ES shown in FIG. 9.

Figure 16:
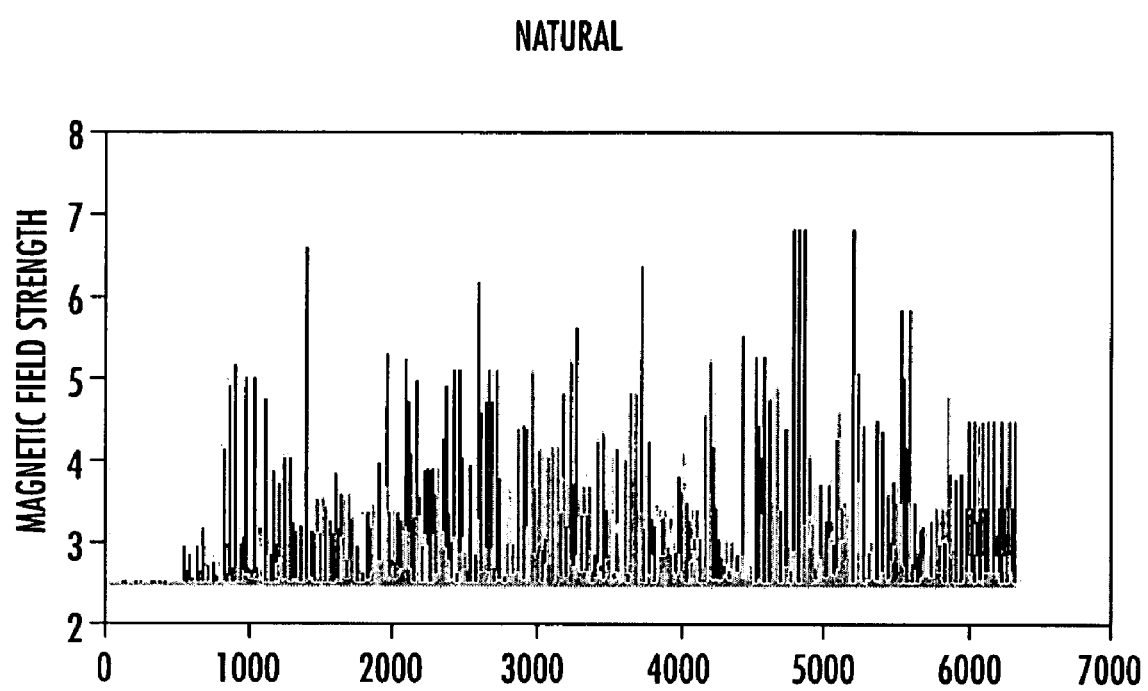

FIG. 16 illustrates a graph of magnetic field strength from two naturally aligned identical magnets with no heating.

Figure 17:
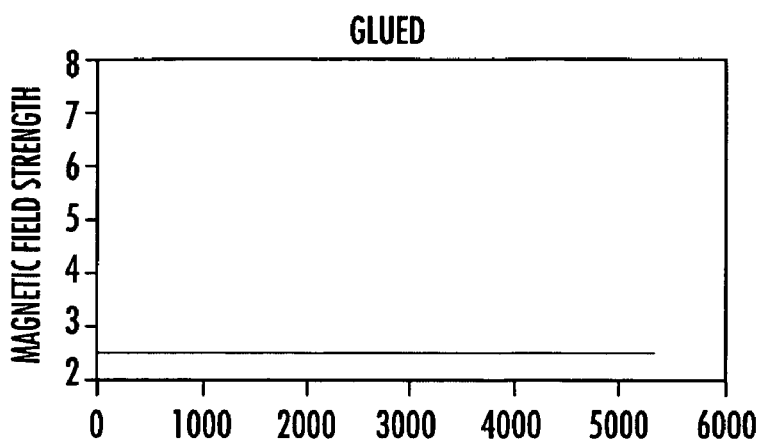

FIG. 17 illustrates a graph of magnetic field strength from two aligned and attached magnets with no heating. The magnets have similar magnetic poles attached with an adhesive.

Figure 18:
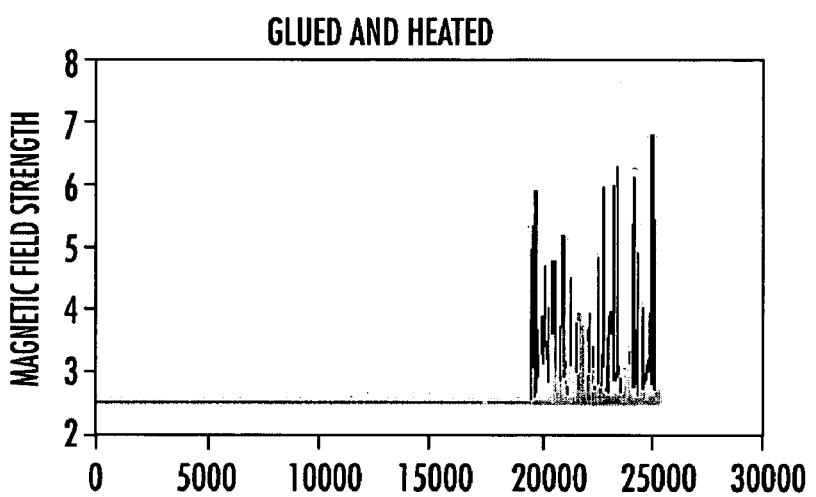

FIG. 18 illustrates a graph of magnetic field strength from two aligned and attached with heating. The magnets have similar magnetic poles attached with an adhesive. The magnets are heated until the predetermined conservative temperature associated with the release temperature of the adhesive is reached. The graph shows a detectable difference in magnetic field strength above the predetermined conservative temperature.

Figure 19:
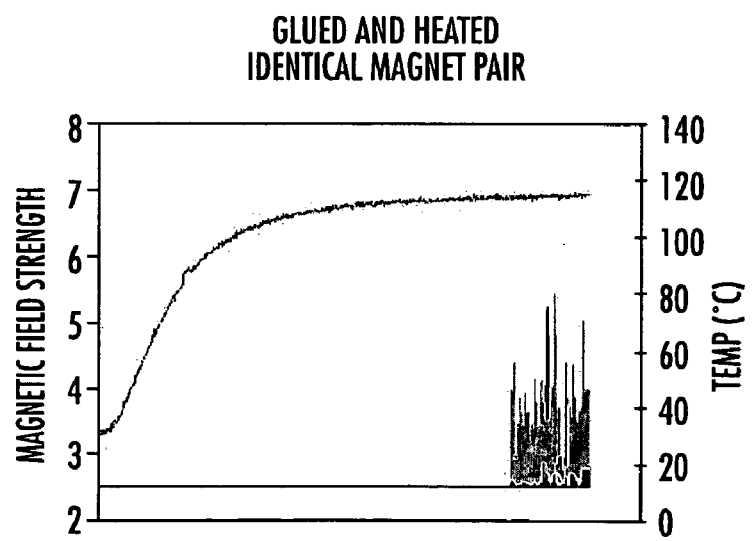

FIG. 19 illustrates a graph showing applied temperature versus magnetic field strength. The temperature is applied to an identical magnet pair attached via an adhesive. The adhesive had a thermal breakdown temperature of about 110° C.

Figure 20:
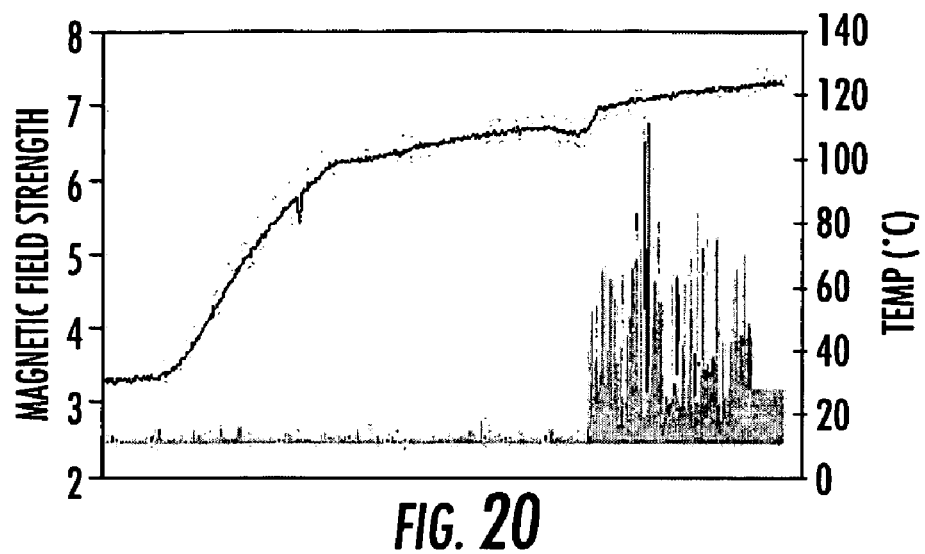

FIG. 20 illustrates a graph showing applied temperature versus magnetic field strength. The temperature is applied to a non-identical magnet pair attached via an adhesive. The adhesive was a thermo-labile adhesive with a thermal breakdown temperature of about 110° C. Low-level magnetic field strength is evident up to the breakdown temperature. Above the breakdown temperature, high magnetic field strength was detected.

Figure 21:
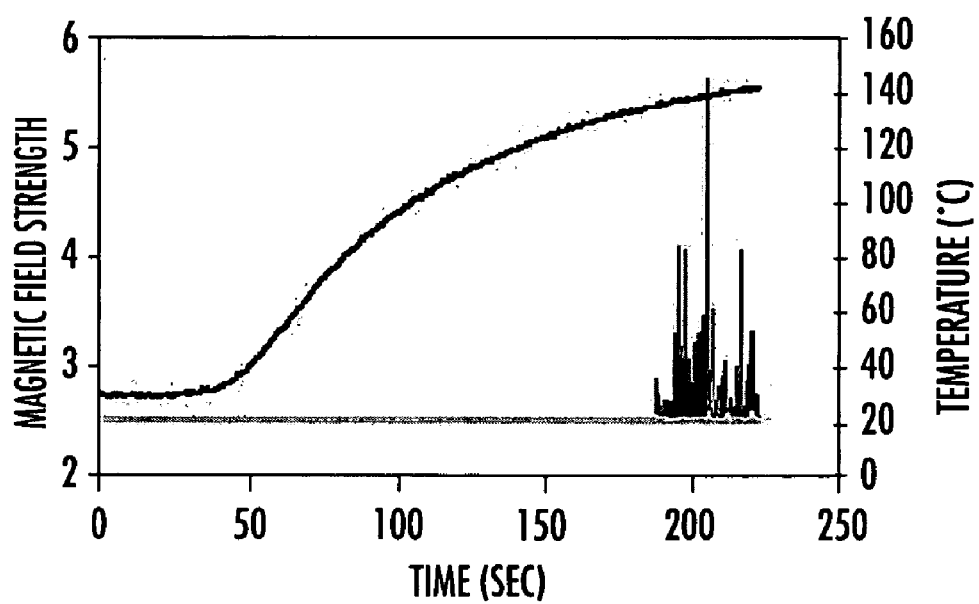

FIG. 21 illustrates a graph showing applied temperature versus magnetic field strength. The adhesive was a soldering alloy with a thermal breakdown temperature of about 137° C. Low-level magnetic field strength is evident up to the breakdown temperature. Above the breakdown temperature, high magnetic field strength was detected.

Figure 22:
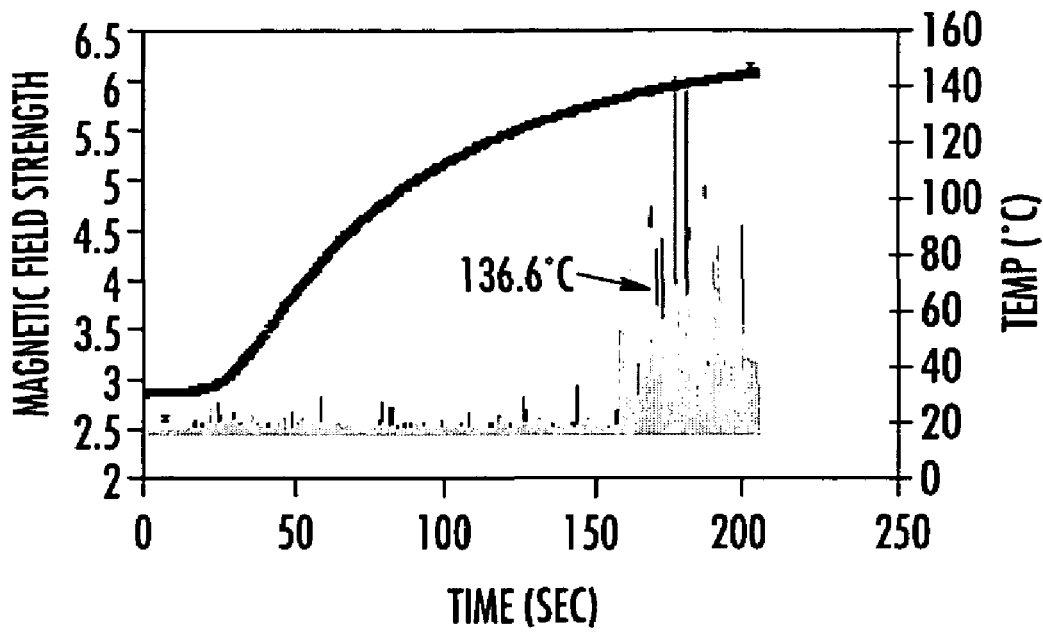
Figure 23:
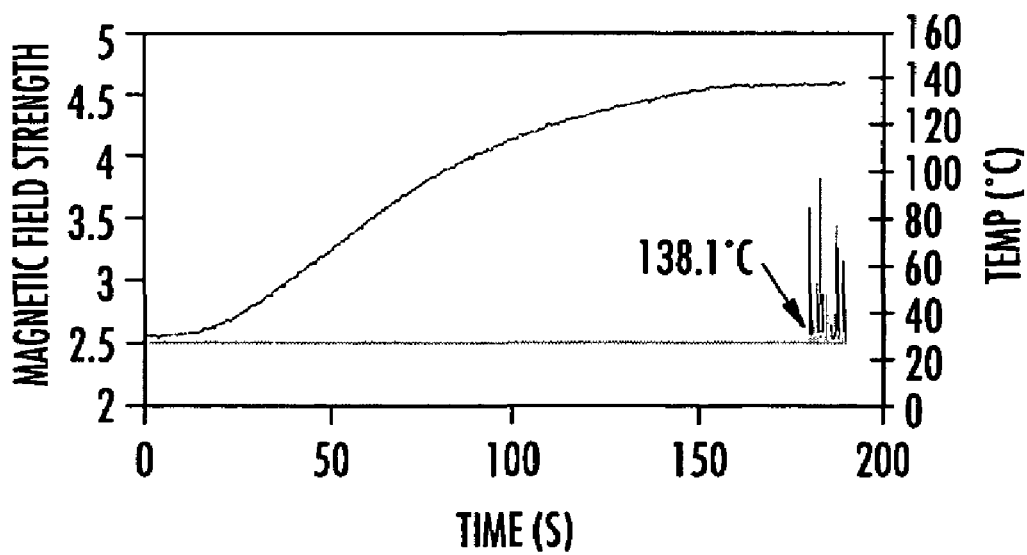
Figure 24:
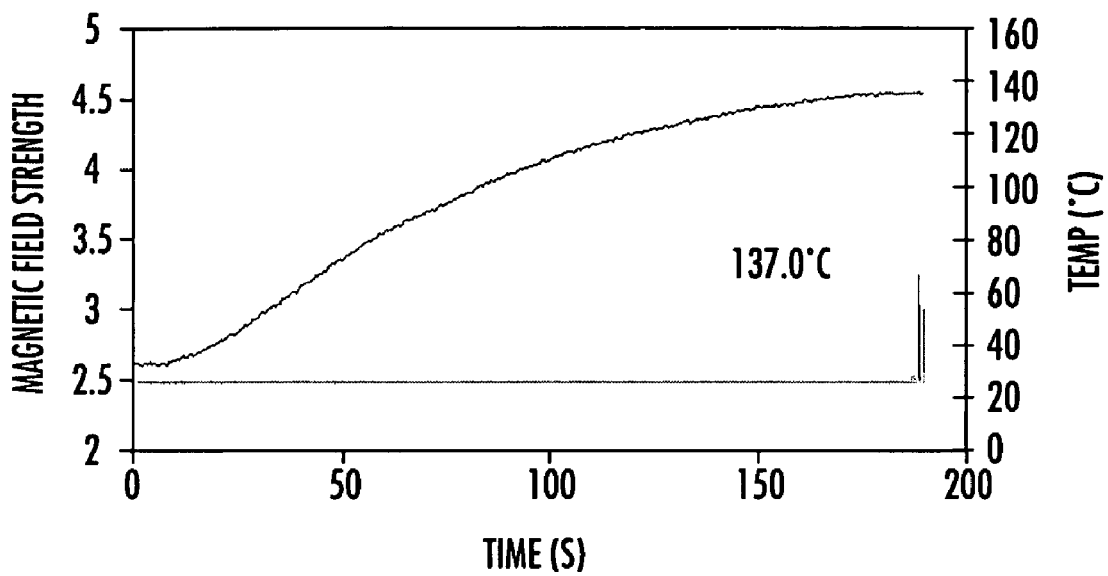
Figure 25:
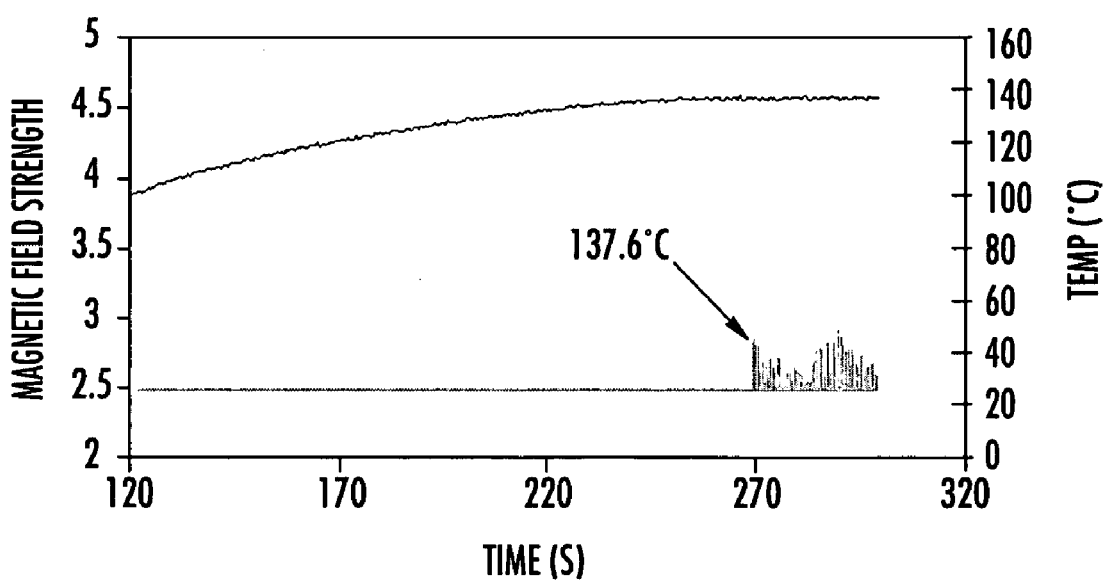
Figure 26:
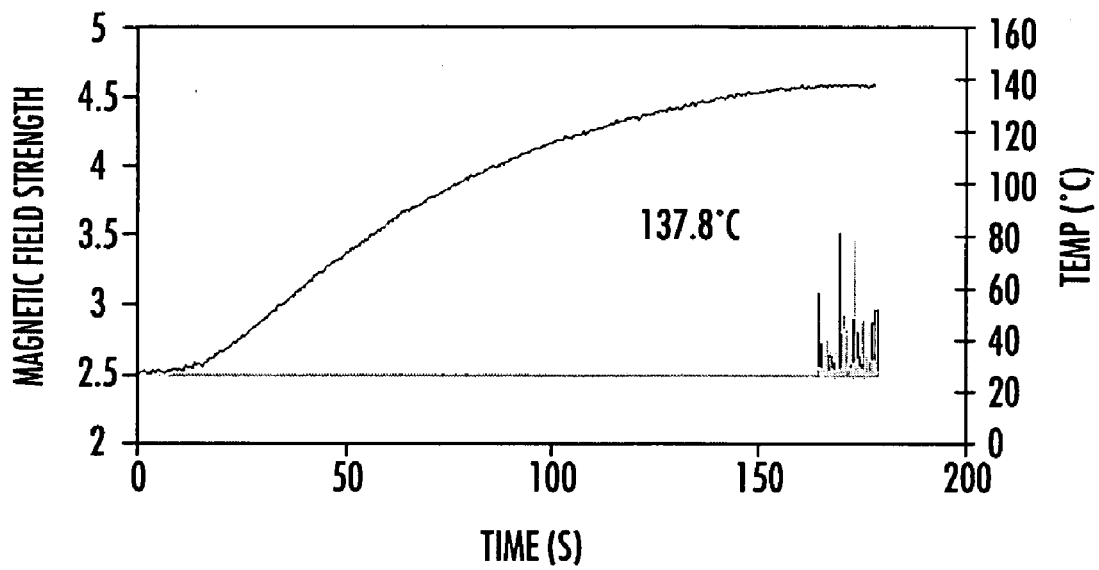
Figure 27:
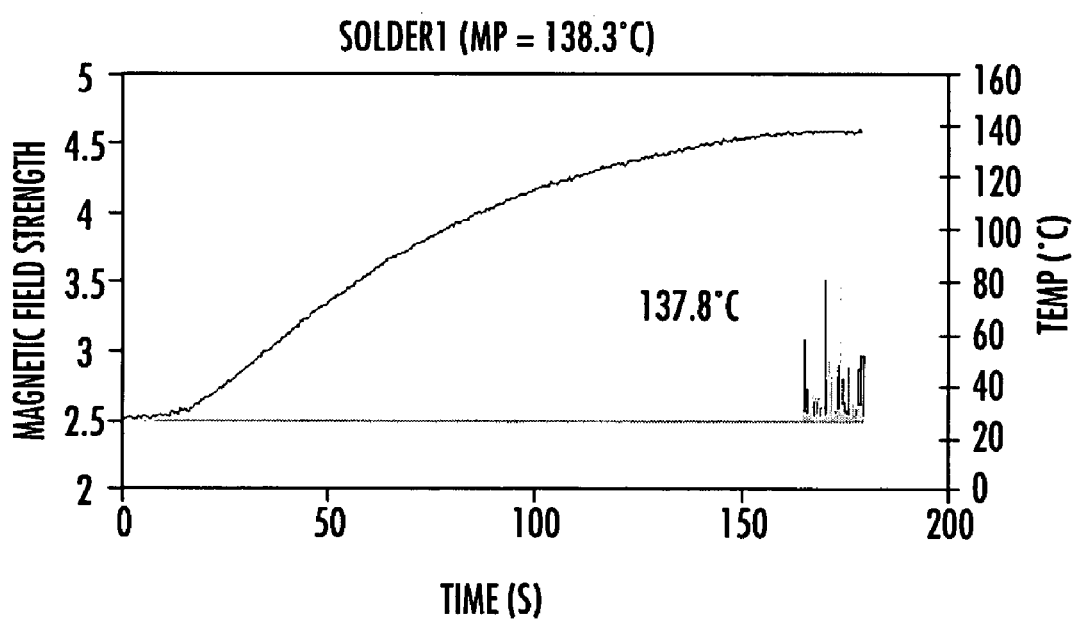

FIG. 22 illustrates a graph showing applied temperature versus magnetic field strength. The increasing heat was applied to a single identical magnet pair placed with a pair of identical force—aligned magnets with the same magnetic poles adjoining and fixed using a soldering alloy with a melting temperature of 137° C. (eutectic). Above the melting temperature, a higher multiplied magnetic field strength was detected.

FIGS. 23–27 illustrate graphs of experimental results obtained by testing the device shown in FIGS. 3A and 3B with an adhesive comprising a metal alloy. The metal alloy has a melting point of 138.3° C. The experimental results shown in FIGS. 23–27 show that the magnetic field strength increases substantially at about 138.3° C.

Figure 28:
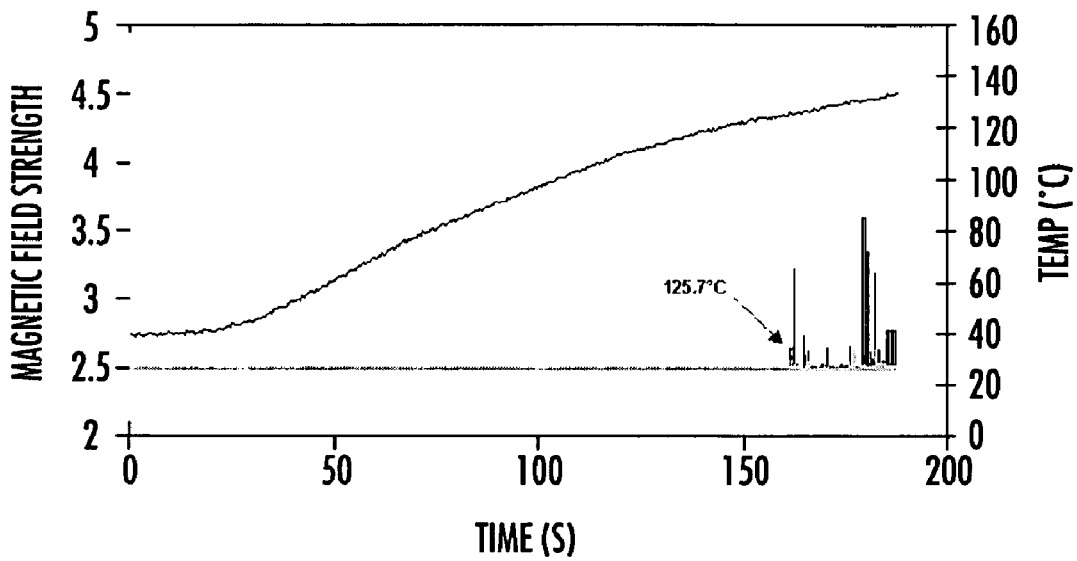
Figure 29:
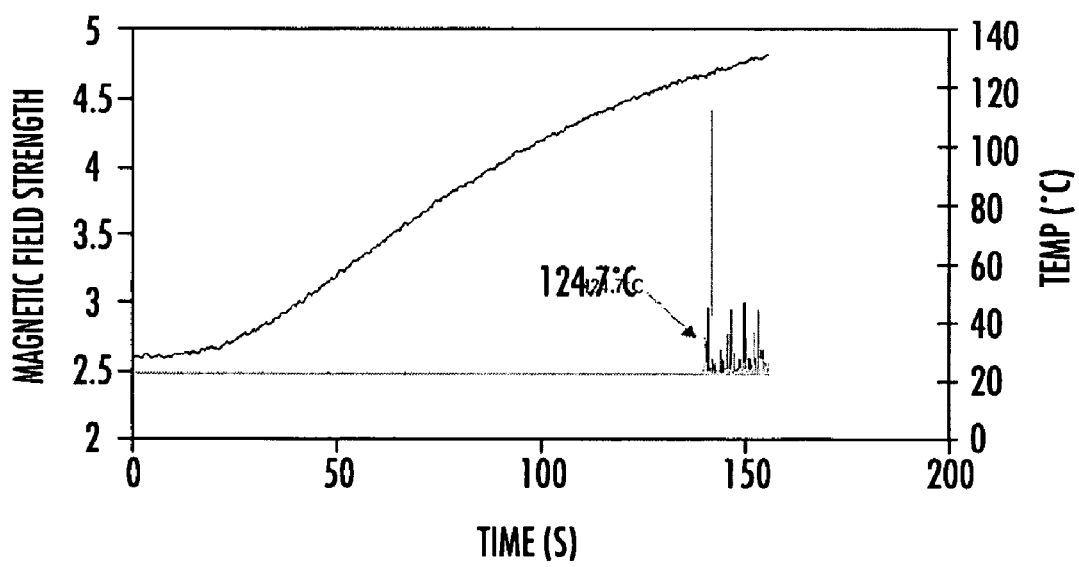
Figure 30:
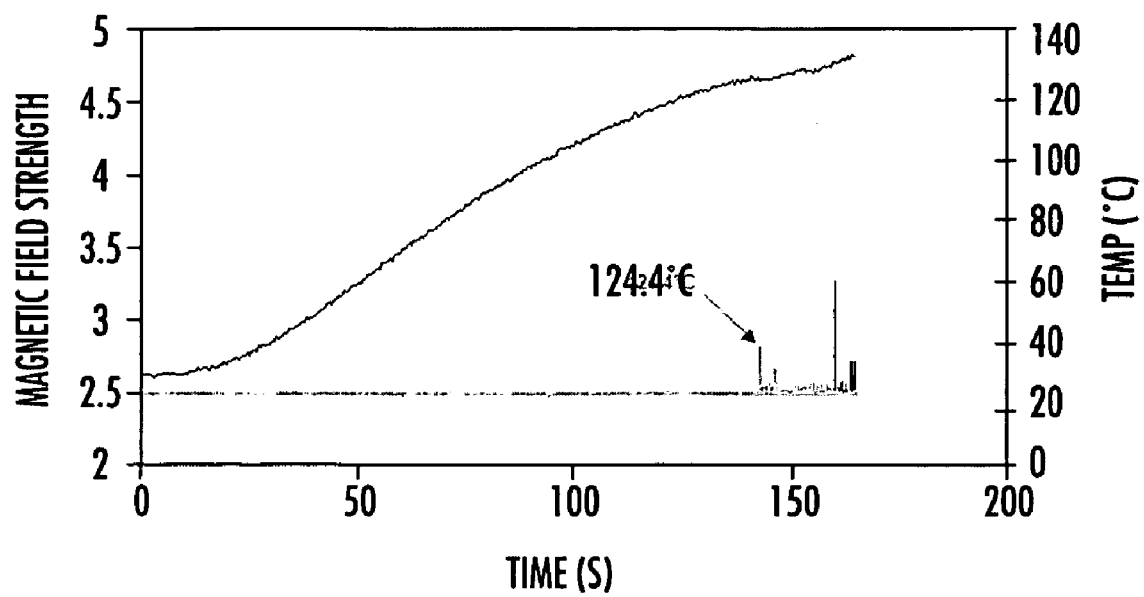

FIG. 28–30 illustrate graphs of experimental results obtained by testing the device shown in FIGS. 3A and 3B with an adhesive comprising a metallic alloy. The metallic alloy has a melting point of 123.9° C. The experimental results shown in FIGS. 28–30 show that the magnetic field strength increases substantially at about 123.9° C.

Figure 31:
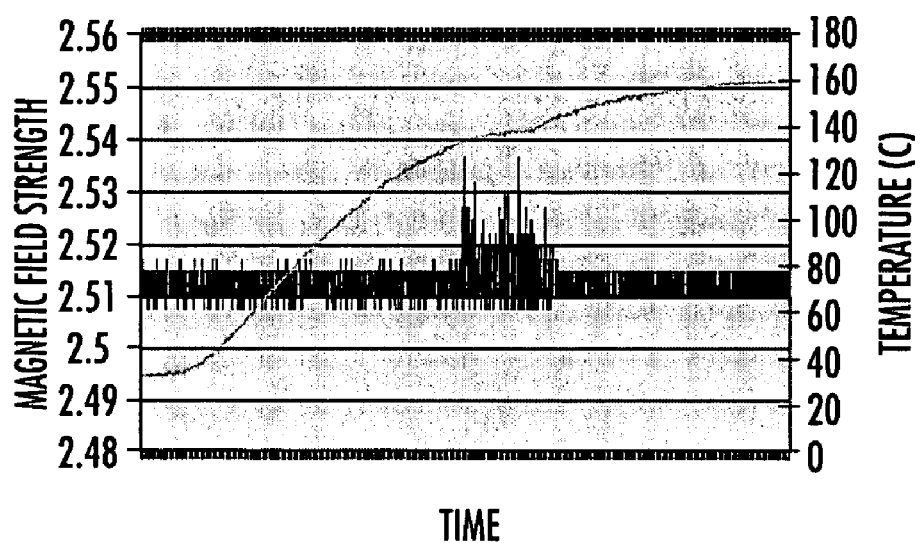

FIG. 31 illustrates a graph of magnetic field strength versus temperature obtained using the assembly shown in FIGS. 5A and 5B, which was tested using experimental system ES shown in FIG. 9.

Figure 32:
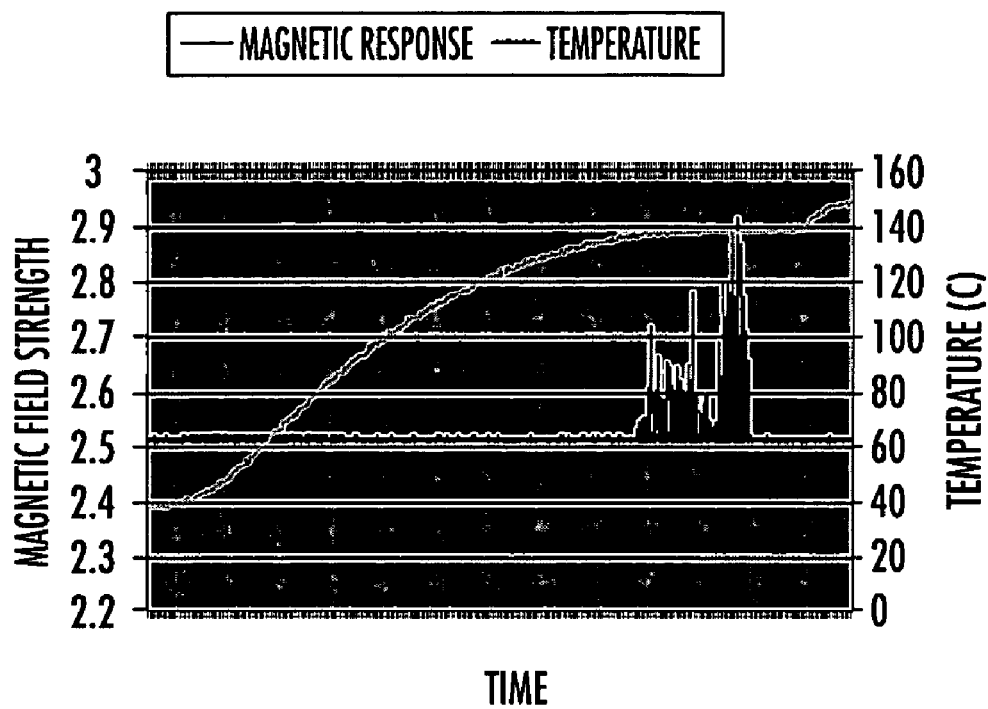

FIG. 32 illustrates a graph of magnetic field strength versus temperature obtained using the assembly shown in FIGS. 6A and 6B, which was tested using experimental system ES shown in FIG. 9.

Figure 33:
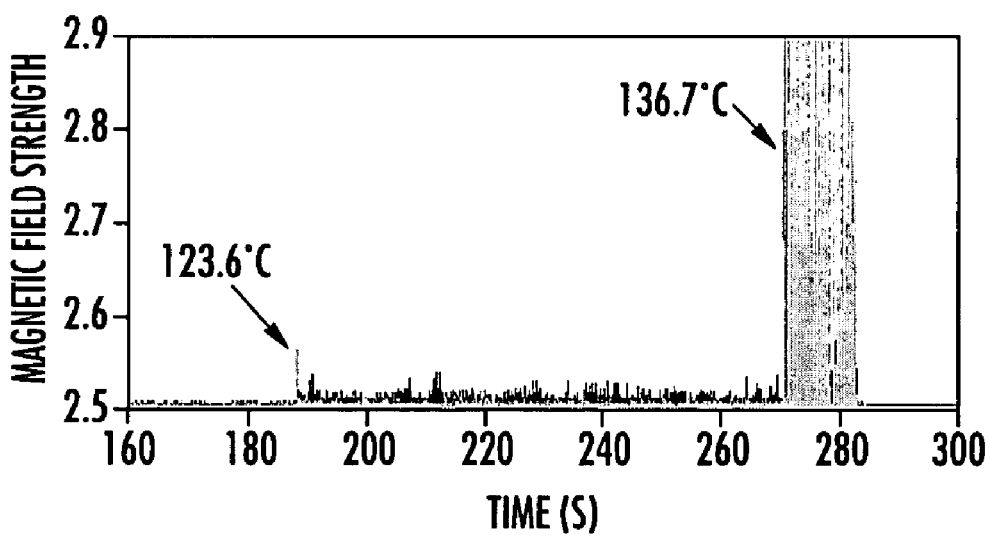

FIG. 33 illustrates a graph of magnetic field strength versus temperature obtained using the assembly shown in FIG. 7, which was tested using experimental system ES shown in FIG. 9.

Figure 34:
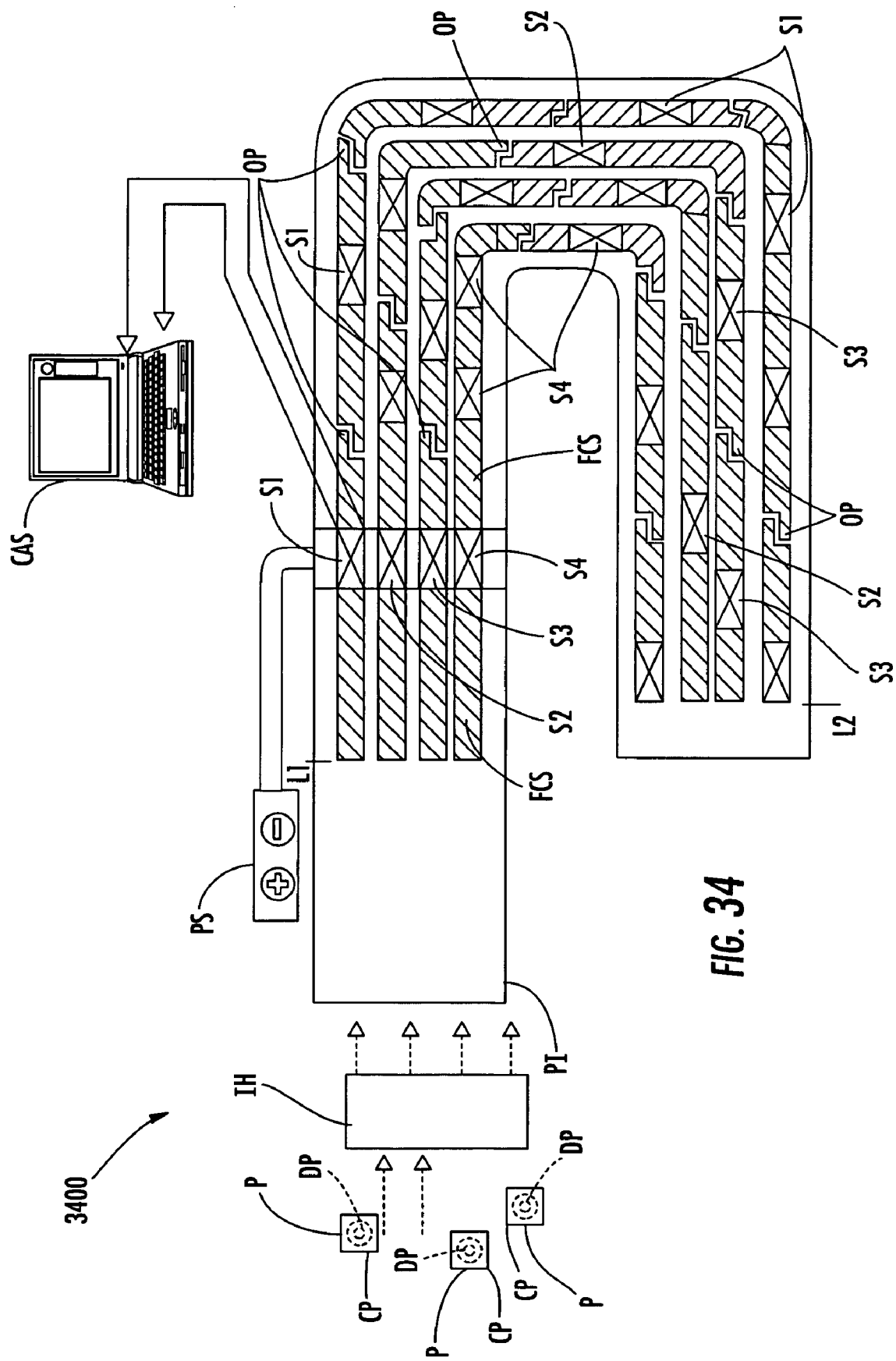
FIG. 34 is a schematic diagram of an exemplary system for conservative evaluation, validation, and monitoring of thermal processing.

FIG. 34 illustrates a schematic diagram of an exemplary system, generally designated 3400, for conservative evaluation, validation, and monitoring of thermal processing. System 3400 can comprise particles P, an infeed hopper IH, pipe PI, sensors S1, S2, S3, and S4, and computer acquisition system CAS. Sensors S1, S2, S3, and S4 each further comprise optional flux-concentrating strips FCS and can be mounted along a predetermined length of pipe PI, wherein the predetermined length is defined by points L1 and L2. Power source PS can provide power to sensors S1, S2, S3, and S4.

Referring to FIG. 34, optional flux-concentrating strips FCS for sensors S1, S2, S3, and S4 can be mounted in a parallel manner with the ends of optional flux-concentrating strips FCS in a parallel or side-by-side overlap as represented by overlap points OP. Alternatively, optional flux-concentrating strips FCS can be wrapped around pipe PI, can be mounted in a "zig-zag" pattern on pipe PI or in any other suitable manner, with the ends of optional flux-concentrating strips FCS being oriented in a parallel or side-by-side overlap as represented by overlap point OP.

Continuing with reference to FIG. 34, particles P can include any suitable magnetically detectable particle DP such as detectable particles DP shown in FIGS. 3A, 3B, 4, 5A, 5B, 6A, 6B, 7A, 7B, 7C, and 8 for providing a magnetic signal change depending on temperature. Particles P can also comprise a carrier particle CP having an interior portion IP defined therein for holding detectable particle DP. Carrier particle CP can comprise shield material selected to provide a conservative heating temperature to detectable particle DP. Additionally, one of sensors S1, S2, S3, and S4 can optionally be calibrated to detect a signal from particles P at a temperature below the predetermined temperature for the respective particles P.

Continuing with reference to FIG. 34, when in use system 3400 can accommodate the insertion of particles P via infeed IH into pipe PI. Pipe PI can represent a continuous thermal processing apparatus. Particles P can be carried by continuous stream of material flowing within pipe PI and can be monitored for a magnetic signal change beginning at point L1. When interior portion IP of particle DP reaches the respective predetermined temperatures (also referred to herein as "switch temperature" or "temperature switch") for each particle DP, the adhesive (such as adhesive A shown in FIGS. 3A and 3B) release magnets (such as magnets M1 and M2) of detectable particle DP such that the magnets reorients as described herein to change magnetic field strength.

The change in magnetic field strength can be detected continuously by sensors S1, S2, S3, and S4 over a predetermined length of pipe PI defined by points L1 and L2, for a period of time, or combinations thereof. The predetermined length defined by points L1 and L2 can comprise a length wherein a "cold spot" within particle DP is maintained at or above the predetermined temperature for a sufficient time to accomplish desired thermal treatment of the product flowing in pipe PI. The detection of the signal along this predetermined length can be recorded by computer acquisition system CAS for graphical display, for printout in a word processing report, or for other review and evaluation by a user. Computer acquisition system CAS can represent a device for digital recording of output (e.g., signals from particles P) for document storage, e.g., as computer data files, and subsequent retrieval and analysis purposes. Other such devices can include digital cameras. Another representative such device can include a video camera, which can be employed for analog (video tape) recording for documentation storage and subsequent retrieval and analysis purposes. Another such device provides for video recording onto a VCR tape off the actual computer display signal, that is, without using a camera, but rather through a converter to a regular NTSC video. This converter can be built into a video card in computer acquisition system CAS or can be external. This converter allows recording onto a tape of anything that is displayed on the computer screen—meaning that as different signals at different locations of particles P flowing through system 3400 are observed, they can be recorded on the video tape. A still camera can be employed at an appropriate shutter speed and other settings to record output, e.g., signals from particles P. Video and still cameras can be operatively connected to system 3400 for automated activation upon detection of a signal or other desired event, and can be employed in an embodiment of system 3400 comprise transparent pipe sections or a view-port.

According to another embodiment, adhesives can also be selected to release magnets during any type of environmental condition, such as surrounding physical and/or chemical conditions. For example, according to one embodiment, an adhesive can be selected so that it degrades when exposed to an analyte, such as a selected chemical component or property, including water, carbon dioxide, and an analyte having a particular pH. The adhesives can also be sensitive to pressure and/or light for release of the magnets at a predetermined threshold of pressure and/or light, respectively. For example, the adhesive can detect and release at a predetermined intensity or frequency of light. According to one embodiment, an adhesive can selected that is sensitive to an increase in the concentration of carbon dioxide. The application of this adhesive to the above described magnets can be used to detect bacterial spoilage within hermetically sealed packages of foods or biomaterials without destroying or opening the package.

An adhesive can also be selected that is sensitive and/or degradable when exposed to an increase or decrease in pH value. The application of this adhesive to the above described magnets can be used in combination with paired magnets to detect other modes of spoilage in sealed packages. For example, this configuration can detect the generation of inorganic or organic acids as byproducts of bacterial fermentation processes.

A water-soluble adhesive can be used to irreversibly detect melting of frozen products. A paired magnets implant can be glued with a water-soluble adhesive and placed on top of a frozen product, sealed within a small sealed bag with some ice—if the melting point was exceeded causing the ice to melt—the resulting liquid water could dissolve the adhesive—causing an irreversible switch of the magnets—thus the event where the temperature exceeded the melting point would be recorded.

These examples are only some of the possible alternative uses of the invention. The subject matter described herein provides for the recording and non-contact detection of a variety of changes that are conducive to the application of magnetic field sensing and the use of an adhesive selected to be sensitive or degradable under a specific single or a set of conditions—thermal, chemical, physical, and combinations thereof.

II. Conservative Carrier Particles for Detectable Particles

Monitoring and validation of thermal pasteurization and sterilization processes can employ simulated, carrier food particles for carrying a detectable particle as disclosed herein. Such a combination of carrier and detectable particles can advantageously exhibit conservative flow and thermal characteristics. A method is provided including a systematic implementation of several heretofore un-integrated, mutually limiting design rules and principles for selecting and defining the geometry and fabrication procedure for a carrier particle. In particular, an integrated approach is provided for designing simulated carrier particles that about match the conservative flow behavior characteristics of a selected target particle (e.g., those characteristics conducive to fabrication and providing sufficient cavity/cargo bay size for selected detectable particles).

Using these design criteria as a basis, the methods described herein can facilitate the design and fabrication of simulated food particles (i.e., a carrier and detectable particle combination having the same conservative behavior characteristics as a selected target food particle or biomaterial present in the processed product) from suitable materials, such as polymers. In some embodiments, these methods can be useful when the determination of wall thickness of the carrier particle is critical for the safety and quality of the food product to be processed.

As used herein, a "target particle" is any type of exemplary food particle exhibiting slow heating and/or fast moving characteristics in a batch or continuous stream of material. Slow heating and/or fast moving characteristics can be considered "conservative behavior characteristics" because these foods particles are those that are likely to be the slowest particles to achieve a predetermined temperature in the cold spot of the particle when used in a batch or continuous stream of material.

As used herein, a "carrier particle" is a particle that is used for enclosing a detectable particle as disclosed herein for the purpose of monitoring and validation of continuous thermal processing of multiphase materials, such as food products. "Conservative thermal behavior" is present when the thermal protection provided by the carrier particle to its cavity carrying the detectable particle is at least equivalent to or greater than the thermal protection provided by a target particle to its cold spot under similar heating conditions. A conservative design of the carrier particle is targeted to ensure product safety. "Conservative design" means that the thermal protection provided by the carrier particle to its cavity carrying the detectable particle is at least equivalent to or greater than the conservative behavior characteristics provided by the target food particle to its cold spot (typically its geometric center), under similar heating conditions. A minimally conservative design is desired, since an over-conservative design can result in unnecessary loss of product quality and an under-conservative design will result in an unsafe product.

A method for providing a carrier particle design for a batch or continuous stream of material can include two main steps—determining conservative behavior characteristics of a target particle used in a batch or continuous stream of material, and determining material and dimensions for a carrier particle design about matching the conservative behavior characteristics of the target particle. Conservative behavior characteristics of a target particle can be determined by selecting and simulating an exemplary food particle or product that is likely to be the fastest moving and/or slowest heating particle in a batch or continuous stream of material. Next, material and dimensions for a carrier particle design can be determined by selecting and simulating various carrier particle designs to achieve a carrier particle design about matching the conservative behavior characteristics of the target particle. An actual target particle can be fabricated with the selected materials and dimensions. The actual target particle can be inserted with a detectable particle for temperature detection in a batch or continuous stream of material.

Figure 35:
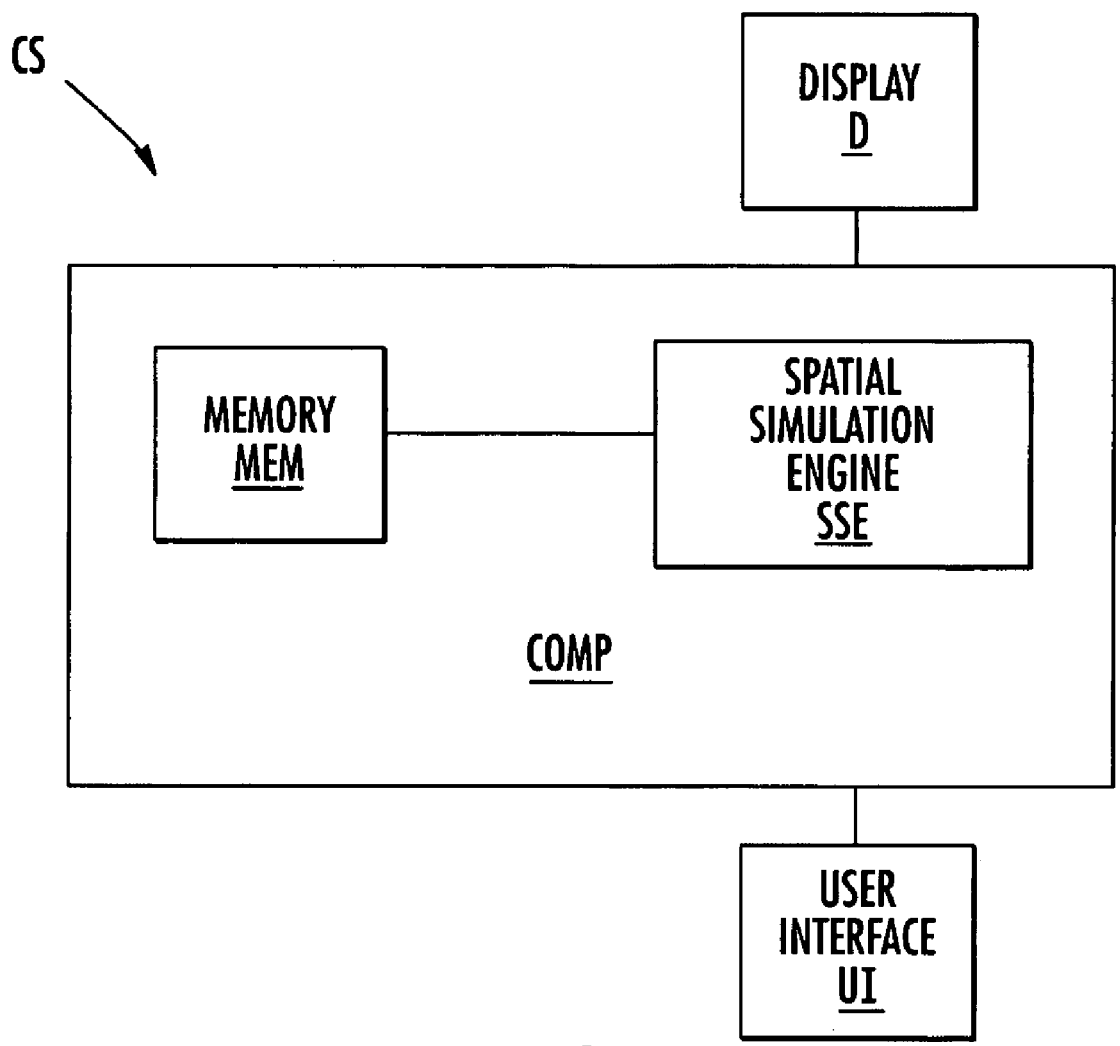
FIG. 35 is a schematic diagram of a computer system that can facilitate the design of a carrier particle about matching the conservative behavior characteristics of a selected target particle.

FIG. 35 illustrates a schematic diagram of a computer system, generally designated CS, which can facilitate the design of a carrier particle about matching the conservative behavior characteristics of a selected target particle. Computer system CS can include a conventional computer COMP having a memory MEM for storing conservative behavior characteristics of different target particles used in a batch or continuous stream of material. Memory MEM can also be operable to input and output data and code to and from spatial simulation engine SSE. Computer COMP can also include a spatial simulation engine SSE for simulating material and dimensions of a carrier particle design for matching the conservative behavior characteristics of the target particle. Computer system CS can also include a user interface UI for receiving user commands and a display D for displaying simulation results and user interface information to an operator. The functions of spatial simulation engine SSE, memory MEM, display D, and user interface UI in providing a carrier particle with conservative behavior characteristics in a batch or continuous stream of material will be described in further detail herein with respect to FIG. 36.

Referring now to FIG. 36, a flow chart, generally designated 3600, is shown which illustrates a process for providing a carrier particle having materials and dimensions to provide characteristics for the carrier particle that about match the conservative behavior characteristics of a selected target particle. As stated above, such a process can be at least partially performed by computer system CS. The process begins at the step indicated by reference numeral 3602. In step 3604, memory MEM (shown in FIG. 35) can be stored with simulation information for an exemplary target particle and the conditions applied to the target particle in at least one simulation. The simulation information for the target particle can include the conservative behavior characteristics of the target particle, such as conservative dimensional and thermal characteristics of the target particle. The dimensional and thermal characteristics of the target particle can be important because it can determine whether the cold spot of the target particle reaches a predetermined temperature in a specified time under a thermal process. Dimensional characteristics can include the shape and size of the selected target particle. Thermal characteristics can include the specific heat, density, and thermal conductivity of the selected target particle.

Depending on the mode of heating, other simulation properties can include electrical conductivity, coefficient of thermal expansion, porosity, and dielectric properties such as dielectric constant, dielectric loss factor, and dielectric loss tangent. Other simulation properties can include elasticity and particle smoothness, which can effect a variety of heat transfer conditions, such as during continuous flow.

Exemplary target particles having conservative behavior characteristics can include any suitable type of food product that is slow to achieve a predetermined temperature in the center of the particle in a thermal process. In order to provide safe food product, the center of the slowest heating food product should reach the predetermined temperature in the applied thermal process. Such food particles can include a potato, carrot, or other suitable slow heating or target particles having conservative behavior characteristics. Other food and biomaterial particles that can be simulated include meat particles, various fruit and vegetable particles, restructured particles such as tofu or cheese particles, texturized vegetable protein particles, solid, elastic and soft pliable gel particles, and biomass generated by microbial fermentations or growth. Additionally, manufactured synthetic particles of organic or inorganic origin and composition can be simulated. These target particles can include quantifiable characteristics for entry into memory MEM (shown in FIG. 35). For example, potatoes are typically cubical in shape, and carrots are typically cylindrical in shape. Other shapes include parallelepipeds, spheres, ellipsoids, wedges, and various irregular shapes that can be approximated by suitable numeric simulations.

At step 3606, memory MEM can be stored with simulation information for a carrier particle design. The simulation information for the carrier particle design can include the characteristics of different materials for fabricating an actual carrier particle. The materials for fabricating a carrier particle can include polymers such as polypropylene, methylpentene copolymer (TPX), and nylon. Further, the carrier particle material can include any suitable plastic polymer material as well as biopolymers (such as polysaccharide and protein gums and gel materials) having suitable physical and thermal characteristics for the selected purpose. The simulation information can also include characteristic information on these types of carrier particles such as specific heat, thermal conductivity, density, electrical conductivity, coefficient of thermal expansion, porosity, dielectric properties such as dielectric constant, dielectric loss factor and dielectric loss tangent. Other properties such as elasticity and particle surface smoothness may also play a role under a variety of heat transfer conditions, especially during continuous flow. Further, the simulation information for the carrier particle design can also include dimensional information for fabricating the actual carrier particle. The dimensional information can include the shape, size, and dimensions of an exterior of the carrier particle and an interior cavity of the carrier particle for holding an associated detectable particle.

At step 3608, the conservative behavior characteristics of a target particle can be determined. Initially, an operator can select a target particle for modeling with computer system CS (shown in FIG. 35). The selected target particle can be a target particle exhibiting conservative behavior characteristics in a batch or continuous stream of material. For example, the target particle can be a potato cube. The operator can select simulation information from memory MEM (shown in FIG. 35) for modeling a potato cube or other target particle with spatial simulation engine SSE. Spatial simulation engine SSE can simulate the model in simulation conditions similar to those in a batch or continuous stream of material.

According to one embodiment of step 3608, simulated heat can be applied to the target particle until its geometric center or cold spot achieves the lethality value ($F_0$) of 3 minutes. This step can generate the required hold time to achieve the desired lethality for the cold spot of the target particle.

Next, at step 3610, the materials and dimensions for a carrier particle design about matching the conservative behavior characteristics of the target particle can be determined. Dimensions, such as shape dimensions, for a carrier particle design can be selected from memory MEM to about match the selected target particle. For example, a cubical or cylindrical shape can be selected to match a cubical potato or cylindrical carrot. Additionally, for example, a spherical shape can be selected to match a spherically-shaped target particle. Additionally, a material type for the carrier particle design can be selected from memory MEM. Spatial simulation engine SSE can simulate a carrier particle design having selected materials and dimensions to determine whether it matches the conservative behavior characteristics of the target particle. Additionally, the materials and dimensions of the carrier particle design can be adjusted to achieve a design about matching the conservative behavior characteristics of the target particle. As disclosed further herein, the operator can also adjust the dimensions and materials of a carrier particle design with the spatial simulation engine SSE to achieve a carrier particle design with desired behavior characteristics.

Generally, carrier particles can be designed and fabricated from one or more polymer materials to emulate the shape and size of food particles or biomaterial present in a processed product, such as a particle in a batch or a continuous stream of material. Potential polymer material for simulated particle fabrication can be selected based on thermal and physical criteria in order to ascertain conservative flow and a conservative heating behavior in a batch or continuously processed system in all lethality-delivering segments or stages of the process.

The carrier particles can be fabricated to provide the equivalent thermally conservative characteristics for any target shape, size and material composition, provided the appropriate thermal and dimensional characteristics are known or defined for the target particle. Typical target particles are defined by material nature, shape and dimensions; for example, a ½ inch potato cube, a ⅜ inch carrot cylinder, 1 cm beef cube, etc. Target particles can also have a spherical shape.

Conservative flow behavior dictates a carrier particle construction in which the carrier particle belongs to the population of particles (containing identical shape and sizes) with the highest likelihood of containing the fastest traveling particle. This desirable result is achieved by selecting the appropriate solid material density and designing the blank cargo space cavity in the particle center to balance the target density of the composite particle and carry the thermosensitive implants. Selected densities can be between about 10 $kg/m^3$ (representing a porous material such as silica aero gel) and 20,000 $kg/m^3$ (representing a very high density solid material). According to one embodiment, the density range can be between about 250 $kg/m^3$ (for simulated particles ranging between the effective density of hollow, thin-walled particle of TPX) and 1600 $kg/m^3$ (for a very dense water-based carrier fluid such as about 95% molasses). Very low effective density particles can be applied to vertical heat exchanger geometries and hold tubes in order to ensure sufficiently fast upward movement within the population of natural target particles.

Conservative heating behavior dictates the criteria for particle construction in which the resulting composite particle exhibits a slower temperature increase in both segments of lethality accumulation (i.e., both the heater and the hold tube) than any other processed material (e.g., carrier fluid and all other used particulate food components). Desirable conservative heating characteristics for a simulated particle were previously defined in U.S. Pat. No. 6,015,231 to Swartzel et al., which is incorporated by reference herein. While the requirement of lowest thermal conductivity was described in that patent as desirable to provide the desired conservative heating behavior, there is a further need to define the minimally conservative characteristics in order to take advantage of positive characteristics of continuous flow thermal processing.

In view of the foregoing, one critical design element for the carrier particles of the presently disclosed subject matter is the minimally conservative particle wall dimension, i.e., the smallest necessary dimension needed for the carrier particle to provide the equivalent or greater thermal protection to the contents of the enclosed cavity (or cargo bay) compared to a predetermined target material shape and dimension.

According to one embodiment of step 3610, the carrier particle design can be simulated under the same heating conditions of the target particle in step 3608 and for the duration (hold time) determined in step 3610 to achieve the lethality value ($F_0$) of 3 minutes for the target particle. This step can generate the cross-section profiles described herein of accumulated $F_0$ values during the same heating process resulting in an $F_0$ value of 3 minutes in the cold spot of the target particle. Next, the layer of $F_0$ values lower than 3 minutes within the carrier particle design can be identified from the cross-section profiles obtained via simulation. This layer can define the position of the wall of the internal cavity of the actual carrier particle for carrying the detectable particle. Therefore, the layer can define the wall thickness for fabricating the actual carrier particle. A detectable particle placed within a cavity surrounded by a carrier particle having a wall of this thickness and processed to an $F_0$ lethality value of 3 minutes or greater can correspond to a process yielding at least an $F_0$ of 3 or more minutes for the related target particle.

Referring again to FIG. 36, at step 3612, the carrier particle design can be used as a plan for fabricating an actual carrier particle for use in a batch or continuous stream of material. The actual carrier particle can be fabricated with the materials and have dimensions of the carrier particle design determined to about match the conservative behavior characteristics of the target particle.

According to one exemplary embodiment, a cube can be fabricated that is made out of a selected polymer, containing an implant-compatible cavity, with a minimum wall thickness providing the equivalent of greater thermal protection to the contents of the cavity that is provided by the target particle material (for example, a potato cube) to its "cold spot" or geometric center.

The critical wall dimension can be determined by simulating heating of the target natural material and identical shape and size of several different potential fabrication polymers, under identical thermal conditions, until the center (cold spot) of the target particle accumulates a preselected time-temperature treatment combination (i.e., lethality, as evidences by a cumulative $F_0$ value of 3 minutes or greater). As referred to herein, the $F_0$ value is the time at a reference temperature of 121.1° C. (250° F.) (assuming instantaneous heating and cooling) to which the entire thermal process is equivalent for constituents with a z-value of 10° C.

The spatial simulation models of the identically sized and shaped polymer materials are then examined to determine the depth (i.e., wall thickness) at which the same or greater equivalent lethality has been accumulated under same conditions and during the same time period. This depth or dimension is then deemed "critical" since it provides at least equivalent and appropriately conservative thermal protection to the contents of the cavity contained within that dimension.

For irregularly or non-symmetrically shaped cavities that may be generated as a result of limitations in fabrication methods and procedures, it is generally assumed that the path of least resistance (i.e., the lowest wall thickness) represents all surrounding wall thicknesses.

The thermal energy required to bring the temperature of the contents of the cavity to the temperature of the wall is treated as an additional conservative protection element. In other words, it is assumed that the contents of the cavity reach the cavity wall instantaneously. This provides an additional level of thermally conservative behavior assurance.

Figure 40:
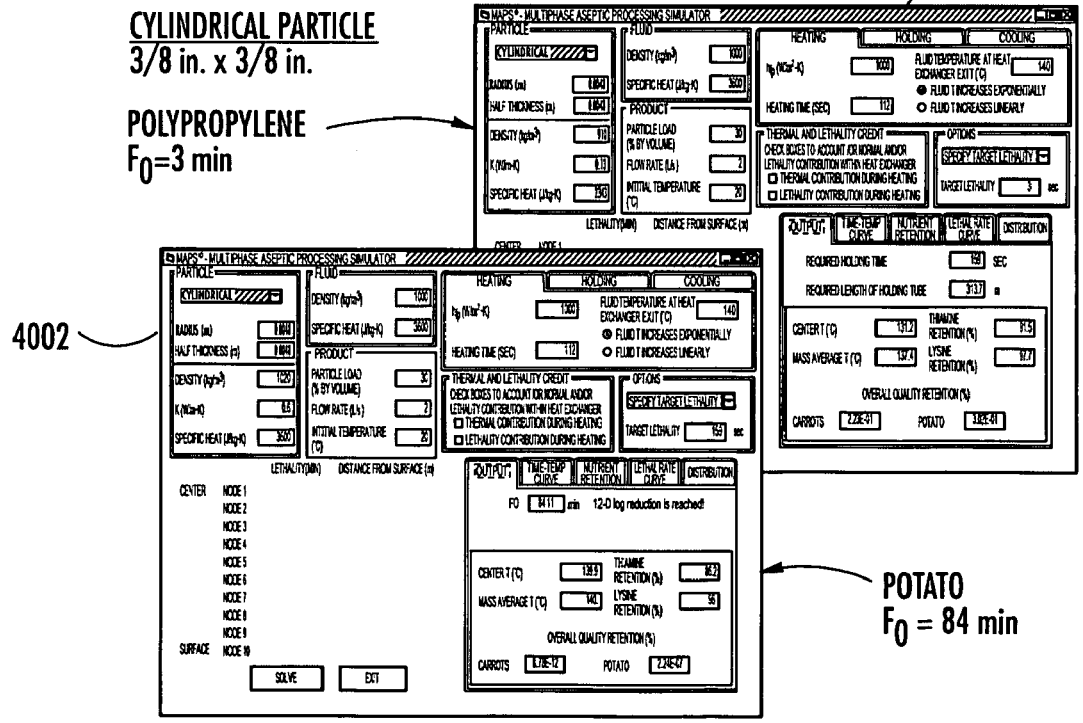

FIGS. 37–40 illustrate various screen displays showing exemplary simulation results that can be displayed on display D (shown in FIG. 35). These simulations can be executed by spatial simulation engine SSE (shown in FIG. 35). These figures show the need for the minimization of conservative properties of fabricated particles. If, for example, polypropylene is used to fabricate a carrier particle in order to simulate heating of potato particles, and to carry a thermo-sensitive implant in its geometric center, considerable overheating of the target particle (e.g., potato) can result if this was used as a basis for thermal process establishment. Under identical simulation heating conditions, by the time the geometric center of a solid polypropylene particle accumulated an equivalent lethality of 3.0 minutes, the corresponding geometric center of a potato particle of identical size accumulated an $F_0$ of 146 minutes for a 0.5 inch cube (FIG. 37); an $F_0$ of 93 minutes for a ⅜ inch cube (FIG. 38); an $F_0$ of 133 minutes for a 0.5 inch by 0.5 inch cylinder (FIG. 39) and an $F_0$ of 84 minutes for a ⅜ inch by ⅜ inch cylinder (FIG. 40). This level of overprocessing can result in unacceptable levels of quality degradation. It is therefore necessary to define the criteria and approach for the construction of minimally conservative fabricated particles relative to the target food or biomaterial particles. This criteria can be defined on fabricated particle wall thickness characteristic. The fabricated particle wall thickness can be selected so that it provides at least the same degree of thermal protection to the cavity contained within the fabricated particle walls as the target particle provides to its geometric center (or cold spot).

Figure 37:
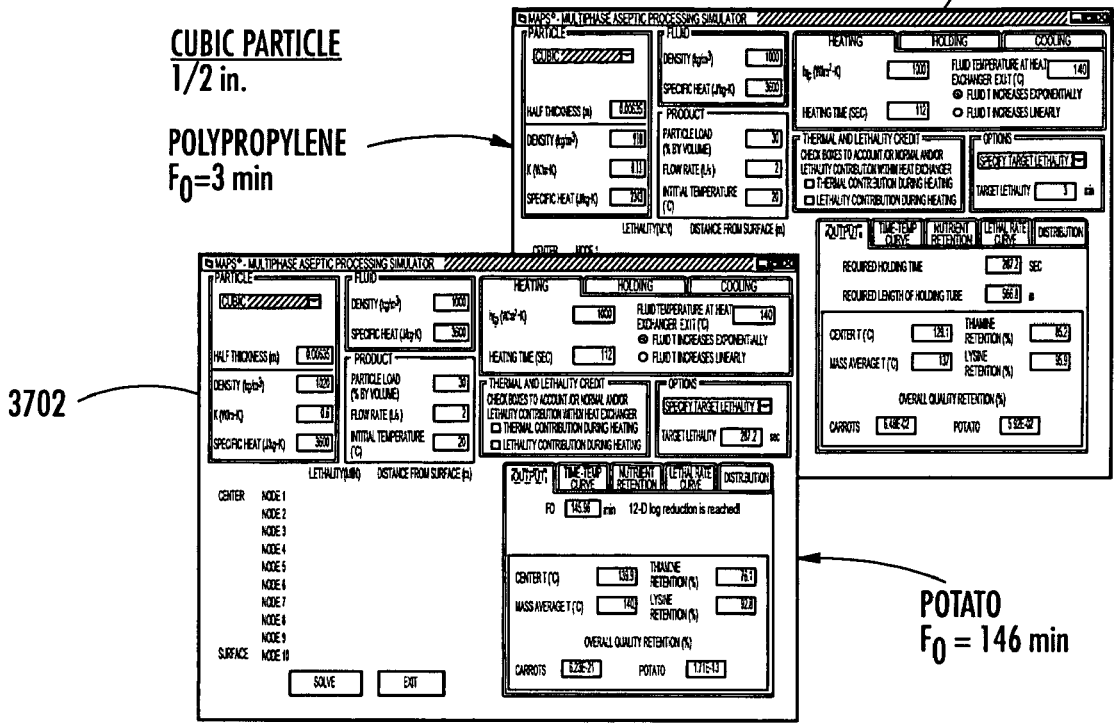
Figure 38:
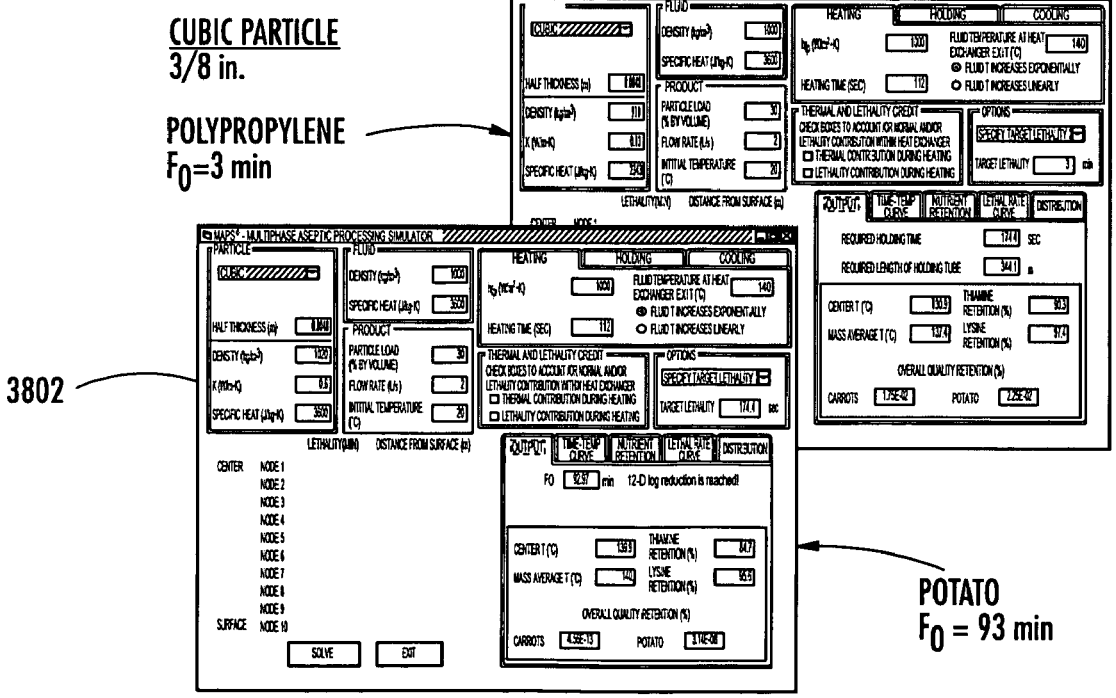
Figure 39:
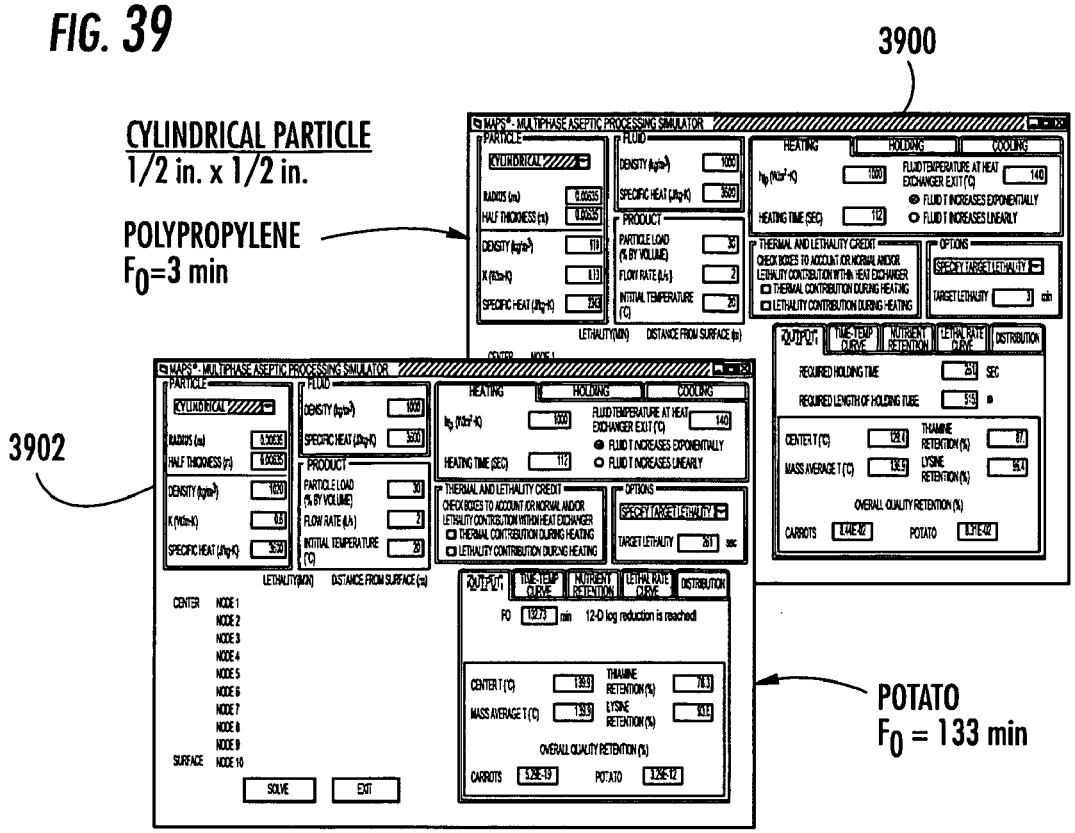

Referring specifically to FIG. 37, two screen displays 3700 and 3702 show results indicating that using an overly conservative carrier particle design can result in a potato food particle receiving cumulative lethality in its cold spot up to two orders of magnitude greater than required for commercial sterility. Screen display 3700 shows the results of simulating a 0.5 inch cubic carrier particle comprising polypropylene in a thermal process. Spatial simulation engine SSE can receive simulation information regarding particle half thickness, density, thermal conductivity (k), and specific heat. In this example, half thickness is set to 0.00635 meters, density is set to 910 kg/m³, thermal conductivity is set to 0.13 W/m·k, and specific heat is set to 2343 J/kg·K. The simulation can include exposing the carrier particle to a specified fluid and heating conditions, such as a specified fluid density and specific heat. In this example, the fluid density is set to 1000 kg/m³, and the specific heat is set to 3600 J/kg·K. Additionally, the simulation can include specifying product particle load, flow rate, and initial temperature. In this example, particle load is set to 30% by volume, flow rate is set to 2 L/s, and initial temperature is set to 20° C. The simulation can also include specifying heating applied to the carrier particle, such as the fluid to particle interface convective heat transfer coefficient ($h_{fp}$); heating time; fluid temperature at heat exchange; and whether the fluid temperature increases exponentially or linearly. In this example, $h_{fp}$ is set to 1000 $W/m^2$·K, fluid temperature at heat exchange is set to 140° C., heating time is set to 112 seconds, and the fluid temperature increases exponentially.

Specific heat or heat capacity range of the carrier particle can range between about 122 J/(kg·C.°) (representing tungsten) and 4,186 J/(kg·C.°) (representing water). According to one embodiment, the specific heat of the carrier particle can range between about 900 J/(kg·C.°) (representing aluminum) and 4,200 J/(kg·C.°) (representing water). Aluminum carrier particles can be used for simulating thermally "liberal" behavior in order to evaluate the "thermally most abused" population segment.

Screen display 3700 can include an output section for displaying the simulation results of applying the specified simulation conditions to the specified carrier particle. The output section can include output for required holding time, required length of holding tube, center temperature, mass average temperature, thiamine retention percentage, lysine retention percentage, and overall quality retention percentage for a carrot and potato. In this example, the required holding time is 287.2 second and the required length of holding tube is 566.8 meters. The center temperature is 129.1° C. The mass average temperature is 137° C. The thiamine retention percentage is 85.2. The lysine retention percentage is 95.9. The overall quality retention percentage is $6.48*10^{-2}$ and $5.9*10^{-2}$ for the carrot and potato, respectively.

Screen display 3702 shows the results of simulating a 0.5 inch cubic, potato target particle in a thermal process. As shown by the simulations, the cumulative lethality received by the simulated potato is about two orders of magnitude greater than required for commercial sterility (e.g., an $F_0$ value of 3 minutes).

Referring to FIG. 38, two screen displays 3800 and 3802 show other simulations applied to a carrier particle design and ⅜ inch, potato food particle, respectively, under similar conditions. These simulations also show that the cumulative lethality received the simulated potato is several orders of magnitude greater than required for commercial sterility.

Referring to FIG. 39, two screen displays 3900 and 3902 show other simulations applied to a carrier particle design and a cylindrical, potato food particle, respectively, under similar conditions. These simulations also show that the cumulative lethality received the simulated potato is several orders of magnitude greater than required for commercial sterility.

Referring to FIG. 40, two screen displays 4000 and 4002 show other simulations applied to a carrier particle design and another cylindrical, potato food particle, respectively, under similar conditions. These simulations also show that the cumulative lethality received the simulated potato is several orders of magnitude greater than required for commercial sterility.

FIGS. 41–51 illustrate an exemplary procedure for simulating, calculating, and selecting carrier particle designs for carrying a detectable particle for monitoring and validation of thermal processing of a multiphase food material containing a 0.5 inch potato cube. Referring specifically to FIG. 41, a schematic diagram of a cubic particle design, generally designated 4100, for simulation by spatial simulation engine SSE is illustrated. Cubic particle design 4100 can be used to calculate the sequential lethality ($F_0$ value) increments during heating for a variety of materials. Cubic particle design 4100 can be divided into smaller cubicles, generally designated 4102, including a cubicle 4104 at the center of particle design 4100 and other cubicles extending to the exterior of cubic particle design 4100. In this embodiment, design 4100 is divided into smaller cubicles 4100 for facilitating the simulation and observation of heating from the exterior of cubicle to the center, the area of greatest interest. Cubic particle design 4100 can be used in simulating heating applied to the exterior of design 4100 and observing the effect of the heating to cubicle 4104, the area of interest.

FIG. 42 illustrates a screen display 4200 showing exemplary heat simulation for a cubic, potato target particle design 4100 (shown in FIG. 41) to an $F_0$ value of 3 minutes in the center. The required holding time is about 131.4 seconds. In this simulation embodiment, target particle design 4100 has a coefficient of thermal diffusivity (α) of $1.63*10^{-7}$ $m^2/s$. The coefficient of thermal diffusivity is a material characteristic which describes the rate at which heat is conducted through the material. The coefficient of thermal diffusivity is related to thermal conductivity k, specific heat $c_p$, and density ρ by the following equation (with the units of $m^2s^{-1}$:

$$a = \frac{k}{\rho c_p}$$

The higher the thermal diffusivity, the faster the heat is conducted through the material.

FIG. 43 illustrates a schematic diagram showing a grid 4300 of the simulation results of heating each of cubes 4102 in the thermal processing simulation. As shown, center cube 4104 achieved the desired thermal treatment of 3.0.

FIG. 44 illustrates a screen display 4400 showing exemplary heat simulation for a 0.5 inch TPX carrier particle design. The TPX carrier particle design has a thermal diffusivity value of $1.04*10^{-7}$ $m^2/s$. The TPX carrier particle design is heated for the same length of time under the same conditions as carrier particle design 4100 (shown in FIG. 41). The holding time is set to 131.4 seconds.

FIG. 45 illustrates a schematic diagram showing a grid 4500 of the result of heating the TPX carrier particle design of FIG. 44 in the same thermal processing simulation of the target particle. Square 4502 of grid 4500 can indicate the center of the TPX carrier particle design. The other squares of grid 4500 can indicate the result of the applied thermal process simulation from square 4502 to the exterior of the TPX carrier particle design. Line 4504 indicates dimensions for the interior cavity of the carrier particle design suitable for a carrier particle about matching the conservative behavior characteristics of the simulated potato of FIGS. 41–43. Line 4504 can be conservatively placed to yield $F_0$ values of 3.0 or greater. Thus, a TPX carrier particle design can be fabricated based on grid 4500. Grid 4500 indicates that the particle should have a wall thickness of about 2.54 mm. The simulation results show that the carrier particle design can match or exceed the conservative thermal characteristics of the simulated potato.

Figure 41:
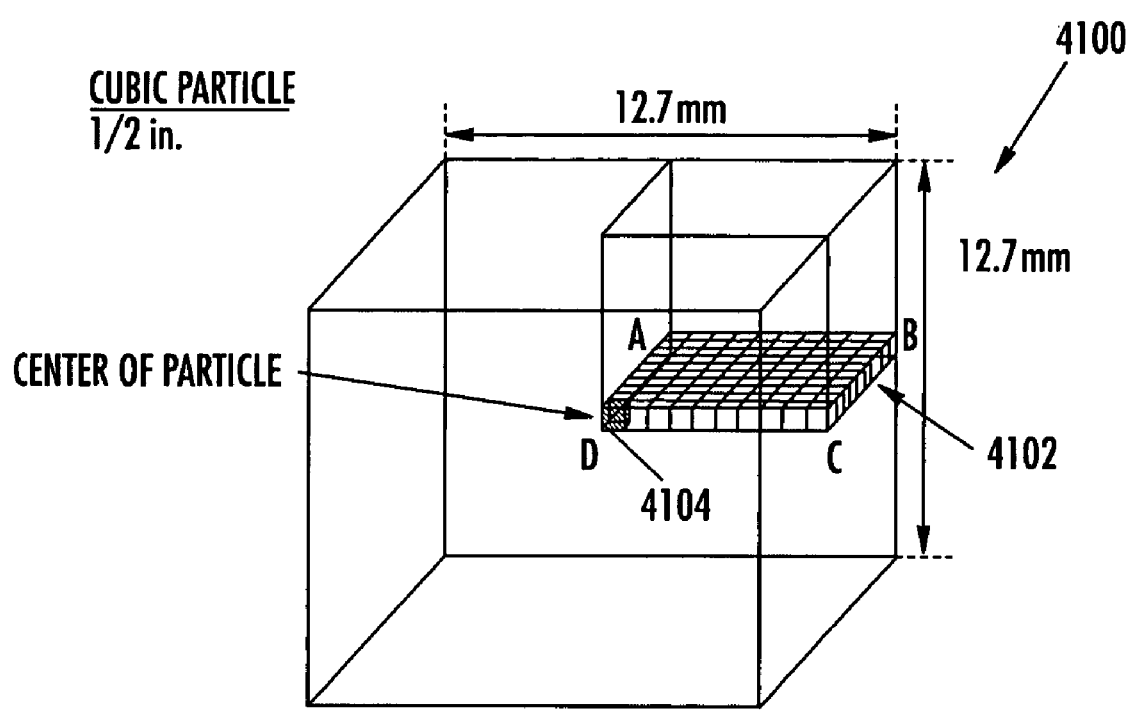
Figure 46:
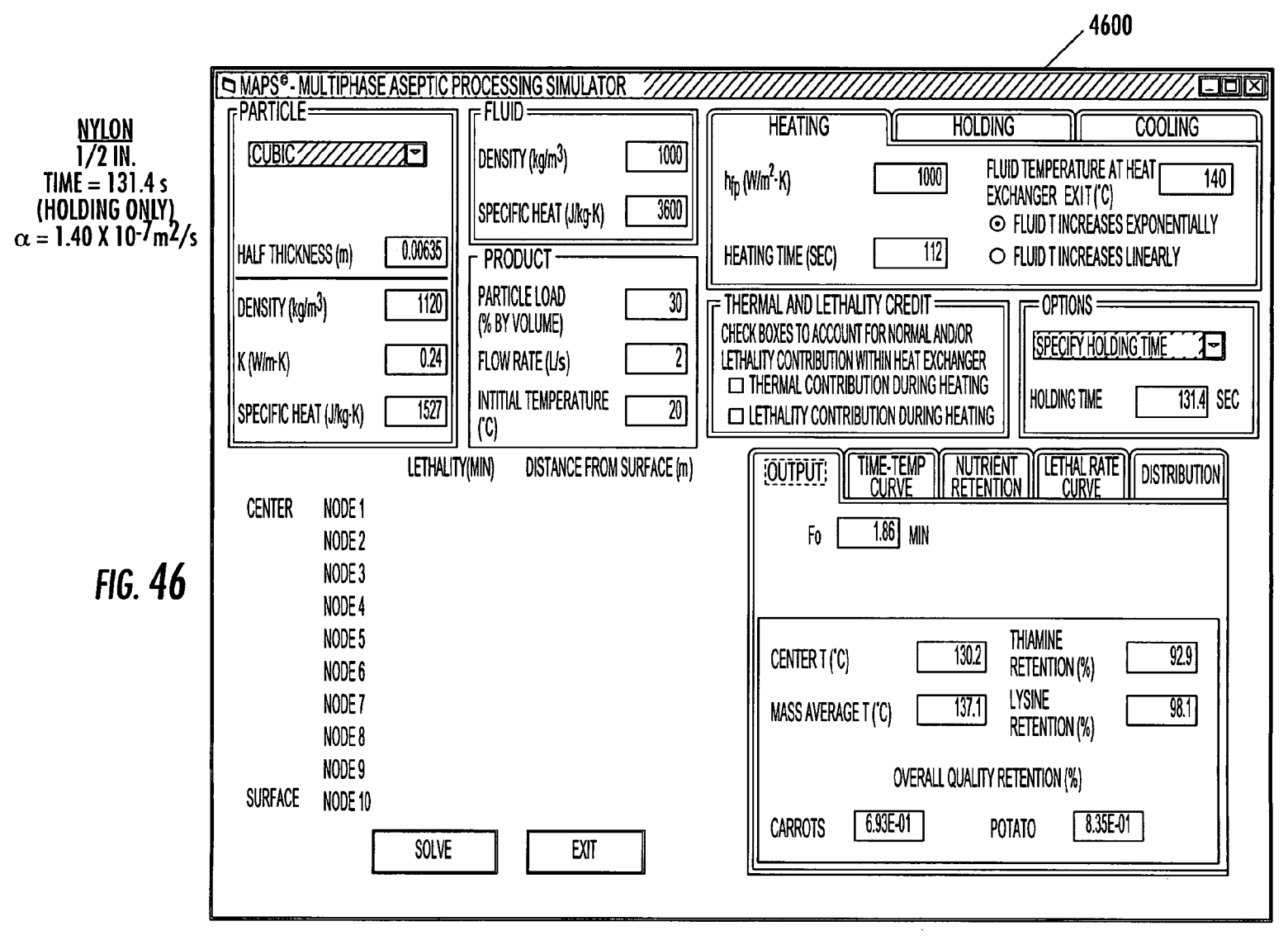

FIG. 46 illustrates a screen display 4600 showing exemplary heat simulation for a 0.5 inch nylon carrier particle design. The nylon carrier particle design has a thermal diffusivity value of $1.40*10^{-7}$ m$^2$/s. The nylon carrier particle design is heated for the same length of time under the same conditions as carrier particle design 4100 (shown in FIG. 41). The holding time is set to 131.4 seconds.

Figure 42:
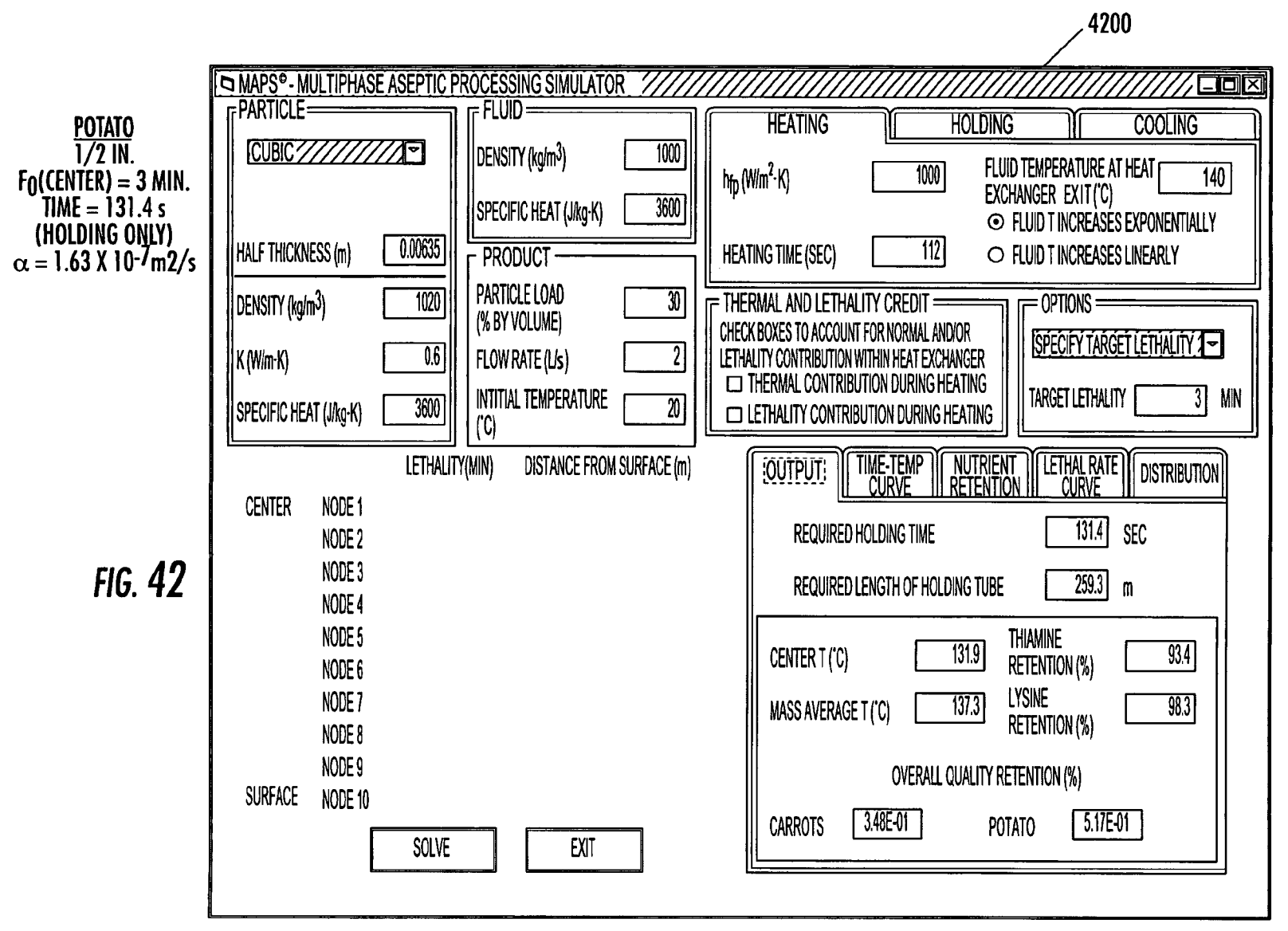
Figure 43:
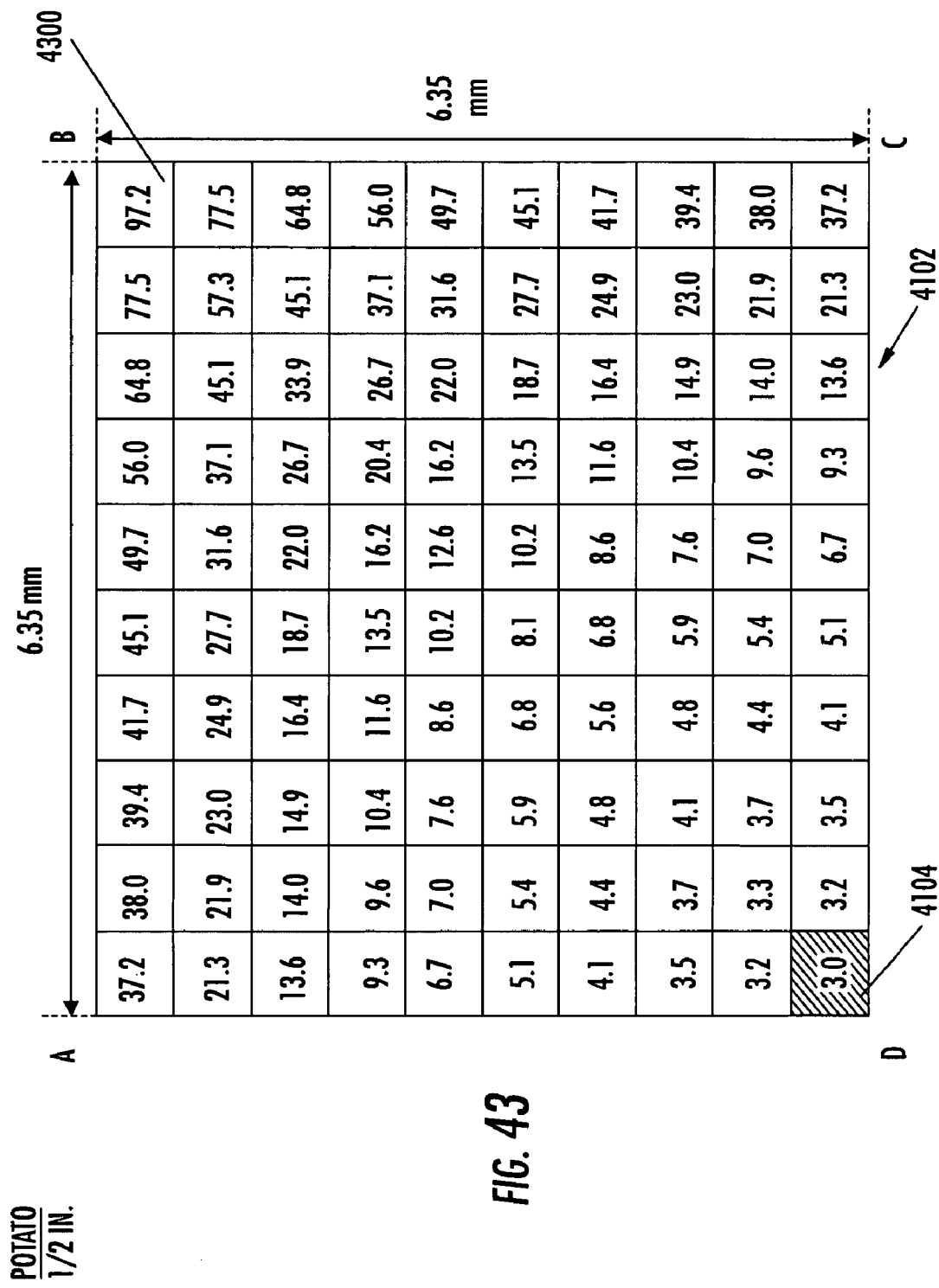
Figure 45:
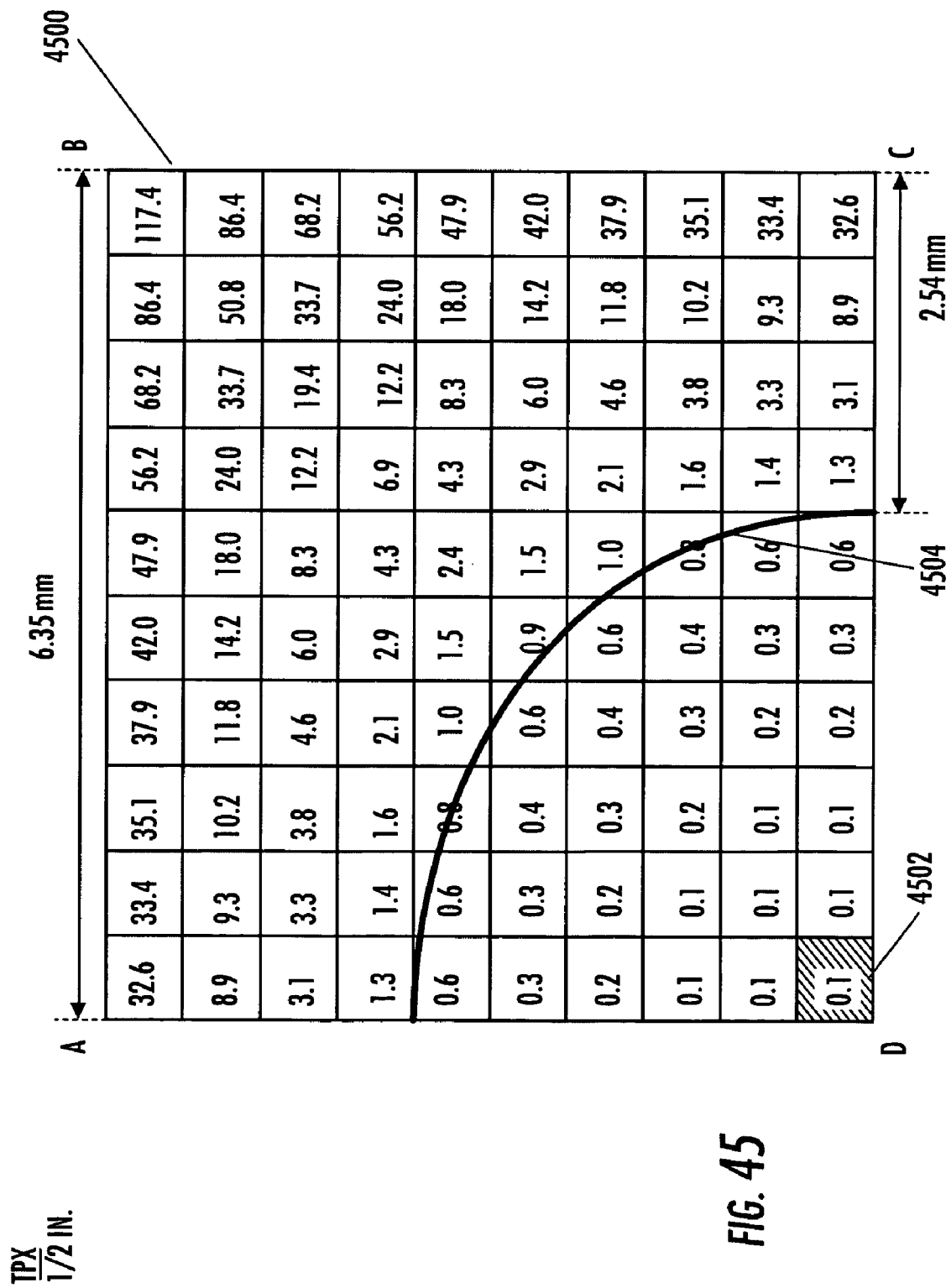
Figure 47:
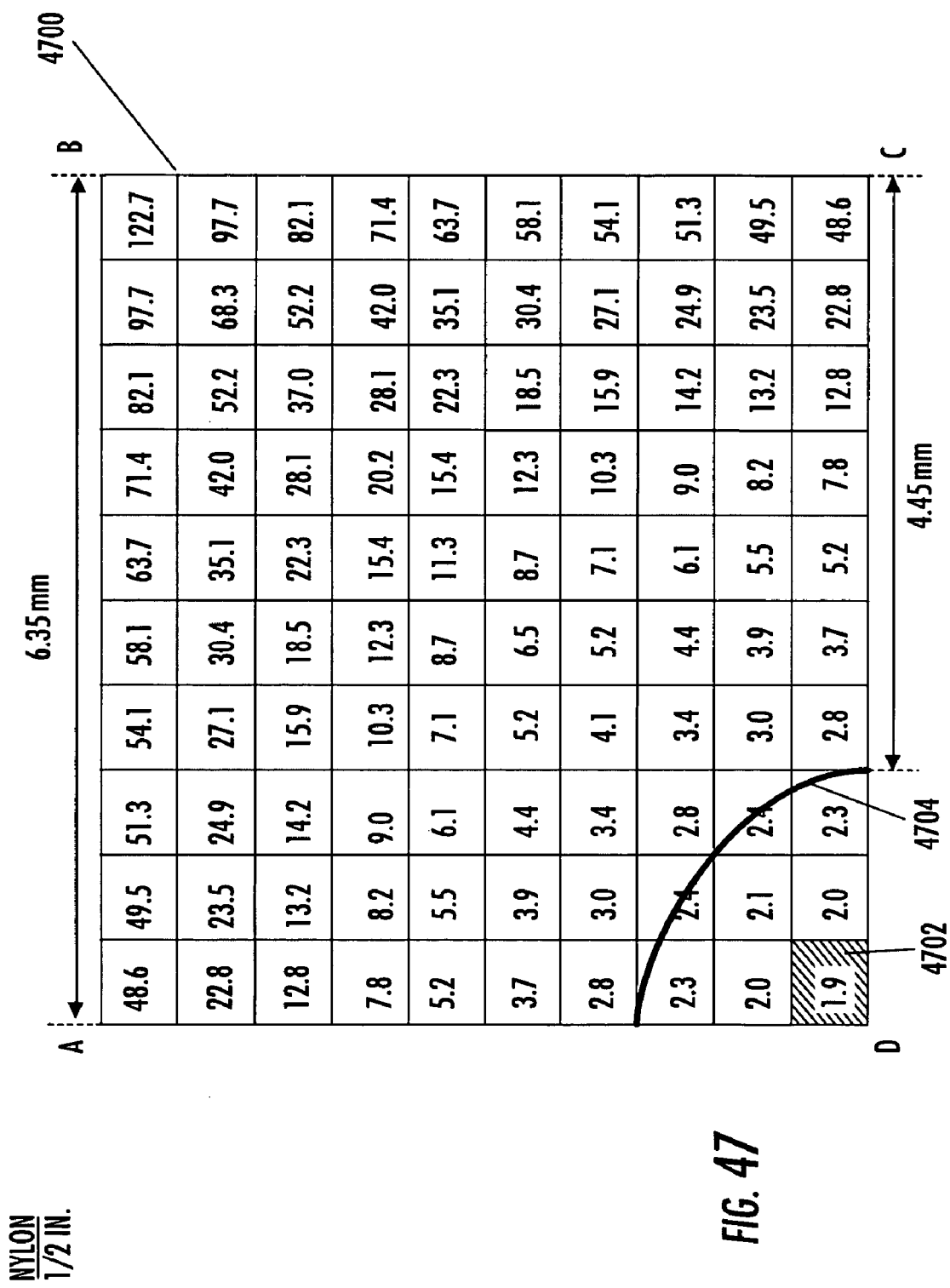

FIG. 47 illustrates a schematic diagram showing a grid 4700 of the result of heating the nylon carrier particle design of FIG. 46 in the same thermal processing simulation of the target particle. Square 4702 of grid 4700 can indicate the center of the nylon carrier particle design. The other squares of grid 4700 can indicate the result of the applied thermal process simulation from square 4702 to the exterior of the nylon carrier particle design. Line 4704 indicates dimensions for the interior cavity of the carrier particle design suitable for a carrier particle about matching the conservative behavior characteristics of the simulated potato of FIGS. 41–43. Thus, a nylon carrier particle design can be fabricated based on grid 4700. Grid 4700 indicates that the particle should have a wall thickness of about 4.45 mm. The simulation results show that the carrier particle design can match or exceed the conservative thermal characteristics of the simulated potato.

Figure 48:
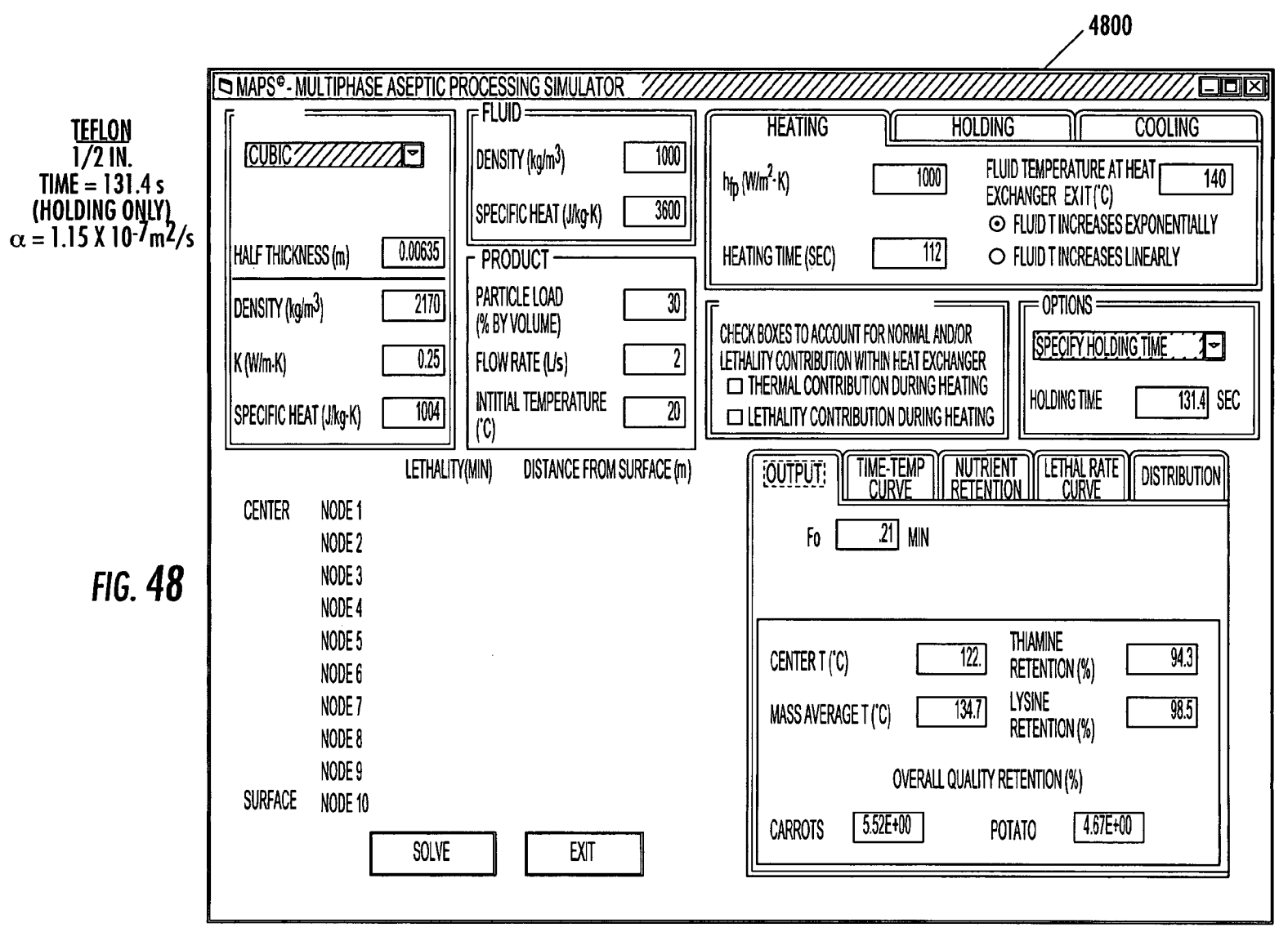

FIG. 48 illustrates a screen display 4800 showing exemplary simulation results for a 0.5 inch TEFLON™ carrier particle design. TEFLON™ material is available from E. I. Du Pont Demours and Company of Wilmington, Del., United States of America. The TEFLON™ carrier particle design has a thermal diffusivity value of $1.15*10^{-7}$ m$^2$/s. The TEFLON™ carrier particle design is heated for the same length of time under the same conditions as carrier particle design 4100 (shown in FIG. 41). The holding time is set to 131.4 seconds.

Figure 44:
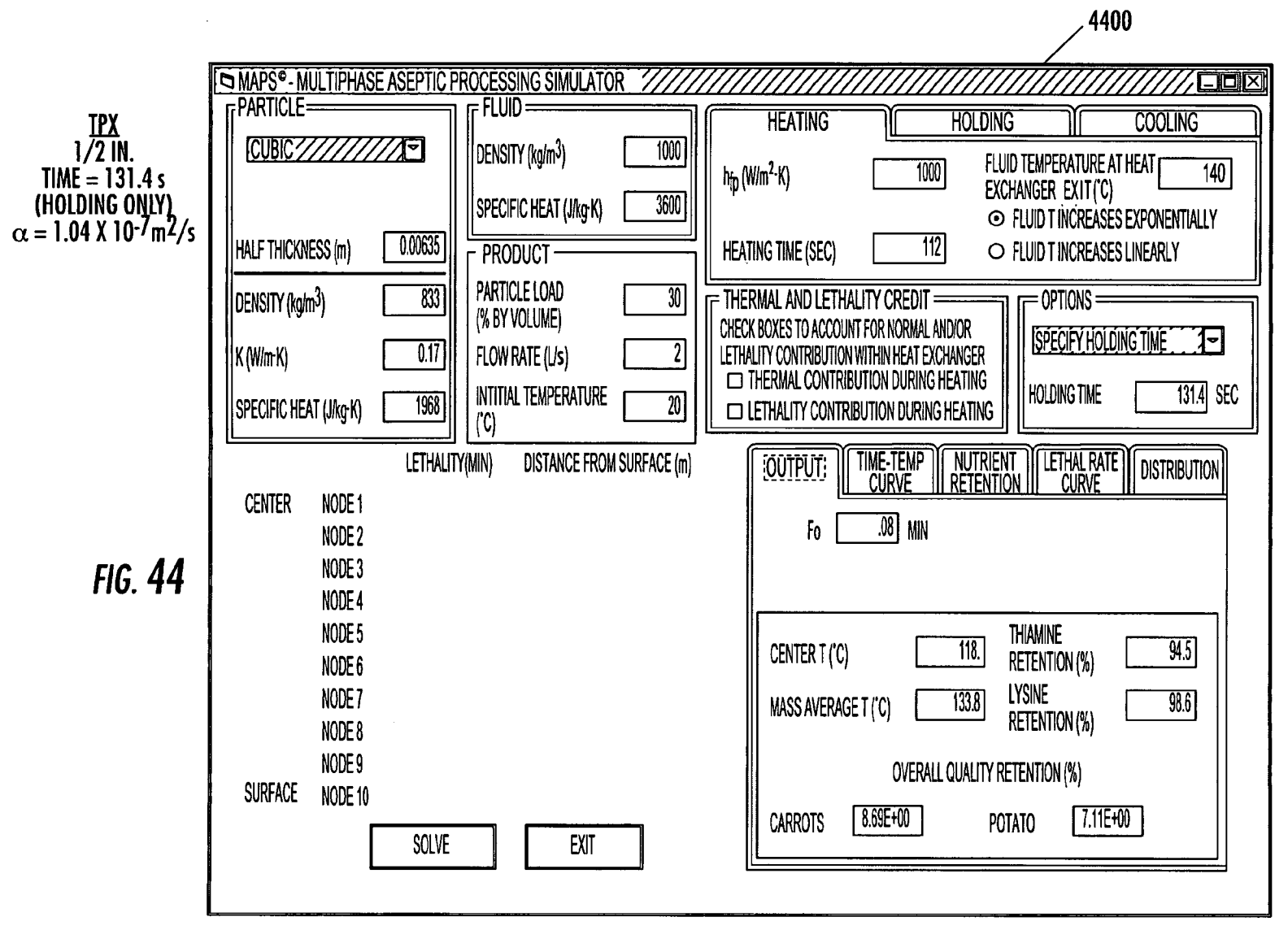
Figure 49:
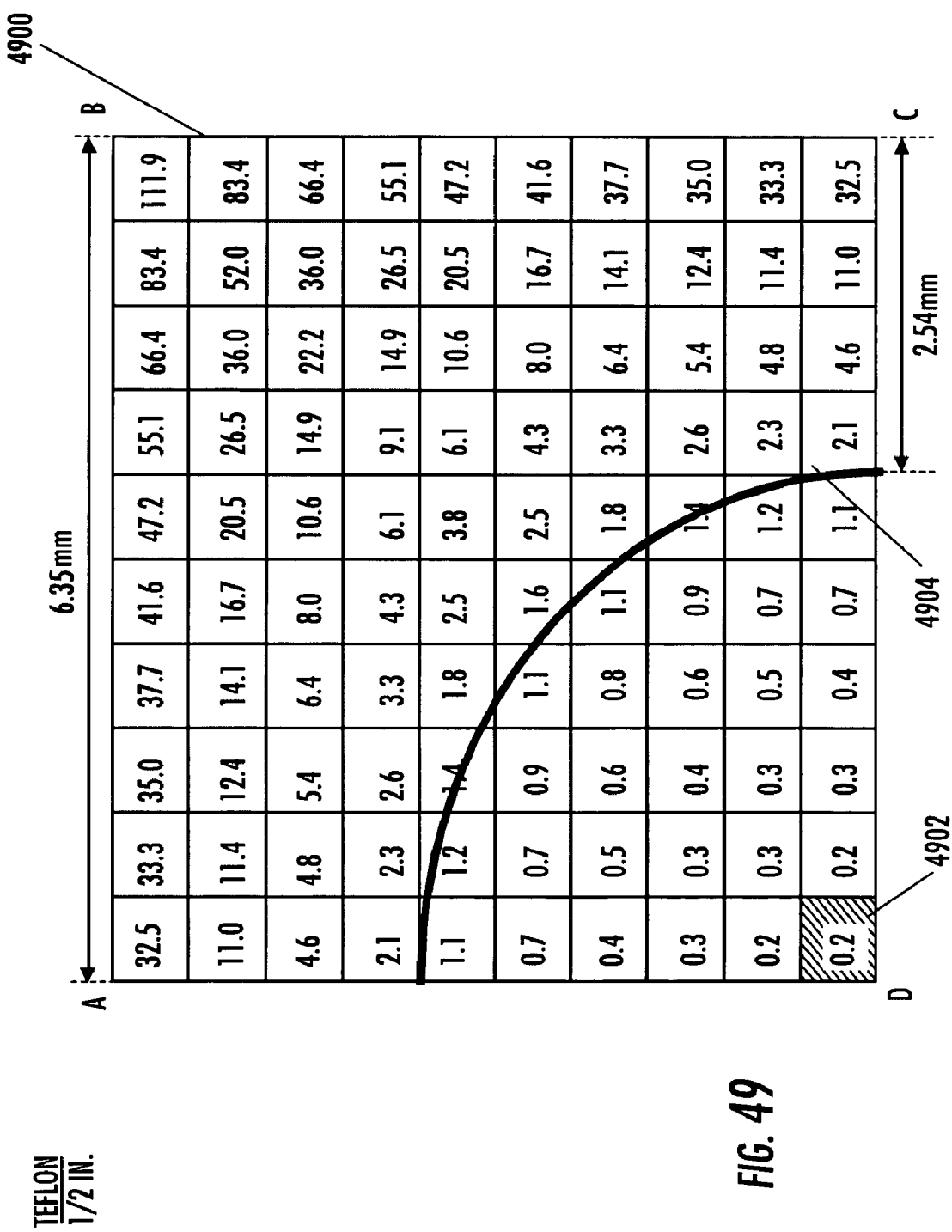

FIG. 49 illustrates a schematic diagram showing a grid 4900 of the result of heating the TEFLON™ carrier particle design of FIG. 44 in the same thermal processing simulation of the target particle. Square 4902 of grid 4900 can indicate the center of the TEFLON™ carrier particle design. The other squares of grid 4900 can indicate the result of the applied thermal process simulation from square 4902 to the exterior of the TEFLON™ carrier particle design. Line 4904 indicates dimensions for the interior cavity of the carrier particle design suitable for a carrier particle about matching the conservative behavior characteristics of the simulated potato of FIGS. 41–43. Thus, a TEFLON™ carrier particle design can be fabricated based on grid 4900. The simulation results show that the carrier particle design can match or exceed the conservative thermal characteristics of the simulated potato.

Figure 50:
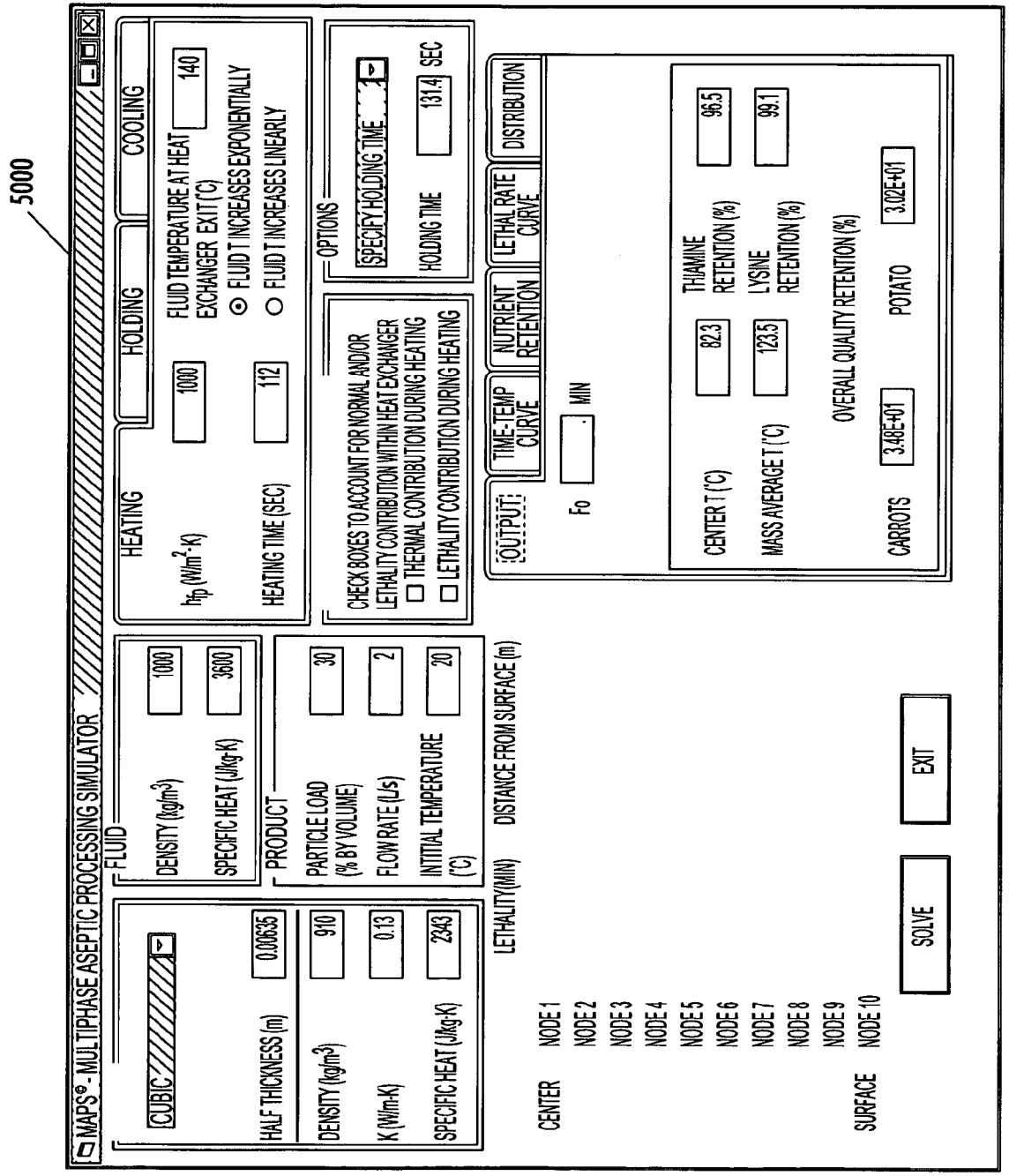

FIG. 50 illustrates a screen display 5000 showing exemplary simulation results for a 0.5 inch polypropylene carrier particle design. The polypropylene carrier particle design has a thermal diffusivity value of $1.15*10^{-7}$ m$^2$/s. The polypropylene carrier particle design is heated for the same length of time under the same conditions as carrier particle design 4100 (shown in FIG. 41). The holding time is set to 131.4 seconds.

Figure 51:
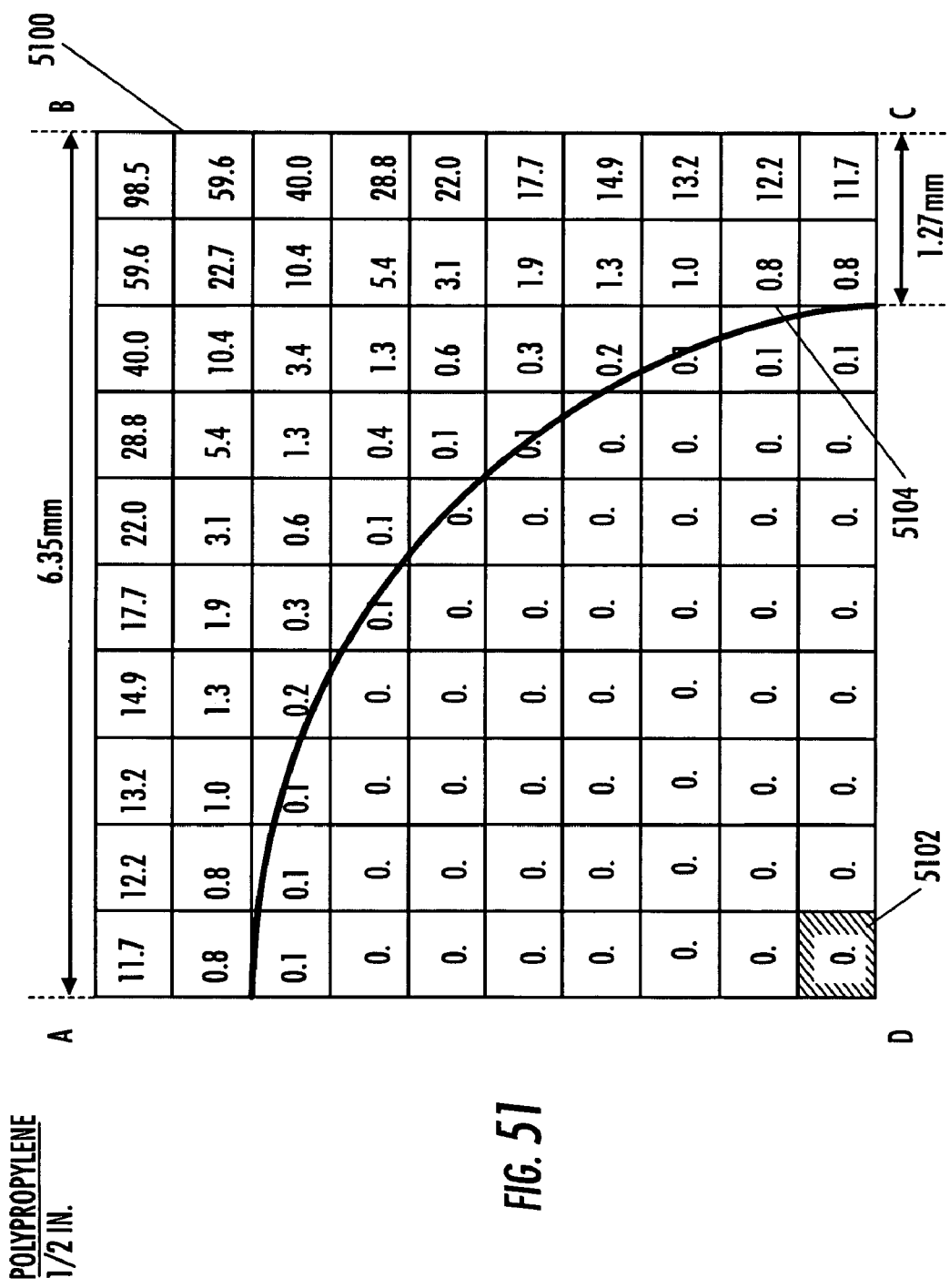

FIG. 51 illustrates a schematic diagram showing a grid 5100 of the result of heating the polypropylene carrier particle design of FIG. 50 in the same thermal processing simulation of the target particle. Square 5102 of grid 5100 can indicate the center of the polypropylene carrier particle design. The other squares of grid 5100 can indicate the result of the applied thermal process simulation from square 5102 to the exterior of the polypropylene carrier particle design. Line 5104 indicates dimensions for the interior cavity of the carrier particle design suitable for a carrier particle about matching the conservative behavior characteristics of the simulated potato of FIGS. 41–43. Thus, a polypropylene carrier particle design can be fabricated based on grid 5100. The simulation results show that the carrier particle design can match or exceed the conservative thermal characteristics of the simulated potato.

Figure 52:
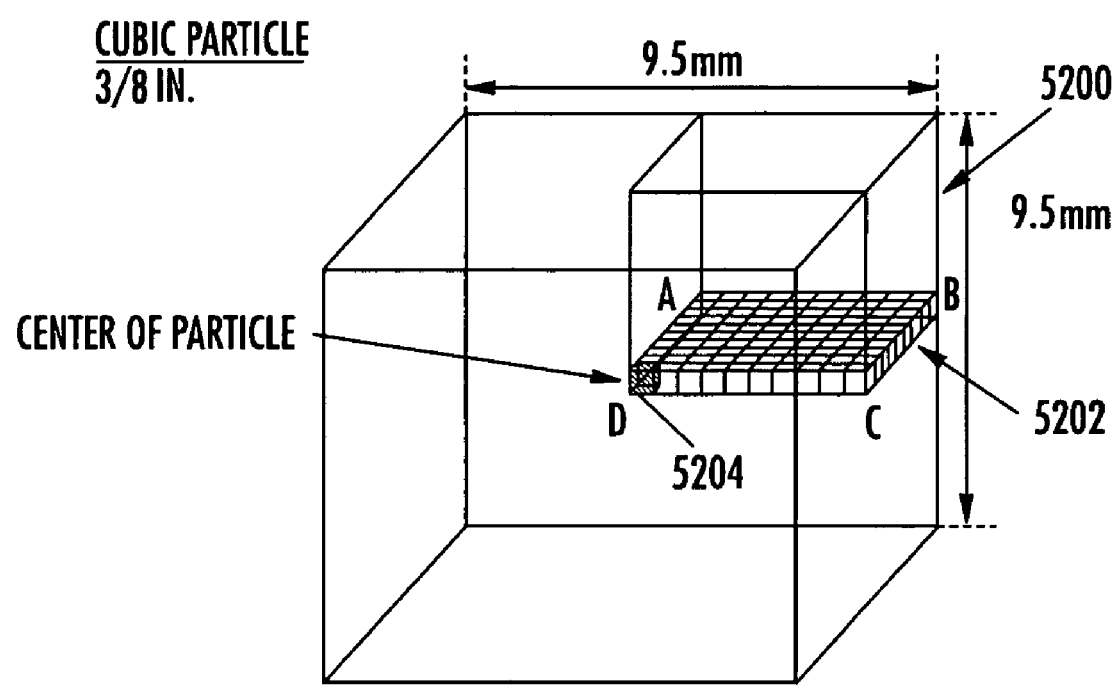

FIGS. 52–62 illustrate an exemplary procedure for simulating, calculating, and selecting carrier particle designs for carrying a detectable particle for monitoring and validation of thermal processing of a multiphase food material containing a ⅜ inch potato cube. FIG. 52 illustrates a schematic diagram of a cubic particle design, generally designated 5200, for simulation by spatial simulation engine SSE. Cubic particle design 5200 can be used to calculate the sequential lethality ($F_0$ value) increments during heating for a variety of materials. Cubic particle design 5200 can be divided into smaller cubicles, generally designated 5202, including a cubicle 5204 at the center of particle design 5200 and other cubicles extending to the exterior of cubic particle design 5200. Cubic particle design 5200 can be used in simulating heating applied to the exterior of design 5200 and observing the effect of the heating to cubicle 5204, the area of interest.

FIG. 53 illustrates a screen display 5300 showing exemplary heat simulation results for cubic, potato particle design 5200 (shown in FIG. 52) to an $F_0$ value of 3 minutes in the center. The required holding time is about 82.1 seconds. In this simulation embodiment, target particle design 4100 has a coefficient of thermal diffusivity of $1.63*10^{-7}$ m$^2$/s.

Figure 54:
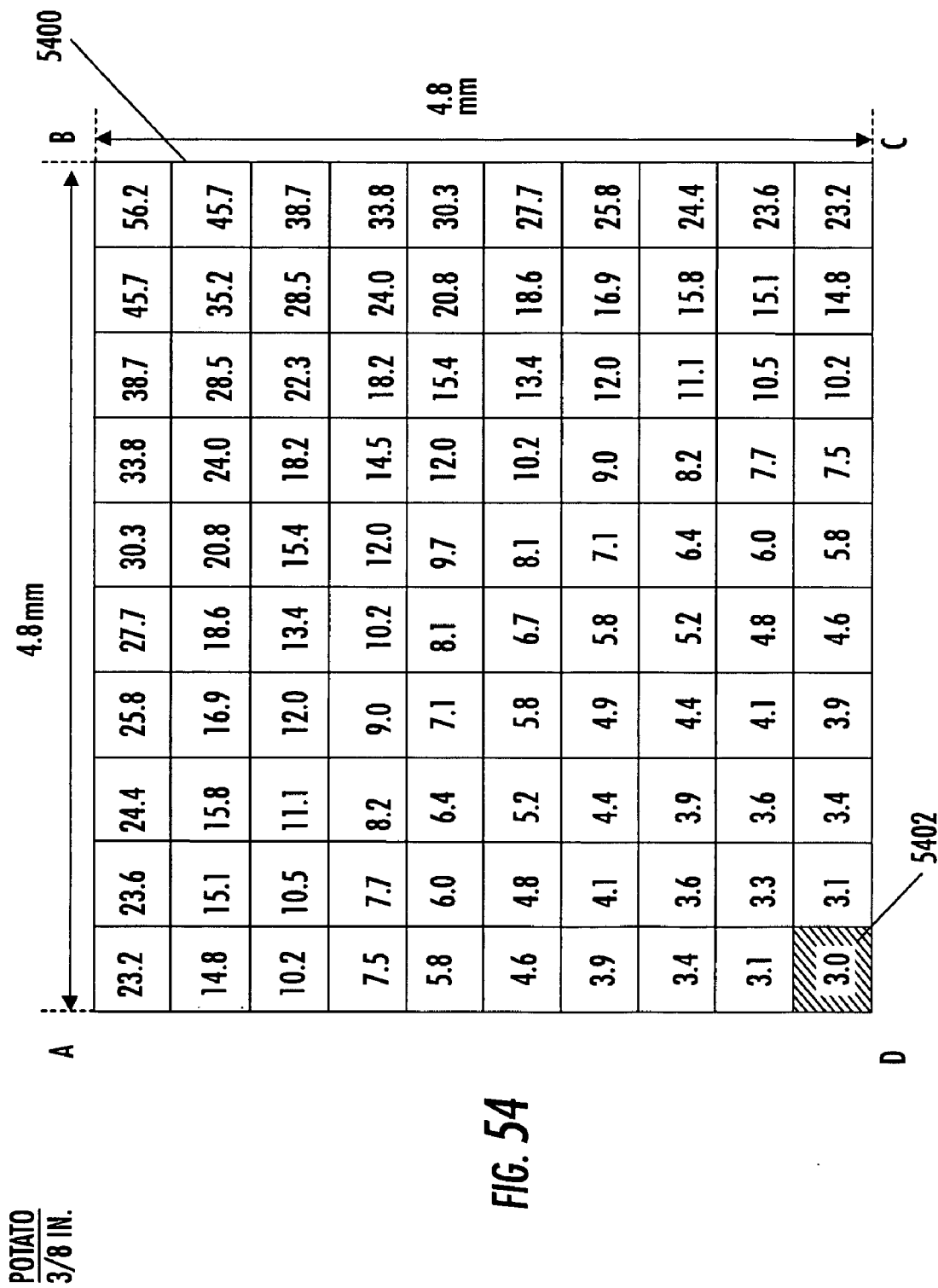

FIG. 54 illustrates a schematic diagram showing a grid 5400 of the result of heating each of cubes in the thermal processing simulation. As shown, center cube 5402 achieved the desired $F_0$ treatment of 3.0 minutes.

Figure 55:
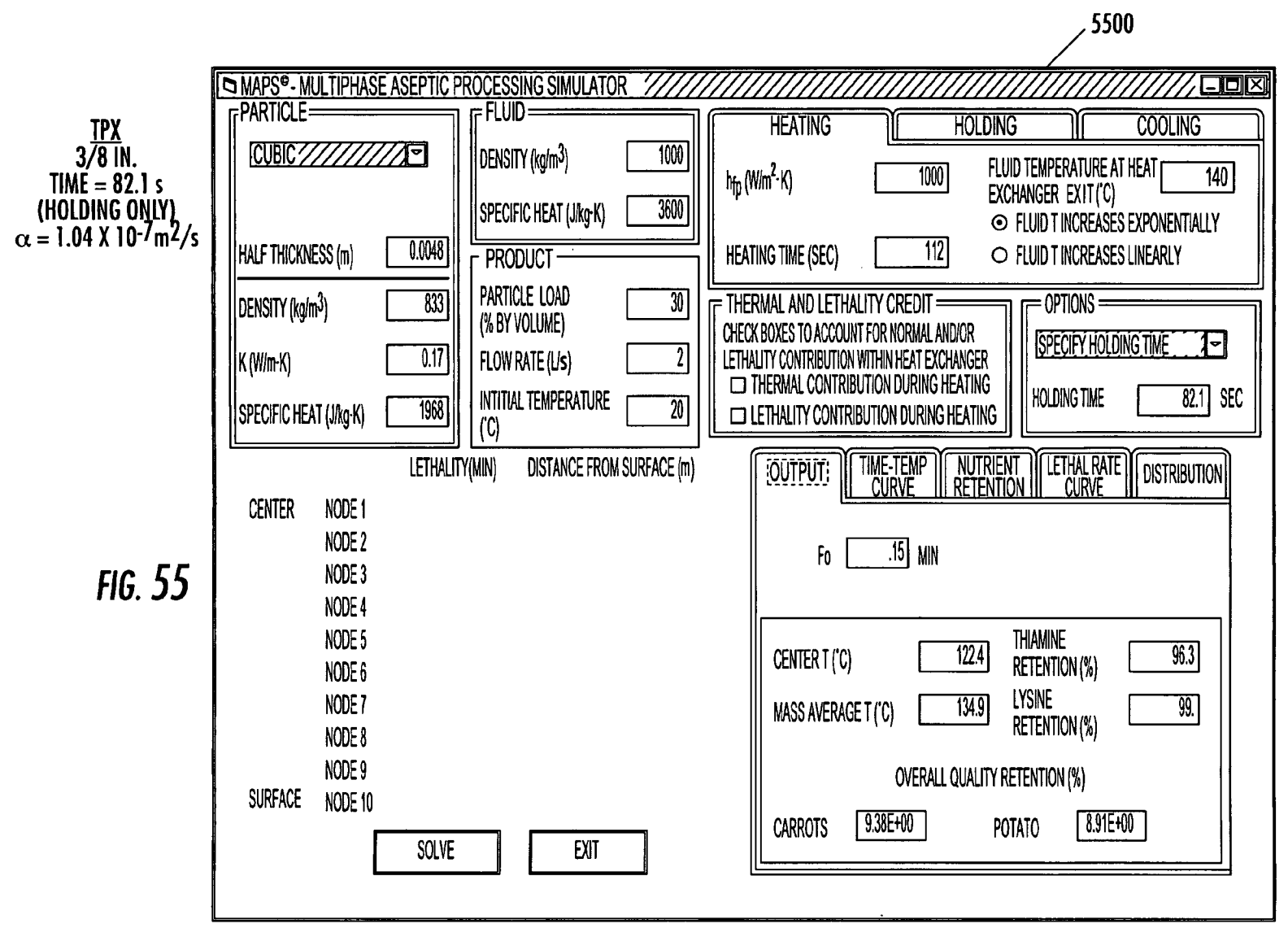

FIG. 55 illustrates a screen display 5500 showing exemplary simulation results for a ⅜ inch TPX carrier particle design. The TPX carrier particle design has a thermal diffusivity value of $1.04*10^{-7}$ m$^2$/s. The TPX carrier particle design is heated for the same length of time under the same conditions as carrier particle design 5200 (shown in FIG. 52). The holding time is set to 82.1 seconds.

Figure 56:
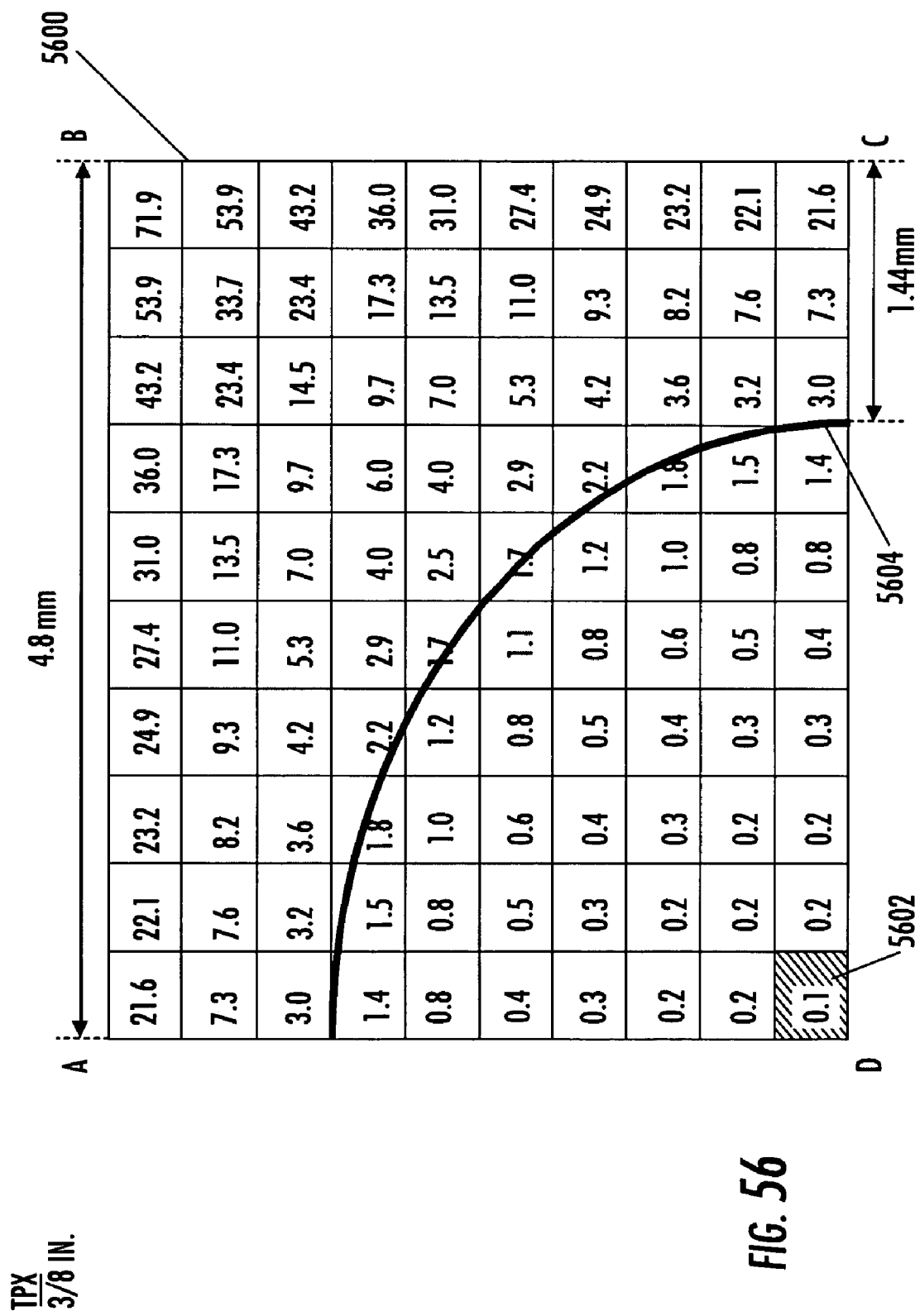

FIG. 56 illustrates a schematic diagram showing a grid 5600 of the result of heating the TPX carrier particle design of FIG. 55 in the same thermal processing simulation of the target particle. Square 5602 of grid 5600 can indicate the center of the TPX carrier particle design. The other squares of grid 5600 can indicate the result of the applied thermal process simulation from square 5602 to the exterior of the TPX carrier particle design. Line 5604 indicates dimensions for the interior cavity of the carrier particle design suitable for a carrier particle about matching the conservative behavior characteristics of the simulated potato of FIGS. 52–54. Thus, a TPX carrier particle design can be fabricated based on grid 5600. The simulation results show that the carrier particle design can match or exceed the conservative thermal characteristics of the simulated potato.

FIG. 57 illustrates a screen display 5700 showing exemplary heat simulation for a ⅜ inch nylon carrier particle design. The nylon carrier particle design has a thermal diffusivity value of $1.40*10^{-7}$ m$^2$/s. The nylon carrier particle design is heated for the same length of time under the same conditions as carrier particle design 5200 (shown in FIG. 52). The holding time is set to 82.1 seconds.

Figure 58:
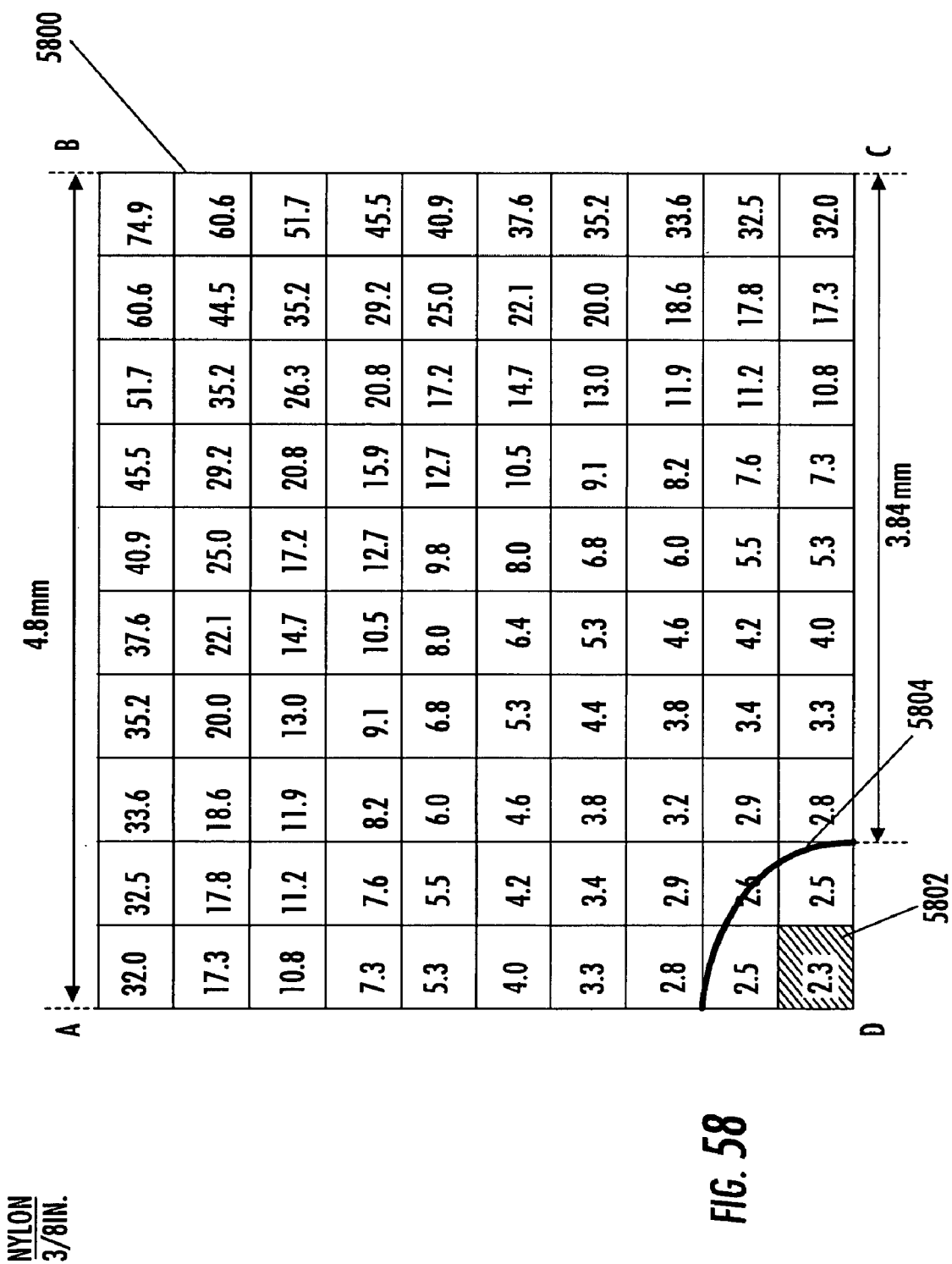

FIG. 58 illustrates a schematic diagram showing a grid 5800 of the result of heating the nylon carrier particle design of FIG. 57 in the same thermal processing simulation of the target particle. Square 5802 of grid 5800 can indicate the center of the nylon carrier particle design. The other squares of grid 5800 can indicate the result of the applied thermal process simulation from square 5802 to the exterior of the nylon carrier particle design. Line 5804 indicates dimensions for the interior cavity of the carrier particle design suitable for a carrier particle about matching the conservative behavior characteristics of the simulated potato of FIGS. 52–54. Thus, a nylon carrier particle design can be fabricated based on grid 5800. Grid 5800 indicates that the particle should have a wall thickness of about 3.84 mm. The simulation results show that the carrier particle design can match or exceed the conservative thermal characteristics of the simulated potato.

Figure 59:
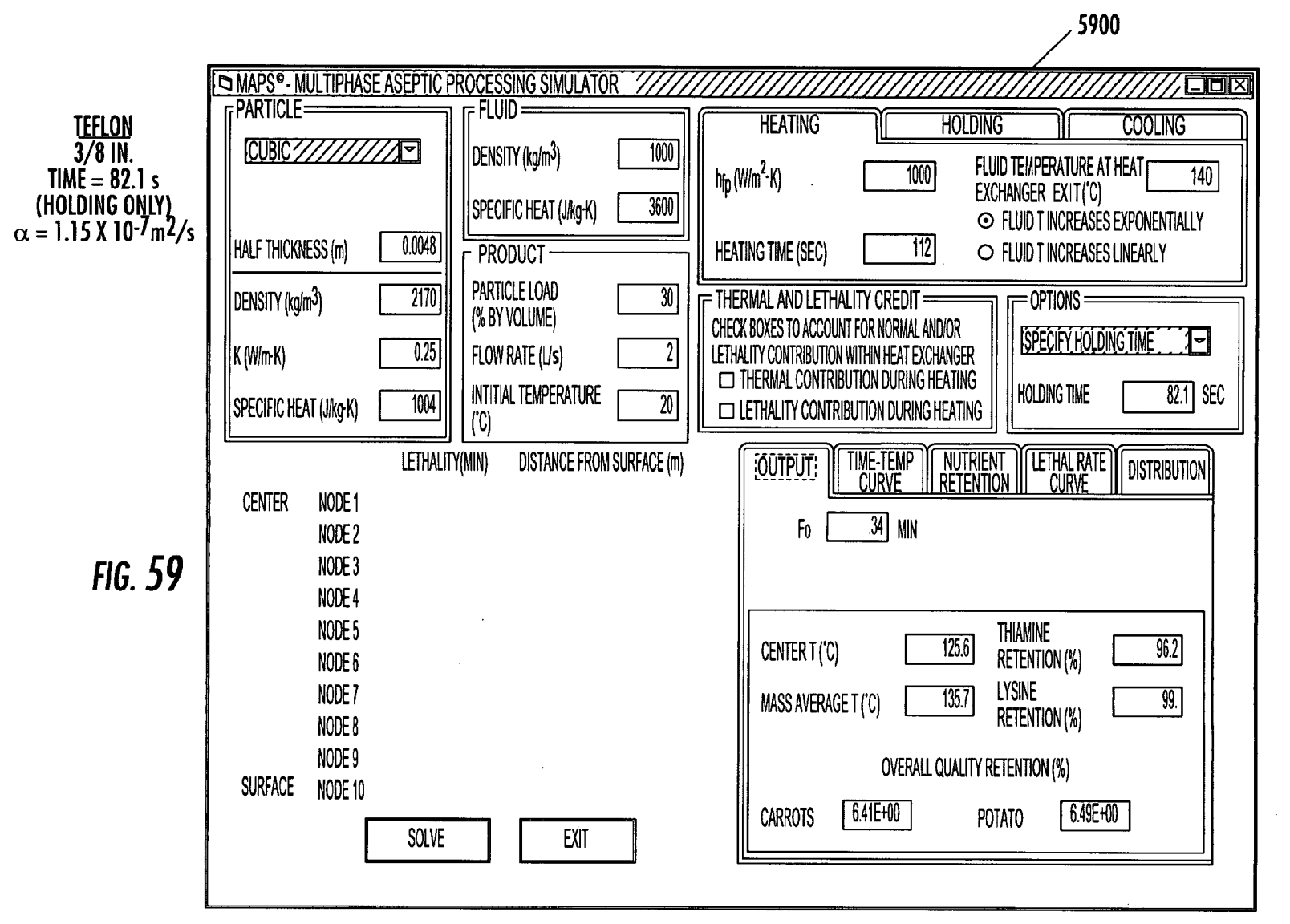

FIG. 59 illustrates a screen display 5900 showing exemplary simulation results for a ⅜ inch TEFLON™ carrier particle design. The TEFLON™ carrier particle design has a thermal diffusivity value of $1.15*10^{-7}$ m$^2$/s. The TEFLON™ carrier particle design is heated for the same length of time under the same conditions as carrier particle design 5200 (shown in FIG. 52). The holding time is set to 82.1 seconds.

Figure 60:
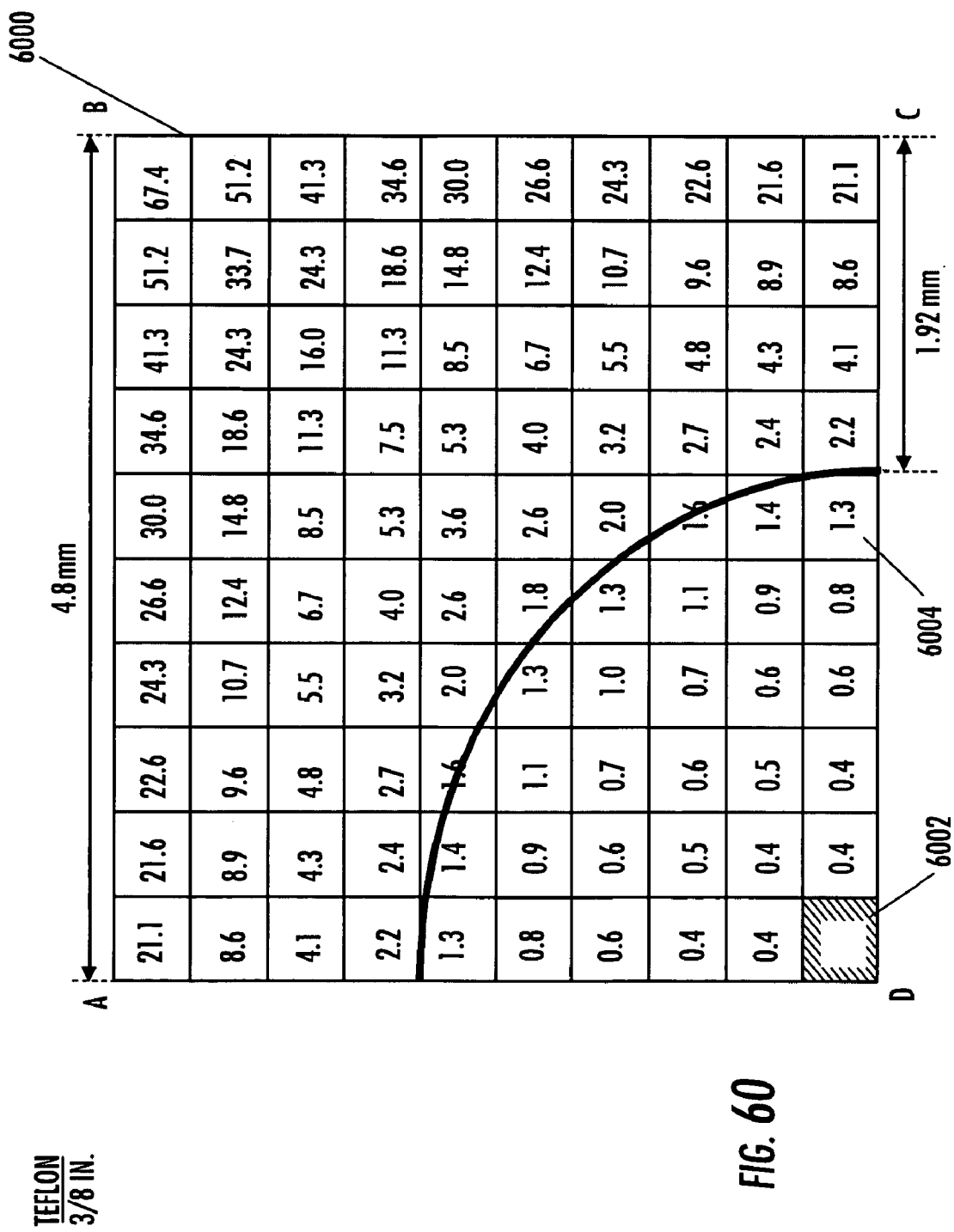

FIG. 60 illustrates a schematic diagram showing a grid 6000 of the result of heating the TEFLON™ carrier particle design of FIG. 59 in the same thermal processing simulation of the target particle. Square 6002 of grid 6000 can indicate the center of the TEFLON™ carrier particle design. The other squares of grid 6000 can indicate the result of the applied thermal process simulation from square 6002 to the exterior of the TEFLON™ carrier particle design. Line 6004 indicates dimensions for the interior cavity of the carrier particle design suitable for a carrier particle about matching the conservative behavior characteristics of the simulated potato of FIGS. 52–54. Thus, a TEFLON™ carrier particle design can be fabricated based on grid 6000. Grid 4500 indicates that the particle should have a wall thickness of about 1.92 mm. The simulation results show that the carrier particle design can match or exceed the conservative thermal characteristics of the simulated potato.

Figure 61:
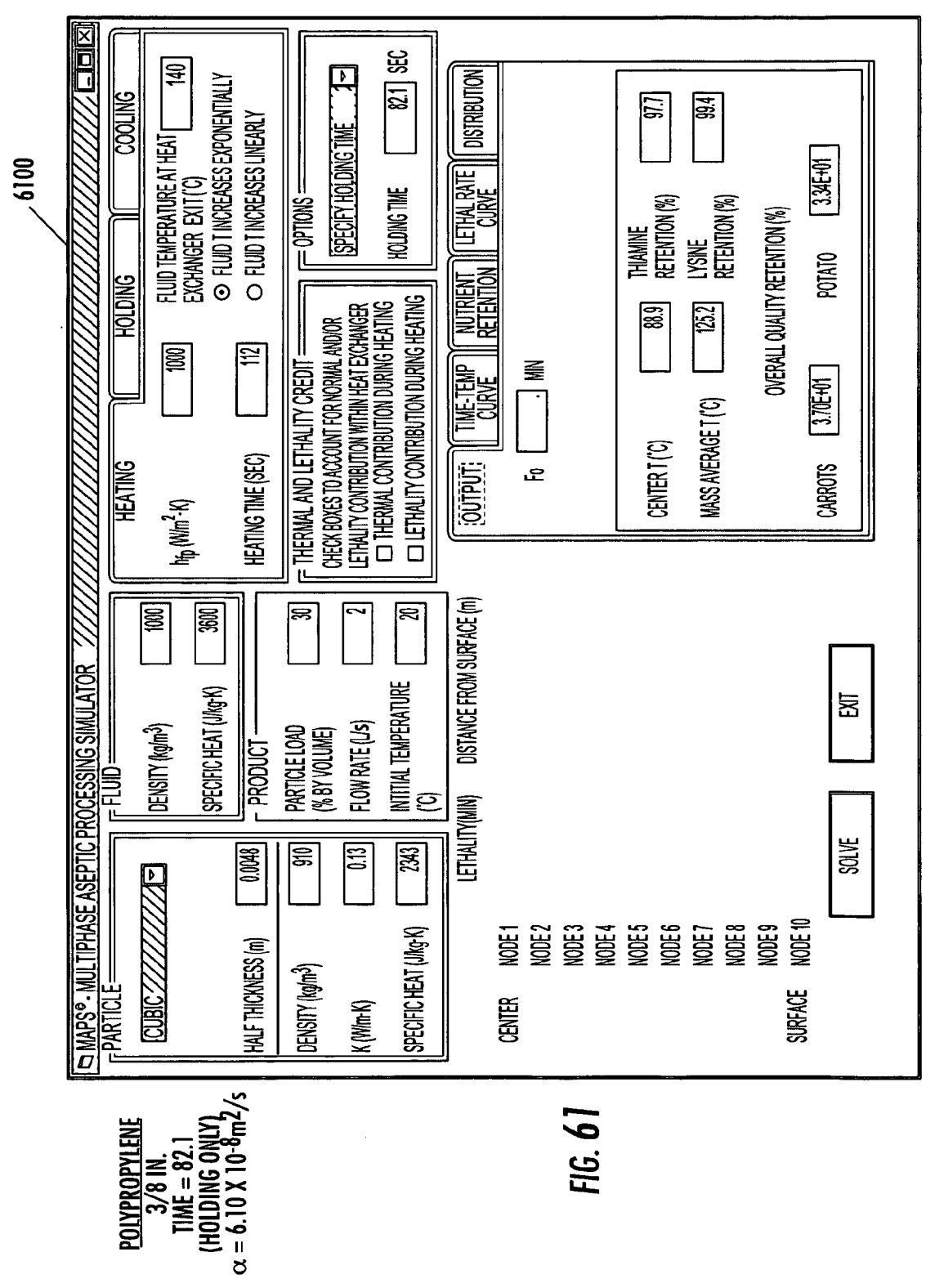

FIG. 61 illustrates a screen display 6100 showing exemplary simulation results for a ⅜ inch polypropylene carrier particle design. The polypropylene carrier particle design has a thermal diffusivity value of $1.15*10^{-7}$ m$^2$/s. The polypropylene carrier particle design is heated for the same length of time under the same conditions as carrier particle design 5200 (shown in FIG. 52). The holding time is set to 82.1 seconds.

Figure 62:
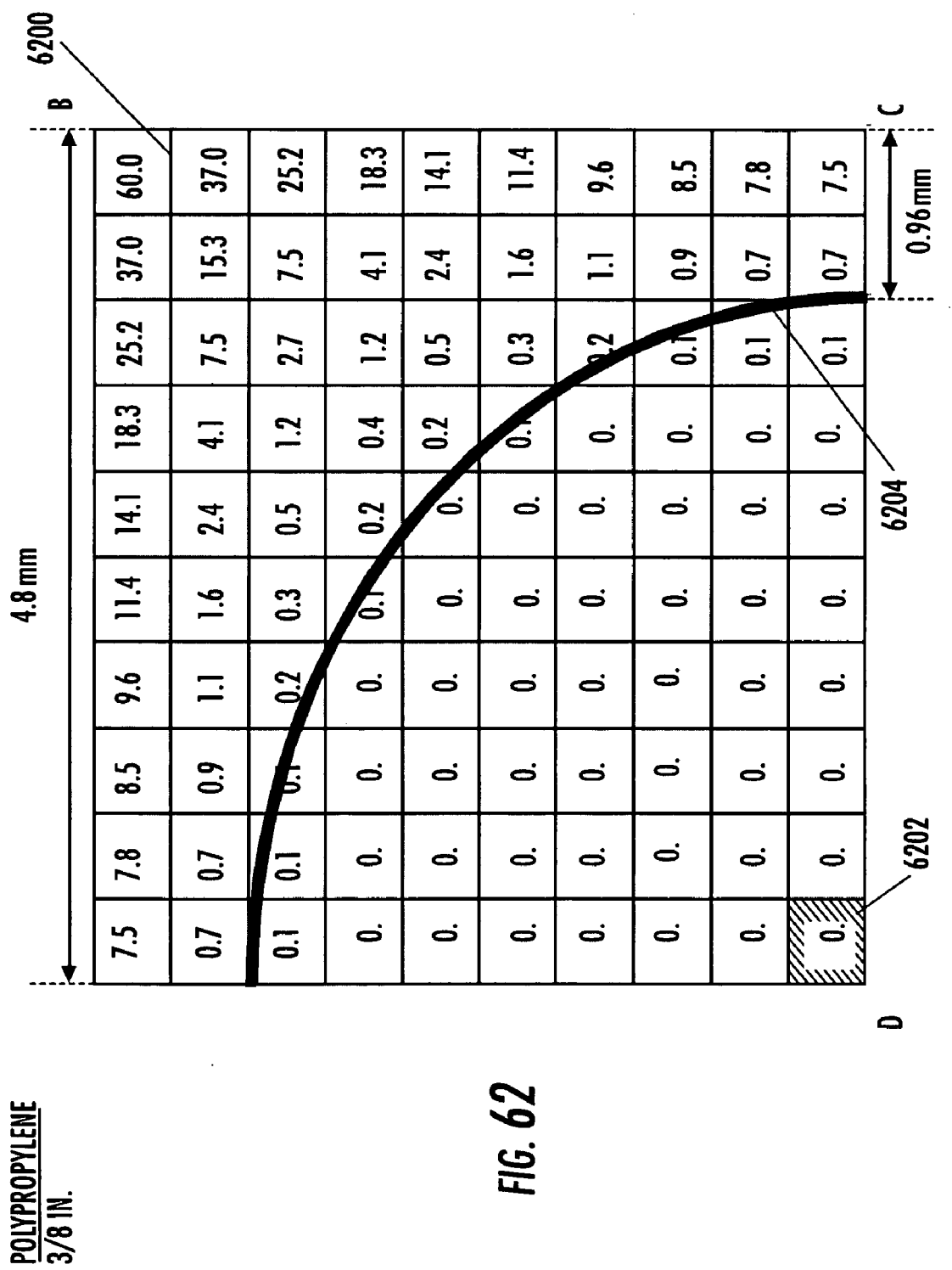

FIG. 62 illustrates a schematic diagram showing a grid 6200 of the result of heating the polypropylene carrier particle design of FIG. 61 in the same thermal processing simulation of the target particle. Square 6202 of grid 6200 can indicate the center of the polypropylene carrier particle design. The other squares of grid 6200 can indicate the result of the applied thermal process simulation from square 6202 to the exterior of the polypropylene carrier particle design. Line 6204 indicates dimensions for the interior cavity of the carrier particle design suitable for a carrier particle about matching the conservative behavior characteristics of the simulated potato of FIGS. 52–54. Thus, a polypropylene carrier particle design can be fabricated based on grid 6200.

The simulation results show that the carrier particle design can match or exceed the conservative thermal characteristics of the simulated potato.

Figure 63:
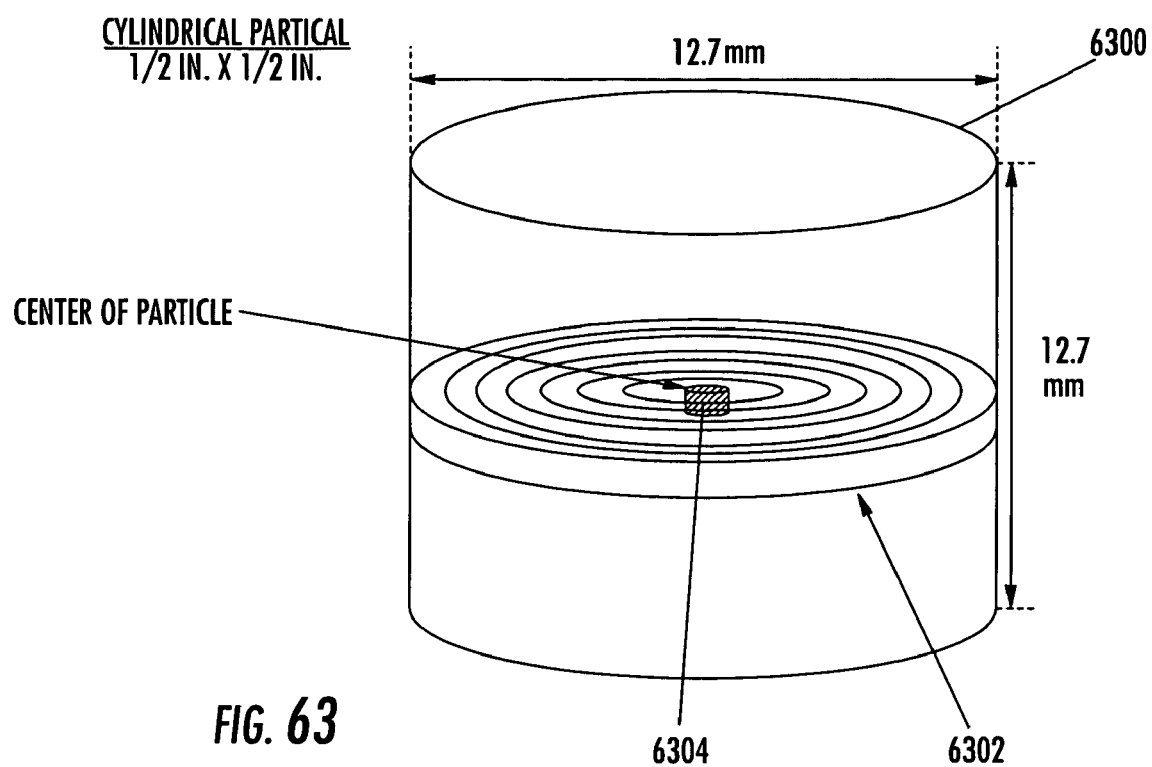

FIGS. 63–73 illustrate an exemplary procedure for simulating, calculating, and selecting carrier particle designs for carrying a detectable particle for monitoring and validation of thermal processing of a multiphase food material containing a 0.5 inch×0.5 inch, cylindrical potato. Referring specifically to FIG. 63, a schematic diagram of a cylindrical particle design, generally designated 6300, for simulation by spatial simulation engine SSE is illustrated. Cylindrical particle design 6300 can be divided into smaller cylindrical portions, generally designated 6302. Cylindrical particle design 6300 can also include a cylinder 6304 at the center of portions 6302. In this embodiment, design 6300 is divided into smaller cylindrical portions 6302 for facilitating the simulation and observation of heating from the exterior of the cylinder to the center, the area of greatest interest. Cylindrical particle design 6300 can be used in simulating heating applied to the exterior of design 6300 and observing the effect of the heating to cylinder 6304, the area of interest.

Figure 64:
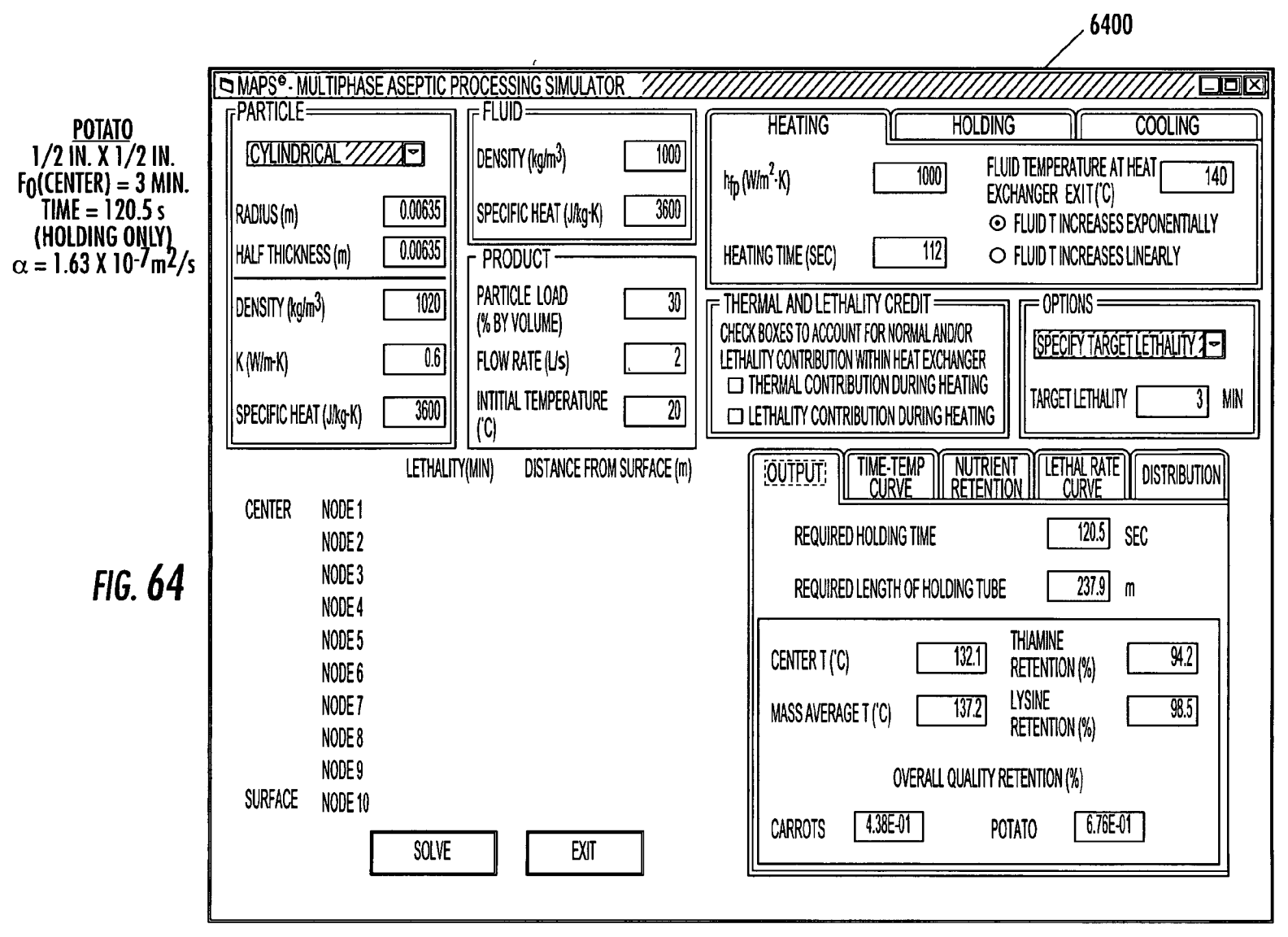

FIG. 64 illustrates a screen display 6400 showing exemplary heat simulation results for cylindrical particle design 6400 shown in FIG. 63. The required holding time is about 120.5 seconds. In this simulation embodiment, target particle design 6300 has a coefficient of thermal diffusivity of $1.63*10^{-7}$ m$^2$/s.

Figure 65:
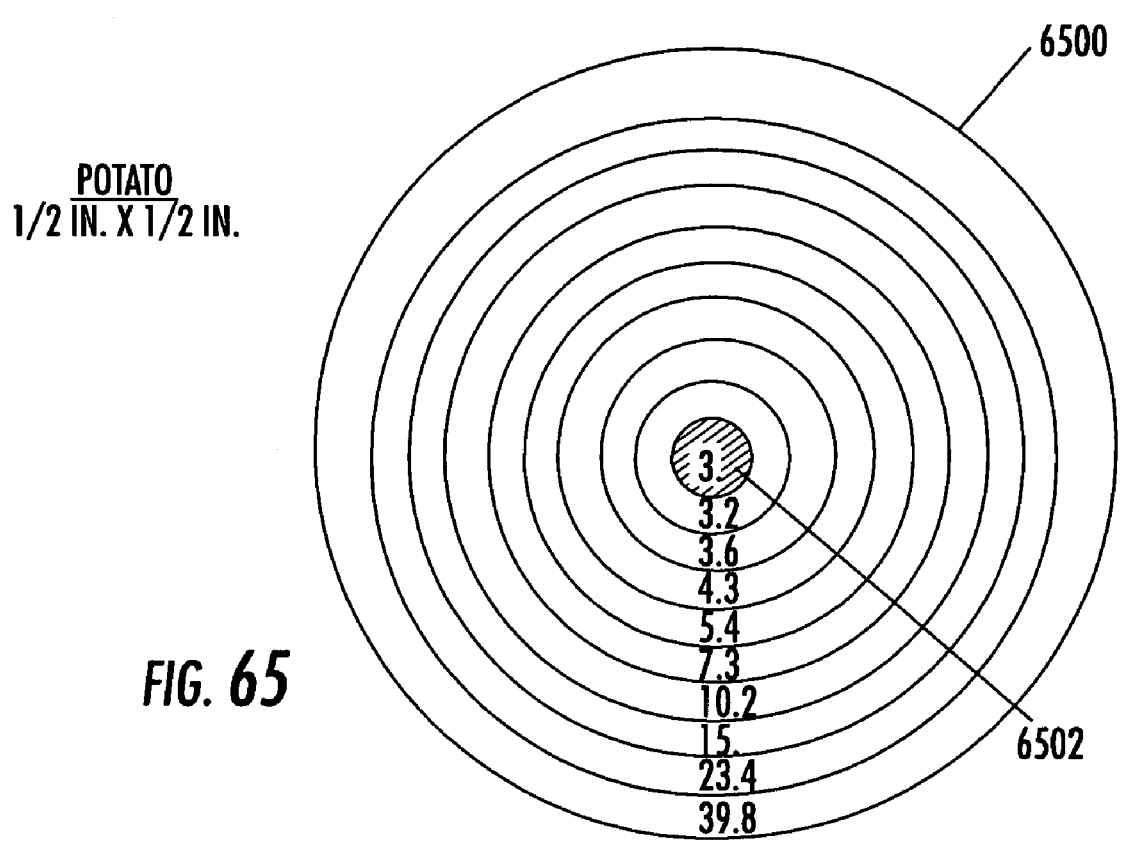

FIG. 65 illustrates a schematic diagram showing a plurality of circular portions 6500 and the result of heating each of circular portions 6500 in the thermal processing simulation. As shown, center circle 6502 achieved the desired $F_O$ treatment of 3.0 minutes.

FIG. 66 illustrates a screen display 6600 showing exemplary simulation results for a 0.5 inch TPX carrier particle design. The TPX carrier particle design has a thermal diffusivity value of $1.04*10^{-7}$ m$^2$/s. The TPX carrier particle design is heated for the same length of time under the same conditions as carrier particle design 6300 (shown in FIG. 63). The holding time is set to 120.5 seconds.

Figure 67:
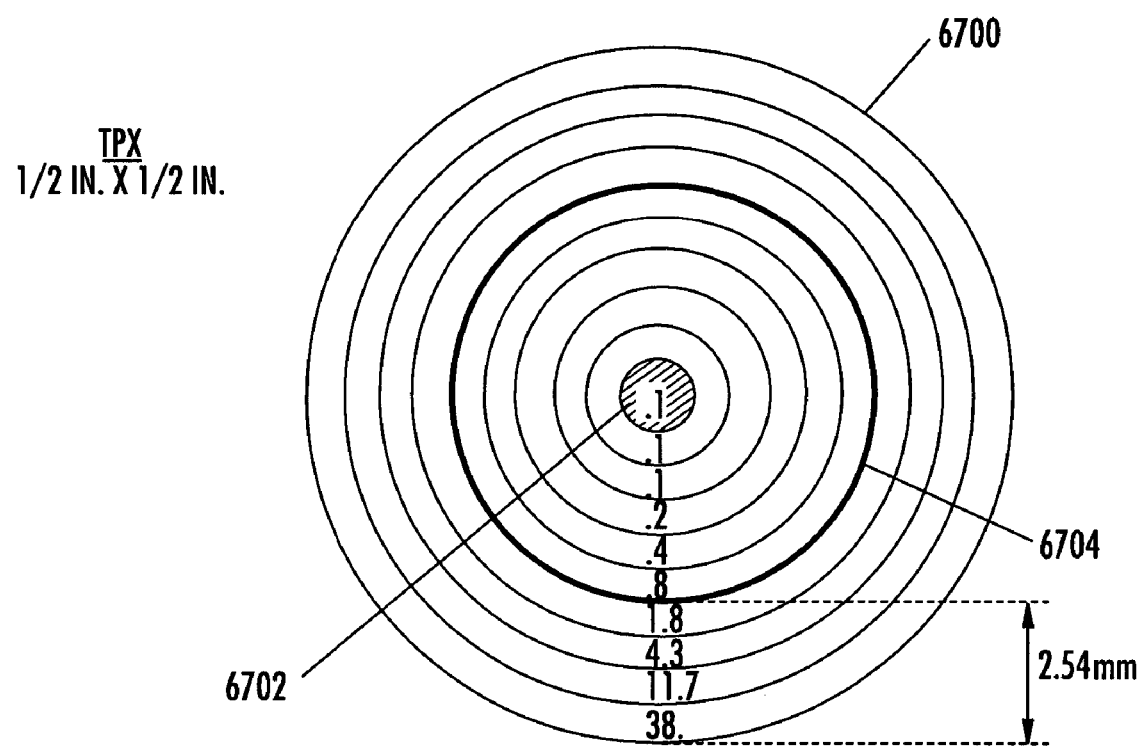

FIG. 67 illustrates a schematic diagram showing a plurality of circular portions 6700 of the result of heating the TPX carrier particle design of FIG. 66 in the same thermal processing simulation of the target particle. Center circle 6702 of portions 6700 can indicate the center of the TPX carrier particle design. The other circular portions of grid 6700 can indicate the result of the applied thermal process simulation from center circle 6702 to the exterior of the TPX carrier particle design. Line 6704 indicates dimensions for the interior cavity of the carrier particle design suitable for a carrier particle about matching the conservative behavior characteristics of the simulated potato of FIGS. 63–65. Thus, a TPX carrier particle design can be fabricated based on portions 6700. The simulation results show that the carrier particle design can match or exceed the conservative thermal characteristics of the simulated potato.

Figure 68:
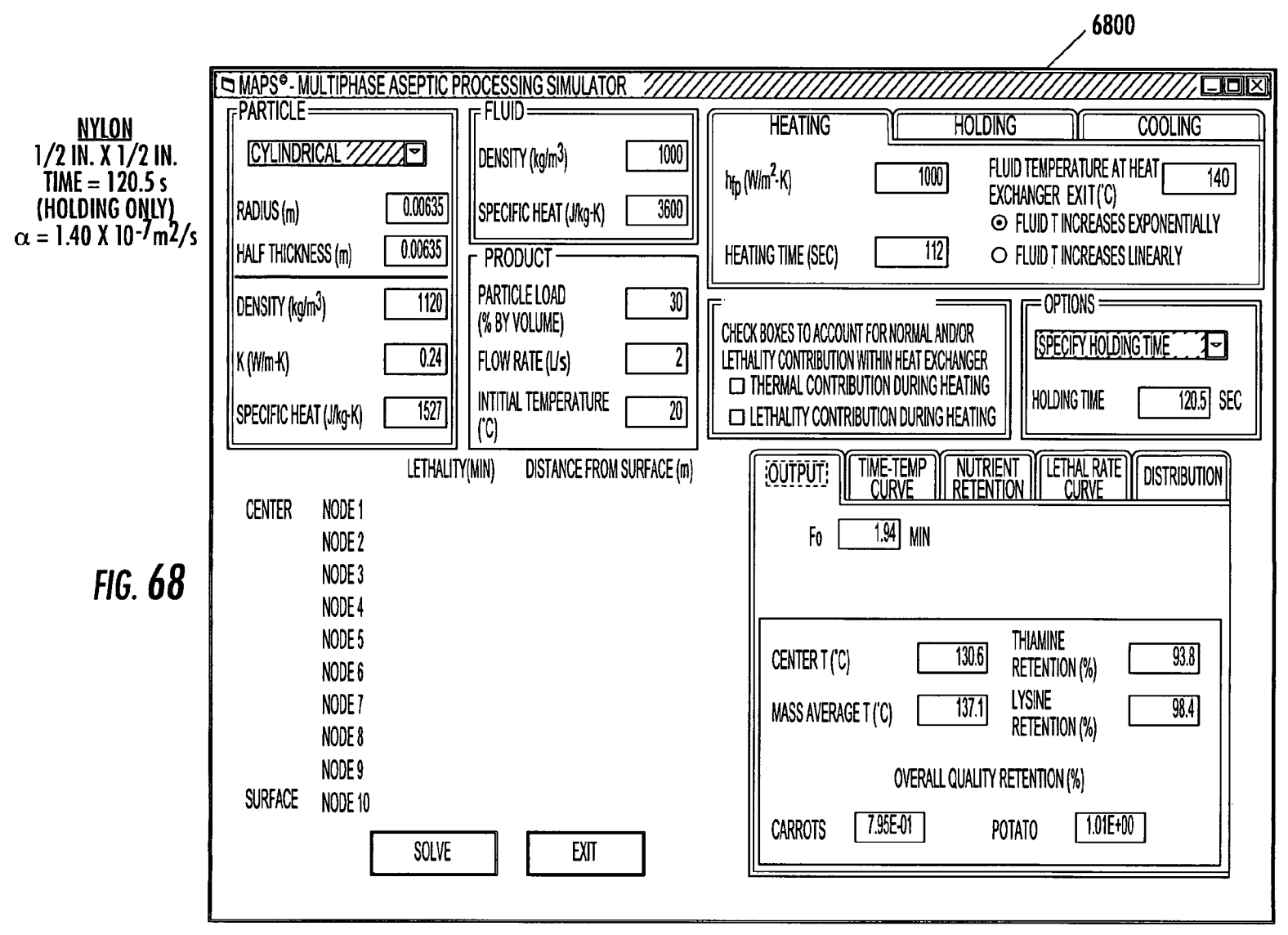

FIG. 68 illustrates a screen display 6800 showing exemplary simulation results for a 0.5 inch nylon carrier particle design. The nylon carrier particle design has a thermal diffusivity value of $1.40*10^{-7}$ m$^2$/s. The nylon carrier particle design is heated for the same length of time under the same conditions as carrier particle design 6300 (shown in FIG. 63). The holding time is set to 120.5 seconds.

Figure 69:
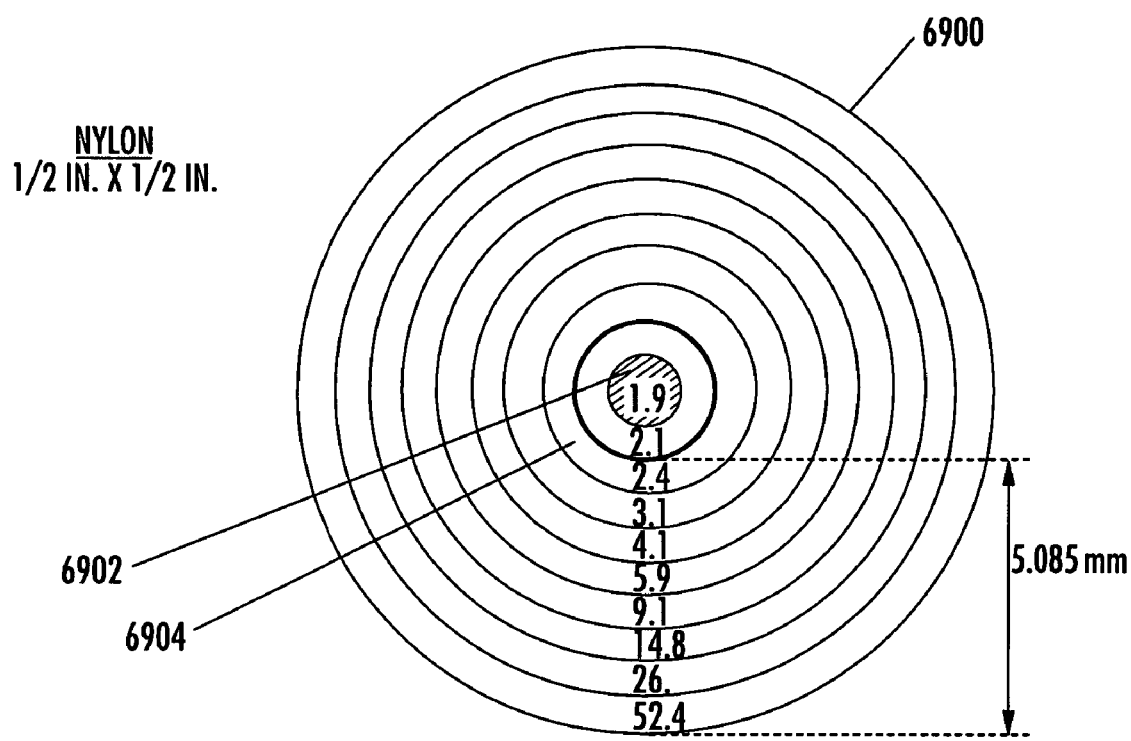

FIG. 69 illustrates a schematic diagram showing a plurality of circular portions 6900 of the result of heating the nylon carrier particle design of FIG. 46 in the same thermal processing simulation of the target particle. Circle 6902 of grid 6900 can indicate the center of the nylon carrier particle design. The other squares of portions 6900 can indicate the result of the applied thermal process simulation from circle 6902 to the exterior of the nylon carrier particle design. Line 6904 indicates dimensions for the interior cavity of the carrier particle design suitable for a carrier particle about matching the conservative behavior characteristics of the simulated potato of FIGS. 63–65. Thus, a nylon carrier particle design can be fabricated based on grid 6900. The simulation results show that the carrier particle design can match or exceed the conservative thermal characteristics of the simulated potato.

Figure 70:
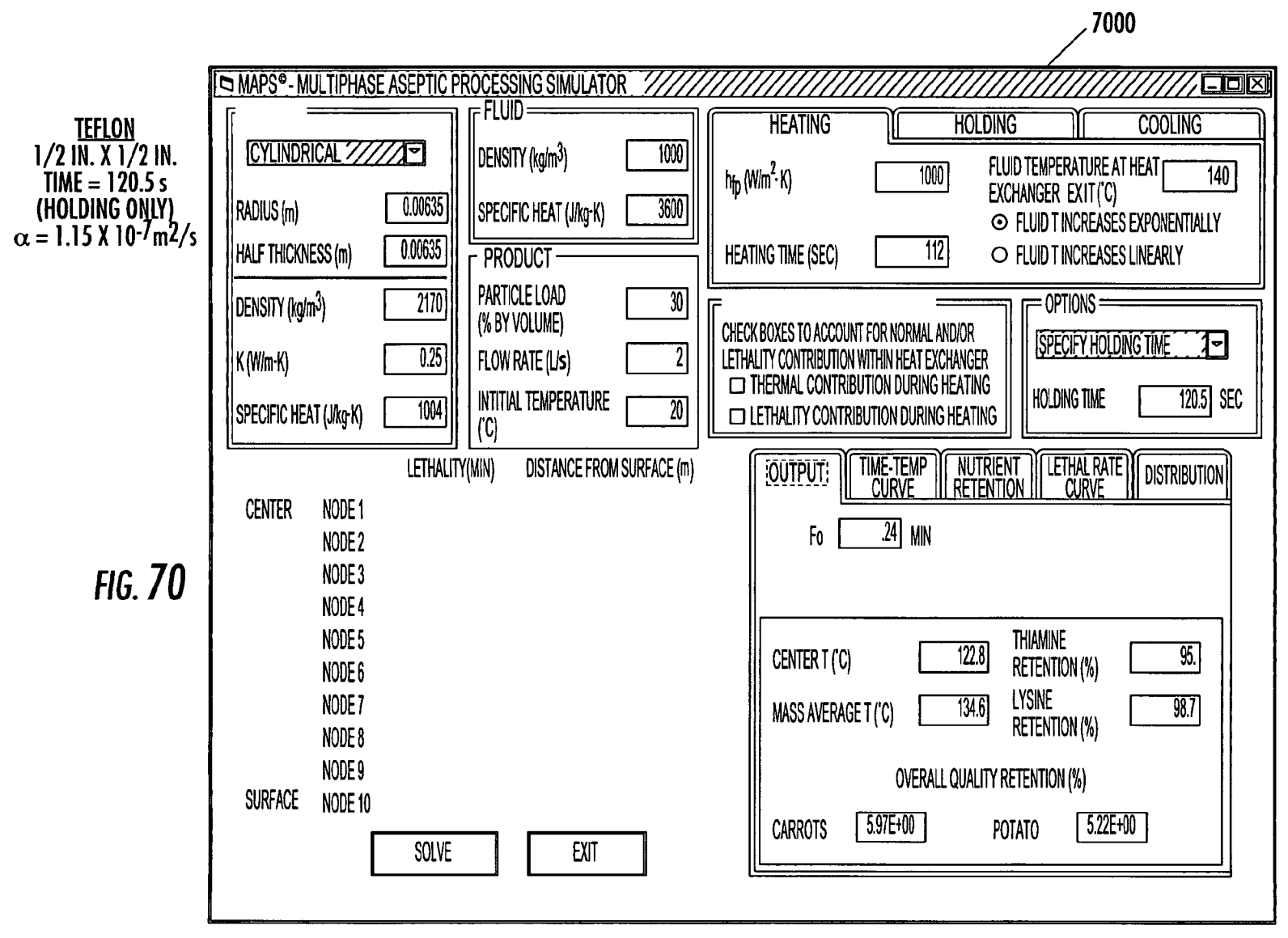

FIG. 70 illustrates a screen display 7000 showing exemplary simulation results for a 0.5 inch TEFLON™ carrier particle design. The TEFLON™ carrier particle design has a thermal diffusivity value of $1.15*10^{-7}$ m$^2$/s. The TEFLON™ carrier particle design is heated for the same length of time under the same conditions as carrier particle design 6300 (shown in FIG. 63). The holding time is set to 120.5 seconds.

Figure 71:
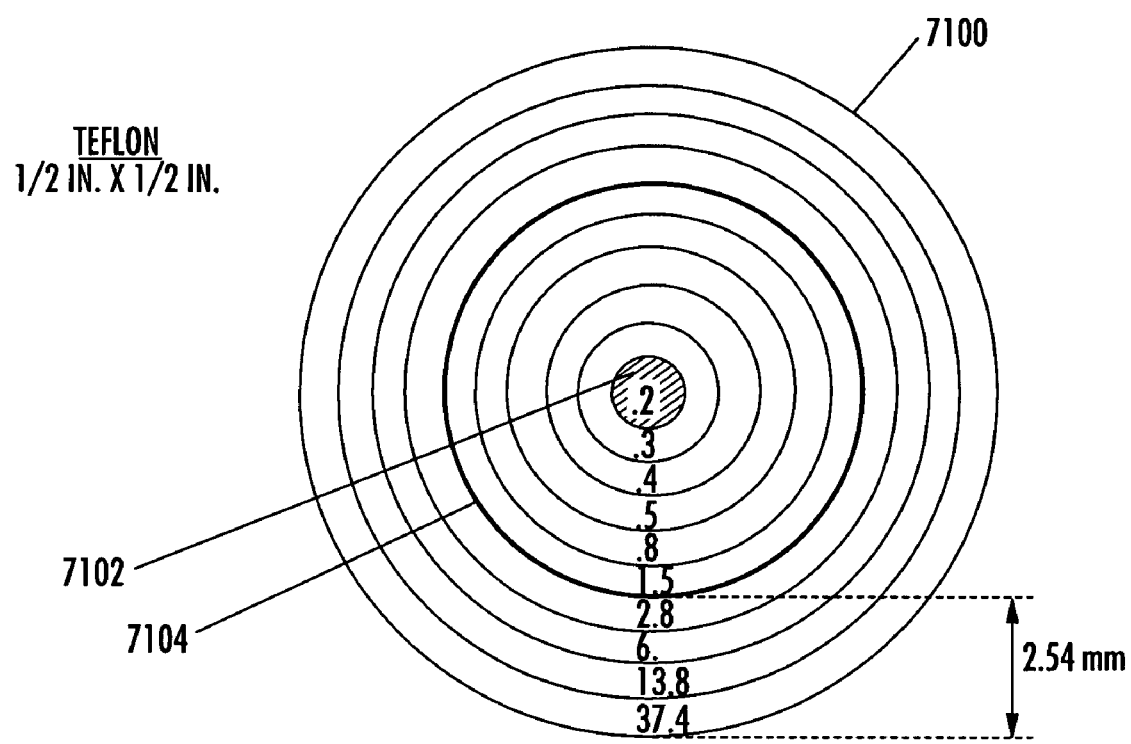

FIG. 71 illustrates a schematic diagram showing a plurality of circular portions 7100 of the result of heating the TEFLON™ carrier particle design of FIG. 66 in the same thermal processing simulation of the target particle. Circle 7102 of portions 7100 can indicate the center of the TEFLON™ carrier particle design. The other circular portions of grid 7100 can indicate the result of the applied thermal process simulation from circle 7102 to the exterior of the TEFLON™ carrier particle design. Line 4904 indicates dimensions for the interior cavity of the carrier particle design suitable for a carrier particle about matching the conservative behavior characteristics of the simulated potato of FIGS. 63–66. Thus, a TEFLON™ carrier particle design can be fabricated based on circular portions 4900. The simulation results show that the carrier particle design can match or exceed the conservative thermal characteristics of the simulated potato.

FIG. 72 illustrates a screen display 7200 showing exemplary simulation results for a 0.5 inch polypropylene carrier particle design. The polypropylene carrier particle design has a thermal diffusivity value of $1.15*10^{-7}$ m$^2$/s. The polypropylene carrier particle design is heated for the same length of time under the same conditions as carrier particle design 6300 (shown in FIG. 63). The holding time is set to 120.5 seconds.

FIG. 73 illustrates a schematic diagram showing a plurality of circular portions 7300 of the result of heating the polypropylene carrier particle design of FIG. 72 in the same thermal processing simulation of the target particle. Circle 7302 of circular portions 7300 can indicate the center of the polypropylene carrier particle design. The other squares of grid 7300 can indicate the result of the applied thermal process simulation from square 7302 to the exterior of the polypropylene carrier particle design. Line 7304 indicates dimensions for the interior cavity of the carrier particle design suitable for a carrier particle about matching the conservative behavior characteristics of the simulated potato of FIGS. 63–65. Thus, a polypropylene carrier particle design can be fabricated based on grid 7300. The simulation results show that the carrier particle design can match or exceed the conservative thermal characteristics of the simulated potato.

FIGS. 74–84 illustrate an exemplary procedure for simulating, calculating, and selecting carrier particle designs for carrying a detectable particle for monitoring and validation of thermal processing of a multiphase food material containing a ⅜ inch×⅜ inch, cylindrical potato. FIG. 74 illustrates a schematic diagram of a cylindrical particle design, generally designated 7400, for simulation by spatial simulation engine SSE. Cylindrical particle design 7400 can be divided into smaller cylindrical portions, generally designated 7402, including a cylinder 7404 at the center of particle design 7400 and other cylindrical shapes extending to the exterior of cylindrical particle design 7400. Cylindrical particle design 7400 can be used in simulating heating applied to the exterior of design 7400 and observing the effect of the heating to cylinder 7404, the area of interest.

FIG. 75 illustrates a screen display 7500 showing exemplary simulation results for cylindrical particle design 7500 shown in FIG. 74. The required holding time is about 76.0 seconds. In this simulation embodiment, target particle design 6300 has a coefficient of thermal diffusivity of $1.63*10^{-7}$ m$^2$/S.

FIG. 76 illustrates a schematic diagram showing a plurality of circular portions 7600 of the result of heating each of circular portions 7602 in the thermal processing simulation. As shown, center circle 7604 achieved the desired $F_0$ treatment of 3.0 minutes.

FIG. 77 illustrates a screen display 7700 showing exemplary simulation results for a ⅜ inch TPX carrier particle design. The TPX carrier particle design has a thermal diffusivity value of $1.04*10^{-7}$ m$^2$/s. The TPX carrier particle design is heated for the same length of time under the same conditions as carrier particle design 7400 (shown in FIG. 74). The holding time is set to 82.1 seconds.

FIG. 78 illustrates a schematic diagram showing a plurality of circular portions 7800 of the result of heating the TPX carrier particle design of FIG. 77 in the same thermal processing simulation of the target particle. Circle 7802 of circular portions 7800 can indicate the center of the TPX carrier particle design. The other circles of circular portions 7800 can indicate the result of the applied thermal process simulation from circle 7802 to the exterior of the TPX carrier particle design. Line 7804 indicates dimensions for the interior cavity of the carrier particle design suitable for a carrier particle about matching the conservative behavior characteristics of the simulated potato of FIGS. 52–54. Thus, a TPX carrier particle design can be fabricated based on circular portions 7800. The simulation results show that the carrier particle design can match or exceed the conservative thermal characteristics of the simulated potato.

FIG. 79 illustrates a screen display 7900 showing exemplary simulation results for a ⅜ inch nylon carrier particle design. The nylon carrier particle design has a thermal diffusivity value of $1.40*10^{-7}$ m$^2$/s. The nylon carrier particle design is heated for the same length of time under the same conditions as carrier particle design 7400 (shown in FIG. 74). The holding time is set to 82.1 seconds.

FIG. 80 illustrates a schematic diagram showing a plurality of circular portions 8000 of the result of heating the nylon carrier particle design of FIG. 57 in the same thermal processing simulation of the target particle. Circle 8002 of portions 8000 can indicate the center of the nylon carrier particle design. The other squares of portions 8000 can indicate the result of the applied thermal process simulation from square 8002 to the exterior of the nylon carrier particle design. Line 8004 indicates dimensions for the interior cavity of the carrier particle design suitable for a carrier particle about matching the conservative behavior characteristics of the simulated potato of FIGS. 74–76. Thus, a nylon carrier particle design can be fabricated based on grid 8000. The simulation results show that the carrier particle design can match or exceed the conservative thermal characteristics of the simulated potato.

FIG. 81 illustrates a screen display 8100 showing exemplary simulation results for a ⅜ inch TEFLON™ carrier particle design. The TEFLON™ carrier particle design has a thermal diffusivity value of $1.15*10^{-7}$ m²/s. The TEFLON™ carrier particle design is heated for the same length of time under the same conditions as carrier particle design 7400 (shown in FIG. 74). The holding time is set to 76.0 seconds.

FIG. 82 illustrates a schematic diagram showing a grid 8200 of the result of heating the TEFLON™ carrier particle design of FIG. 81 in the same thermal processing simulation of the target particle. Circle 8202 of grid 8200 can indicate the center of the TEFLON™ carrier particle design. The other circles of grid 8200 can indicate the result of the applied thermal process simulation from circle 8202 to the exterior of the TEFLON™ carrier particle design. Line 8204 indicates dimensions for the interior cavity of the carrier particle design suitable for a carrier particle about matching the conservative behavior characteristics of the simulated potato of FIGS. 74–76. Thus, a TEFLON™ carrier particle design can be fabricated based on grid 8200. The simulation results show that the carrier particle design can match or exceed the conservative thermal characteristics of the simulated potato.

FIG. 83 illustrates a screen display 8300 showing exemplary simulation results for a ⅜ inch polypropylene carrier particle design. The polypropylene carrier particle design has a thermal diffusivity value of $1.15*10^{-7}$ m²/s. The polypropylene carrier particle design is heated for the same length of time under the same conditions as carrier particle design 7400 (shown in FIG. 74). The holding time is set to 76.0 seconds.

FIG. 84 illustrates a schematic diagram showing a grid 8400 of the result of heating the polypropylene carrier particle design of FIG. 83 in the same thermal processing simulation of the target particle. Circle 8402 of circular portions 8400 can indicate the center of the polypropylene carrier particle design. The other circles of portions 8400 can indicate the result of the applied thermal process simulation from circle 8402 to the exterior of the polypropylene carrier particle design. Line 8404 indicates dimensions for the interior cavity of the carrier particle design suitable for a carrier particle about matching the conservative behavior characteristics of the simulated potato of FIGS. 74–76. Thus, a polypropylene carrier particle design can be fabricated based on portions 8400. The simulation results show that the carrier particle design can match or exceed the conservative thermal characteristics of the simulated potato.

The materials described herein for fabricating the carrier particle can have a lower thermal diffusivity than the target particle material. Materials with lower thermal diffusivity require a thinner particle wall to achieve the same degree of thermal protection for the internal carrier cavity. Nylon has a high thermal diffusivity value, and thus requires a large wall thickness to provide the same level of thermal protection as a material with a lower thermal diffusivity value. Polypropylene provides a high level of thermal protection, and thus requires a thin wall thickness to provide the same level of thermal protection as a material with a higher thermal diffusivity value.

The systems and methods described herein can provide a convenient tool for flow and thermal process monitoring for other materials and other criteria. By setting alternative (e.g., other than conservative) criteria for thermal property selections, a carrier particle can be fabricated with representative characteristics (e.g., to mimic the real behavior of present particles, rather than conservatively) or thermally "liberal" characteristics (i.e., to heat faster than the target material under identical conditions). Representatively designed carrier particles can be used in fluid and multiphase dynamics studies while "liberally" designed particles can be used to evaluate the effect of respective treatments on quality characteristics and ingredients of materials. Under this scenario, the carrier particles thus represent the "most thermally abused particle" rather than "least thermally processed particle". For quality studies, these particles can be of interest since the most abused particles typically define the quality threshold of a particular food or biomaterial product (e.g., the one with the poorest flavor, color, or post-process retained bio-activity).

According to another embodiment, display D (shown in FIG. 13) can display images related to designing a carrier particle. User interface UI (shown in FIG. 13) can also receive user input related to designing a carrier particle. Memory MEM can include computer-readable instructions for receiving input from the operator, displaying images on display D, and providing information to spatial simulation engine (shown in FIG. 13) for modeling a target and carrier particle and running thermal process simulations for the target and carrier particles as described herein. One skilled in the art will appreciate that while these systems and methods are useful for the design of carrier particles, they are not limited by the use of the computer system CS (shown in FIG. 13). The carrier particles can also be designed without the use of the computer system CS with the methodology described herein. Specifically, the carrier particles can be designed, as described above, by building and then heating particles of varying wall thicknesses under same experimental conditions as the food particle that is being conservatively emulated. The particle design with the heating characteristics most similar to the target food can then be selected as a desirable carrier particle. Experimental confirmation (under concurrent heating) of the conservative nature for a simulated vs. real particle will be employed regardless of which design basis is implemented (i.e., software design vs. experimental design of multiple wall thickness increments). However, the software and systems described herein can be advantageously used to computes the wall thickness required for the minimally conservative design of a carrier particle as well as other design parameters for the particle, thus providing artisans with a convenient and automatic tool for particle design.

One embodiment of methods, systems, and computer-readable instructions described herein is referred to as the "CPDesign" approach. The CPDesign approach can integrate the sequential steps of particle design into one single application. Referring to FIG. 85, a flow chart, generally designated 8500, is shown which illustrates a process for designing a carrier particle having characteristics about matching the conservative behavior characteristics of a selected target particle. The process begins at the step indicated by reference numeral 8502. In step 8504, spatial simulation engine SSE (shown in FIG. 13) can simulate heating of a target food particle until a target lethality is accumulated at the cold spot. Next, at step 8506, under similar conditions, a carrier particle constructed of a suitable material can be simulated during the same time period. At step 8508, the spatial lethality distribution within the polymer particle can be examined to determine the appropriate (minimally conservative) thickness of the wall between the interior cavity for holding a detectable particle and the exterior of the carrier particle.

Next, in step 8510, the weight of the detectable particle and any added ballast needed to achieve the target density of the carrier particle can be calculated. The density of the carrier fluid can be determined experimentally or calculated based on the projected thermal history in the hold tube ($\rho_{fluid}$). The maximum weight of the fabricated carrier particle (containing all implant and any ballast materials) can be calculated assuming that the critical particle density is the same as the carrier fluid (neutrally buoyant particle); or preferably slightly lower (by 0.5% or less) than the carrier fluid (a slightly buoyant particle). This can be achieved by multiplying the volume of the selected target particle shape and size by the carrier fluid density reduced by 0.5% or less. Therefore, the following equation results: $W_{max}=V_{particle}*\rho_{fluid}*0.9995$. Critical particle density is a density which provides the highest likelihood that the particle can have conservative (fast moving) flow particles.

From this maximum particle weight, maximum implant weight can be calculated by subtracting the weight of the thermally conservative carrier particle shell from the maximum particle weight with the following equation: $W_{max\text{-}implant}=W_{max}-W_{carrier\ shell}$, wherein $W_{carrier\ shell}=(V_{particle}*\rho_{fluid})-(V_{caviti}*\rho_{polymer})$. The weight of the carrier shell (or particle) can be calculated by subtracting the weight of the polymer material removed in order to create a carrier cavity within the thermally conservative particle from the weigth of the particle having a target shape and dimensions constructed from a solid particle material. The polymer material for the fabrication of the carrier particle can be selected so that the maximum weight of the implants is maximized, i.e., in addition to the conservative properties of the carrier shell, density of the polymer material can be lower than the carrier fluid. This allows for the maximization of implant weight and subsequent easier detection or reading of traceable or recordable signals from the implants. Therefore, the total integrated maximum particle weight is given by the following equation: $W_{max}=W_{carrier\ shell}+W_{implant}+W_{ballast}$.

Referring to FIG. 85, the process can then stop at step 8512. In particular, heating of a target food particle can be simulated particle until a user-specified lethality is achieved at the center of particle. At the end of this first step, a heating time is determined to be used in the simulation of the heating of a polymer material under identical heating conditions. Then, by examining the spatial lethality distribution within the polymer particle, an appropriate wall thickness can be determined. By knowing the thermophysical properties, shape, and characteristic dimensions of the targeted food and the carrier particle material, and given known process variables (e.g., initial temperature of particle, ambient temperature, fluid-to-particle heat transfer coefficient, and desired $F_0$ at the center of food particle) wall thickness of the polymer particle can be determined.

According to one embodiment, a CPDesign method warns the user if a conservative carrier particle design for the given polymer material and process variables is not possible. If this is the case, the user is prompted to either select a different polymer material or slightly increase the dimension of the polymer particle.

Calculation of the implant weight that can be placed inside the cavity is another important capability of the program, as it relates to conservative flow behavior of the carrier particle, which can be established in the process design.

In some embodiments, a CPDesign method can be used to monitor thermal processing of other materials based on other criteria by adjusting the density and dimension characteristics of the fabricated carrier particle.

According to one embodiment, computer-readable instructions can be based on the WINDOWS® operating system (available from Microsoft Corporation of Redmond, Wash., United States of America). Simulation results can be saved to memory MEM (shown in FIG. 13) and printed via a suitable printer (not shown).

FIGS. 86–90B illustrate exemplary screen displays of the CPDesign application for a computer system (such as computer system CS shown in FIG. 13). Referring to FIG. 86, a screen display 8600 of the CPDesign application providing a dropdown menu 8602 for selecting a target food particle for simulation is illustrated. The target food particles for selection by menu 8602 can include potato, carrot, and any other suitable food product.

Referring to FIG. 87, a screen display 8700 of the CPDesign application providing a menu for receiving operator input for designing a carrier particle. In this example, a potato is selected as the target food particle. Further, in this example, the carrier particle material is selected as TPX, and the carrier particle shape is selected as cylindrical. Screen display 8700 also shows characteristic information for a potato and TPX material, including density, thermal conductivity, and specific heat. The operator can also enter dimensions for the cylindrical-shaped carrier particle and cylindrical-shaped, potato, target particle. Additionally, the operator can enter an initial particle temperature, ambient temperature, heat transfer coefficient, and desired $F_0$. The operator can also enter information regarding the maximum density of the target particle. After the operator enters this information, computer system CS can determine the maximum weight of the implant (i.e., combination of the detectable and carrier particles). The results of the simulation can be printed.

FIGS. 88A and 88B illustrate screen displays 8800 and 8802, respectively, of the CPDesign application providing the results of the information entered in screen display 8700 of FIG. 87. Referring to FIG. 88B, line 8804 indicates the minimally conservative wall of a cylindrical carrier particle having the entered information. In this example, the wall thickness is determined to be 2.67 millimeters.

FIGS. 89A and 89B illustrate screen displays 8900 and 8902, respectively, of the CPDesign application providing exemplary results of other simulation information entered by an operator. In this example, the carrier particle has a cubical exterior and a spherical interior cavity. Screen display 8902 includes line 8904 indicating the minimally conservative wall of a cylindrical carrier particle having the entered information. In this example, the wall thickness is determined to be 1.91 millimeters.

FIGS. 90A and 90B illustrate screen displays 9000 and 9002, respectively, of the CPDesign application providing exemplary results of other simulation information entered by an operator. In this example, the carrier particle has a cubical exterior and a spherical interior cavity. Screen display 9002 includes line 9004 indicating the minimally conservative wall of a cylindrical carrier particle having the entered information. In this example, the wall thickness is determined to be 1.91 millimeters.

It will be understood that various details of the presently disclosed subject matter can be changed without departing from the scope of the presently disclosed subject matter. Furthermore, the foregoing description is for the purpose of illustration only, and not for the purpose of limitation.

What is claimed is:

1. A magnetically detectable particle for generating a temperature measurement for a batch or a continuous stream of material, the particle comprising:
   (a) a first and second magnet each comprising a positive and negative pole; and
   (b) an adhesive having a release temperature and operable to attach one or both of the positive and negative poles of the first magnet proximate to the same polarity pole of the second magnet or to attach one of the positive and negative poles of the first magnet between the poles of the second magnet below the release temperature such that a first magnetic field is generated by the first and second magnet, and operable to release the first and second magnets from one another above the release temperature,
   wherein the first and second magnets move with respect to one another when the adhesive releases the first and second magnets such that one of the positive and negative poles of the first magnet moves toward the opposing polarity pole of the second magnet for generating a second magnetic field different than the first magnetic field to indicate a temperature measurement for the batch or continuous stream.

2. The magnetically detectable particle of claim 1, wherein the first magnetic field has a first magnetic field strength, wherein the first and second magnets have a second and third magnetic field strength, respectively, wherein the second magnetic field strength is about the same as the third magnetic field strength such that the first magnetic field strength is about zero when one of the positive and negative poles of the first magnet is attached to the same polarity pole of the second magnet.

3. The magnetically detectable particle of claim 1, wherein the first magnetic field has a first magnetic field strength, wherein the first and second magnets comprise a second and third magnetic field strength, respectively, wherein the second magnetic field strength is greater than the third magnetic field strength such that the first magnetic field strength is detectable when one of the positive and negative poles of the first magnet is attached to the same polarity pole of the second magnet.

4. The magnetically detectable particle of claim 1, wherein the first and second magnets can comprise a material selected from the group consisting of neodymium iron boron, cobalt rare earth, aluminum-based, ceramic, organic, plastic-embedded metal or ceramic, neodymium-iron-boron grades, and combinations thereof.

5. The magnetically detectable particle of claim 1, wherein the adhesive comprises a material selected from the group consisting of glue materials, metallic alloys, single or multi-component epoxies, epoxy films, thermo-resistant cyanoacrylate adhesives, and combinations thereof.

6. The magnetically detectable particle of claim 1, wherein the adhesive comprises a material selected from the group consisting of indium, bismuth, tin, lead, cadmium, silver, and combinations thereof.

7. The magnetically detectable particle of claim 1, wherein the adhesive comprises a metal alloy and a first and second thermo-resistant adhesive, wherein the metal alloy is attached to the first and second magnets via the first and second thermo-resistant adhesive, respectively.

8. The magnetically detectable particle of claim 1, wherein the release temperature is a conservative temperature.

9. The magnetically detectable particle of claim 1, wherein the adhesive comprises a release temperature of about between −40° C. and 1000° C.

10. The magnetically detectable particle of claim 9, wherein the carrier particle defines an interior cavity for holding the adhesive and the first and second magnets.

11. The magnetically detectable particle of claim 1, comprising a carrier particle.

12. The magnetically detectable particle of claim 11, wherein the carrier particle comprises conservative behavior characteristics in a batch or continuous stream of material.

13. The magnetically detectable particle of claim 1, wherein the first and second magnets comprise a series of magnets each comprising a positive and negative pole, wherein opposing polarity poles of the magnets in series are attached.

14. A method of generating a temperature measurement for a batch or a continuous stream of material, the method comprising:
   (a) providing a magnetically detectable particle comprising:
      (i) a first and second magnet each comprising a positive and negative pole; and
      (ii) an adhesive having a release temperature and operable to attach one of the positive and negative poles of the first magnet to the same polarity pole of the second magnet or between the poles of the second magnet below the release temperature such that a first magnetic field is generated by the first and second magnet, and operable to release the first and second magnets from one another above the release temperature,
   wherein the first and second magnets move with respect to one another when the adhesive releases the first and second magnets such that one of the positive and negative poles of the first magnet moves toward the opposing polarity pole of the second magnet for generating a second magnetic field different than the first magnetic field to indicate a temperature measurement for the batch or continuous stream;
   (b) inserting the detectable particle provided in step (a) into the batch or continuous stream; and
   (c) detecting a change in magnetic field strength of the detectable particle to thereby generate a temperature measurement for the batch or continuous stream.

15. The method of claim 14, wherein the first magnetic field has a first magnetic field strength, wherein the first and second magnets comprise a second and third magnetic field strength, respectively, wherein the second magnetic field strength is about the same as the third magnetic field strength such that the first magnetic field strength is about zero when one of the positive and negative poles of the first magnet is attached to the opposing polarity positive or negative pole of the second magnet.

16. The method of claim 14, wherein the first magnetic field has a first magnetic field strength, wherein the first and second magnets comprise a second and third magnetic field strength, respectively, wherein the second magnetic field strength is greater than the third magnetic field strength such that the first magnetic field strength is detectable when one of the positive and negative poles of the first magnet is attached to the opposing polarity positive or negative pole of the second magnet.

17. The method of claim 14, wherein the first and second magnets can comprise a material selected from the group consisting of neodymium iron boron, cobalt rare earth, aluminum-based, ceramic, organic, plastic-embedded metal or ceramic, neodymium-iron-boron grades, and combinations thereof.

18. The method of claim 14, wherein the adhesive comprises a material selected from the group consisting of glue materials, metallic alloys, single or multi-component epoxies, epoxy films, thermo-resistant cyanoacrylate adhesives, and combinations thereof.

19. The method of claim 14, wherein the adhesive comprises a metal alloy and a first and second thermo-resistant adhesive, wherein the metal alloy is attached to the first and second magnets via the first and second thermo-resistant adhesive, respectively.

20. The method of claim 14, wherein the adhesive comprises a material selected from the group consisting of indium, bismuth, tin, lead, cadmium, silver, and combinations thereof.

21. The method of claim 14, wherein the release temperature is a conservative temperature.

22. The method of claim 14, wherein the adhesive comprises a release temperature of about between −40° C. and 1000° C.

23. The method of claim 14, comprising a carrier particle.

24. The method of claim 23, wherein the carrier particle defines an interior cavity for holding the detectable particle.

25. The method of claim 24, wherein the carrier particle comprises conservative behavior characteristics in a batch or continuous stream of material.

26. The method of claim 14, wherein the first and second magnets comprise a series of magnets each comprising a positive and negative pole, wherein opposing polarity poles of the magnets in series are attached.

27. The method of claim 14, wherein a change from the first magnetic field to the second magnetic field is detected via a sensor positioned proximate to the batch or stream.

28. The method of claim 27, wherein the change is detected via a plurality of sensors positioned proximate to the batch or stream.

29. The method of claim 14, comprising detecting wherein a change from the first magnetic field to the second magnetic field over a predetermined period of time, a predetermined length of a continuous stream, or combinations thereof.

30. The method of claim 29, wherein the change in magnetic field strength is detected via a plurality of successive, parallel, or overlapping sensors positioned proximate to the continuous stream over the predetermined length of the continuous stream.

31. The method of claim 14, wherein the continuous stream is a particulate-containing food product passing through a thermal processing apparatus.

32. The method of claim 14, comprising recording data associated with the detecting of the change in magnetic field strength.

33. The method of claim 32, wherein the data is stored for documentation, retrieval, analysis, or combinations thereof.

34. The method of claim 33, comprising retrieving the data, analyzing the data, or combinations thereof.

35. A system for generating a temperature measurement for a batch or a continuous stream of material, the system comprising:
  (a) a magnetically detectable particle comprising:
    (i) a first and second magnet each comprising a positive and negative pole; and
    (ii) an adhesive having a release temperature and operable to attach one of the positive and negative poles of the first magnet to the same polarity pole of the second magnet or between the poles of the second magnet below the release temperature such that a first magnetic field is generated by the first and second magnet, and operable to release the first and second magnets from one another above the release temperature,
    wherein the first and second magnets move with respect to one another when the adhesive releases the first and second magnets such that one of the positive and negative poles of the first magnet moves toward the opposing polarity pole of the second magnet for generating a second magnetic field different than the first magnetic field to indicate a temperature measurement for the batch or continuous stream; and
  (b) a detector for detecting a change from the first magnetic field to the second magnetic field to thereby generate a temperature measurement for the batch or continuous stream.

36. The system of claim 35, wherein the first magnetic field has a first magnetic field strength, wherein the first and second magnets comprise a second and third magnetic field strength, respectively, wherein the second magnetic field strength is about the same as the third magnetic field strength such that the first magnetic field strength is about zero when one of the positive and negative poles of the first magnet is attached to the opposing polarity positive or negative pole of the second magnet.

37. The system of claim 35, wherein the first magnetic field has a first magnetic field strength, wherein the first and second magnets comprise a second and third magnetic field strength, respectively, wherein the second magnetic field strength is greater than the third magnetic field strength such that the first magnetic field strength is detectable when one of the positive and negative poles of the first magnet is attached to the opposing polarity positive or negative pole of the second magnet.

38. The system of claim 35, wherein the first and second magnets can comprise a material selected from the group consisting of neodymium iron boron, cobalt rare earth, aluminum-based, ceramic, organic, plastic-embedded metal or ceramic, neodymium-iron-boron grades, and combinations thereof.

39. The system of claim 35, wherein the adhesive comprises a material selected from the group consisting of glue materials, metallic alloys, single or multi-component epoxies, epoxy films, thermo-resistant cyanoacrylate adhesives, and combinations thereof.

40. The system of claim 35, wherein the adhesive comprises a metal alloy and a first and second thermo-resistant adhesive, wherein the metal alloy is attached to the first and second magnets via the first and second thermo-resistant adhesive, respectively.

41. The system of claim 35, wherein the adhesive comprises a material selected from the group consisting of indium, bismuth, tin, lead, cadmium, silver, and combinations thereof.

42. The system of claim 35, wherein the release temperature is a conservative temperature.

43. The system of claim 35, wherein the adhesive comprises a release temperature of about between −40° C. and 1000° C.

44. The system of claim 35, comprising a carrier particle.

45. The system of claim 44, wherein the carrier particle defines an interior cavity for holding the detectable particle.

46. The system of claim 45, wherein the carrier particle comprises conservative behavior characteristics in a batch or continuous stream of material.

47. The system of claim 35, wherein the first and second magnets comprise a series of magnets each comprising a positive and negative pole, wherein opposing polarity poles of the magnets in series are attached.

48. The system of claim 35, wherein the detectable particle comprises a density adjusted to a predetermined target density.

49. The system of claim 48, wherein the target density is that density with the highest likelihood of including the fastest particle.

50. The system of claim 35, wherein the detectable particle further comprises a wall having a thickness, size, shape, composition or combination thereof that imparts a conservative heat transfer characteristic to the detectable particle.

51. The system of claim 35, wherein the detector comprises a magnetic sensor adapted for positioning proximate to the batch or stream.

52. The system of claim 35, comprising a data recorder for recording data detected by the detector.

53. The system of claim 52, comprising a memory operable to store data for documentation, retrieval, analysis, or combinations thereof.

54. A method of generating a temperature measurement for a batch or a continuous stream of material, the method comprising:
(a) providing a plurality of magnetically detectable particles, each particle comprising:
  (i) a first and second magnet each comprising a positive and negative pole; and
  (ii) an adhesive having a release temperature and operable to attach one of the positive and negative poles of the first magnet to the same polarity pole of the second magnet or between the poles of the second magnet below the release temperature such that a first magnetic field is generated by the first and second magnet, and operable to release the first and second magnets from one another above the release temperature,
 wherein the first and second magnets move with respect to one another when the adhesive releases the first and second magnets such that one of the positive and negative poles of the first magnet moves toward the opposing polarity pole of the second magnet for generating a second magnetic field different than the first magnetic field to indicate a temperature measurement for the batch or continuous stream;
(b) inserting the detectable particles provided in step (a) into the batch or continuous stream; and
(c) detecting a change in magnetic field strength from each of the detectable particles to thereby generate a temperature measurement for the batch or continuous stream.

55. The method of claim 54, wherein the first magnetic field has a first magnetic field strength, wherein the first and second magnets comprise a second and third magnetic field strength, respectively, wherein the second magnetic field strength is about the same as the third magnetic field strength such that the first magnetic field strength is about zero when one of the positive and negative poles of the first magnet is attached to the opposing polarity positive or negative pole of the second magnet.

56. The method of claim 54, wherein the first magnetic field has a first magnetic field strength, wherein the first and second magnets comprise a second and third magnetic field strength, respectively, wherein the second magnetic field strength is greater than the third magnetic field strength such that the first magnetic field strength is detectable when one of the positive and negative poles of the first magnet is attached to the opposing polarity positive or negative pole of the second magnet.

57. The method of claim 54, wherein the first and second magnets can comprise a material selected from the group consisting of neodymium iron boron, cobalt rare earth, aluminum-based, ceramic, organic, plastic-embedded metal or ceramic, neodymium-iron-boron grades, and combinations thereof.

58. The method of claim 54, wherein the adhesive comprises a material selected from the group consisting of glue materials, metallic alloys, single or multi-component epoxies, epoxy films, thermo-resistant cyanoacrylate adhesives, and combinations thereof.

59. The method of claim 54, wherein the adhesive comprises a metal alloy and a first and second thermo-resistant adhesive, wherein the metal alloy is attached to the first and second magnets via the first and second thermo-resistant adhesive, respectively.

60. The method of claim 54, wherein the adhesive comprises a material selected from the group consisting of indium, bismuth, tin, lead, cadmium, silver, and combinations thereof.

61. The method of claim 54, wherein the release temperature is a conservative temperature.

62. The method of claim 54, wherein the adhesive comprises a release temperature of about between −40° C. and 1000° C.

63. The method of claim 54, wherein the detectable particle comprises a carrier particle.

64. The method of claim 63, wherein the carrier particle defines an interior cavity for holding the detectable particle.

65. The method of claim 64, wherein the carrier particle comprises conservative behavior characteristics in a batch or continuous stream of material.

66. The method of claim 54, detecting a change from the first magnetic field to the second magnetic field for each of the particles via a sensor positioned proximate to the batch or stream.

67. The method of claim 66, wherein detecting a change is detected via a plurality of sensors positioned proximate to the batch or stream.

68. The method of claim 54, comprising detecting a change from the first magnetic field to the second magnetic field over a period of time, a predetermined length of a continuous stream, or combinations thereof.

69. The method of claim 68, wherein the change in magnetic field strength is detected via a plurality of successive, parallel, or overlapping sensors positioned proximate to the continuous stream over the predetermined length of the continuous stream.

70. The method of claim 54, wherein the continuous stream is a particulate-containing food product passing through a thermal processing apparatus.

71. The method of claim 54, comprising recording data associated with the detecting of the change in magnetic field strength.

72. The method of claim 71, wherein the data is stored for documentation, retrieval, analysis, or combinations thereof.

73. The method of claim 72, comprising retrieving the data, analyzing the data, or combinations thereof.

74. The method of claim 54, wherein the release temperature of each of the plurality of detectable particles is different.

75. A magnetically detectable particle for generating a temperature measurement for a batch or a continuous stream of material, the particle comprising:
(a) a first, second, and third magnet each comprising a positive and negative pole;
(b) a first adhesive having a first release temperature and operable to attach the negative pole of the first magnet to the negative polarity pole of the second magnet below the first release temperature, and operable to release the first and second magnets from one another above the first release temperature; and
(c) a second adhesive having a second release temperature and operable to attach the positive pole of the third magnet to the positive pole of the second magnet below the first release temperature, and operable to release the second and third magnets from one another above the first release temperature,
wherein a first magnetic field is generated by the first, second, and third magnets when the first magnet and third magnets are attached to the second magnet,
wherein the first and second magnets move with respect to one another when the first adhesive releases the first and second magnets such that the positive pole of the first magnet moves toward the negative pole of the second magnet for generating a second magnetic field different than the first magnetic field to indicate a first temperature measurement for the batch or continuous stream, and
wherein the second and third magnets move with respect to one another when the second adhesive releases the second and third magnets such that the negative pole of the third magnet moves toward the positive pole of the second magnet for generating a third magnetic field different than the first magnetic field to indicate a second temperature measurement for the batch or continuous stream.

76. The magnetically detectable particle of claim 75, wherein the first, second, and third magnets can comprise a material selected from the group consisting of neodymium iron boron, cobalt rare earth, aluminum-based, ceramic, organic, plastic-embedded metal or ceramic, neodymium-iron-boron grades, and combinations thereof.

77. The magnetically detectable particle of claim 75, wherein the first and second adhesive comprises a material selected from the group consisting of glue materials, metallic alloys, single or multi-component epoxies, epoxy films, thermo-resistant cyanoacrylate adhesives, and combinations thereof.

78. The magnetically detectable particle of claim 75, wherein the first and second adhesive comprises a material selected from the group consisting of indium, bismuth, tin, lead, cadmium, silver, and combinations thereof.

79. The magnetically detectable particle of claim 75, wherein the first release temperature is less than the second release temperature such that the first magnet is released from the second magnet at a lower temperature than the third magnet is released from the second magnet for indicating at least two temperature levels.

80. The magnetically detectable particle of claim 75, wherein the second release temperature is less than the first release temperature such that the third magnet is released from the second magnet at a lower temperature than the first magnet is released from the second magnet for indicating at least two temperature levels.

81. The magnetically detectable particle of claim 75, wherein the first release temperature is equal to the second release temperature such that the first and third magnets are released from the second magnets at the same temperature for indicating two temperature levels.

82. The magnetically detectable particle of claim 75, comprising a carrier particle.

83. The magnetically detectable particle of claim 82, wherein the carrier particle defines an interior cavity for holding the first and second adhesives and the first, second, and third magnets.

84. The magnetically detectable particle of claim 83, wherein the carrier particle comprises conservative behavior characteristics in a batch or continuous stream of material.

85. The magnetically detectable particle of claim 75, comprising:
(a) a fourth magnet comprising a positive and negative pole; and
(b) a third adhesive having a third release temperature and operable to attach the negative pole of the third magnet to the negative polarity pole of the fourth magnet below the third release temperature, and operable to release the third and fourth magnets from one another above the third release temperature,
wherein the third and fourth magnets move with respect to one another when the third adhesive releases the third and fourth magnets such that the positive pole of the fourth magnet moves toward the negative pole of the third magnet for generating a fourth magnetic field different than the first magnetic field to indicate a third temperature measurement for the batch or continuous stream.

86. A magnetically detectable particle for generating a temperature measurement for a batch or a continuous stream of material, the particle comprising:
(a) a plurality of sets of first and second magnets, each of the first and second magnets comprising a positive and negative pole; and
(b) a plurality of adhesives each corresponding to one of the sets of first and second magnets, the adhesives each having a release temperature and each adhesive operable to attach one of the positive and negative poles of the corresponding first magnet between the positive and negative poles of the corresponding second magnet below the release temperature such that a first magnetic field is generated by the corresponding first and second magnet, and each adhesive operable to release the first and second magnets from one another above the release temperature; and
wherein the corresponding first and second magnets move with respect to one another when the adhesive releases the corresponding first and second magnets such that one of the positive and negative poles of the corresponding first magnet moves toward the opposing polarity pole of the corresponding second magnet for generating a second magnetic field different than the first magnetic field to indicate a temperature measurement for the batch or continuous stream.

87. The magnetically detectable particle of claim 86, wherein each adhesive of the plurality of adhesives has different release temperatures.

88. The magnetically detectable particle of claim 86, wherein each adhesive of the plurality of adhesives has similar release temperatures.

* * * * *